United States Patent
Nemitallah et al.

(10) Patent No.: US 9,702,300 B2
(45) Date of Patent: Jul. 11, 2017

(54) APPLICATIONS OF OXY-FUEL COMBUSTION TECHNOLOGY INTO GAS TURBINE COMBUSTORS AND ION TRANSPORT MEMBRANE REACTORS

(71) Applicant: King Fahd University of Petroleum and Minerals, Dhahran (SA)

(72) Inventors: Medhat Ahmed Nemitallah, Dhahran (SA); Mohamed Abdel-Aziz Habib, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 138 days.

(21) Appl. No.: 14/178,907

(22) Filed: Feb. 12, 2014

(65) Prior Publication Data

US 2015/0267611 A1    Sep. 24, 2015

(51) Int. Cl.
  F02C 3/20    (2006.01)
  F23R 3/28    (2006.01)
  F23L 7/00    (2006.01)

(52) U.S. Cl.
  CPC ............... *F02C 3/20* (2013.01); *F23L 7/007* (2013.01); *F23R 3/286* (2013.01); *F05D 2240/35* (2013.01); *Y02E 20/16* (2013.01); *Y02E 20/322* (2013.01); *Y02E 20/344* (2013.01)

(58) Field of Classification Search
  CPC .... F02C 3/20; F02C 3/22; F23L 7/007; F23R 3/286; F23R 3/12; F23R 3/14; Y02E 20/16; Y02E 20/322; F05D 2260/14; F23B 7/002; F23C 7/002; F23C 7/004; F23C 7/006; F23C 2900/03004; F23C 2900/07021; F23D 14/24; F23D 14/583

USPC ............ 60/776, 786, 39.821, 732, 740, 778, 60/39.461, 737, 780, 801; 210/638; 431/170, 178, 176, 12, 162, 187, 182, 431/183, 184, 185

See application file for complete search history.

(56) References Cited

U.S. PATENT DOCUMENTS 5,979,183 A    11/1999  Smith et al.
6,010,614 A *   1/2000  Keskar .................. B01D 53/22
                                              205/763
6,035,641 A *   3/2000  Lokhandwala ...... B01D 53/002
                                              60/649

(Continued)

FOREIGN PATENT DOCUMENTS

IN    20100270514    5/2011

*Primary Examiner* — Christopher Demeree
(74) *Attorney, Agent, or Firm* — Oblon, McClelland, Maier & Neustadt, L.L.P.

(57) ABSTRACT

Experimental and numerical investigations on an atmospheric diffusion oxy-combustion flame in a gas turbine model combustor are conducted. The combustor is fuelled with $CH_4CH4$ and a mixture of $CO_2$ and $O_2$ as oxidizer. The stability of the oxy-combustion flame is affected when the operating percentage of oxygen in the oxidizer mixture is reduced below 25%. A new 3D reactor design is introduced for the substitution of ITM reactors into a gas turbine combustor. A new oxygen permeation equation model has been developed by fitting the experimental data available in the literature for a LSCF ion transport membrane. The monolith structure design ITM reactor is capable of delivering power ranging from 5 to 8 MWe based on cycle first law efficiency.

5 Claims, 73 Drawing Sheets

(56) References Cited

U.S. PATENT DOCUMENTS

| | | | | |
|---|---|---|---|---|
| 6,153,163 | A * | 11/2000 | Prasad | B01J 19/2475 |
| | | | | 252/373 |
| 8,820,312 | B2 * | 9/2014 | Habib | A21B 1/10 |
| | | | | 126/19 R |
| 2002/0174659 | A1 | 11/2002 | Viteri et al. | |
| 2008/0104961 | A1 * | 5/2008 | Bunker | F23R 3/286 |
| | | | | 60/737 |
| 2011/0099969 | A1 * | 5/2011 | Ku | B01D 53/22 |
| | | | | 60/39.12 |
| 2013/0247886 | A1 | 9/2013 | Hamad et al. | |
| 2014/0004470 | A1 * | 1/2014 | Huang | F23L 7/007 |
| | | | | 431/11 |

* cited by examiner

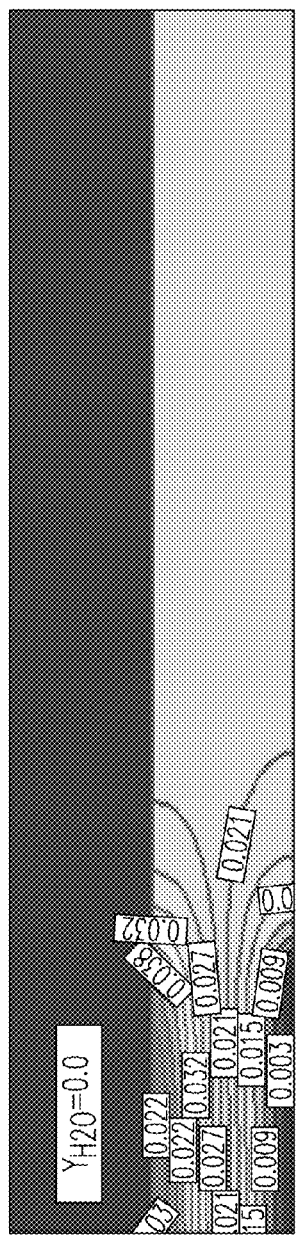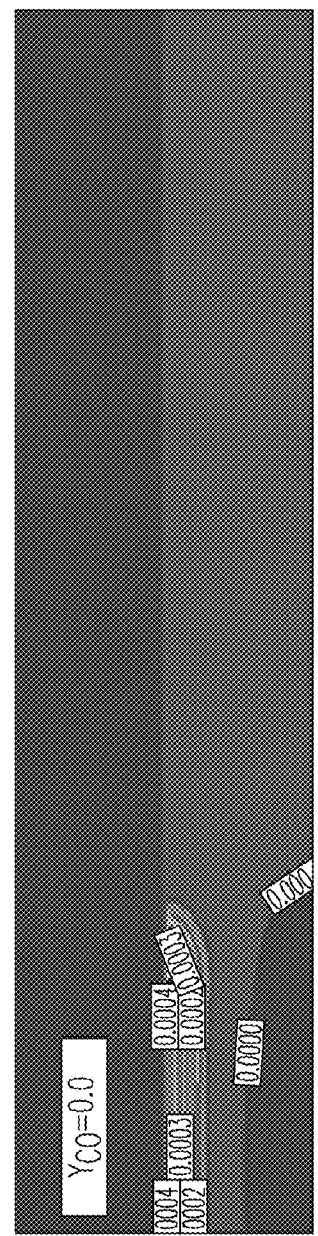

APPLICATIONS OF OXY-FUEL COMBUSTION TECHNOLOGY INTO GAS TURBINE COMBUSTORS AND ION TRANSPORT MEMBRANE REACTORS

BACKGROUND OF THE INVENTION

Technical Field

The present invention relates to a swirl stabilized gas turbine oxy-combustor, a method for oxy-combustion of a fuel using the swirl stabilized gas turbine oxy-combustor, and a monolith structure ion transport membrane reactor.

Description of the Related Art

Global climate change is one of the greatest challenges in the $21^{st}$ century. The greenhouse gas making the largest contribution to global climate change from human activities is carbon dioxide ($CO_2$). $CO_2$ emissions from the fossil fuel-based large power plants are of main concern as they are the largest sources of $CO_2$ in the coming decades. International Energy Agency forecasts have indicated that some 38 percentage of the world's electricity will still be generated from coal by 2020. See Priddle R., IEA World Energy Outlook, Paris, 1998, incorporated herein by reference in its entirety. For decreasing greenhouse gas (mainly $CO_2$) emissions, several approaches have been evaluated and reviewed for capturing $CO_2$ in the utility industry, namely Carbon Capture and Storage technology (CCS), including pre-combustion capture, oxyfuel combustion, and post-combustion capture. As a promising CCS technology, oxyfuel combustion can be used in existing and new power plants. See Buhre B. J. P., Elliott L. K., Sheng C. D., Gupta R. P., Wall T. F., Oxy-fuel combustion technology for coal-fired power generation, Prog. Energy Combust. Sci. 2005 Vol. 31, 283-307, incorporated herein by reference in its entirety. Compared to conventional air combustion, oxyfuel combustion shows different characteristics of heat transfer, ignition, char burnout as well as NOx emission. See Wall T. F., Combustion processes for carbon capture. Proceedings of the Combustion Institute, 2007, Vol. 3.1, 31-47, incorporated herein by reference in its entirety. During oxyfuel combustion, a combination of oxygen and recycled flue gases are used for combustion of the fuel. The exhaust gases consisting mainly of $CO_2$ and $H_2O$ generated with a concentration of $CO_2$ ready for sequestration. The recycled flue gases used to control flame temperature and make up the volume of the missing $N_2$ to ensure there is enough gas to carry the heat through the boiler. $CO_2$ capture and storage by the current technically viable options (post-combustion capture, pre-combustion capture and oxyfuel combustion) will impose a 7-10% efficiency penalty on the power generation process. The major contributors to this efficiency penalty are oxygen production and $CO_2$ compression. Cryogenic air separation systems use intricately designed multi-stage distillation processes at low temperature and require a significant amount of electrical power, mainly for air compression. See Pfaff I., Kather A., Comparative thermodynamic analysis and integration issues of CCS steam power plants based on oxy-combustion with cryogenic or membrane based air separation, Energy Procedia. 2009, 1(1):495-502, incorporated herein by reference in its entirety. Typical electrical power requirements range from 160 kWh, to 270 kWh per ton of $O_2$ with a commonly cited approximate value of 200 kWh per ton, depending on the desired purity. See Darde A., Prabhakar R., Tranier J. P., Perrin N., Air separation and flue gas compression and purification units for oxy-coal combustion systems, Energy Procedia. 2009, 1(1):527, 34 and Amann J. M., Kanniche M., Bouallou C., Natural gas combined cycle power plant modified into an $O_2/CO_2$ cycle for $CO_2$ capture, Energy Conversion and Management 2009, 50(3):510-21, each incorporated herein by reference in their entirety. Despite their complexity, commercial cryogenic units achieve low Second Law efficiencies in the range of 15-24%, resulting in a First Law efficiency loss of up to 8.5% points compared to a typical NGCC (Natural gas combined cycle) without CCS. See Simpson A. P., Simon A. J., Second law comparison of oxy-fuel combustion and post-combustion carbon dioxide separation, Energy Conversion and Management. 2007, 48(11): 3034-45 and Kakaras E., Koumanakos A., Doukelis A., Giannakopoulos D., Vorrias I., Oxyfuel boiler design in a lignite-fired power plant, Fuel 2007, 86(14): 2144-50, each incorporated herein by reference in their entirety. Clearly, the thermodynamic and economic penalties incurred by the use of a cryogenic air separation process could easily offset any advantages gained by using Oxy-fuel CCS, prompting many researchers to investigate the use of alternative air separation systems.

Energy production from fossil fuel combustion results in the emission of greenhouse gases, the dominant contributor being $CO_2$. Public awareness and legislation have led to a policy of reduction of greenhouse gas emissions in most economically well-developed countries, with the regulations partially driven by (international) initiatives such as the Kyoto protocol and the Inter-governmental Panel on Climate Change. See IPCC, Intergovernmental Panel on Climate Change, available at http://www.ipcc.ch.2004, Access date: Oct. 27, 2004, incorporated herein by reference in its entirety. Greenhouse gas emissions from energy production can be reduced by the use of alternative energy sources such as nuclear power and renewable energy. Renewable energy sources are increasingly used, however, until these sources can reliably produce significant amounts of energy, the immediate energy demand is likely to be met by conventional fossil fuel combustion, as indicated by energy policies and use projections. To reduce greenhouse gas emissions from fossil fuel-fired power generation, several possibilities exist including improving efficiency of power plants, introduction of combined cycles with generation by gas and steam turbines, which can achieve high thermal efficiencies, replacement of fossil fuels with renewable resources, substitution of coal by natural gas (having a lower carbon content), and $CO_2$ capture and storage (called CCS). Incremental reduction of greenhouse gas emissions can be achieved by the first four options, however, to make a step-change reduction in emissions, the $CO_2$ generated from combustion needs to be captured and stored (or sequestered).

All technologies include compression of the $CO_2$ product to a supercritical state, typically 10 MPa, prior to transport and geological storage at a depth (and thereby pressure) retaining this state. FIG. 1 is an illustration of the three capture processes of $CO_2$. Three main methods can be envisaged for the capture of $CO_2$ with these three systems as shown in FIG. 1: (1) pre-combustion capture: to capture $CO_2$ in a synthesis gas after conversion of CO into $CO_2$; (2) post-combustion capture: to capture $CO_2$ in the exhaust gases once the fuel has been fully burned with air; (3) capture in oxycombustion: consisting of combustion in oxygen with recycling of exhaust gases (therefore, composed mainly of $CO_2$ and water) and purification of the $CO_2$ flow, to eliminate incondensable gases.

FIG. 2 is an illustration of the efficiency of the different systems with and without $CO_2$ capture. The literature shows (see FIG. 2) that the highest efficiency with capture is obtained for NGCC with post-combustion capture, with an efficiency of 50% compared with 60% without capture. The next highest is the oxy-combustion in PC, with an efficiency of almost 35% compared with 45% without capture, and then IGCC-Puertollano with pre-combustion capture with an efficiency of the order of 3 3.5% compared with 44% without capture. The lowest efficiency is obtained with post-combustion capture in PC, equal to 30% which is 15 points less than PC without capture (if MEA is used). See Kanniche M., Bonnivard R. G., Jaud P., Marcos J. V., Amann J. M., Bouallou C., Pre-combustion, post-combustion and oxy-combustion in thermal power plant for $CO_2$ capture, Applied Thermal Engineering. 2010, 30, 53-62, incorporated herein by reference in its entirety. Therefore, recommended to only consider pre-combustion capture in IGCC, post-combustion in NGCC and oxy-combustion in PC.

The characteristics of oxy-fuel combustion with recycled flue gas differ with air combustion in several aspects primarily related to the higher $CO_2$ levels and system effects due to the recirculated flow, including the following: (1) To attain a similar adiabatic flame temperature (AFT), the $O_2$ proportion of the gases passing through the burner is higher, typically 30%, than that for air (of 21%), necessitating that about 60% of the flue gas is recycled. (2) The high proportions of $CO_2$ and $H_2O$ in the furnace gases result in higher gas emissivities, so that similar radiative heat transfer for a boiler retrofitted to oxy-fuel will be attained when the $O_2$ proportion of the gases passing through the burner is less than the 30% required for the same AFT. (3) The volume of gases flowing through the furnace is reduced somewhat, and the volume of flue gas (after recycling) is reduced by about 80%. (4) The density of the flue gas is increased, as the molecular weight of $CO_2$ is 44, compared to 28 for N2. (5) Typically, when air-firing coal, 20% excess air is used. Oxy-fuel requires a percent excess $O_2$ (defined as the $O_2$ supplied in excess of that required for stoichiometric combustion of the coal supply) to achieve a similar $O_2$ fraction in the flue gas as air firing, in the range of 3-5%. See Khare S., Wall T., Gupta R., Elliott L., Buhre B., The $30^{th}$ International Technical Conference on Coal Utilisation and Fuel Systems 2005, Coal 9 Technology: Yesterday-Today-Tomorrow, incorporated herein by reference in its entirety. (6) Without removal in the recycle stream, species (including corrosive sulphur gases) have higher concentrations than in air firing. (7) As oxy-fuel combustion combined with sequestration must provide power to several significant unit operations, such as flue gas compression, that are not required in a conventional plant without sequestration, oxy-fuel combustion/sequestration is less efficient per unit of energy produced.

The combustion of fuel in a mixture of recirculated flue gas (RFG) and oxygen, however, presents new challenges to combustion specialists. Several experimental investigations with oxy-firing pulverized coal burners report that flame temperature and stability are strongly affected. See Croiset E., Thambimuthu K. V., NOx and $SO_2$ emissions from $O2/CO_2$ recycle coal combustion, Fuel. 2007, Vol. 80, 2117-2121 and Rohan S., Wall T., Sulphur impacts during pulverised coal combustion in oxyfuel technology for carbon capture and storage, Progress in Energy and Combustion Science 37 (2011) 69e88, each incorporated herein by reference in their entirety. This work focuses on the investigation of the oxy-combustion of methane to see the effect of $CO_2$ recirculation on combustion characteristics. The substitution of N2 with $CO_2$ in the oxidizer will lead to a reduction of the flame speed as reported by Zhu et al. See Zhu D. L., Egolfopoulos F. N., Law C. K., Propagation and extinction of stretched premixed flames, Symposium (International) on Combustion. 1998, Vol. 21, Issue 1, 1419-1426, incorporated herein by reference in its entirety. This causes poor combustion performance and a modified distribution of temperature and species in the combustion chamber.

Today, most of the researchers in the oxy-combustion field are working on combustion using mixed ionic and electronic conducting ceramic membranes. These membranes have received increasing interest from academia and industry. A major industrial effort is currently devoted to the development of the mixed-conducting ceramic membrane reactor technology for partial oxidation of hydrocarbons, in particular, partial oxidation of methane to syngas. See Dyer P. N., Richards R. E., Russek S. L., Taylor D. M., Ion transport membrane technology for oxygen separation and syngas production, Solid State Ionics. 2000, 134, 21 and Lin Y. S., Microporous and dense inorganic membranes: current status and prospective, Sep. Purif. Technol. 2001, 25, 39-55, each incorporated herein by reference in their entirety. The membrane materials studied most extensively are lanthanum cobaltite perovskite type ceramics. See Zeng Y., Lin Y. S., Swartz S. L., Perovskite type ceramic membranes: synthesis, oxygen permeation and membrane reactor performance for oxidative coupling of methane, J. Membrane Sci. 1998, 150, 87-98, incorporated herein by reference in its entirety. New mixed-conducting ceramic membrane materials developed recently for the membrane reactor applications include modified perovskite ceramics having general formula of $SrFeCo_{0.5}O_x$, brownmillerite structured ceramic represented by $Sr_{1.4}La_{0.6}GaFeO_{3-\delta}$, and ceramic-metal dual phase membranes, such as $Sr_{0.2}La_{0.8}Fe_{0.69}Co_{0.1}Cr_{-0.2}Mg_{0.01}O_{3+}$ 50 Ag/50Pd, and thin dual phase membranes consisting of the chemically stable yttria-stabilized zirconia (YSZ) and Pd phases. See Balachandran U., Kleefisch M. S., Kobylinski T. P., Morissette S. L., Pei S., Oxygen ion-conducting dense ceramic membranes, U.S. Pat. No. 5,639,437; 1997, Schwartz M., White J. H., Sammels A. F., Solid state oxygen anion and electron mediating membrane and catalytic membrane reactors containing them, U.S. Pat. No. 6,033,632; 2000, Chen C. C., Prasad R., Gottzmann C. F., Solid electrolyte membrane with porous catalytically-enhancing constituents (Assigned to Praxair Technology), U.S. Pat. No. 5,938,822; 1999, and Kim J., Lin Y. S., Synthesis and oxygen permeation properties of thin YSZ/Pd composite membranes, AIChE J. 2000, 46, 1521, each incorporated herein by reference in their entirety. All these membranes are oxygen semi-permeable with high oxygen permeation flux when the membrane is exposed to air and a hydrocarbon such as methane.

In order to decrease $CO_2$ emissions, many approaches have been evaluated in order to capture $CO_2$, namely Carbon Capture and Storage technology (CCS). As a promising CCS technology, oxy-fuel combustion can be used in existing and new power plants. In oxy-combustion, a fuel is oxidized in a nearly nitrogen-free, diluted mixture such that the products consist mainly of $CO_2$ and water vapor, enabling a relatively simple and inexpensive condensation separation process facilitating $CO_2$ capture. There are two main approaches available to utilize the oxy-combustion technology, one of them is through the use of air separation units to separate $O_2$ which will be used in the combustion process and the other application is the ion transport membrane (ITM) reactor technology.

The combustion of fuel in a mixture of recirculated flue gas (RFG) and oxygen, however, presents new challenges to combustion specialists. Several experimental investigations with oxy-firing pulverized coal burners reported that flame temperature and stability are strongly affected. See Croiset E., Thambimuthu K. V., NOx and SO2 emissions from O2/CO$_2$ recycle coal combustion, Fuel. 2007, Vol. 80, 2117-2121, incorporated herein by reference in its entirety. The substitution of N2 with CO$_2$ in the oxidizer will lead to a reduction of the flame speed as reported by Zhu et al. See Zhu D. L., Egolfopoulos F. N., Law C. K., Propagation and extinction of stretched premixed flames, Symposium (International) on Combustion. 1998, Vol. 21, Issue 1, 1419-1426, incorporated herein by reference in its entirety. This causes poor combustion performance and a modified distribution of temperature and species in the combustion chamber. Liu et al. have performed numerical investigations on the chemical effects of CO$_2$. See Liu F., Guo H., Smallwood G., The chemical effect of CO$_2$ replacement of N2 in air on the burning velocity of CH$_4$ and H$_2$ premixed flames, J. Combust. Flame. 2003, Vol. 133 (4), 495-497, incorporated herein by reference in its entirety. A comparison between numerical and experimental data showed that the decrease in burning velocity for the oxyfuel combustion cannot entirely be described by only considering the material properties of CO$_2$. Anderson et al. have performed experiments on a 100 kW test unit which facilitates O$_2$/CO$_2$ combustion with real flue gases recycle. See Andersson K., Johnsson F., Flame and radiation characteristics of gas-fired O2/CO$_2$ combustion, Fuel. 2007, Vol. 86, 656-668, incorporated herein by reference in its entirety. The tests comprise a reference test with air and two O$_2$/CO$_2$ test cases with different recycled feed gas mixture concentrations of O$_2$ (OF 21 @ 21 vol. % O$_2$, 79 vol. % CO$_2$ and OF 27 @ 27 vol. % O$_2$, 73 vol. % CO$_2$). The results showed that the fuel burnout is delayed for the OF 21 case compared to air-fired conditions as a consequence of reduced temperature levels. Instead, the OF 27 case results in more similar combustion behavior as compared to the reference conditions in terms of in-flame temperature and gas concentration levels, but with significantly increased flame radiation intensity.

On the other hand, Teraoka et al. first demonstrated that $La_{1-x}S_xCo_{1-y}Fe_yO_{3-\delta}$ oxide-based perovskite-type ceramic membranes have appreciably high oxygen permeation fluxes at high temperatures. See Teraoka, Y., Zhang H. M., Furukawa S., Yamazoe N., Oxygen permeation though perovskite-type oxides, Chem. Lett. 1985, 1743, incorporated herein by reference in its entirety. Following Teraoka et al.'s work, many researchers studied the La—Sr—Co—Fe series as oxygen permeable membranes. See Kruidhof H., Bouwmeester H. J. M., Doom R. H. E., Burggraaf A. J., Influence of order-disorder transitions on oxygen permeability through selected nonstoichiometric perovskite-type oxides, Solid State Ionics. 1993, 3B-65B, 816; Qiu L., Lee T. H., Liu L. M., Yang Y. L., Jacobson A. J., Oxygen permeation studies of $SrCo_{0.8}Fe_{0.2}O_{3-\delta}$, Solid State Ionics. 1995, 76, 321; Stevenson J. W., Armstrong T. R., Carmeim R. D., Pederson L. R, Weber L. R., Electrochemical properties of mixed conducting perovskite $La_{1-x}M_xCo_{1-y}Fe_yO_{3-\delta}$ (M=Sr, Ba, Ca), J. Electrochem. Soc. 1996, 143, 2722; Tsai C. Y., Dixon A. G., Ma Y. H., Moser W. R., Pascucci M. R., Dense perovskite $La_{1-x}M_xCo_{1-y}Fe_yO_{3-\delta}$ (M=Sr, Ba, Ca) membrane synthesis, application, and characterization, J. Am. Ceram. 1998, Soc. 81, 1437; Xu S. J., Thomson W., Stability of $La_{0.6}Sr_{0.4}Co_{0.2}Fe_{0.8}O_{3-\delta}$ perovskite membranes in reducing and nonreducing environments, J. Ind. Eng. Chem. Res. 1998, 37, 1290; Elshof T. J. E., Bouwmeester H. J. M., Verweij H., Oxidative coupling of methane in a mixed conducting perovskite membrane reactor, Appl. Catal. 1995, A 130, 195; Gu X. H., Jin W. Q., Chen C. L, Xu N. P., Shi J., Ma Y. H., YSZ—$SrCo_{0.4}Fe_{0.6}O_{3-\delta}$ elta membranes for the partial oxidation of methane to syngas, AIChE J. 2002, 48, 2051-2060; Zhang K., Yang Y. L., Ponnusamy D., Jacobson A. J., Salama K., Effect of microstructure on oxygen permeation in $SrCo_{0.8}Fe_{0.2}O_{3-\delta}$, J. Mater. 1999, Sci. 34, 1367, each incorporated herein by reference in their entirety. The oxygen ionic transference number obtained was in the range of $10^{-5}$ to $10^{-3}$ depending on the temperature and ambient atmosphere, and the activation energy for ionic transport was 64-125 kJ/mol. Inconsistencies (up to one order of magnitude) were frequently reported on the oxygen permeation rates even with nominally identical membrane materials. For example, Teraoka et al. reported the oxygen permeation flux as high as $2.31 \times 10^{-6}$ mol/cm$^2$s at 850° C. for the $SrCo_{0.8}Fe_{0.2}O_{3-\delta}$ membrane; while the oxygen permeation fluxes for $SrCo_{0.8}Fe_{0.2}O_{3-\delta}$ membrane of the same thickness from Kruidhof et al. and Qiu et al. are $1.8 \times 10^{-7}$ and $6.3 \times 10^{-7}$ mol/cm$^2$s, respectively, under the same experimental conditions. In membrane reactor applications in which the membrane is, respectively, exposed to air and methane, the difference in the oxygen permeation fluxes reported by different research groups could be as large as two orders of magnitudes even for membranes of same or similar compositions.

Experimental and numerical investigations of an atmospheric diffusion oxy-combustion flame in a gas turbine model combustor are disclosed herein. Oxycombustion and emission characterization, flame stabilization and oxy-combustion model validation analyses are the main goals of the present disclosure. The combustor is fuelled with CH$_4$ and a mixture of CO$_2$ and O$_2$ as oxidizer. Wide ranges of different operating parameters are considered including equivalence ratio, percentage of O$_2$/CO$_2$ in the oxidizer mixture, and fuel volume flow rate. Stability of the oxy-combustion diffusion flame is checked experimentally and numerically. The minimum permissible percent of O$_2$ in the oxidizer mixture required in order to get a stable flame is determined. Visualizations of the flame at the above mentioned operating conditions have been carried out experimentally and compared with the numerical results. The flames have been characterized in details by measuring the exhaust gas temperatures and comparing them with those from the numerical model. Flame zone also has been characterized in details by plotting the axial and radial temperatures, species concentrations and flow velocities. A modified two-step oxy-combustion reaction kinetics model for methane-oxygen combustion has been used in order to predict a clearer oxy-combustion characteristics and then more accurate numerical results in order to correctly validate the numerical model using the experimental results.

Computational fluid dynamics (CFD) is becoming an important industrial tool for trouble-shooting. However, CFD modeling of industrial combustion applications is a computationally demanding task. See Andersen J., Rasmussen C. L., Giselsson T., Glarborg P., Global Combustion Mechanisms for Use in CFD Modeling under Oxy-Fuel Conditions, Energy Fuels, 2009, 23, 1379-1389, incorporated herein by reference in its entirety. It is necessary to apply simplified reaction mechanisms to reduce the computing cost and time; however the simplified schemes do not work as well under oxy-fuel combustion conditions like the case of combustion using air. For conducting the 2D analysis of the simple symmetric design ITM reactor, the modified two step finite rate oxy-combustion reaction kinetics model done by Andersen et. al. is used to predict oxy-combustion characteristics inside a stagnation flow ITM reactor.

Liu et al. have performed numerical investigations on the chemical effects of CO$_2$. A comparison between numerical and experimental data showed that the decrease in burning velocity for the oxyfuel combustion cannot entirely be described by only considering the material properties of $CO_2$. $CO_2$ affects the combustion reactions especially by the reaction $CO+OH \rightarrow CO_2+H$. The competition of $CO_2$ for H radical through the above reverse reaction with the single most important chain branching reaction $H+O_2 \rightarrow O+OH$ significantly reduces the concentrations of important radicals, i.e. O, H, and OH, leading to significant reduction of fuel burning rate. This hypothesis is supported by a comparison of the burning velocity of methane flames and hydrogen flames in a $CO_2 2/O_2$ gas mixture.

The influence of $CO_2$ on the burning velocity of hydrogen flames is less significant because the concentration of hydrogen radicals is much higher. The chemical effect of $CO_2$ significantly reduces the burning velocity of methane, where by the relative importance of this chemical effect increases with increasing $CO_2$ concentration in the oxidizing mixture.

During oxy-fuel combustion, the amount of NOx exhausted from the system can be reduced to less than one-third of that with combustion in air. See Jyh-Cherng C., Zhen-Shu L., Jian-Sheng H., Emission characteristics of coal combustion in different O2/N2, $O_2/CO_2$ and O2/RFG atmosphere, Journal of Hazardous Materials 142 (2007) 266-271 and Kimura K., Omata K., Kiga T., Takano S., Shikisima S., Characteristics of pulverized coal combustion in $O2/CO_2$ mixtures for $CO_2$ recovery, Energy Convers Manage 1995; 36: 805-808, each incorporated herein by reference in their entirety. The NOx reduction is thought to be the result of several mechanisms: Decrease of thermal NOx due to the very low concentration of $N_2$ from air in the combustor, the reduction of recycled NOx as it is reburnt in the volatile matter release region of the flame, and the reaction between recycled NOx and char. Okazaki and Ando used a bench-scale reactor to examine the effects of the latter two factors during oxy-fuel combustion with an $O_2$ concentration of 21% (i.e., recycling ratio as high as 80%) at a maximum flame dominant mechanism for the reduction in NOx emissions. See Okazaki K., Ando T., NOx reduction mechanism in coal combustion with recycled $CO_2$, Energy, 22 (1997) 207-215, incorporated herein by reference in its entirety. They estimated that more than 50% of the recycled NOx was reduced when 80% of the flue is recycled. It has also been found that oxy-fuel combustion can decrease the $SO_2$ emissions compared to that in air combustion. See Hu Y., Naito S., Kobayashi N., Hasatani M., $CO_2$, $NO_x$ and $SO_2$ emissions from the combustion of coal with high oxygen concentration gases, Fuel. 2000, 79, 1925-1932, incorporated herein by reference in its entirety.

The concept of oxy-combustion involves the burning of fuel in pure oxygen in addition to some recycled flow gases or steam in order to control the flame temperature. The aim is to obtain a carbon dioxide-rich stream that is ready for sequestration, after removing water vapor and other impurities. Various oxy-combustion systems have been introduced in the literature. See Buhre B. J. P., Elliott L. K., Sheng C. D., Gupta R. P., Wall T. F., Oxy-fuel combustion technology for coal-fired power generation, Prog. Energy Combust. Sci. 2005 Vol. 31, 283-307; Seepana S., Jayanti S., In: ASME international mechanical engineering congress and exposition, Boston, Mass., 2008, 435-444; Seepana S., Jayanti S., Steam-moderated oxy-fuel combustion, Energy Conversion and Management, 2010, 51, 1981-1988; Hong J., Chaudhry G., Brisson J., Field R., Gazzino M., Ghoniem A., Analysis of Oxy-Fuel Combustion Power Cycle Utilizing a Pressurized Coal Combustor, Energy. 2009, 34:1332-1340; and Andersen R., MacAdam S., Viteri F., Davies D., Downs J., Paliszewski A., In: Proceedings of ASME Turbo Expo, 2008, Berlin, Germany, each incorporated herein by reference in their entirety. The first version is the atmospheric pressure oxy-combustion system where part of the flue gases is recycled in order to control the flame temperatures. There is another alternative to using recycled flue gases is to inject steam in order to control the flame temperature. To further increase the performance of these systems, pressurized systems have been proposed for both systems oxy-combustion with recycled flue gases and oxy-syngas combustion in combination with solid fuel gasification technology. See Zheng L., Pomalis R., Clements B., Herage T., In: The 35$^{th}$ international technical conference on clean coal & fuel systems, 2010, Clearwater, Fla.; Fassbender A., Henry R., Tao L., AEA Report, AEA Grant Number. 2009, —AEA 07-014; Hong J., Thesis: Cambridge. 2009, Massachusetts Institute of Technology; and Hong J., Field R., Gazzino M., Ghoniem A., Operating Pressure Dependence of the Pressurized Oxy-Fuel Combustion Power Cycle, Energy 2010, 35, 5391-5399, each incorporated herein by reference in their entirety. Ion transport membrane reactor technology can also be applied and it is discussed in details later on. FIG. 3 is an illustration of the atmospheric oxy-coal combustion system with flue gas recycle proposed for carbon capture in coal power plants. The atmospheric oxy-coal combustion system shown in FIG. 3 was introduced as a short-term solution to retrofit existing coal-fired power plant to include the option of carbon capture and sequestration. The additional required equipments as compared with air-fired systems are considered herein.

When retrofitting existing power plants to be used with oxy-combustion, the system uses the same equipments used in the conventional combustion in addition to an ASU used to produce an oxygen rich stream for combustion. Currently, the only ASU technology that can meet the volume and purity demand of a large scale coal-fired utility boiler is based on cryogenic distillation. Air is compressed, cooled and cleaned prior to being introduced into the distillation column to separate air into an oxygen-rich stream and a nitrogen-rich stream. See Chen L., Zheng S., Yong, Ghoniem A., Modeling the slag behavior in three dimensional CFD simulation of a vertically-oriented oxy-coal combustion, Progress in Energy and Combustion Science. 2012, 38 156-214, incorporated herein by reference in its entirety. Cryogenic air separation is consuming about 0.24 kWh/kg O2 with 95% oxygen purity. See Haslbeck J., Capicotto P., Juehn N., Lewis E., Rutkowski M., Woods M., et al., In: Bituminous coal to electricity, Vol. 1. Washington D.C. 2007, DOE/NETL-129 1 and Haslbeck J., Capicotto P., Juehn N., Lewis E., Rutkowski M., Woods M., et al., In: Bituminous coal to electricity, Vol. 1. Washington D.C. 2007, DOE/NETL-129 1, each incorporated herein by reference in their entirety. The oxygen purity requirement for oxy-coal combustion (85-98%) is lower than that needed in the process industry (99.5-99.6%). See Darde A., Prabhakar R., Tranier J. P., Perrin N., Air separation and flue gas compression and purification units for oxy-coal combustion systems, Energy Procedia. 2009, 1(1):527, 5534, incorporated herein by reference in its entirety. The ASU can consume more than 15% of the gross power output. See Andersson K., Johnsson F., Process evaluation of an 865 MWe lignite fired $O_2/CO_2$ power plant, Energy Conversion and Management. 2006, 47:3487-98; Okawa M., Kimura N., Kiga T., Takano S., Arai K., Kato M., Trial design for a $CO_2$ recovery power plant by burning pulverized coal in $O_2/CO_2$, Energy Conversion and Management. 1997, 38:S123-7; and Varagani R., Chatel F., Pranda P., Rostam M., Lu Y., Bose A.,

In: The 4th annual conference on carbon sequestration, 2005, Alexandria, Va., each incorporated herein by reference in their entirety.

A carbon purification unit consists of gas cleanup units in order to remove water and other gases from the flue gas before being compressed for the sequestration process. Because oxy-combustion is compatible with retrofits, selective catalytic reduction (SCR), electrostatic precipitator (ESP) and flue gas desulphurization (FGD) are typically retained as means of NOx, particulate matter and SOx removal from the flue gases. These pollutants control devices are also suitable for use in conjunction with amine-type absorbents for post-combustion capture plants.

After the removal of acid gases such as SOx and NOx, non-condensable $N_2$, $O_2$, and Ar should also be purged using a non-condensable gas purification unit. This unit is made of multi-stage compression units with inter-stage cooling in order to separate out the inert gases.

Recycled flue gases are required for replacement of nitrogen in order to control the combustion temperature. These flue gases can be recycled at different locations downstream of the economizer in the form of wet or dry recycles. since $SO_2$ concentration in the flue gas may accumulate due to flue gas recycle, resulting in two or three times higher concentration than in conventional air-firing systems, the primary recycle has to be at least partially desulphurized for medium and high sulfur coal, to avid corrosion in the coal mill and flue gas pipes.

Capture of $CO_2$ from large point sources such as power plants with subsequent geological storage offers the possibility of a significant and relatively quick response to climate change at a reasonable cost. Successful commercialization of such technology could therefore provide a transition to a future during which energy production from non-fossil energy sources can grow over time. At present, there are no power plants with $CO_2$ capture available on a commercial scale, but long time aquifer storage is currently applied and evaluated in the North Sea and show promising results. See Torp T. A., Gale J., Demonstrating storage of $CO_2$ in geological reservoirs: the Sleipner and SACS projects, Energy. 2004, 29, 1361, 1369, incorporated herein by reference in its entirety. The $CO_2$ could also be stored in connection to enhanced oil recovery (EOR). Such storage has been closely monitored in the Weyburn project in Canada, see e.g. Emberly S., Hutcheon I., Shevalier M., Durocher K., Gunter W. D., Perkins E. H., Geochemical monitoring of fluid-rock interaction and $CO_2$ storage at the Weyburn $CO_2$-injection enhanced oil recovery site, Energy. 2004, 29:1393, 1401, incorporated herein by reference in its entirety. The highest cost is however on the capture side and to reduce the specific costs for capture different concepts are discussed. To recover and store carbon dioxide from flue gases of fossil fuel power plants, processes based on oxy-combustion appear to be promising. Concept of the technology is the combustion with commercially pure oxygen to achieve high $CO_2$ concentrations in the flue gases for the final $CO_2$ separation. The required oxygen is supplied by an air separation unit where the nitrogen is separated from the air. A great portion of the flue gases has to be recycled to substitute the removed nitrogen. This measure is inevitable to maintain the temperature level in the combustion chamber and in particular not to increase the heat transferred to the membrane walls of the steam generator which is limited by material parameters. See Pfaff I., Kather A., Comparative Thermodynamic Analysis and Integration Issues of CCS Steam Power Plants Based on Oxy-Combustion with Cryogenic or Membrane Based Air Separation, Energy Procedia. 2009, 1, 495-502, incorporated herein by reference in its entirety.

In the past decades, intense research efforts have been directed to the development and improvement of ceramic-based membranes for oxygen separation from air at high-temperature operations. Ceramic based membranes for oxygen separation systems can be categorized into pure oxygen conducting membranes and mixed ionic-electronic conducting membranes. Mixed ionic and electronic conducting ceramic membranes have received increasing interest from academia and industry. A major industrial effort is currently devoted to the development of the mixed-conducting ceramic membrane reactor technology for partial oxidation of hydrocarbons, in particular, partial oxidation of methane to syngas.

The required oxygen in this case is supplied by an air separation unit where the nitrogen is separated from the air. A great portion of the flue gases has to be recycled to substitute the removed nitrogen. A key component of the oxy-fuel process with high temperature membrane air separation unit (HTM-ASU), which is in the stage of development, is a dense membrane made of ceramic materials. These materials begin to conduct oxygen ions above a material dependent temperature (usually above 700° C.). Driving force for the mass transport is the differential oxygen partial pressure across the membrane, while the oxygen flux is enhanced with decreasing membrane thickness and rising temperature. As only oxygen permeates the membrane, 100% pure oxygen could be produced provided that air leakage within the membrane module is avoided. For further details regarding membrane materials, references are recommended. See Li K., Ceramic Membranes for Separation and Reaction. 2007, John Wiley & Sons, Ltd., West Sussex and Sirman J., Chapter 6 In: Nonporous Inorganic Membranes. 2006, WILEY-VCH Verlag GmbH & Co. KG, Weinheim, pp. 165-184, each incorporated herein by reference in their entirety. FIG. 4 is a schematic of an air separation unit based on high temperature membranes (exemplary flue gas swept). The basic idea of the HTM-ASU, as illustrated schematically in FIG. 4, is the elevation of the oxygen partial pressure on the air side with an air compressor. The partial pressure difference across the membrane can be further enhanced by lowering the oxygen partial pressure on the oxygen receiving side of the membrane by sweeping with flue gas, which contains only a small amount of oxygen. As temperatures at the compressor outlet are not sufficient to activate the membrane material's conduction mechanism, the air needs to be preheated with counter current oxygen enriched flue gas. To recover parts of the spent energy for compression, the oxygen depleted air is expanded in a turbine. As the off-gas leaves the HTM-ASU at still elevated temperatures, the heat can be recovered in the power plant cycle. The energy demand of the HTM-ASU is determined by the required high temperature heat. In addition, mechanical driving power is needed or produced depending on the ASU process parameter design.

As an option to get $O_2$ required for combustion, Oxygen may be obtained via air separation units, e.g. cryogenic or membrane based processes. The combustion process takes place in a nitrogen free or low-nitrogen environment resulting in a flue gas composed mainly of $CO_2$ and $H_2O$, as well as a low concentration of impurities such as argon and oxygen. Therefore, a simplified flue gas processing by means of condensation of $H_2O$ to capture $CO_2$, without using costly separation methods such as chemical absorption, can be possible. There are several proposed combined cycle concepts in oxy-fuel gas turbine processes with natural gas combustion in oxygen and $CO_2$, for example, the $O_2/CO_2$ cycle, the COOLENERG cycle, the COOPERATE cycle, and the MATIANT cycle. See Kvamsdal H. M., Jordal K., Bolland O., A quantitative comparison of gas turbine cycles with $CO_2$ capture, Energy 2007; 32:10-24; Bolland O., Mathieu P., Comparison of two $CO_2$ removal options in combined cycle power plants, Energy Convers Manage 1998; 39(16-18):1653-63; Dillon D. J., Panesar R. S., Wall R. A., Allam R. J., White V., Gibbins J., et al., Oxycombustion processes for $CO_2$ capture from advanced supercritical PF and NGCC power plant, In: Proceedings of the seventh international conference on greenhouse gas control technologies—GHGT7. Vancouver, Canada; September, 2004; Staicovici M. D., Further research zero $CO_2$ emission power production: the COOLENERG process, Energy 2002; 27:831-844; Yantovski E. I., Stack downward zero emission fuel-fired power plants concept, Energy Convers Manage 1996; 37:867-877; Mathieu P., Nihart R., Sensitivity analysis of the MATIANT cycle, Energy Convers Manage 1999; 40:1687-700, each incorporated herein by reference in their entirety. These cycles belong to the group also known as Semi-Closed Oxy-Fuel Combustion Combined Cycles (SCOF-CC). Recent studies within the European Union funded research project ENCAP (Enhanced Capture of $CO_2$) have concluded that SCOF-CC has good potential with limited technoeconomical hinders for realization. See The European Technology Platform for Zero Emission Fossil Fuel Power Plants (ZEP), The final report from working group 1 power plant and carbon dioxide capture; 13 Oct. 2006 and Sanz W., Jericha H., Bauer B., Göttlich E., Qualitative and quantitative comparison of two promising oxy-fuel power cycles for $CO_2$ capture, Paper GT2007-27375, ASME Turbo Expo, Montreal, Canada; 2007, each incorporated herein by reference in their entirety. Besides SCOF-CC a number of other oxyfuel cycles using steam/water as working fluids have been proposed including the Graz cycle, and the Water cycle developed by Clean Energy Systems (CES). See Jericha H., Sanz W., Göttlich E., Design concept for large output graz cycle gas turbines, ASME Paper GT2006-90032, ASME Turbo Expo 2006, Barcelona, Spain; 2006 and Anderson R. E., MacAdam S., Viteri F., Davies D. O., Downs J. P., Paliszewski A., Adapting gas turbines to zero emission oxy-fuel power plants, Paper GT 2008-5 1377, ASME Turbo Expo, Berlin, Germany; 2008, each incorporated herein by reference in their entirety. These cycles may require high temperature turbines and new design for the turbomachinery. For oxy-fuel gas turbine cycles, researches have been focused on thermodynamic studies of system performance. The combustion behavior, e.g. the flame dynamics and reaction zone structures in the gas turbine combustors, is less addressed. From thermodynamic studies it has been shown that a small amount of trace species in the combustion products can have a great impact on the $CO_2$ capture, storage and transportation. Li et al. demonstrated that the purification process of the flue gas stream of oxy-fuel combustion is highly influenced by the existence of impurities such as the small amount of N2 resulted from the air separation units and the remaining O2 in the flue gas due to incomplete combustion. See Li H., Yan J., Yan J., Anheden M., Impurity impacts on the purification process on oxy-fuel combustion based $CO_2$ capture and storage system, Appl Energy 2009; 86:202-13, incorporated herein by reference in its entirety. The presence of non-condensable gases results in increased condensation duty for the recovery of the $CO_2$. This in turn leads to lower system efficiency and increased cost for separation. To minimize the oxygen concentration in the flue gas and meanwhile achieve complete combustion of fuel, stoichiometric mixture is preferred in oxy-fuel combustion. $CO_2$ and/or steam are used to control the flue gas temperature. Jericha and Gottlich outlined a burner and combustor configuration, in which fuel, oxygen and steam were supplied separately in different inlets. See Jericha H., Göttlich E., Conceptual design for an industrial prototype graz cycle power plant, Paper GT 2002-30118, ASME Turbo Expo, Amsterdam, Netherlands; 2002, incorporated herein by reference in its entirety. The steam was supplied through an annular outer swirler inlet to form a swirling flow motion to wrap the flames and to cool down the flue gases.

Such combustor configuration would likely generate rather high flame temperature locally in the reaction zones that will enhance the dissociation of $H_2O$ and $CO_2$ and thus affect the composition of the flue gas such that the unconsumed oxygen can be high in the flue gas. To reduce the flame temperature and thereby the remaining oxygen in the flue gas it can be beneficial to premix the oxygen and $CO_2$ or steam before injecting them to the combustor. There are several possibilities that need to be explored for example, different levels of premixing of the fuel/oxygen/steam/$CO_2$ prior to their injection into the combustor, and different mixing patterns inside the combustor. The thermodynamic studies will give the same answer for the flue gas in the post flame zone if the inlet temperature, combustor pressure and the overall mass flows of fuel, oxygen, steam, and $CO_2$ streams are kept the same. However, the flame dynamics and reaction zone structures are dependent on combustor configurations as they are dictated by the detailed inflow conditions for the fuel/oxygen/steam and $CO_2$ supplies.

Optimal Supply of Oxygen and Diluent to Oxy Fuel Combustion:

To generate stable combustion in gas turbine combustion chambers with oxy-fuel combustion, certain minimal oxygen level in the oxidizer or elevated oxidizer temperature has to be maintained. The fundamental reason for this is the need to have sufficiently high temperature in the reaction zones for the chain reactions to proceed. Flame instability and poor burnout have been experienced when oxygen/$CO_2$ are premixed and supplied together to the flame as the oxidizer. See Woycenko D., van de Kamp W., Roberts P., European Comission Joule II clean coal technology program 1992-1995, vol. II. Powder coal combustion projects final reports; 1997. ISBN:92-9-828-006-7, incorporated herein by reference in its entirety. For example, in the recent experiments of Heil et al. it was shown that poor burnout and lifted dark flames appeared when the oxygen mole fraction in the O2/$CO_2$ stream was set to 21%; when the oxygen volume fraction was increased to 27% and 34%, full burnout and stable flames were obtained. See Heil P., Torporov D., Stadler H., Tschunko S., Forster M., Kneer R., Development of an oxycoal swirl burner operating at low $O_2$ concentrations, Fuel. 2009, 88, 1269-1274, incorporated herein by reference in its entirety. In order to burn the fuel with lower oxygen level in the oxidizer (O2/$CO_2$) stream the burner had to be modified to allow for recirculation of hot gases to the flame. To improve the recirculation, the inlet design of the oxidizer mixture should be modified in order to mix the hot burned gases in the flame zone with the incoming fresh cold gases in order to stabilize the flame.

In the study done by Kutne et. al., the burner considered was a modified version of a practical gas turbine combustor with an air blast nozzle for liquid fuels. See Kutne P., Kapadia B. K., Meier W., Aigner M, Experimental analysis of the combustion behavior of oxyfuel flames in a gas turbine model combustor, proceedings of the combustion institute. 20 1 0.doi: 10.101 6/j.proci.20 10.07.008 and Cao M., Eickhoff H., Joos F., Simon B., in: ASME Propulsion and Energetics, 70$^{th}$ Symposium, AGARD Conf. Proc. 422, 1987, 8.1, each incorporated herein by reference in their entirety. Co-swirling oxidizer mixture was supplied to the flame through a central nozzle and an annular nozzle. The radial swirlers consisted of 8 channels for the central nozzle and 12 channels for the annular nozzle. The overall flow field of the flames is characterized by a conically shaped inflow of fresh gas, an inner recirculation zone (IRZ) and outer recirculation zone (ORZ) as sketched in FIG. 5. FIG. 5 is a schematic of diagram of a combustion chamber. In the shear layer formed between the inflow and the IRZ, the mixing of hot combustion products with fresh gas leads to a continuous ignition and stabilization of the flame. Same idea of conically shaped inlet for the oxidizer mixture is applied to the running system of gas turbine model combustor in order to improve the mixing process and so stabilizing the flame. However, the aspect ratio between the diameter of the inlet nozzle and the combustor diameter plays an important role in calculating the amount of the oxidizer mixture that will be available for combustion and the amount that will escape between the flame zone and the reactor walls.

With high level oxygen in the oxidizer, the combustion products become hot and this may lead to high level of oxygen in the flue gas due to the dissociation reactions at high temperatures. There is an optimal ĵĵ window" of oxygen/diluent ratio in the oxidizer stream. See Liu C., Chen G., Sipöcz N., Assadi M., Bai X., Characteristics of oxy-fuel combustion in gas turbines, Applied Energy. 2012, 89, 3 87-394, incorporated herein by reference in its entirety. In the work done by Liu et al., they reported that the primary oxidizer which is supplied in the upstream through the dome of the combustion chamber should have minimal oxygen level of 24% under the oxidizer temperature 520 K condition. The reaction zones to have a suitable temperature when the flue gas enters to the turbines. This will cool down the combustion products generated in the primary reaction zones. Stable combustion and low turbine inlet temperature can be obtained simultaneously by adjusting the oxygen and $CO_2$ supplies to the combustion chamber.

The stability of swirl stabilized oxyfuel/$CH_4$ flames was studied in the work done by Peter Kutne et al. for $O_2$ mole fractions of 20-40%, equivalence ratios of $\Phi$=0.5-1 and thermal powers of 10-30 kW. However, attempts of operating the burner with <22% $O_2$ were unsuccessful even with conditions of $\Phi$=1 at 20 and 30 kW resulting in unstable operation and blow out.

Reactions Characteristics:

The oxyfuel combustion of coal in a steam turbine process is regarded as a possible way to use the oxyfuel process for $CO_2$ reduction. Research on this field is very active with the outcome that the first demonstration plants are in operation, and the power generation industry is willing to invest in this technology. Another way of particular interest is the use of oxyfuel combustion in gas turbines. This process offers the possibility to use the same post combustion techniques as for the oxyfuel coal process, in combination with an efficient combined cycle process. Swirl flames are used extensively in practical combustion systems because they enable high energy conversion in a small volume and exhibit good ignition and stabilization behavior over a wide operating range. See Gupta A., Lilley D., Syred N., Swirl Flows, 1984, Abacus Press, Kent; Syred N., Chigier N. A., Beér J. M., Flame Stabilization in Recirculation Zones of Jets with Swirl, Thirteenth Symposium on Combustion, University of Utah, Salt Lake City, 1970. Thirteenth International Symposium on Combustion, Combust. Inst. 1971, 13, 617-624; Syred N., Beér J. M., Combustion in swirling flows: A review, Combust. Flame. 1974, 23, 143-201; and Weber R., Dugué J., Combustion accelerated swirling flows in high confinements, Prog. Energy Combust. Sci. 1992, 18, 349-367, each incorporated herein by reference in their entirety. In stationary gas turbine (GT) combustors, they are used mostly as premixed or partially premixed flames, and in aero engines, as diffusion flames. To reduce pollutant emissions, especially NOx, the flames are operated generally very lean. See Correa S. M., Power generation and aeropropulsion gas turbines: from combustion science to combustion technology, Combust. Inst. 1998, 27, 1793-1807; Lefebvre A. H., Gas Turbine Combustion, Taylor &Francis, Philadelphia, 1999; and Bauer H. J., New low emission strategies and combustor designs for civil aeroengine Applications, Prog. Comput. Fluid Dyn. 2004, 4, 130-142, each incorporated herein by reference in their entirety. Under these conditions, the flames tend to exhibit undesired instabilities, e.g., in the form of unsteady flame stabilization or thermoacoustic oscillations. The underlying mechanisms of the instabilities are based on the complex interaction between flow field, pressure, mixing, and chemical reactions, and are not well enough understood to date. Detailed measurements in full-scale combustors are hardly possible, and very expensive and numerical tools have not yet reached a sufficient level of confidence to solve the problems. A promising strategy lies therefore in the establishment of a laboratory-scale "standard combustor" with practical relevance and detailed, comprehensive measurements using nonintrusive techniques with high accuracy. The gained data set will be used for validation and measurement of numerical combustion simulation codes which then can be applied to simulate the behavior of technical combustors. Intrusive probe measurements are less suited for these applications as they disturb the local flow field and change the conditions for stabilization and for reaction—locally or even in general. See Meier W., Duan X. R., Weigand P., Lehmann B, Temperatur-Messungen in turbulenten Drallflammen: Thermoelemente im Vergleich zu Laser-Raman-Streuung, Gaswärme Int. 2004, 53, 153-158 and Stricker W., Kohse-Höinghaus K., Jeffries J., Applied Combustion Diagnostics, Taylor & Francis, New York, 2002, pp. 155-193, each incorporated herein by reference in their entirety. In turbulent reacting flows, the use of optical measurement techniques is therefore essential for reliable information. Laser-based tools are the method of choice offering the potential to measure most of the important quantities with high temporal and spatial resolution, often as one- or two-dimensional images, and the ability to perform the simultaneous detection of several quantities. See Eckbreth A. C., Laser Diagnostic for Combustion Temperature and Species, Gordon & Breach, 1996; Kohse-Höinghaus K., Jeffries J., Applied Combustion Diagnostics, Taylor & Francis, New York, 2002; Masri A. R., Dibble R. W, Barlow R. S., The structure of turbulent nonpremixed flames revealed by Raman-Rayleigh-LIF measurements, Prog. Energy Combust. Sci. 1996, 22, 307-362; and Wolfrum J., lasers in combustion: from basic theory to practical devices, Proc. Combust. Inst. 1998, 28, 1-41, each incorporated herein by reference in their entirety.

In recent years a variety of laser-based investigations in GT model combustors have been reported that, besides feasibility studies, concentrated on certain aspects of the combustion process or model validation. For example, Kaaling et al. performed temperature measurements with CARS in a RQL (rich-quench-lean) combustor, and Kampmann et al. used CARS simultaneously with 2-D Rayleigh scattering to characterize the temperature distribution in a double-cone burner. See Kaaling H., Ryden R., Bouchie Y., Ansart D., Magre P., Guin C., in: 13$^{th}$ International Symposium on Air Breathing Engines (ISABE), Chattanooga, Tenn. (USA), 1997 and Kampmann S., Seeger T., Leipertz A., simultaneous CARS and 2D laser ragleigh thermometry in a contained swirl combustor, Appl. Opt. 1995, 34, 2780-2786, each incorporated herein by reference. In the same combustor, Dinkelacker et al. studied the flame front structures and flame lift. See Dinkelacker F., Soika A., Most D., Hofmann D., Leipertz A., Polifke W., Döbbeling K., structure of locally quenched highly turbulent lean premixed flames, Proc. Combust. Inst. 1998, 27, 857-865, incorporated herein by reference in its entirety. Their experiments have been conducted at bluff-body-stabilized premixed methane/air flames, where flow and flame parameters have been varied systematically over a broad range of exit velocities and stoichiometries. They found that for this burner configuration not only one but two different liftoff criteria must be met. For very lean mixtures the chemically dominated ignition delay is found to be the rate-determining step. For other cases, the liftoff height can be determined by a newly described turbulent mixing dominated model. Fink et al. investigated the influence of pressure on the combustion process by applying PLIF of OH and NO in a LPP (lean pre-evaporized premixed) model combustor. See Fink R., Hupfer A., Rist D., in: Proceedings, ASME Turbo Expo, 2002, GT-2002-30078, incorporated herein by reference in its entirety. With respect to NOx reduction strategies, Cooper and Laurendeau performed quantitative NO LIF measurements in a lean direct injection spray flame at elevated pressures. See Cooper C. S., Laurendeau N. M., Comparison of laser-induced and planar laser-induced fluorescence measurements of nitric oxide in a high-pressure, swirl-stabilized, spray flame. Appl. Phys. 2000, B 70, 903-910 and Cooper C. S., Laurendeau N. M., Quantitative measurements of nitric oxide in high-pressure (2-5 atm), swirl-stabilized spray flames via laser-induced fluorescence, Combust. Flame. 2000, 123, 175-188, each incorporated herein by reference in their entirety. They have performed excitation scans and calibration comparisons to assess the background contribution for PLIF detection. Also, they presented and analyzed quantitative radial NO profiles measured by LIF so as to correct the PLIF measurements to within the accuracy bars of the LIF measurements via a single-point scaling of the PLIF image. Shih et al. applied PLIF of OH and seeded acetone in a lean premixed GT model combustor, and Deguchi et al. used PLIF of OH and NO in a large practical GT combustor. See Shih W. P., Lee J. G., Santavicca D. A., stability and emissions characteristics of a lean premixed gas turbine combustor, Proc. Combust. Inst. 1996, 26, 277 1-2778 and Deguchi Y., Noda M., Fukuda Y., Ichinose Y., Endo Y., Inida M., Abe Y., Iwasaki S., industrial applications of temperature and species concentration monitoring using laser diagnostic, Meas. Sci. Technol. 2002, 13, R103-R1.15, each incorporated herein by reference in their entirety. They found that the automated LIBS unit is capable of monitoring trace element concentration fluctuations at ppb levels with a 1 min detection time under actual plant conditions. In addition, real-time measurement of $O_2$ and CO concentrations in a commercial incinerator furnace was performed using TDLAS to improve the combustion control. The multiple-point laser measurement results to control secondary air allocation, higher secondary combustion efficiency was achieved, and CO concentration was reduced. Hedman and Warren used PLIF of OH, CARS, and LDV for the characterization of a GT-like combustor fired with propane in order to achieve a better understanding of the fundamentals of GT combustion. See Hedman P. O., Warren D. L., Turbulent velocity and temperature measurements from a gas-fueled technology combustor with a practical fuel injector, Combust. Flame. 1995, 100, 185-192, incorporated herein by reference in its entirety. PLIF of OH was also applied by Lee et al. to study flame structures and instabilities in a lean premixed GT combustor, by Arnold et al. to visualize flame fronts in a GT combustor flame of 400 kW, and by Fritz et al. for revealing details of flashback. See Lee S. Y., Seo S., Broda J. C, Pal S., Santoro R. J., An experimental estimation of mean reaction rate and flame structure during combustion instability in a lean premixed gas turbine combustor, Proc. Combust. Inst. 2000, 28, 775-782; Arnold A., Bombach R., Hubschmid W., Käppeli B., ERCOFTAC Bull, 1998, 38, 10-19; and Fritz J., Kröner M., Sattelmayer, in: Proceedings, ASME Turbo Expo 2001, 2001-GT-0054, each incorporated herein by reference in their entirety. Lofstrom et al. performed a feasibility study of two-photon LIF of CO and 2-D temperature mapping by LIF of seeded indium in a low-emission GT combustor. See Löfström C., Engström J., Richter M., Kaminsky C. F., Johansson P., Nyholm K., Nygren J., AldénM., in: Proceedings, ASME Turbo Expo 2000, 2000-GT-0 124, incorporated herein by reference in its entirety. Four different laser diagnostic techniques were investigated in their work. The two more mature techniques, Planar Mie Scattering/Laser Induced Fluorescence and Planar Laser Induced Fluorescence of OH were used for fuel- and OH-visualisation, respectively. In addition, the applicability of some novel techniques in harsh industrial environments were investigated, two-line atomic fluorescence (TLAF) to obtain 2-dimensional temperature distributions, and two-photon LIF for the detection of CO. A comparison of two different laser excitation schemes for major species concentration measurements with laser Raman scattering was performed by Gittins et al. in a GT combustion simulator. See Gittins C. M., Shenoy S. U, Aldag H. R., Pacheco D. P., Miller M. F., Allen M. G., in: 38$^{th}$ AIAA Aerospace Sciences Meeting, Reno, Nev., 2000, incorporated herein by reference in its entirety. At a high-pressure test rig of the DLR, various laser techniques (LDV, CARS, PLIF of OH and kerosene, and 2-D temperature imaging via OH PLIF) were applied to GT combustors under technical operating conditions to achieve a better understanding of combustor behavior and to validate CFD codes. See Meier U. E., Wolff-Galβmann D., Heinze J., Frodermann M., Magnusson I., Josefsson G., in: 18$^{th}$ International Congress on Instrumentation in Aerospace Simulation Facilities (ICIASF 99), Toulouse, 1999, pp. 7.1-7.7; Meier U. E., Wolff-Gaβmann D., Stricker W., LIF imaging and 2D temperature mapping in a model combustor at elevated pressure, Aerospace Sci. Technol. 2000, 4, 403-414; Carl M., Behrendt T., Fleing C., Frodermann M., Heinze J., Hassa C., Meier U., Wolff-Gaβmann D., Hohmann S, Zarzalis N., Gas Turbines Power, ASME J. Eng. 2001, 123, 810-816; and Kunz O., Noll B., Lückerath R., Aigner M., Hohmann S., in: 37$^{th}$ AIAA/ASME/SAE/ASEE Joint Propulsion Conference and Exhibition, Salt Lake City, Utah, 2001, AIAA 2001-3706, each incorporated herein by reference in their entirety.

Williams et al investigated syngas and methane flames for premixed swirl stabilized conditions for two different oxidizers of air and O2/$CO_2$/N2. See Williams T. C., Shaddix C. R., Schefer R. W., Effect of Syngas Composition and $CO_2$-Diluted Oxygen on Performance of a Premixed Swirl-Stabilized Combustor, Combust. Sci. Technol. 2008, 180, 64-88, incorporated herein by reference in its entirety. Simple flame images for different conditions have been presented along with exhaust gas emissions. They report lower nitrogen oxides concentrations (NOx) for the quasi-oxyfuel flames and higher carbon monoxide concentrations (CO), suggesting stoichiometric operation at 20-24% $O_2$ as ideal for low emissions. Sautet et al. studied the length of natural gas/oxygen diffusion flames in a jet burner for free and confined configurations. See Sautet J. C., Salentey L., Ditaranto M., Samaniego J. M., length of natural gas-oxygen non-premixed flames, Combust. Sci. Technol. 2001, 166, 131-150, incorporated herein by reference in its entirety. Fuel jet Reynolds numbers were varied from 8362 to 16300 for five flames of which two were buoyancy controlled. The flame lengths were calculated from OH-chemiluminescence and indicated flames to be 2-3 times shorter than air flames with adiabatic flame temperatures in the region of 3050 K. Ditaranto and Hals discussed the effect of stoichiometric operation and high O2 content in oxidizer on thermo-acoustic oscillations in sudden expansion jet configuration. See Ditaranto M., Hals J., Combustion instabilities in sudden expansion oxy-fuel flames. Combust, Flame. 2006, 146, 493-512. dx.doi.org/10.1021/ef300539c|Energy Fuels 2012, 26, 4599-4606, incorporated herein by reference in its entirety. They reported occurrence of thermo-acoustic instabilities as $O_2$ content in the oxidizer was increased, characterizing different instability modes dependant on flow velocity and flame speed variations. The discussion above focused on oxy-fuel combustion using ion transport membranes in order to separate oxygen from air, then using the oxygen that permeates through the membrane in a combustion process in the other side of the membrane as shown in FIG. 6 FIG. 6 is an illustrative flowsheet for oxy-fuel combustion process using membrane reactor technology, with additional unit operations for carbon capture. See Habib M. A., Badr H. M., Ahmed S. F., Ben-Mansour R., Mezghani K., Imashuku S., lao G. J., Shao-Horn Y., Mancini N. D., Mitsos A., Kirchen P., Ghoniem A. F., A review of recent developments in carbon capture utilizing oxy-fuel combustion in conventional and ion transport membrane systems, Int. J. Energy Res. 2011, 35, 741-764, incorporated herein by reference in its entirety.

More recently, strong demand for tonnage quantities of oxygen is encouraged by the steady growth in chemical process operations. For instance, oxyfuel combustion process and oxygen-blown gasification to convert coal and natural gas into an intermediate synthesis gas that can be further processed to produce electricity, chemicals and transportation fuels. There have been two fundamental approaches to air separation, which are cryogenic and non-cryogenic distillation. The cryogenic distillation is typically reserved for applications that require tonnage quantity of oxygen at ultra-low temperature. The latter involves the separation of air at ambient temperatures using either molecular sieve adsorbents via pressure swing adsorption (PSA), or membrane separation process using the polymeric membranes. Recently, a third category of air separation has emerged, which is based on specialized ceramic membranes that separate oxygen from air at elevated temperatures, in contrast to the super-cooled temperatures required by conventional cryogenic distillation. This novel technique is based on dense ceramic membranes, which carry out the separation of oxygen from air at elevated temperatures, typically 800 to 900° C. MIEC (Mixed Ionic Electronic Conducting) membranes, ITM (Ion Transport Membranes), and OTM (Oxygen Transport Membranes) are acronyms that used to refer to high temperature ceramic membranes. See Hashim S. M., Mohamed A., Bhatia S., Current status of ceramic-based membranes for oxygen separation from air, Advances in Colloid and Interface Science. 2010, 160, 88-100, incorporated herein by reference in its entirety. These terms will be used throughout this work.

Ceramic based membranes for oxygen separation systems can be categorized into pure oxygen conducting membranes and mixed ionic-electronic conducting membranes. The solid electrolytes are pure oxygen conducting membranes, where electrodes are provided for the electron pathway. See Sunarso J., Baumann S., Serra J. M., Meulenberg W. A., Liu S., Lin Y. S., Diniz da Costa J. C., Mixed ionic-electronic conducting (MIEC) ceramic-based membranes for oxygen separation, J Membr Sci. 2008, 320:13-41, incorporated herein by reference in its entirety. The main advantage of this system is the control over the amount of oxygen generated via the application of an electric current. Compared to solid electrolytes, mixed ionic-electronic conducting membranes require neither electrodes nor an external circuit to operate. The electronic conductivity itself performs as an internal short circuit involving oxygen partial pressure gradient. Oxygen ions permeate from the high oxygen partial pressure side to the low oxygen partial pressure side, whilst the overall charge neutrality is maintained by a counterbalancing flux of electrons, as idealized schematically in FIG. 7. FIG. 7 is a schematic diagram of a dense ceramic membrane based on conduction mechanism. It should be noted that oxygen separation through this process has the advantage of producing high-purity oxygen.

It is worth noticing that ceramic materials with mixed ionic-electronic conducting characteristics typically have defined phase structures that can be derived from perovskite, fluorite, brownmillerite, and other similar types of materials. See Shao Z. P., Yang W. S., Cong Y., Dong H., Tong J. H., Xiong G. X., Investigation of the permeation behavior and stability of a $Ba_{0.5}Sr_{0.5}CO_{0.8}Fe_{0.2}O_{3-\delta}$ oxygen membrane, J Membr Sci. 2000, 172, 177-188; Kharton V. V., Viskup A. P., Kovalevsky A. V., Naumovic E. N., Marques F. M. B., Ionic transport in oxygen-hyperstoichiometric phases with K2NiF4-type structure, Solid State Ionics. 2001, 143, 337-353; Ting C., Hailei Z. Nansheng X., Yuan L., Xionggang L. U., ~Weizhong D., ~Fushen L., Synthesis and oxygen permeation properties of a $Ce_{0.8}Sm_{0.2}O_{2-\delta}$ $LaBaCO_2O_{5+\delta}$, Journal of Membrane Science 2011, 370, 158-165; and Wiik K., Aasland S., Hansen H. L., Tangen L. L., Odegard E., Oxygen permeation in the system $SrFeO_{3-x}SrCoO_{3-y}$, Solid State Ionics. 2002, 152-153, 675-680, each incorporated herein by reference in their entirety. Among ceramic membranes with mixed ionic-electronic conducting characteristics, perovskite-type and fluorite-type are the best structures in case of oxygen permeation properties; however, the perovskite type ceramic membranes have higher permeability and promising potential for improvement. See Fan C. G., Zuo Y. B., Li J. T., Lu J. Q., Chen C. S., Bae D. S., Highly permeable $La_{0.2}Bs_{0.8}Co_{0.8}Fe_{0.2-x}Zr_xO_{3-\delta}$ membranes for oxygen separation, Sep Purif Technol. 2007, 55, 35; Ishihara T., Yamada T., Arikawa H., Nishiguchi H., Takita Y., mixed electronic-oxide ionic conductivity and oxygen permeating property of Fe-, Co- or Ni-doped $LaGaO_3$ provskite oxide, Solid State Ionics. 2000, 135, 63 1-636; and Fan C. G., Zuo Y. B., Li J. T., Lu J. Q., Chen C. S., Bae D. S., Highly permeable $La_{0.2}Ba_{0.8}Co_{0.8}Fe_{0.2-x}Zr_xO_{3-\delta}$ membranes for oxygen separation, Sep Purif Technol. 2007, 55, 35, each incorporated herein by reference in their entirety.

Based on the difference in the oxygen chemical potentials between the feed side and the permeate side, the membrane temperature and its ambipolar conductivity, oxygen migrates from the high pressure feed side to the low pressure permeate side, according to the overall transport processes summarized as follows:

i) gaseous oxygen mass transfer (advection and diffusion) from the feed stream to the membrane surface, adsorption onto the membrane surface, dissociation and ionization of oxygen molecules and subsequent incorporation of the ions into the lattice vacancies (feed side surface exchange), ii) Transport of lattice oxygen ions through the membrane (bulk diffusion), iii) Association of lattice oxygen ions to oxygen molecules and desorption from the membrane surface into the gas phase (permeate side surface exchange), gaseous oxygen mass transfer (advection and diffusion) from the membrane surface to the permeate stream. See Manning P. S., Sirman J. D., Kilner J. A., Oxygen self-diffusion and surface exchange studies of oxide electrolytes having the fluorite structure, Solid State Ionics. 1996, 93(1-2), 125-132; Ishihara T., Kilner J. A., Honda M., Sakai N., Harumi Y., Yusaku T., Oxygen surface exchange and diffusion in LaGaO3 based perovskite type oxides, Solid State Ionics. 1998, 113-115, 593-600; Ruiz-Trejo E., Sirman J. D., Baikov Y. M., Kilner J. A., Oxygen ion diffusivity surface exchange and ionic conductivity in single crystal Gadolinia doped Ceria, Solid State Ionics. 1998, 113-115, 565-569; and Lane J. A, Kilner J. A., Oxygen surface exchange on gadolinia doped ceria, Solid State Ionics. 2000, 136-137, 927-932, each incorporated herein by reference in their entirety. FIG. 8 is a schematic diagram of oxygen permeation through mixed ionic-conducting membrane. FIG. 8 demonstrates that oxygen permeation through a dense mixed ionic-electronic conducting material is limited by surface exchange resistance, bulk diffusion limitations, or both. See Tan X., Liu Y., Li K., Mixed conducting ceramic hollow fibre membranes for air separation, AIChE J. 71 (2005) 1991; Kim S., Yang Y. L., Jacobson A. J., Abeles B., Diffusion and surface exchange coefficients in mixed ionic electronic conducting oxides from the pressure dependence of oxygen permeation, Solid State Ionics. 1998, 106:189-195; and Lin Y. S., Wang Y., Han J., Oxygen permeation through thin mixed-conducting solid oxide membranes. AIChE J. 1994, 40:786-798, each incorporated herein by reference in their entirety. It should be noted that the bulk diffusion will be the controlling step when the membrane is relatively thick.

FIG. 8 visualizes the mechanism for oxygen permeation through a mixed ionic-electronic conducting membrane. It can be seen that the permeation process from the high oxygen partial pressure side to the low oxygen partial pressure side by dividing the process into three zones: (1) an interfacial zone on the high partial pressure or air side; (2) a Central bulk zone; and (3) an interfacial zone on the low oxygen partial pressure or sweep gas side. The demonstration of incorporating both bulk diffusion and surface exchange kinetics into a single unambiguous equation has been done by few research groups. For example, the following general assumptions were used for the derivation of Eq. (2.1) by Tan and Li in the formation of mathematical models for the perovskite systems: 1) the oxygen permeation flux is controlled by the surface exchange reactions. 2) The operation is under steady-state isothermal operation. 3) The radial diffusion of gases is neglected. 4) Ideal gas law is applied to the gas phase. 5) The mass transfer resistance of gas phase to oxygen permeation is negligible and the oxygen partial pressures on both shell side and tube side of the membrane surfaces are the same.

$$\frac{dN_{O_2}}{dl} = \frac{K_f[(P'o_2)^{0.5} - (P''o_2)^{0.5}]}{\frac{K_f \ln(r_2/r_1)(P'o_2)^{0.5}(P''o_2)^{0.5}}{\pi D_v} + \frac{(P'o_2)^{0.5}}{2\pi r_1} + \frac{(P''o_2)^{0.5}}{2\pi r_2}} \quad (2.1)$$

where N is the molar flow rate, l is the variable length of hollow fiber membrane, kf is the forward reaction rate constant, Dv is the oxygen vacancy diffusion coefficient, p'o2 and p~o2 are partial pressures of oxygen at the feed and permeate side, respectively and r2 and r1 are the outer and inner diameter radius of the membrane tube.

Eq. (2.1) is specially derived for tubular membranes and has been applied successfully in the hollow-fiber systems of $Ba_{0.5}Sr_{0.5}Co_{0.8}Fe_{0.2}O_{3-\delta}$ (BSCF) and $La0.6Sr0.4Co0.2Fe0.8O_{3-\delta}$—(LSCF). See Xu S. J., Thomson W. J., Oxygen permeation rates through ion-conducting perovskite membranes, Chem Eng Sci. 1999, 54: 3839 and Lee T., Yang Y., Jacobson A., Abelesa B., Zhou M., Oxygen permeation in dense $SrCo_{0.8}Fe_{0.2}O_{3-\delta}$ membranes: Surface exchange kinetics versus bulk diffusion, Solid State Ionics. 1997, 100, 77-85, each incorporated herein by reference in their entirety. The detailed derivation of Eq. (2.1) can be found elsewhere. See Shao Z., Xiong G., Tong J., Dong H., Yang W., ~Ba effect in doped $Sr(Co_{0.8}Fe_{0.2})O_{3-\delta}$ on the phase structure and oxygen permeation properties of the dense ceramic membranes', Sep. Purif. Technol., 25, 419-429 (2001); Wang H., Wang R., Liang D., Yang W., Experimental and modeling studies on $Ba_{0.5}Sr0.5Co_{0.8}Fe0.2O_{3-\delta}$ (BSCF) tubular membranes for air separation, J. membr Sci. 2004, 243, 405; and Ge L., Shao Z., Zhang K., Ran R., Diniz da Costa J., Liu S., Evaluation of mixed-conducting lanthanum-strontium-cobaltite ceramic membrane for oxygen separation, AIChE J. 2009, 55, 2603, each incorporated herein by reference in their entirety. The use of Eq. (2.1) for the perovskite systems is very useful in the scaled-up engineering calculations, wherein the oxygen permeation flux performance inside the hollow-fiber perovskite membrane modules, which consists of many small-long tubes, can be estimated. Consequently, the oxygen permeation flux with respect to log mean membrane area, $dAm=2\pi rmdl$ where $rm=(r2-r1)/\ln(r2/r1)$ can be expressed by:

$$J_{O_2} = \frac{K_f D_v((P'o_2)^{0.5} - (P''o_2)^{0.5})}{2(r_2 - r_1)K_f(P'o_2 P''o_2)^{0.5} + \frac{r_m}{r_1}D_v(P'o_2)^{0.5} + \frac{r_m}{r_1}D_v(P''o_2)^{0.5}} \quad (2.2)$$

For the sake of analyses, it is assumed that the oxygen permeation in Eq. (2.2) is still applicable to other mixed conducting membranes such as $SrCo_{0.9}Nb_{0.01}O_{3-\delta}$ and $La_{0.2}Ba_{0.8}Co_{0.8}Fe_{0.2-x}Zr_xO_{3-\delta}$. See Ito W., Nagai T., Sakon T., Oxygen separation from compressed air using a mixed conducting perovskite-type oxide membrane, Solid State Ionics. 2007, 178, 809, incorporated herein by reference in its entirety. $L_c$ is defined by the membrane thickness at which the oxygen permeation resistance by bulk diffusion equals by the surface exchange reactions. Lc is expressed as:

$$L_c = \frac{D_v}{2K_f}\left(\frac{1}{P'o_2^{0.5}} + \frac{1}{P''o_2^{0.5}}\right) \quad (2.3)$$

It is noted in Eq. (2.3) that value depends on oxygen partial pressure and temperature. A larger characteristic thickness is resulted from higher and operating at lower temperature or lower oxygen partial pressure. When the membrane has a thickness far less than the critical thickness, Lc, the resistance by bulk diffusion can be neglected; therefore, the surface exchange reaction becomes the rate-limiting step. Lee et al. indicated that the permeation in membranes in the thickness range of 1 to 2.6 mm was controlled both by the bulk diffusion of oxide ions and by surface exchange. In this case, Eq. (2.1) can be further simplified as:

$$\frac{dN_{O_2}}{dl} = \frac{K_f[(P'_{O_2})^{0.5} - (P''_{O_2})^{0.5}]}{\frac{(P'_{O_2})^{0.5}}{2\pi r_1} + \frac{(P''_{O_2})^{0.5}}{2\pi r_2}} \quad (2.4)$$

See Zhu X., Sun S., Cong Y., Yang W., Operation of perovskite membrane under vacuum and elevated pressures for high-purity oxygen production, J Membr Sci. 2009, 345, 47-52, incorporated herein by reference in its entirety.

Surface exchange reactions may involve many sub-steps, which are oxygen transfer from the gas phase to membrane phase, physical adsorption on surface, dissociation with electronic transfer to yield chemisorbed oxygen species, and the incorporation in surface layer including the reverse reactions. See Zhu X., Cong Y., Yang W., Oxygen permeability and structural stability of $BaCe_{0.15}Fe_{0.85}O_{3-\delta}$ membranes, J Mem br Sci. 2006, 283, 3 8-44, incorporated herein by reference in its entirety.

The oxygen permeation flux is inversely proportional to the membrane thickness; thus, reducing the membrane thickness will increase the oxygen permeation as long as bulk diffusion prevails. Kim et al. derived an equation applicable in tubular perovskite membranes to explain the oxygen permeation data in $Sr_{0.5}Co_{0.8}Fe_{0.2}O_{3-\delta}$ and $Sr_{0.5}Sr_{0.5}CoO_{3-\delta}$ in the surface exchange reaction limited. Eq. (2.5) can be used for surface exchange limited region in tubular perovskite membranes.

$$J_{O_2} = \frac{\pi r_1 r_2 k}{(r_1 + r_2)S}\left(\frac{\sqrt{P'_{O_2}}}{\sqrt{P^o_{O_2}}} - \frac{\sqrt{P''_{O_2}}}{\sqrt{P^o_{O_2}}}\right) \quad (2.5)$$

where, k is the surface exchange coefficient unit and S is the effective membrane area. When a membrane is relatively thick, the overall oxygen permeation is controlled by the bulk diffusion. The flux in this case is generally described by Wagner theory. The flux of oxygen, $J_{O_2}$ is given by Eq. (2.6):

$$J_{O_2} = \frac{1}{4^2 F^2 L} \int_{\mu_{O_2}(2)}^{\mu_{O_2}(1)} t_i t_e \sigma_t d\mu_{O_2} \quad (2.6)$$

where F (C/mol) the Faraday constant; L (m) the membrane thickness and t is the product of the electronic transference number te, ionic transference number ti and total conductivity Γt. Lin et al. and Qi et al. derived the oxygen permeation flux equations for ionic or mixed-conducting ceramic membranes in terms of electrical conductivity. See Lin Y. S., Wang Y., Han J., Oxygen permeation through thin mixed-conducting solid oxide membranes, AIChE J. 1994, 40:786-798 and Qi X., Lin Y., Swartz S., electrical transport and oxygen permeation properties of lanthanum cobaltite membranes synthesized by different methods, Ind Eng Chem Res. 2000, 39, 646, each incorporated herein by reference in their entirety. In this case, the oxygen permeation flux can be expressed as:

$$J_{O_2} = \frac{RT}{4F^2L}\left[\sigma_h(P'_{O_2})\left(1 - \left(\frac{P''_{O_2}}{P'_{O_2}}\right)^{1/4}\right) + \sigma_e(P'_{O_2})\left(\left(\frac{P''_{O_2}}{P'_{O_2}}\right)^{1/4} - 1\right)\right] \quad (2.7)$$

where, R (J/mol K) is the gas constant and T (K) is the temperature. Eq. (2.7) has been used successfully by Rui et al. to describe the oxygen permeation through dense ceramic membranes with finite rate of chemical reaction. See Rui Z., Li Y., Lin Y., Analysis of Oxygen Permeation through Dense Ceramic Membranes with Chemical Reactions of Finite Rate, Chem Eng Sci. 2009, 64, 172, incorporated herein by reference in its entirety. Oxygen permeation flux within $Bi_{1.5}Y_{0.3}Sm_{0.3}O_{3-\delta}$ (t=1.2 mm, T=873-953 K) and $La_{0.6}Sr_{0.4}Co_{0.2}Fe_{0.8}O_{3-\delta}$ (t=1.12 mm, T=1273 K) is well explained by this equation. Although Eq. (2.7) is originally an empirical equation, it has been applied in the literature with reasonable predictions. See Akin F. T., Jerry, Lin Y. S., Oxygen permeation through oxygen ionic or mixed-conducting ceramic membranes with chemical reactions, Journal of Membrane Science. 2004, 231, 133-146, incorporated herein by reference in its entirety.

Wang et al. revealed that the controlling step of the oxygen permeation for the 1.5 mm thickness BSCF tubular membrane was bulk diffusion at the temperature range of 700° C. to 900° C.; hence, the surface exchange reaction does not favor the oxygen permeation flux. The oxygen permeation flux is described in Eq. (2.8).

$$J_{O_2} = \frac{\pi L C_i D_a}{2S \ln(r_1/r_2)} \ln\left(\frac{P''_{O_2}}{P'_{O_2}}\right) \quad (2.8)$$

where Ci stands for density of oxygen ions and Da for ambipolar oxygen ion-hole diffusion coefficient, $D_a$ could be determined from oxygen permeation flux data. Ge et al. theoretically analyzed that the oxygen permeation flux through $La_{0.4}Sr_{0.6}CoO_{3-\delta}$ disk-shaped membrane at 950° C. was controlled by both the bulk diffusion and oxygen surface exchange reactions; therefore, the oxygen permeation flux is given as:

$$J_{O_2} = \frac{D_v}{2L} \frac{\frac{K_f}{\frac{1}{(P'_{O_2})^{0.5}} + \frac{1}{(P''_{O_2})^{0.5}}}}{\frac{Kf}{\frac{1}{(P'_{O_2})^{0.5}} + \frac{1}{(P''_{O_2})^{0.5}}} + \frac{D_v}{2L}} (C_v'^e - C_v^e) \quad (2.9)$$

Where $C^e$ and $C'^e$ are the oxygen vacancy concentrations in the material under thermal equilibrium with the atmosphere surrounded by oxygen partial pressure at feed side and oxygen partial pressure at the permeate side and ($P'o_2$ and $P''o_2$), respectively. Dv and kf can be determined by proper fitting of the experimental data into Eq. (2.9), which requires prior knowledge of (a) and values and (b) the oxygen permeation fluxes under the applied oxygen partial pressure gradient across the membrane at selected temperatures by oxygen permeation experiments.

Chang et al. systematically compared the performance of symmetric (1.5 mm thick) and asymmetric mixed-conducting membranes (200 μm-thick thin dense layer and 1.3 mm-thick support) with correlation of overall oxygen permeation resistance across the membrane. See Chang X., Zhang C., He Y., Dong X., Jin W., Xu N., A Comparative Study of the Performance of Symmetric and Asymmetric Mixed-conducting Membranes, Chin J Chem Eng. 2009, 17, 562, incorporated herein by reference in its entirety. They prepared the asymmetric membrane consists of the support and thin dense layer from the same composition $SrCo_{0.4}Fe_{0.5}Zr_{0.1}O_{3-\delta}$ (SCFZ) perovskite-type oxide. The oxygen permeation flux in both membrane architectures is represented as:

$$J_{O_2} = \frac{1}{S} \frac{RT}{R_p + R_d} \ln\left(\frac{P'_{O_2}}{P''_{O_2}}\right) \quad (2.10)$$

Where Rp and Rd are the resistance in the porous support and thin dense layer, respectively. For an asymmetric membrane, the overall resistance is the sum of the resistance in the porous support and in the thin dense layer ($R_{overall}$=Rp+Rd). In the symmetric membrane $R_{overall}$=Rp. They concluded that the oxygen permeation flux on the asymmetric membrane was higher than the symmetric membrane due to the significant decrease of bulk diffusion resistance in the thin dense layer of the asymmetric membrane. Chang et al. reported detailed calculation of the overall oxygen permeation resistance and modeling of the transport resistance through a membrane.

The performance of oxygen permeation flux depends on both membrane materials and the membrane thickness. The permeation conditions such as pressure and temperature also influence the flux according to the Eq. (2.7); in addition, the sweep gas flow rate also plays an important role. The dependence of oxygen permeation flux on the thickness of the disk membrane of 0.55, 1.10 and 1.65 mm has been observed by Sunarso et al. See Sunarso J., Liu S., Lin Y., Diniz da Costa J., Oxygen permeation performance of $BaBiO3-\delta$ ceramic membranes, J Membr Sci. 2009, 344, 28 1-287, incorporated herein by reference in its entirety. FIG. 9 is a graph of the oxygen permeation fluxes as function of temperature at different membrane thicknesses. As can be seen in FIG. 9, the oxygen permeation flux was insignificant when the temperature was lower than 600° C.; however, at temperature higher than 650° C., considerable oxygen permeation flux value was obtained. These researchers claimed that the sharp increase of oxygen permeation flux was obtained when the temperature was above 800° C. due to the improvement of oxygen ionic diffusion and/or surface reaction rate. It can be obviously seen the six fold enhancement (from 0.2 to 1.2 ml/cm$^2$ min) for 0.55 mm disk membrane thickness when the temperature increased from 800 to 950° C. Sunarso et al. also revealed that the oxygen permeation flux increased as the membrane thickness decreased, especially when the temperature was higher than 800° C. Interestingly, they observed that the increase of oxygen permeation flux was not inversely proportional to the membrane thickness reduction. This can be explained by reducing the thickness of the disk membrane by half, which was from 1.10 mm to 0.55 mm; as a result, the increase of oxygen permeation fluxes was only 20%, rather than 100%. From the results obtained, Sunarso et al. suggested that both bulk diffusion and surface exchange kinetics were the rate limiting steps for the oxygen transport across the membranes.

The similar observation was reported by Watanabe et al. See Watanabe K., Takauchi D., Yussa M., Kida T., Shimanoe K., Teraoka Y., et al., Oxygen Permeation Properties of Co-Free Perovskite-Type Oxide Membranes Based on $BaFe_{1-y}Zr_yO_{3-\delta}$, J Electrochem Soc. 2009, 156, 81, incorporated herein by reference in its entirety.

Zhu et al. investigated the performance of oxygen permeation flux of dense $BaCe_{0.15}Fe_{0.85}O_{3-\delta}$ (BCF1 585) ceramic membranes synthesized by the solid-state reaction (SSR) method and EDTA-citric acid (EC) method. See Zhu X., Cong Y., Yang W. J., Effects of synthesis methods on oxygen permeability of $BaCe_{0.15}Fe_{0.85}O_{3-\delta}$ ceramic membranes, Mem br Sci. 2006, 283, 158-163, incorporated herein by reference in its entirety. FIG. 10 is a graph of the dependence of oxygen permeation flux of the membranes synthesized by different methods on temperature. FIG. 10 shows the dependence of oxygen permeation flux of BCF 1585 membranes synthesized by different methods on the operating temperatures. FIG. 10 shows the oxygen permeation flux of the membrane synthesized by SSR method was higher than the membrane synthesized by EC method. They observed the oxygen permeation flux for the SSR method derived membrane was 0.92 ml/cm$^2$.min compared to EC method derived membrane with 0.71 ml/cm$^2$.min at 940° C., respectively. It has been reported by Han et al. that oxygen partial pressure in the permeate side could reach as low as $10^{13}$ atm. under the vacuum operation model; as a result, the oxygen permeation flux would be extremely high. See Han J., Xomeritakis G., Lin Y. S., Oxygen permeation through thin zirconia/yttria membranes prepared by EVD, Solid State Ionics. 1997, 93, 263-272, incorporated herein by reference in its entirety. It is vitally important to note that the mechanical strength of thinner perovskite membranes under such condition is very poor; therefore, the deposition of a thin membrane on a porous support or asymmetric structure seems to be a wise solution.

Li and Tan found that the LSCF hollow-fiber module operated at elevated pressure may not be a good choice compared to the operation under vacuum conditions. They observed that the oxygen flux of 0.31 ml/cm2.min can be obtained when the vacuum pressure in the tube side of the module is reduced to 0.01 atm. additionally; they claimed that it would not be possible to achieve such oxygen permeation flux at elevated pressure operation even the shell side pressure is increased to 30 atm. It can be noted that the elevated pressure operation is generally adopted in the conventional polymeric hollow-fiber membrane modules for gas separation. Therefore, the vacuum operation in the permeate side of the membrane is more preferable. In addition, Li and Tan claimed that the improvement in oxygen flux can be observed when the pressure in the permeate side is decreased, but only up to a certain pressure value or effective pressure. The enhancement in level improves the performance in oxygen permeation flux because the driving force across the membrane is increased. However, there is no improvement in oxygen permeation flux with further decrease in the vacuum.

Zydorczak et al. studied the performance of oxygen permeation flux in an ultra-thin $La_{0.6}Sr_{0.4}Co_{0.2}Fe_{0.8}O_{3-\delta}$. by investigating the effects of operating temperatures and sweep gas flow rate (helium) on the oxygen permeation fluxes. See Zydorczak B., Wu Z., Li K., Fabrication of ultrathin LSCF hollow fibre membranes for oxygen permeation, Chem Eng Sci. 2009, 64, 4383, incorporated herein by reference in its entirety. They observed that the oxygen permeation flux increased when the operating temperature was increased. The similar trend occurs with the increasing of sweep gas flow rates. The oxygen partial pressure difference across the hollow fiber membrane is increased when flow rate of sweep gas increased. The oxygen partial pressure gradient acts as the driving force for the transport of oxygen through the membrane; therefore, the sharp increase in oxygen permeation flux can be observed. The reduced membrane thickness does contribute to the improved oxygen permeation flux, than that reported in previous studies by Tan et al. and Wang et al. See Tan X., Wang Z., Liu H., Liu S., Enhancement of oxygen permeation through $La_{0.6}Sr_{0.4}Co_{0.2}Fe_{0.8}O_{3-\delta}$ hollow fibre membranes by surface modifications, J Mem br Sci. 2009, 324, 128 and Wang Z., Yang N., Meng B., Tan X., Li K., Preparation and oxygen permeation properties in hollow fibre membranes, Ind Chem Eng Res. 2009, 48, 510, each incorporated herein by reference in their entirety. It is important to note that surface exchange reaction and bulk diffusion are two factors that contribute to the transport resistance with respect to the operating temperature. Surface exchange reaction is the rate limiting step at lower temperatures; conversely, bulk diffusion becomes the rate limiting step with the increase in the temperature. The similar observation has been reported by Xu and Thomson. The hollow fiber membrane developed is extremely thin; hence, at high temperature, the flux will increase rapidly. They concluded that the reduced thickness of the membrane has an enormous effect on oxygen permeation flux as the ionic bulk diffusion will be the rate limiting step at high temperature.

Another study done by Tan and Li revealed the effect of sweep gas operation to the performance of oxygen permeation flux in hollow fiber modules. See Tan X., Li K., Oxygen production using dense ceramic hollow fiber membrane modules with different operating modes, AIChE J. 2007, 53, 838, incorporated herein by reference in its entirety. They observed that the oxygen concentration in the permeate side decreased when the argon flow rate is increased for all the operating temperatures. They reported that the use of water vapor as a sweep gas in investigating the oxygen flux gave the same operating performance as under argon gas condition. Wang et al. investigated the production of high-purity oxygen by BCFZ perovskite hollow fiber membranes swept with steam; consequently, they found that the oxygen permeation obtained was 4.1 ml/cm² min at 875° C. See Wang H., K'olsch P., Schiestel T., Tablet C., Werth S., Caro J., Production of high-purity oxygen by perovskite hollow fiber membranes swept with steam, J Membr Sci. 2006, 284, 5-8, incorporated herein by reference in its entirety. Hence, they concluded that the steam employed as a sweep gas has a promising potential to produce high-purity oxygen with reasonable oxygen permeation flux due to the problems related to high temperature sealing can be solved. However, two fundamental problems of employing steam or water vapor are membrane stability and membrane module itself. Tan et al. and Wang et al. did not explain these two problems due to the limitation of experimental apparatus.

Mixed ionic and electronic conducting ceramic membranes have received increasing interest from academia and industry. A major industrial effort is currently devoted to the development of the mixed-conducting ceramic membrane reactor technology for combustion of hydrocarbons.

Permeation Equation:

In the ceramic membrane reactor, oxygen permeates through the ionic or mixed-conducting ceramic membrane via a complex mechanism. It usually includes adsorption of oxygen and charge transfer reaction on the membrane surface exposed to air, oxygen vacancy and electron diffusion in the membrane bulk, and charge transfer and chemical reaction on the membrane surface exposed to a reducing gas. The detailed mathematical formulation for oxygen permeation through mixed-conducting ceramic membranes is fairly complex. The oxygen permeation through oxygen ionic or mixed-conducting ceramic membranes under reaction conditions was also examined by Zebao et. al. with a model taking into account of different electrical transport mechanisms (p-type and n-type transports) and finite reaction rate. See Zebao R., Yongdan L., Lin Y. S., Analysis of oxygen permeation through dense ceramic membranes with chemical reactions of finite rate, Chemical Engineering Science. 2009, 64, 172-179, incorporated herein by reference in its entirety. It was demonstrated in their work that with a reaction consuming oxygen in one side of the membrane, the oxygen partial pressure in the reaction side decreases and the oxygen permeation flux increases with the increase in the reaction rate for both the p-type and the n-type transport dominated mechanism. Also they reported that the increase in reaction rate causes a transition of the transport mechanism from p-type to n-type. This transition leads to an increase in the permeation flux by up to 30 times. This effect offers one explanation for the large discrepancies in published permeation data for membrane reactors of partial oxidation reaction employing an oxygen permeable dense ceramic membrane. They reported also, for a membrane with a specific transport mechanism, the increase in the reactant partial pressure causes an increase in the reaction rate and oxygen permeation flux. However, the increase in the inlet inert gas amount has a complicated effect on the oxygen permeation flux because it lowers both oxygen partial pressure and the reaction rate at the same time.

The OCM (oxidative coupling of methane) and SOE (selective oxidation of ethane) reactions involve oxidative reactions of methane or ethane to form ethylene as the intermediate (desired) product. The final (equilibrium) product is carbon dioxide (and water). Both the OCM and SOE reaction mechanisms are very complex and may involve over hundreds of steps. See Akin F., Lin Y., oxidative coupling of methane in dense ceramic membrane reactor with high yields, AIChE J. 2002, 48, 2298-2306 and Akin F. T., Lin Y. S., Selective oxidation of ethane to ethylene in a dense tubular membrane reactor, J. Membrane Sci. 2002, 209, 457-467, each incorporated herein by reference in their entirety. Akin and Jerry demonstrated how the extent of the reaction (or reactivity) and reactant flow rate affect the oxygen permeation flux, they used the following simple reaction to exemplify the complex oxidative reactions of methane or ethane to ethylene and finally to carbon dioxide: See Akin F. T., Jerry, Lin Y. S., Oxygen permeation through oxygen ionic or mixed-conducting ceramic membranes with chemical reactions, Journal of Membrane Science. 2004, 231, 133-146, incorporated herein by reference in its entirety.

$$CO + \tfrac{1}{2}O_2 \rightarrow CO_2 \quad (A)$$

Where, carbon monoxide represents a hydrocarbon reactant. The use of this simple reaction can help in obtaining semi-analytical solution for the combustion with oxygen permeation. The basic principle illustrated with this simple reaction can be extended for the more complex reaction systems if detailed reaction mechanism and kinetic equations are known. In order to obtain analytical expressions for the oxygen partial pressure in the reaction chamber, Akin and Jerry used a simple reactor model, continuously stirred tank reactor (CSTR), to describe the reaction chamber in this work. Since in most laboratory studies, membrane reactor experiments were conducted on disk-shaped or short tubular membrane, such as the BYS used in their work, the CSTR model can catch the major characteristics of the oxidation reaction in the membrane reaction chamber. Instead of putting specific reaction kinetics in the model in account for reaction rate, they only considered two extreme cases in the modeling and analysis: (a) extremely fast reaction rate, i.e., complete conversion of the reactant (CO in this work) with oxygen permeating to the reaction chamber, (b) extremely slow reaction rate, i.e., no reaction between the oxygen permeating with the reactant (CO). In the second case, the reactant fed into the reaction side behaves like an inert gas, such as the case of oxygen permeation experiments with helium as purge. The real case would lie between these two extreme cases. Oxygen permeation flux through dense ionic or mixed conducting ceramic membranes can be related to air and reaction side oxygen partial pressures as proposed in their model. For ionic or mixed-conductors with ionic transference number close to 1 and electron conduction dominated by the transport of the electron-holes (such as yttria-stabilized zirconia and doped bismuth oxide), the oxygen permeation flux can be approximated by the following equation:

$$J_{O2}=k(P'_{O2}{}^{1/n}-P''_{O2}{}^{1/n}) \qquad (2.11)$$

See Bouwmeester H. J. M., Burggraaf A. J., Dense ceramic membranes for oxygen separation, in: P. J. Gellings, H. J. M. Bouwmeester (Eds.), The CRC Handbook of Solid State Electrochemistry, CRC Press, Boca Raton, Fla., 1997, Chapter 14; Han J., Xomeritakis G., Lin Y. S., Oxygen permeation through thin zirconia/yttria membranes prepared by EVD, Solid State Ionics. 1997, 93, 263-272; and Zeng Y., Lin Y. S., Oxygen permeation and oxidative coupling of methane in yttria doped bismuth oxide membrane reactor, J. Catal. 2000, 193, 58-64, each incorporated herein by reference in their entirety.

The driving force is the oxygen partial pressure in the air side minus the oxygen partial pressure in the reaction side with a positive value for constant n (i.e., n>0). For convenience in notation, this group of membranes with oxygen permeation equation in the form of Eq. (2.11) is referred to in this paper as membranes with p-type flux equation.

For ionic conductors with electron conduction dominated by the electrons, such as yttria doped zirconia at low oxygen partial pressure range, or for mixed conductors with ionic transference number close to zero, such as lanthanum cobaltite, the permeation flux equation can be expressed by $$J_{O2}=k(P'_{O2}{}^{1/n}-P''_{O2}{}^{1/n}) \qquad (2.12)$$

See Park J. H., Blumenthal R. N., Electronic transport in 8 mole percent $Y_2O_3$—$ZrO_2$, J. Electrochem. Soc. 1989, 136, 2867, incorporated herein by reference in its entirety.

The driving force is the oxygen partial pressure in the reaction side minus the oxygen partial pressure in the air side with a negative value for constant n (n<1). For convenience in notation, these groups of membranes are referred to here as membranes with n-type flux equation. Table 2.1 summarizes the parameters used. The values for constants, k and n in Eq. (2.11), for a membrane with p-type flux equation are chosen for the bismuth-based oxide $Bi_{1.5}Y_{0.3}Sm_{0.2}O_{3-\delta}$ (BYS). See Kusaba H., Shibata Y., Sasaki K., Teraoka Y., Surface effect on oxygen permeation through dense membrane of mixed-conductive LSCF perovskite-type oxide, Solid State Ionics. 2006, vol. 177, 2249-2253, incorporated herein by reference in its entirety. The k and n values for a membrane with n-type flux equation in Eq. (2.12) are calculated from the literature oxygen permeation data given for $La_{0.6}Sr_{0.4}Co_{0.2}Fe_{0.8}O_{3-\delta}$ (LSCF). As proposed by Xu and Thomason, The concentration of oxygen vacancies at both surfaces of the membrane ($C'_V$ and $C'_V$) is also governed by surface exchange kinetics for the following two surface reactions (forward reaction in the feed side and backward reaction in the permeate side):

(B)

$$\frac{1}{2}O_2 + V^-{}_O \underset{k_r}{\overset{k_f/k_r}{\longleftrightarrow}} O^x{}_O + 2h^- \qquad (2.13)$$

where $O^x{}_O$ represents lattice oxygen in the perovskite crystal structure, kf and kr are, respectively, the forward and reverse reaction rate constants for the forward reaction (or the reverse and forward rate constants for backward reaction). It should be noted that because of the high electronic conductivity, the electron holes are essentially constant at both surfaces of the membrane, and thus the reverse reaction rate of Reaction B and the forward reaction rate of Reaction C are pseudo zero-order at steady state under isothermal conditions. According to this, they have correlated the steady-state oxygen permeation flux as a function of $P'_{O2}$, $P''_{O2}$ and membrane temperature and thickness:

$$J_{O2} = \frac{D_V K_r(P'^{0.5}_{O2} - P''^{0.5}_{O2})}{2LK_f(P'_{O2}P''_{O2})^{0.5} + D_V(P'^{0.5}_{O2} + P''^{0.5}_{O2})} \qquad (2.13)$$

Where DV, Kr and Kf are functions of temperature and the specific properties of the membrane. The values of those parameters have been determined by fitting the experimental oxygen flux data in the work done by kusaba et al. as a function of temperatures as shown in FIG. 11. FIG. 11 is a graph of the fitting of the experimental data of Oxygen permeation through LSCF1991 membrane having a thickness of 0.8 mm. As shown in the figure, both the experimental data and the present Dkk model (DV, Kr and Kf model) are in a very good agreement. Also, the as the temperature of the membrane surface increases as the oxygen permeation flux across the membrane increases due to the reduced surface resistance of the membrane as a result of temperature increase. The fitted values of the coefficients DV, Kr and Kf are listed in table 2.2 and also the values of the activation energies.

A semi-empirical form found in the literature also was used extensively to determine the local oxygen flux as a function of the membrane Temperature, the feed and permeate oxygen partial pressures, and empirical constants that depend on the specific material. This form allows for interchangeable oxygen flux mechanisms to be implemented quickly and effectively within the model in order to explore the impact of different ITM membrane materials.

$$J_{O2}=A^*\exp(-B/T_M)^*(P'_{O2}{}^n-P''_{O2}{}^n) \qquad (2.14)$$

The pre-exponential A in some sense accounts mostly for the diffusion coefficient and the membrane thickness dependence, while B represents the effective activation energy or Arrhenius dependence due to both surface exchange kinetics and diffusion coefficient activation energy. This mechanism is chosen because it is simple, relatively accurate with respect to experimental data, and reasonably captures the impact of both surface exchange kinetics as well as the temperature dependence of the oxygen vacancy diffusion coefficient. However, it is limited in the sense that it applies for a specific membrane thickness, and also cannot be extrapolated too far from the experimental conditions used to obtain the fitted values for A and B. The functional dependence on partial pressure is assumed to be n=0.5 for LSCF, and n=0.25 for LNO based on global surface exchange kinetics theory and experimental results and the values of A and B are 26.75 mol m$^{-2}$ s$^{-1}$ pa$^{-n}$, 16510 K for LSCF and 2.011 mol m$^{-2}$ s$^{-1}$ pa$^{-n}$, 10240 K for LNO respectively. This is consistent with the mixed control, i.e., both diffusion and surface kinetics, in contrast to diffusion dominant where n is typically less than zero. See Mancini N. D., Mitsos A., Ion transport membrane reactors for oxy-combustione part II: analysis and comparison of alternatives, Energy. 2011, 36(8):4721-4739, incorporated herein by reference in its entirety.

Membrane Reactor Performance:

Little work was reported with a focus on examining the effects of reaction side conditions on oxygen permeation through the mixed-conducting ceramic membranes. In membrane reactors for partial oxidation of a hydrocarbon, one side of the ionic or mixed-conducting ceramic membrane is exposed to air and the other side to a hydrocarbon gas. Oxygen from the air side permeates through the membrane and reacts with the hydrocarbon in the reaction side. Although it is generally agreed that the driving force for oxygen permeation is the oxygen potential gradient across the membrane, the oxygen partial pressure, or oxygen chemical potential in the reaction side is very difficult to define or measure by experiments. See Akin F., Lin Y., Zeng Y., a comparative study on oxygen permeation and oxidative coupling of methane in disk-shaped and tubular dense membrane reactors, Ind. Eng. Chem. Res. 2001, 40, 5908-5916, incorporated herein by reference in its entirety. As a result, the quantitative value of oxygen potential gradient across an ionic or mixed-conducting ceramic membrane exposed to air and a hydrocarbon is not fixed. The permeation flux through an ionic conducting ceramic membrane depends on many parameters in a membrane reactor.

TABLE 2.1

Summary of parameters used in the parametric study

| Parameter | Range |
|---|---|
| $Q^0_{feed}$ (ml/min) | 100-675 |
| T (° C.) | 850 |
| A (cm$^2$) | 1.8 |
| k (ml/min cm$^2$ atm$^{1/n}$) | |
| BYS (ml/min cm$^2$ atm$^{1/n}$) | 0.035 |
| LSCF (ml/min cm$^2$ atm$^{1/n}$) | 0.16 |
| n | |
| BYS | 3.34 |
| LSCF | −8.06 |

TABLE 2.2

The obtained pre-exponential coefficients and activation energies of $D_v$, $k_f$ and $k_r$ for LSCF-1991 membrane from our work through the fitting of experimental data

| Expression | Unit | Pre-Exponential coefficients Value | Activation Energy (kJ/mol) |
|---|---|---|---|
| $D_v = D^°_v \exp(-E_D/RT)$ | m$^2$/s | $1.58 \times 10^{-5}$ | 73.6 |
| $K_f = k^°_f \exp(-E_f/RT)$ | m/atm$^{0.5}$ · s | $1.11 \times 10^{10}$ | 226.9 |
| $K_r = k^°_r \exp(-E_r/RT)$ | mol/m$^2$ · s | $3.85 \times 10^{11}$ | 241.3 |

Akin and Jerry presented a simple mathematical analysis, coupled with experimental data, on the effects of hydrocarbon flow rate and reactivity with oxygen on the oxygen permeation in an ionic or mixed conducting ceramic membrane reactor for partial oxidation of hydrocarbon. In their work, Oxygen permeation experiments were conducted on a fluorite structured $Bi_{1.5}Y_{0.3}Sm_{0.2}O_{3-\delta}$ (BYS) membrane. The BYS is primarily an oxygen ionic conductor with a considerable electronic conductivity due to the doping of samarium. The membrane used in their work was a short BYS tubes, of 3-4 cm in length and 4 mm in inner diameter, were prepared from the citrate derived BYS powder followed by a green machining method. Oxygen permeation experiments were conducted, respectively, with methane and ethane as the feed to the reaction side. Oxygen permeating through the BYS membrane reacted with methane or ethane, with main reaction being oxidative coupling of methane (OCM) in the former and selective oxidation of ethane (SOE) to ethylene for the latter. The BYS membrane surface is catalytically active for OCM and SOE. Furthermore, these reactions typically involve formation of a radical on membrane surface followed by a homogeneous reaction in the gas phase inside the membrane tube. Therefore, no other catalyst was packed to the tube side of the BYS membrane in these studies. Oxygen permeation through oxygen ionic or mixed-conducting ceramic membranes under reaction conditions was analyzed in their work by a simple mathematical model considering different transport mechanisms (with n-type versus p-type flux equations) and oxidation reaction kinetics (extremely fast reaction versus no reaction). Experimental oxygen permeation data for $Bi_{1.5}Y_{0.3}Sm_{0.2}O$ (BYS) membrane under two different reaction conditions (with methane and ethane) were measured and analyzed by the modeling results.

They showed that for a membrane under reaction conditions with a specific reducing gas, the oxygen permeation flux depends strongly on the oxidation reaction rate and the reducing gas flow rate. Such dependencies are different for membranes with oxygen permeation controlled by p-type electron transport and those by n-type electron or oxygen vacancy transport. Also they reported that oxygen permeation flux under the condition of extremely fast reaction is several fold higher than that under the condition of slow reaction as a result of the decrease of the oxygen partial pressure in the reaction side with increasing reaction rate. Also they found that the oxygen permeation flux through BYS membrane under the reaction conditions with ethane is about one order of magnitude higher than that with methane because of the significantly faster oxidation reaction with ethane than with methane. The analysis results also suggest that increasing oxidation reaction rate in the reaction side by use of a heterogeneous catalyst can enhance the oxygen permeation flux through an ionic or mixed-conducting ceramic membrane. For a membrane with a fixed oxygen permeation mechanism, increasing gas flow rate lowers the conversion of oxidation reaction in the reaction side (equivalent to a decrease in reaction rate), causing a decrease in the oxygen permeation flux. Varying reactant flow rate may also cause a change in oxygen permeation mechanism leading to a complex permeation flux versus flow rate relationship.

These perovskite-type ionic conductors have technological applications in devices such as oxygen ion conducting solid electrodes, solid oxide fuel cells (SOFC), and electrochemical oxygen pumps (EOP) and oxygen sensors. See Eng D., Stoukides M., Catalytic and electro catalyticmethane oxidation with solid oxide membranes, Catalysis Reviews Science Engineering. 1991, 33 (3 and 4), 375) 412, incorporated herein by reference in its entirety. There is also a great potential to use these materials as a membrane in a catalytic reactor. In this case, oxygen is separated from air and then used for selective oxidation reactions such as the oxidative coupling of methane (OCM) to ($C_{2+}$) higher hydrocarbons or methane partial oxidation to synthesis gas. See Van Hassel B. A., ten Elshof J. E., Bouwmeester H. J. M., Oxygen permeation through $La_{1-y}Sr_yFeO_{3-\delta}$ limited by carbon monoxide oxidation rate, Applied Cataylsis A. 1994, 119, 279-291, incorporated herein by reference in its entirety. Using $La_{0.6}Sr_{0.4}Co_{0.2}Fe_{0.8}O_{3-\delta}$ (LSCF-6428) as the catalytic membrane for the OCM reaction, Xu and Thomson found that the oxygen permeation rate was higher than that required for methane activation on the membrane surface. See Xu S. J., Thomson W. J., Ion-conducting perovskite membrane for the oxidative coupling of methane, A.I.Ch.E. Journal, 1997, 44, 2731-2740, incorporated herein by reference in its entirety. Consequently, excess oxygen ions recombined to form oxygen molecules, which caused serious combustion of methane in the gas phase and reduced the selectivity of the desired $C_{2+}$ products. Moreover, in a separate analysis of the stability of these membranes, they showed that morphological changes on the methane side of the membrane surface caused significant changes in the oxygen permeation flux. The surface reaction rate was found to limit the CO oxidation rate in a $La_{1-y}Sr_yFeO_{3-\delta}$ (Y=0.1, 0.2) membrane where the rate was nearly independent of the membrane thickness. Hence, in order to achieve practical and effective applications of these membrane reactors for partial oxidative reactions, it is essential to understand the oxygen permeation mechanism and to determine the rate limiting step among the processes of mass transfer, ionic transport, and surface reactions.

Xu and Thomson developed an explicit oxygen permeation model in a stagnation flow for ion-conducting membranes with a high ratio of electronic to ionic conductivity, which makes it possible to correlate the permeation flux to directly measurable variables. Surface exchange kinetics at each side of the membrane was emphasized and their resistance to oxygen permeation has been quantitatively distinguished from the bulk diffusion resistance. They conducted a series of experimental measurements of oxygen fluxes for La0.6Sr0.4Co0.2Fe0.8O3−δ over a wide range of temperature and oxygen partial pressures and they used the results for model regression purposes and for mechanism analysis. They concluded that the oxygen permeation at low temperatures (750° C.) is limited by the rate of oxygen-ion recombination but is dominantly controlled by bulk diffusion at high temperatures (950° C.) and this is consistent with activation energies for oxygen vacancy diffusion and for the surface exchange rates, which are estimated at 74 kJ/mol and 227, 241 kJ/mol, respectively.

The characteristics of oxyfuel combustion in an oxygen transport reactor (OTR) have been investigated. See Ben-Mansour R., Habib M., Badr H., Uddin A., Nemitallah M. A., Characteristics of Oxy-fuel Combustion in an Oxygen Transport Reactor, Energy Fuels. 2012, dx.doi.org/10.1021/ef300539c|Energy Fuels 2012, 26, 4599-4606, incorporated herein by reference in its entirety. The cylindrical reactor walls were made of dense, nonporous, mixed-conducting ceramic membranes that only allow oxygen permeation from the outside air into the combustion chamber and the simulations have been done for different composition of $CH_4/CO_2$ mixtures and for different mass flow rates. The comparison between reactive and separation-only OTR units showed that combining reaction and separation increases significantly $O_2$ permeation rate to about 2.5 times under the assumptions given therein and the results indicated that the heat of reaction is mostly transferred to the air side with a portion used to heat the $O_2$ permeating flux. For higher mass flow rates, the OTR operates with rich mixture resulting in low $CH_4$ conversion.

The present disclosure describes the performance of ion transport membranes under the oxycombustion conditions in the permeate side of the membrane. Effects of many parameters including inlet gases temperature, reactor geometry, feed and sweep flow rate, oxygen partial pressure in the feed side and the effect of the percentage of $CH_4$ in the sweep gases mixture on the permeation and combustion processes are included.

A new 3D reactor design is introduced for the substitution of ITM reactors into a gas turbine combustor including oxygen separation through ion transport membranes and then the combustion in the permeate channels with fuel in a mixture of $O_2/CO_2/H_2O$. The reactor design substitutes conventional gas turbine combustor with a monolith structure ITM reactor. Particular feed and sweep flow rates are disclosed in order to meet the power required for the reactor and keeping the reactor size as compact as possible. Effects of flow configurations, channel width and percentage of $CH_4$ in the permeate side flow are controlled under constant inlet gas temperature and fixed operating pressure of 10 bars. The reactor geometry is structured based on channel width to keep the reactor size as close as possible to the size of a conventional industrial gas turbine. The monolith structure rector design provides power ranging from 5 to 8 MWe based on cycle first law efficiency.

Based on the above details, the objectives of the present disclosure include determining experimentally and numerically, the atmospheric diffusion oxycombustion in a gas turbine model combustor, determining flame stability under wide operating range of parameters including equivalence ratio, percentage of $O_2/CO_2$ in the oxidizer mixture in addition to fuel volume flow rate, determining the minimum percentages of $O_2$ in the oxidizer mixture required to get a stable oxy-flame, characterizing the flames to obtain the main species concentration at the exhaust section of the combustor, exhaust temperature and inside reactor temperature distribution which can serve as a database for combustion models validation, validating the numerical model using the experimental data, disclosing the oxygen permeation process and oxy-fuel combustion characteristics inside an ITM reactor using a simple symmetric design reactor allowing the reduction of the number of coordinates to 2D without reducing the accuracy of the solution, a detailed sensitivity analysis for all of the parameters affecting the membrane reactor performance, develop new oxygen permeation equation model and perform the reaction kinetics using a two-step oxy-combustion reaction kinetics model, and a new 3-D reactor design for the substitution of gas turbine combustor by an ITM reactor utilizing an ITM monolith structure reactor.

BRIEF SUMMARY OF THE INVENTION

The foregoing paragraphs have been provided by way of general introduction, and are not intended to limit the scope of the following claims. The described embodiments, together with further advantages, will be best understood by reference to the following detailed description taken in conjunction with the accompanying drawings.

One embodiment of the present invention includes a swirl stabilized gas turbine oxy-combustor.

In another embodiment, the combustor includes a plurality of inlets and one outlet, a supply pipe, a mixing chamber, a reactor inlet, a combustion chamber, and an exit plane.

In another embodiment, oxygen is mixed with carbon dioxide inside the mixing chamber.

In another embodiment, feed gas is passed through the supply pipe and into the inlet of the combustor.

In another embodiment, the reactor inlet and bluff body contain slits on the surface that form fuel channels.

In another embodiment, the exit plane allows for measuring of the exhaust gas temperature.

In another embodiment, a method is presented for oxy-combustion of a non-swirling fuel using the combustor.

In another embodiment, the operating percentage of oxygen in the oxidizer mixture is above 25%.

In another embodiment, a monolith structure ion transport membrane reactor is comprised of an ionic ceramic membrane, a plurality of channels inside the reactor, a plurality of membranes, and an integration zone.

In another embodiment, the reactor channels include permeate channels and feed channels.

In another embodiment the reactor has at least 50,000 permeate channels in which combustion occurs with a mixture comprising the oxygen combustion gas and a fuel gas.

In another embodiment the membrane surface area of the reactor is 2500 m$^2$-3000 m$^2$ and the membrane thickness of the reactor has a value of 0.5-1.0 mm.

In another embodiment the reactor is able to deliver power ranging from 5-8 MWe based on cycle first law efficiency.

In another embodiment the methane concentration in the reactor remains above about 5% at both the inlet of the reactor and in the permeate channels of the reactor.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
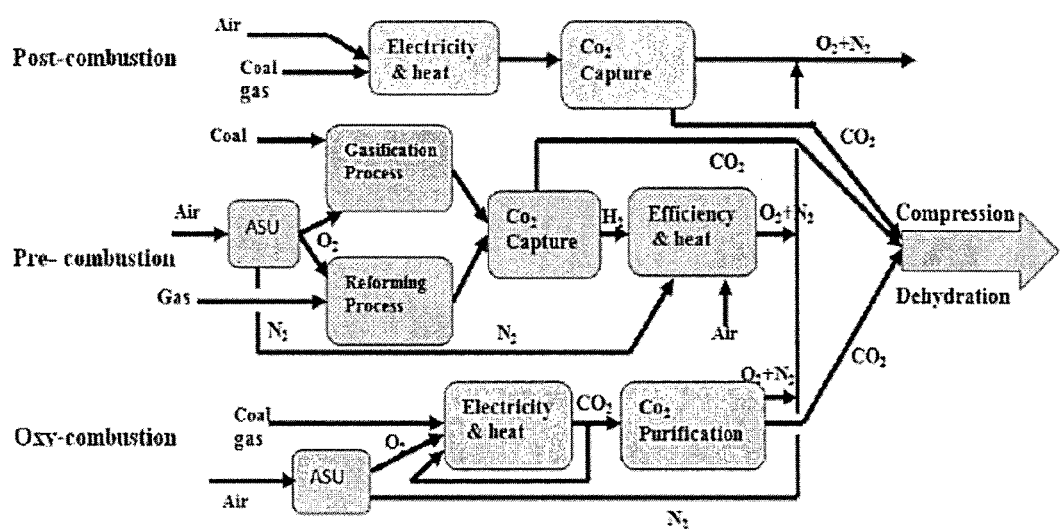
FIG. 1 is an illustration of the three capture processes of $CO_2$.
Figure 2:
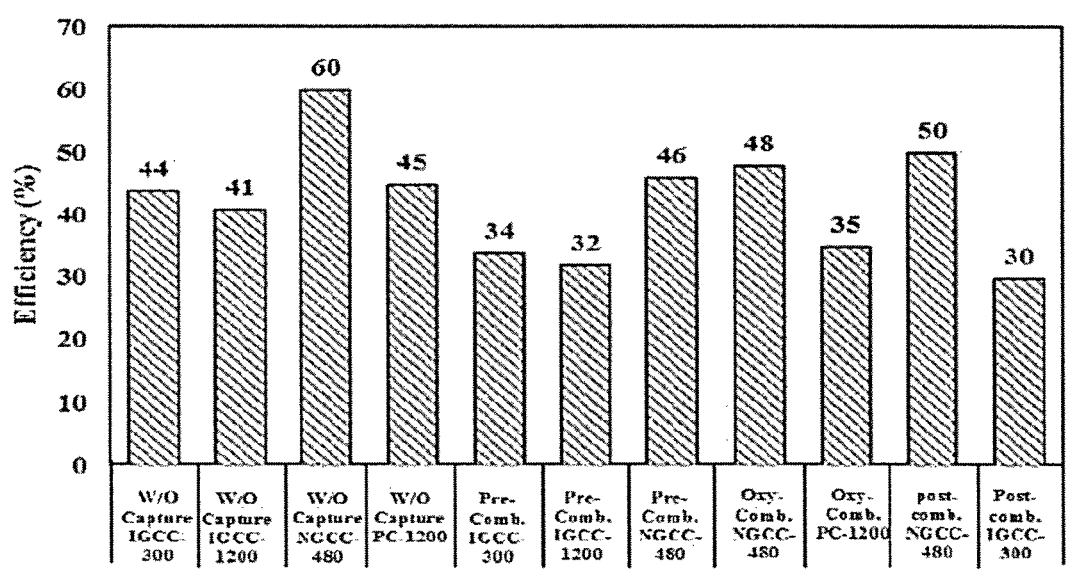
FIG. 2 is an illustration of the efficiency of the different systems with and without $CO_2$ capture.
Figure 3:
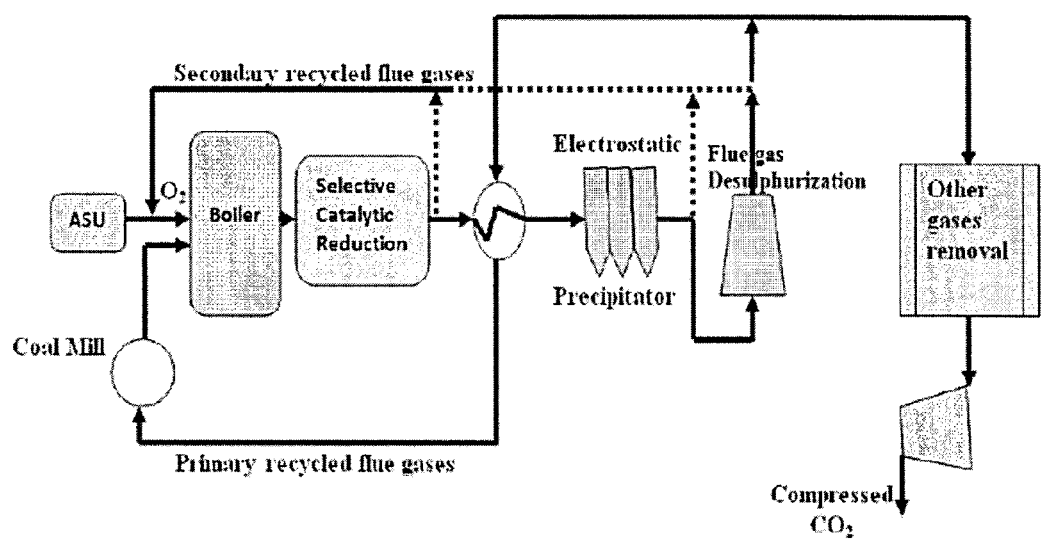
FIG. 3 is an illustration of an atmospheric oxy-coal combustion system with flue gas recycle proposed for carbon capture in coal power plants.
Figure 4:
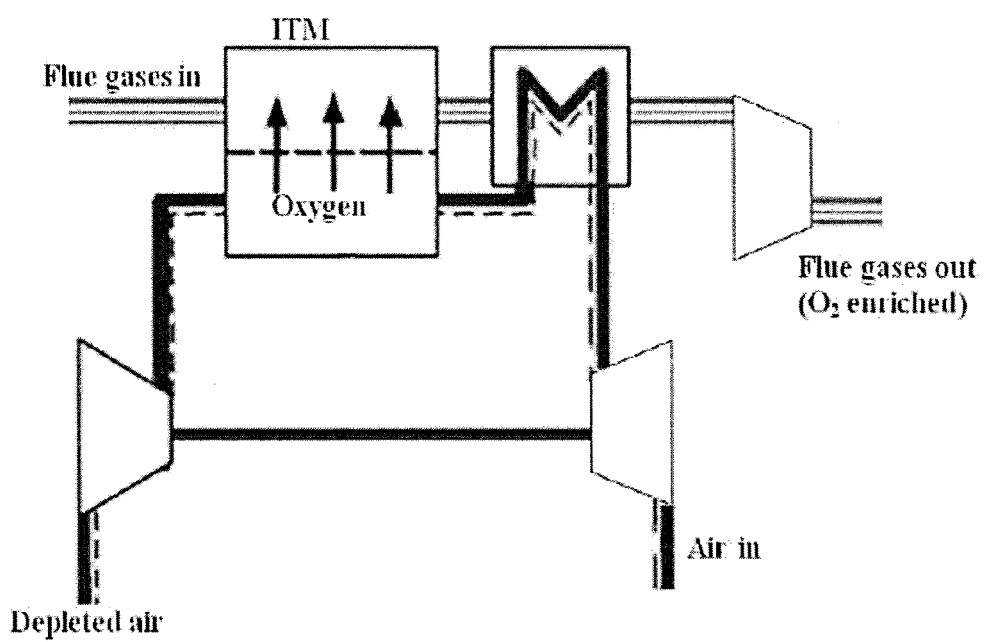
FIG. 4 is a schematic of an air separation unit based on high temperature Membranes.
Figure 5:
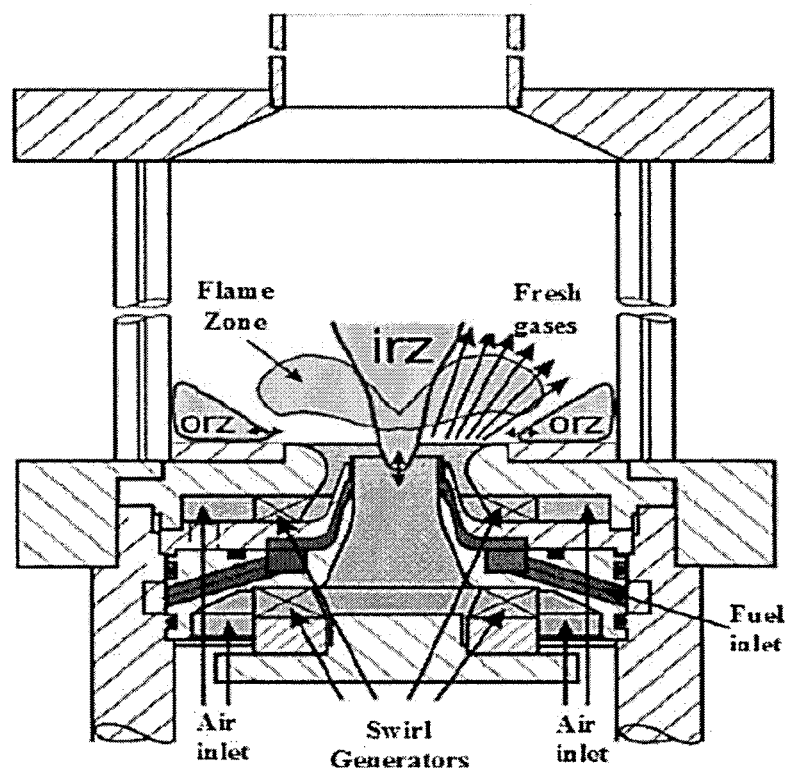
FIG. 5 is a schematic diagram of a combustion chamber.
Figure 6:
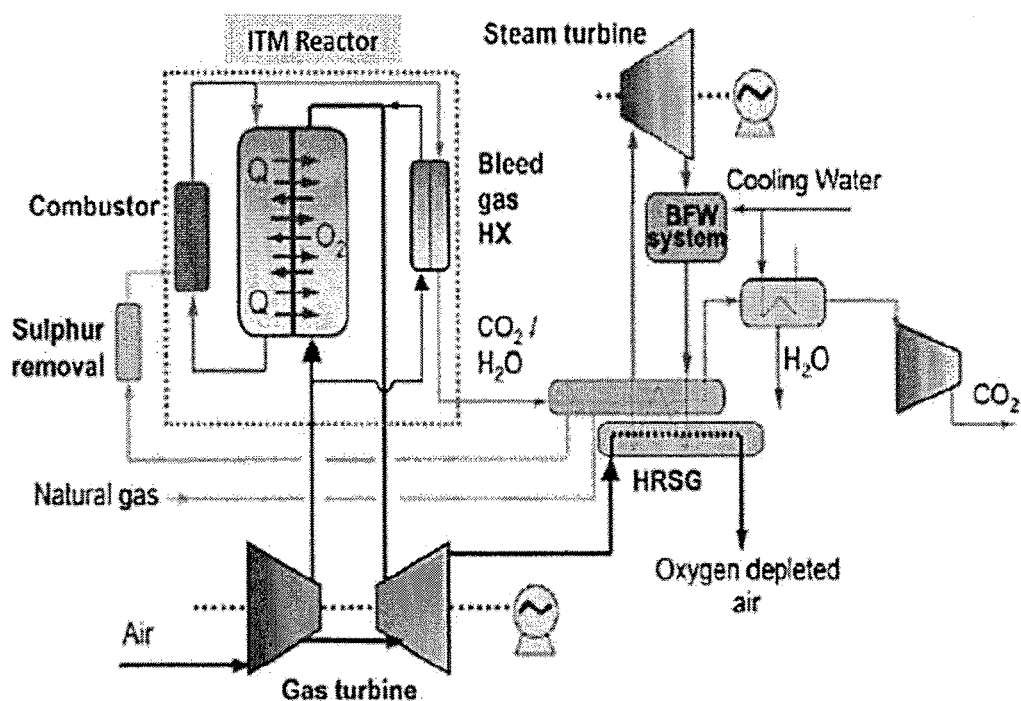
FIG. 6 is an illustrative flowsheet for oxy-fuel combustion process using membrane reactor technology, with additional unit operations for carbon capture.
Figure 7:
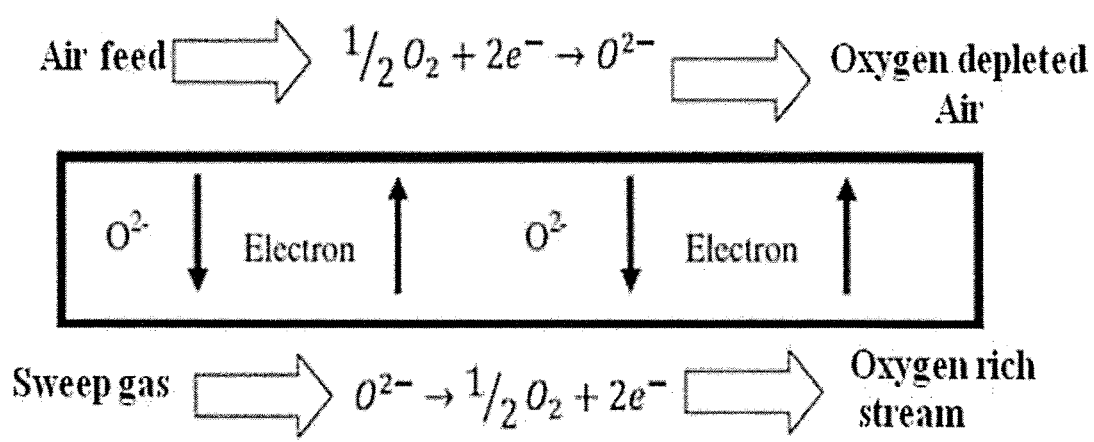
FIG. 7 is a schematic diagram of a dense ceramic membrane based on a conduction mechanism.
Figure 8:
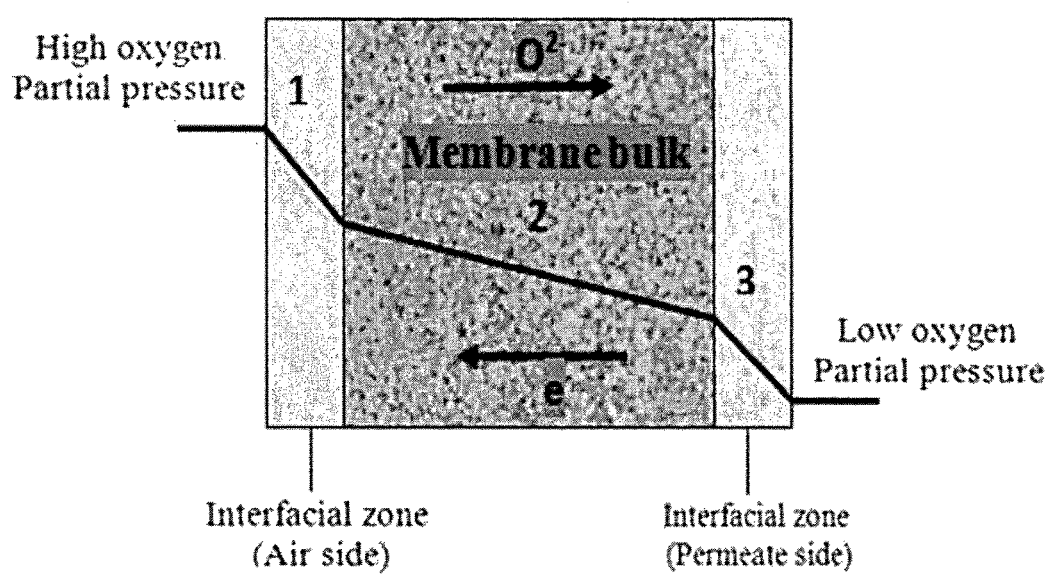
FIG. 8 is a schematic diagram of oxygen permeation through mixed ionic-conducting membrane.
Figure 9:
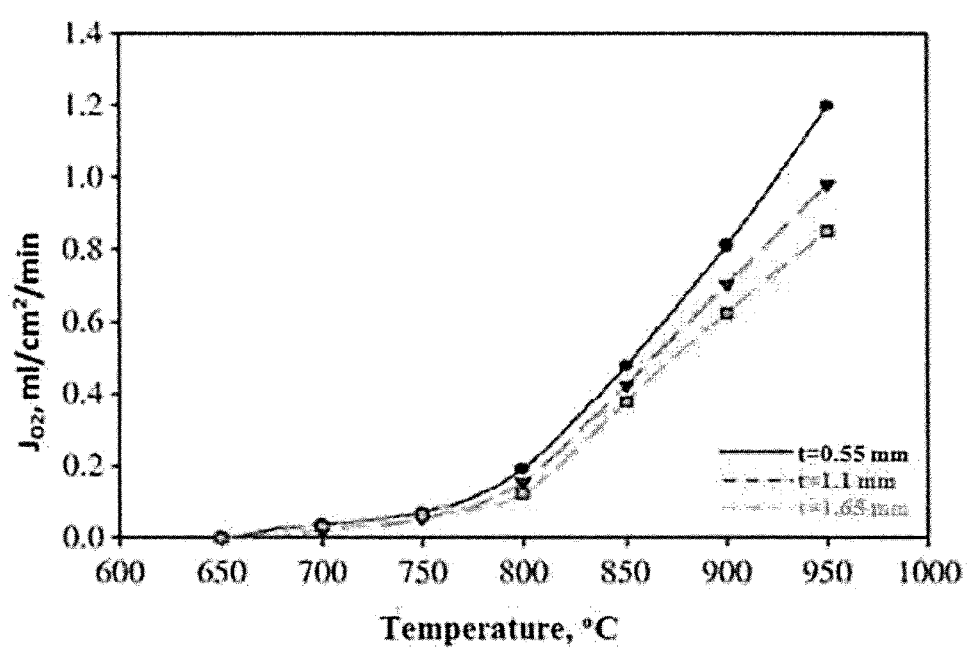
FIG. 9 is a graph of the oxygen permeation fluxes as function of temperature at different membrane thicknesses.
Figure 10:
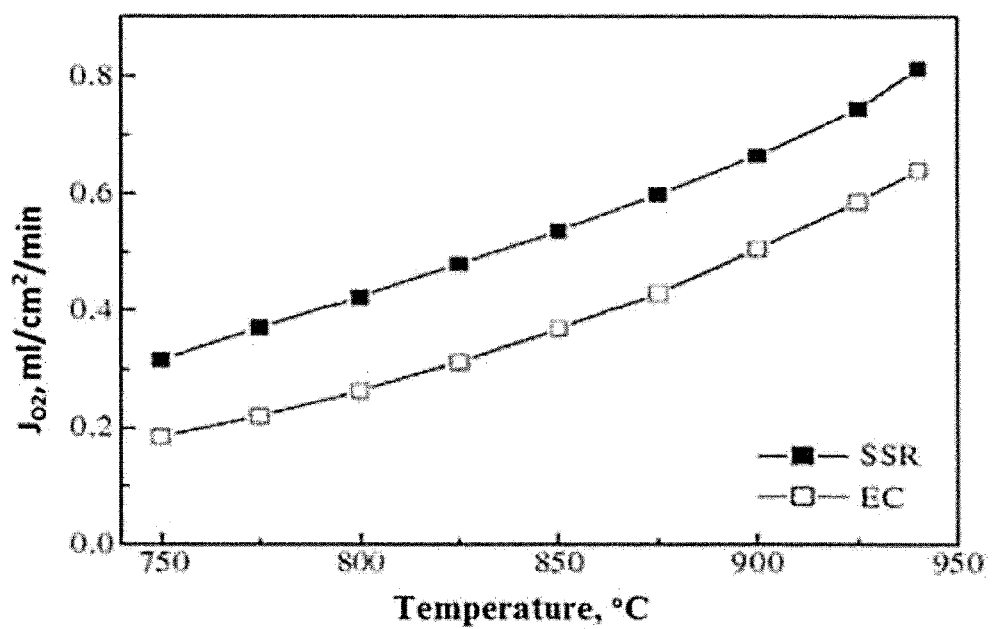
FIG. 10 is a graph of the dependence of oxygen permeation flux of the membranes synthesized by different methods on temperature.
Figure 11:
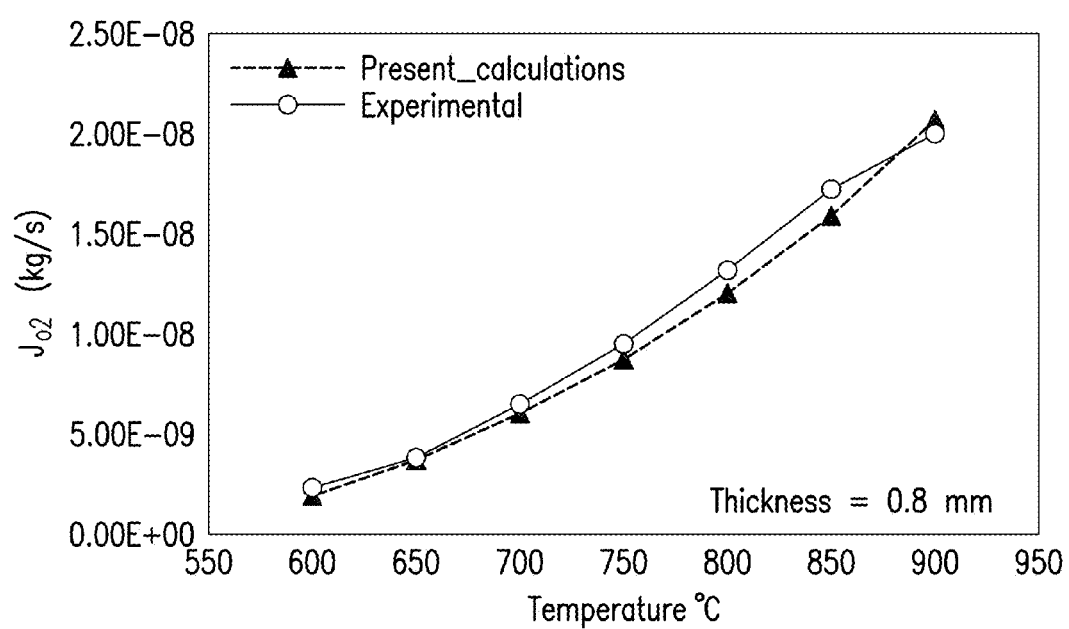
FIG. 11 is a graph of the fitting of the experimental data of Oxygen permeation.

Referring now to the drawings, wherein like reference numerals designate identical or corresponding parts throughout the several views.

For decreasing greenhouse gas (mainly $CO_2$) emissions, several approaches have been evaluated and reviewed for capturing $CO_2$ in the utility industry, namely Carbon Capture and Storage technology (CCS). As a promising CCS technology, oxy-fuel combustion can be used in existing and new power plants. There are two main approaches available to utilize the oxy-combustion technology, one of them is the use of air separation units to separate O2 which will be used in the combustion process and the other application is the ion transport membrane (ITM) reactor technology. For the application of the first approach, experimental and numerical investigations on an atmospheric diffusion oxy-combustion flame in a gas turbine model combustor are disclosed. The combustor is fuelled with $CH_4$ and a mixture of $CO_2$ and $O_2$ as oxidizer. A wide range of operating parameters was considered aiming to determine the stability limits of the oxy-combustion diffusion flame and characterize the flame in detail. The experimental and numerical results showed that the stability of the oxy-combustion flame is affected when the operating percentage of oxygen in the oxidizer mixture is reduced below 25%. For the application of the second approach a new 3D reactor design is disclosed for the substitution of ITM reactors into a gas turbine combustor. A new oxygen permeation equation system has been developed by fitting the experimental data for a LSCF ion transport membrane. Based on 3D analysis, the monolith structure design ITM reactor is capable of delivering power ranging from 5 to 8 MWe based on cycle first law efficiency. Experimental and numerical investigations on an atmospheric diffusion oxy-combustion flame in a gas turbine model combustor were conducted.

The other application is through the use of ion transport membrane (ITM) reactor technology. Numerical investigations were conducted in order to understand the oxygen permeation process and oxy-fuel combustion characteristics inside a 2D simple symmetric design ITM reactor. A new 3D reactor design is disclosed for the substitution of ITM reactors into a gas turbine combustor. The total volume of the reactor and the total number of channels required varies in order to give a power more close to that available through using real gas turbines.

Figure 12:
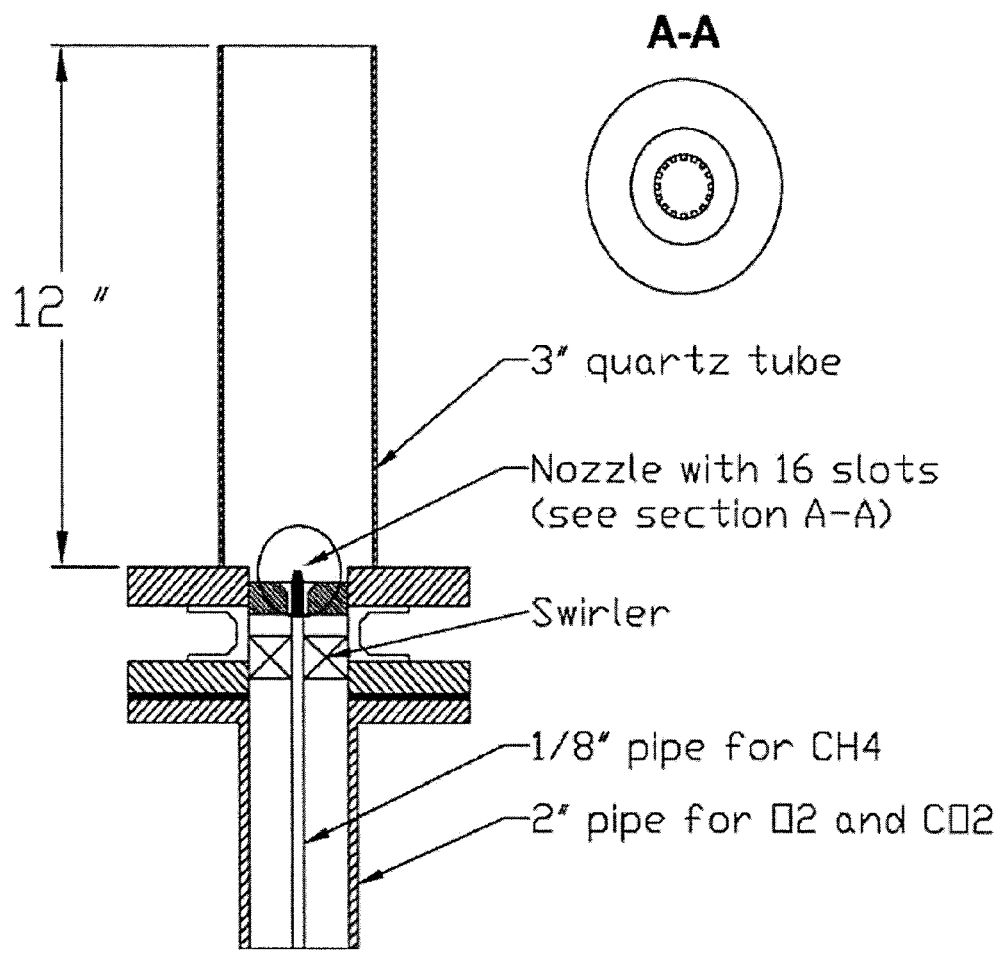
FIG. 12 is a schematic of the atmospheric pressure swirl stabilized gas turbine combustor.

FIG. 12 shows a schematic drawing of a swirl stabilized gas turbine model combustor. The non-swirling fuel ($CH_4$) is supplied through 16 channels made on the round surface of a bluff body with diameter of 5 mm and are inserted at the top part of the fuel tube (¼~outside diameter) in order to generate the required velocity to stabilize the flame. Each fuel channel has dimensions of 0.45 mm×0.2 mm. The oxidizer ($O_2$/$CO_2$ mixture at room temperature) is supplied to the combustion chamber through an annular space between the fuel inlet pipe of 6.35 mm diameter and an outside diffuser which has inlet diameter, outlet diameters and length of 10 mm, 20 mm, and 5 mm respectively. The exit plane of the fuel channels is assigned to be the reference zero height of the flame (h=0 mm) and the exit plane of the oxidizer is located below the fuel exit plane by a distance of 5 mm. The overall flow field of the flame is characterized by this conically shaped inflow of fresh gas. An outer recirculation zone has been created in the lower part of the reactor between the flame and the wall of the reactor and as a result, the mixing of hot combustion products with fresh gas leads to a continuous ignition and stabilization of the flame. The burner is mounted in an optically accessible combustion chamber which consists of a quartz tube of 12 inches height and 3 inches mm inside diameter.

The burner can provide power ranging from 4.1 MW/$m^3$.bar at 6 L/min fuel volume flow rate up to 6.2 MW/$m^3$.bar at 10l/min fuel volume flow rate that is comparable to most industrial gas turbines, which are operated at 3.5 to 20 MW/$m^3$ bar. In order to shorten and stabilize the flame, a swirler with a swirl angle of 60 degrees is used to apply the required swirl for air. The swirler is located just below the oxidizer inlet to the reactor inside a supplying tube of 2 inches inside diameter as shown in FIG. 12. FIG. 12 is a schematic of the atmospheric pressure swirl stabilized gas turbine combustor.

To generate high flow velocity at the exit section of the combustor to prevent the back flow from the surrounding to the reactor, a conically shaped top part made of steel with a minimum diameter at its top of 50 mm and a length of 100 mm is used to form the exhaust gas exit. This conical exhaust part is supported with holes to enable measuring both the inner reactor temperature and species concentrations.

Figure 13:
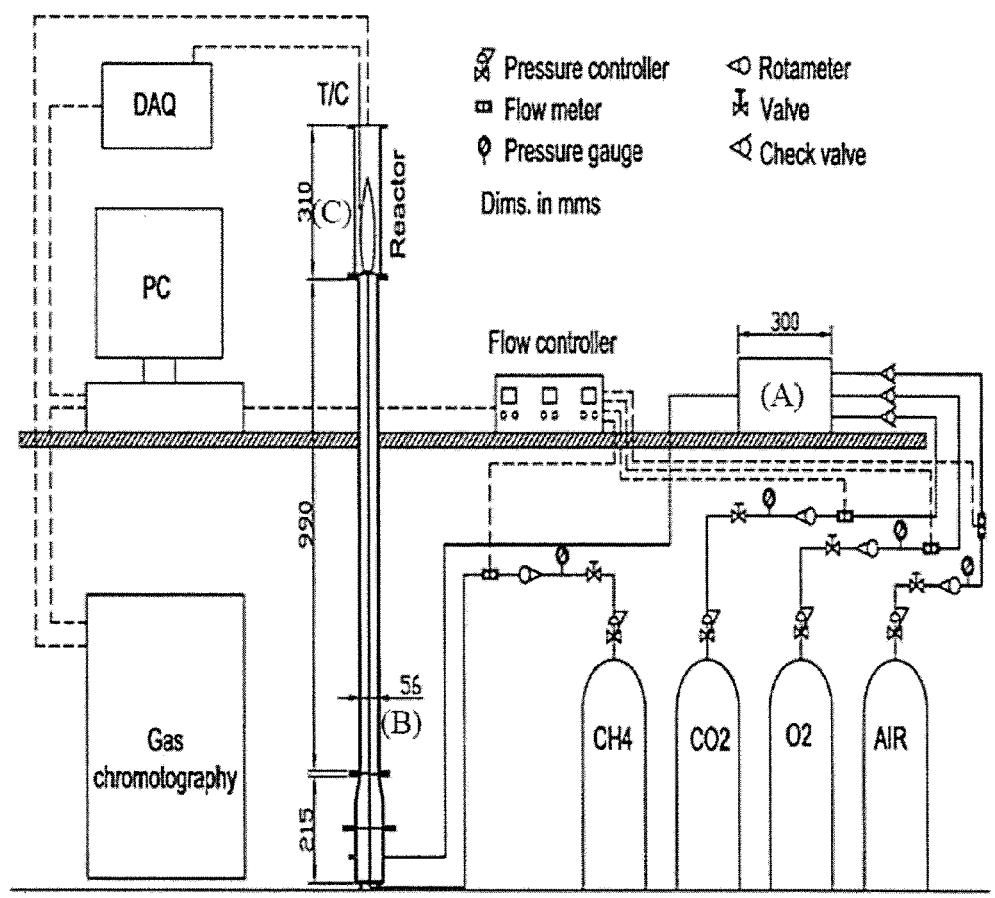
FIG. 13 is a schematic of the test-rig facility.

FIG. 13 shows a schematic of the experimental test-rig facility. The oxygen and carbon dioxide oxidizer is premixed before injection into the combustor to reduce the flame temperature and thereby reducing the remaining oxygen in the flue gas. The oxygen is mixed with carbon dioxide upstream of the combustor in a mixing chamber (A) which has a cylindrical shape of 150 mm diameter, 300 mm length, and an internal throat of 50 mm diameter. The mixing chamber has three inlets for O2, $CO_2$ (for oxy-combustion experiments) and air and has one outlet. To improve the mixing of $O_2$ and $CO_2$, the $O_2$/$CO_2$ mixture (feed gas) passes through a supply pipe (B) of 50.8 mm inside diameter upstream of the reactor and with a height of 1.2 m before the inlet to the combustor at the top part as shown in FIG. 13. FIG. 13 is a schematic of the test-rig facility. Methane is supplied through a 6.4 mm (¼~) tube extended from the cylinder to the reactor inlet (C) and a bluff body containing slits on its surface forming the fuel channels to generate the required velocity of the fuel flow. All gases are supplied from compressed gas cylinders and the flow is controlled through pressure regulators and valves. To measure the flow rate, a flow rotameter is used in each gas line and the mass flow rate is controlled by a mass flow controller from Bronkhorest HIGH-TECH (D-type, model number F-201CI-10K-AGD-22-V for $CH_4$, F202AI-M20-AAD-55-V for O2 and F-202AI-M20-AGD-55-V for $CO_2$, with uncertainty of ±0.5% of full scale). The controllers are connected to a computer for data logging and post processing.

The exhaust gas temperature was measured at the exit plan of the reactor (height of 300 mm) with R-type thermocouple from Omega which has a maximum range of 1500° C. and inserted inside a 12 inches long ceramic probe to protect it from high flame temperature. As the measurements have been recorded only at the exit section of the reactor, the size of the probes did not affect the operation of the flame. The thermocouple probe is connected to a data logger and a computer which takes the average temperature at each location during one minute. Similar local temperature measurements are repeated and average values are calculated at each location. The thermocouple probe enters the reactor from its top as shown in FIG. 13 and a traverse mechanism is used to move the probe precisely in the axial and radial directions inside the reactor. For higher flame temperatures, a B-type thermocouple from Omega is used with the ability to measure the temperature up to 1950° C. A high speed camera is used to visualize and compare different flames. The camera is fixed at the same level of the reactor.

Gas composition data consisting of $O_2$, CO, $CO_2$, dissolved $N_2$ and total unburned hydrocarbon (HC) concentrations were measured at the exit section of the combustor (h=300 mm) using a gas chromatography, model 450-G.C. The sample is supplied to the gas chromatograph through a suction fan after quenching it at the exit section using a specially designed probe to prevent reactions and protect the pump blades. The probe consists of three tubes, the sample is sucked through the inner tube (dia. of ⅛~) and the cooling water is supplied in the annular area between the outer pipe (dia. of 0.5 inch) and the middle tube (dia. of 0.25 inch) and leaves from the annulus between the inner and the middle tubes. The flow of water is controlled in order to prevent the condensation inside the probe. The exit pipe of the fan is lengthy and has a sudden drop in diameter to complete the cooling process to separate $H_2O$ before injecting the sample to the G.C. to introduce the sample as dry. The total hydrocarbon concentration is measured as methane equivalents by means of an FID (flame ionization detector) based instrument. The analysis of $O_2$, CO, $N_2$ and $CO_2$ were performed by a Thermal Conductivity Detector (TCD) which is the most universal detector available with different measurement ranges, adapted for reference and $O_2/CO_2$ conditions, respectively. The gas is dried and filtered before it is fed into the on-line gas analyzer train.

Two sets of experiments were conducted with the first focusing on determining flame stability for equivalence ratios ranging from 0.5 to 1, fuel volume flow rates from 5 to 10 l/min and at different $O_2$ concentrations in the oxidizer ranging from 100% O2 (0% $CO_2$) oxidizer mixture of $O2/CO_2$ are 100/0, 80/20, 60/40, 50/50, 40/60, 30/70 and 25/75 by volume. The conditions for the flame blow out are determined by reducing the percentage of O2 from 25% by a step of 1% until blow out state is reached. The high speed camera is used to visualize the size, shape and position of the heat release zone. The second set of experiments involve measurements to characterize the flames by measuring the main species concentration at the exhaust section of the combustor, exhaust temperature, and inside reactor temperature profile through the flame from the bottom of the reactor to the exhaust section which can serve as a database for combustion models validation. The temperature at the exit section of the reactor is measured in the radial direction at radii of 0, 10, 20, 30 mm. The fuel volume flow rate is changed for each equivalence ratio from 5 l/min to 10 l/min by a step of 1 l/min and at each value of fuel volume flow rate. Also, at a certain equivalence ratio; all the different percentages of $O_2/CO_2$ have been checked. All gases are introduced to the combustion chamber at atmospheric pressure and at a temperature of 22° C.

The flames were established under globally lean conditions which showed no soot production and burned with a light blue color. The flames also appeared with a conically shaped flame zone at all operating conditions. The width of the flame is increased through the combustor height to completely occupy the quartz reactor tube at a certain height. The flames are stabilized in this design by two recirculation zones. One recirculation zone is inside the flame itself due to the bluff body at the end of the fuel pipe which accelerates the fuel and cause a recirculation zone inside the flame. The second recirculation zone is created due to the existence of the conically shaped oxidizer inlet which forms a recirculation zone near to the reactor wall. Flame visualization shows a good radial symmetry.

A simplified equation is used to calculate the swirl number as given in Eq. (3.1). The equation was simplified to eliminate the need for static pressure measurement and the final form is based on the velocity at reactor inlet just above the nozzle exit.

$$S = \frac{\int_0^{R_o} V_z W r^2 dr}{R_o \int_0^{R_o} V_z^2 r dr} \quad (3.1)$$

where, Vz is the axial velocity, W is the tangential velocity, and Ro is the radius of at the nozzle exit. The swirl number is calculated and was found to have a range of 0.5 to 0.6. The nozzle is contoured and a combustion chamber is used with an expansion factor (D/d) of 3.5 where D is the inner diameter of combustion chamber and d is the diameter of the nozzle at the reactor inlet. Both inner and outer recirculation zones break down the vortex motion. The Reynolds number is calculated for each case based on the cold inflow conditions and a nozzle diameter of 10 mm. The mass flow rate is calculated at the standard temperature and pressure while the viscosity of the mixture is calculated using the correlation given by Warnatz et al. See Warnatz J., Maas U., Dibble R., Combustion: physical and chemical fundamentals, modeling and simulation, 4th ed. 2006, Springer, p. 64, incorporated herein by reference in its entirety.

Errors and uncertainties in the measuring devices are very important parameters in the analysis of the experimental data. Those errors can rise from instrument selection, instrument condition, instrument calibration, environment and observation. This analysis of uncertainty is also important to prove the accuracy of the experiments. The uncertainty analysis is performed using the method described by Holman et al. See Holman G. F., Chires G. L., Bott T. R., Process heat transfer, CRC Press LLC, New York, 1994, incorporated herein by reference in its entirety. In the present experiments, temperatures and flow rates are measured using appropriate instruments as described above. The total uncertainty of any measured parameter may be calculated as follows:

$$\omega M = (\omega^2_{sensor} + \omega^2_{DAS} + \omega^2_{Cailib})^{1/2}$$

where, $\omega M$ is the uncertainty in any measured parameter, M, $\omega_{sensor}$ is the uncertainty in the sensor reading, $\omega_{DAS}$ is the uncertainty associated with the data acquisition system and $\omega_{Cal}$ is the uncertainty in the calibration process. The uncertainties in the measured parameters are presented in Table 3.1. Reproducibility of results was checked by repeating a set of tests for two times under the same conditions and taking the average values.

TABLE 3.1

Uncertainty of the measured parameters.

| Quantity | Exhaust Temperature | Gases mass flow rates |
|---|---|---|
| Uncertainty, % | ±0.5 (° C.) | ±2% |

The mathematical model was based on the numerical solution of the conservation equations for mass, momentum, and energy, and transport equations for scalar variables. The equations, which are elliptic and three-dimensional, were solved to provide predictions of the flow pattern, thermal and emissions characteristics of reacting medium inside a gas turbine model combustor. The equations which govern the conservation of mass, momentum and energy as well as the equations for species transport may be expressed in the following general form: See Habib M. A., Elshafei M., Dajani M., Influence of combustion parameters on NOx production in an industrial boiler, Computers & Fluids, Volume 37, Issue 1, January 2008, Pages 12-23, incorporated herein by reference in its entirety.

$$\frac{\partial}{\partial x_j}(\overline{\rho U}_j \Phi + \overline{\rho u_j \phi}) = \frac{\partial}{\partial x_j}\left[\Gamma_\phi \frac{\partial \Phi}{\partial x_j}\right] + \overline{\rho} S_\Phi \quad (3.3)$$

where $\Phi$ and $\phi$ are the average and fluctuating values of the dependent variable and uj is the velocity component along the coordinate direction xj, $\overline{\rho}$ is the fluid density, $\Gamma_\Phi$ is the i diffusion coefficient and $S_\Phi$ is the source term.

Equation (3.3) stands for the mass conservation equation when $\Phi=1$; the momentum conservation equation when $\Phi$ is a velocity component; the energy equation when $\Phi$ is the stagnation enthalpy; or the transport equation of a scalar when $\Phi$ is a scalar variable such as mixture fraction.

The present work utilizes the k-model of Versteeg and Malalasekera. See Versteeg H. K., Malalasekera W., An Introduction to Computational Fluid Dynamics; the Finite Volume Method, Longman Scientific and Technical, 1995, incorporated herein by reference in its entirety. The Reynolds stresses and turbulent scalar fluxes are related to the gradients of the mean velocities and scalar variable, respectively, via exchange coefficients as follows:

$$-\rho \overline{u_i u_j} = \mu_t \left( \frac{\partial \overline{U_i}}{\partial x_j} + \frac{\partial \overline{U_j}}{\partial x_i} \right) - \frac{2}{3} \rho k \delta_{ij} \quad (3.4)$$

$$-\rho \overline{u_j \phi} = \Gamma_\Phi \frac{\partial \Phi}{\partial x_j} \quad (3.5)$$

where: $\mu t$ is the turbulent viscosity and $\Gamma_\Phi$ is equal to $\mu t / \sigma \Phi$. The turbulent viscosity is modeled as:

$$\mu_t = c_\mu \rho k^2 / \epsilon \quad (3.6)$$

Where: $c_\mu$ and $\sigma_\Phi$ are constants. The turbulent viscosity is thus obtained from the solution of the transport equations for k and $\epsilon$. RNG (Renormalized group) turbulence model was used to provide better results for vertical flows. See Wilcox D. C., Turbulence Modeling for CFD, DCW Industries, 2000, incorporated herein by reference in its entirety.

The eddy dissipation model that described turbulence-chemistry interaction in non-premixed combustion was utilized in the present work to provide the production rate of species. The conservation equations of the kinetic energy of turbulence and the rate of dissipation of the kinetic energy of turbulence are:

$$\frac{\partial}{\partial x_j} (\rho \overline{U}_j k) = \frac{\partial}{\partial x_j} \left( \frac{\mu_{eff}}{\sigma_k} \frac{\partial k}{\partial x_i} \right) + G_k - \rho \epsilon \quad (3.7)$$

$$\frac{\partial}{\partial x_j} (\rho \overline{U}_j \epsilon) = \frac{\partial}{\partial x_i} \left( \frac{\mu_{eff}}{\sigma_\epsilon} \frac{\partial \epsilon}{\partial x_i} \right) + C_1 C_k \frac{\epsilon}{k} - C_2^* \rho \frac{\epsilon^2}{k} \quad (3.8)$$

where Gk represents the generation of turbulent kinetic energy due to the mean velocity gradients and is given by:

$$G_k = -\rho \overline{u_i u_j} \frac{\partial \overline{U}_j}{\partial x_i} \quad (3.9)$$

See Chen L., Ghoniem A. F., Simulation of Oxy-Coal Combustion in a 100 kWth Test Facility Using RANS and LES: A Validation Study, Energy Fuels 2012, 26, 4783-4798, incorporated herein by reference in its entirety.

The quantities $\sigma_k$ and $\sigma_\epsilon$ are the effective Prandtl numbers for k and $\epsilon$, respectively and $C^*_2$* is given as:

$$C^*_2 = C_2 + C_3 \quad (3.10)$$

where C3 is a function of the term and, therefore, the model is responsive to the effects of rapid strain and streamline curvature and is suitable for the present calculations. The model constants C1 and C2 have the values; C1=1.42 and C2=1.68. The wall functions establish the link between the field variables at the near-wall cells and the corresponding quantities at the wall.

The solution of the radiative transfer equation (RTE) was obtained using the discrete ordinates (DO) radiation model. The RTE equation is written as:

$$\frac{dI(r,s)}{ds} = \kappa I_b - (\kappa + \sigma_s) I(r,s) \quad (3.11)$$

The total radiation intensity I, depends on the position vector, r, and the path length s. $\kappa$ is the absorption coefficient and GS is the scattering coefficient. The Planck mean absorption coefficient is given as:

$$\kappa_P(T,P) = \frac{\int_0^\infty \kappa_\lambda(\lambda, T, P) e_{b\lambda}(\lambda, T) d\lambda}{\sigma T^4} \quad (3.12)$$

where $eb\lambda$ is the blackbody spectral emissive power. The blackbody spectral emissive power is calculated using variables by Zheng et al. See Zheng Y., Fan J., Ma Y., Sun P, Cen K., Computational modeling of Tangentially Fired Boiler II NOx Emissions, Chinese J. of Chemical Engineering, Vol. 8 (3), pp. 247-250, 2000, incorporated herein by reference in its entirety.

The mass fraction of each species ml, is predicted through the solution of a convection-diffusion equation for the $l^{th}$ species. The present calculations utilize a modified two-step methane-oxycombustion reaction kinetics model as described below which solves the transport equations for the species of $O_2$, $CO_2$, CO and $H_2O$. The conservation equations can be expressed in the following form:

$$\frac{\partial}{\partial x_i} (\rho \overline{U}_i m_l) = -\frac{\partial}{\partial x_i} J_{l,i} + R_l \quad (3.13)$$

where Rl is the mass rate of creation or depletion by chemical reaction of the species l, Jl,i is the diffusion flux of species l, which arises due to concentration gradients which is given by:

$$J_{l,i} = -\left( \rho D_{l,m} + \frac{\mu_i}{Sc_l} \right) \frac{\partial m_l}{\partial x_i} \quad (3.14)$$

where $D_{l,m}$ is the diffusion coefficient for species l in the mixture and Sct is the turbulent Schmidt number, $\mu_t / \rho D_t$ is equal to 0.7.

An eddy-dissipation model that relates the rate of reaction to the rate of dissipation of the reactant- and product-containing eddies is used to calculate the rate of reaction. See Magnussen B. F., Hjertager B. H., On mathematical models of turbulent combustion with special emphasis on soot formation and combustion, In $16^{th}$ Symp. (Int'l) on Combustion, the Combustion Institute, 1976, incorporated herein by reference in its entirety.

The source of chemical species i due to reaction, $R_i$, is computed as the sum of the reaction sources over the NR reactions, thus:

$$R_i = M_i \Sigma_{k=1}^{N_R} R_{i,k} \quad (3.15)$$

where $M_i$ is the molecular weight of species i and $R_{i,k}$ is the molar rate of creation/destruction of species i in reaction k. The reaction rate, $R_{i,k}$ is controlled either by an Arrhenius kinetic rate expression or by the mixing of the turbulent eddies containing fluctuating species concentrations. The rate of reaction $R_{i,k}$ is given by the smaller value of the two expressions below:

$$R_{i,k} = v_{i,k} M_i A \rho \frac{\varepsilon}{k} \frac{m_R}{v_{R,k} M_R} \quad (3.16)$$

$$R_{i,k} = v_{i,k} M_i A B \rho \frac{\varepsilon}{k} \frac{\sum_P m_P}{\sum_j^N v_{j,k} M_j} \quad (3.16)$$

where $m_P$ is the mass fraction of a product species (P), mR is the mass fraction of a reactant (R), where R is the reactant species giving the smallest value of $R_{i,k}$, A is an empirical constant equal to 4.0, B is an empirical constant equal to 0.5, $v_{R,k}$ is the stoichiometric coefficient for reactant i in reaction k and $v_{j,k}$ is the stoichiometric coefficient for product i in reaction k. The eddy-dissipation model relates the rate of reaction to the rate of dissipation of the reactant- and product-containing eddies and the term k/ε represents the time scale of the turbulent eddies.

Examples of CFD modeling in combustion application using the global mechanisms are found in the literature. See Brink A., Mueller C., Kilpinen P., Hupa M., Possibilities and limitations of the Eddy Break-Up Model, Combust. Flame, 2000, 123, 275-279 and Saario A., Oksanen A., Comparison of global ammonia chemistry mechanisms in biomass combustion and selective noncatalytic reduction process conditions, Energy Fuels, 2008, 22, 297-305, each incorporated herein by reference in their entirety. However, computationally simple mechanisms are cheap, simple and available; the simplified schemes may not give accurate results especially under oxy-fuel combustion conditions. The replacement of inert N2 with a chemically reactive compound, $CO_2$, has been shown to change the importance of some of the elementary reactions governing the combustion, thereby requiring a modification of the global multistep reaction mechanisms to make them valid under oxy-fuel conditions. See Glarborg P., Bentzen L. L., Chemical Effects of a High $CO_2$ Concentration in Oxy-Fuel Combustion of Methane, Energy Fuels, 2007, 22, 291-296, incorporated herein by reference in its entirety.

The two-step hydrocarbon oxidation mechanism by Westbrook and Dryer which was modified by Andersen et al. was used herein for the calculations of the reaction kinetics. See Westbrook C. K., Dryer F. L., Simplified reaction mechanisms for the oxidation of hydrocarbon fuels in flames, Combust. Sci. Technol. 1981, 27, 31-43, incorporated herein by reference in its entirety. The model was modified to handle the increased $CO_2$ concentration under oxy-fuel conditions. The Westbrook and Dryer model consists of two reactions, where the last step, oxidation of CO to $CO_2$, is reversible. The mechanism is listed in the form of three irreversible steps:

$CH_4 + 1.5O_2 \rightarrow CO + 2H_2O$ (reaction 1)

$CO + 0.5O_2 \rightarrow CO_2$ (reaction 2)

$CO_2 \rightarrow CO + 0.5O_2$ (reaction 3)

For this model, the modified reactions rates data by Andersen et. al. are listed in Table 3.2. The set of governing equations and boundary conditions are solved numerically. The details of the calculation procedure can be found in previous works. See Shuja S. Z., Habib M. A., Fluid Flow and Heat Transfer Characteristics in Axisymmetric Annular Diffusers, Computers and Fluids, Vol. 25, No. 2, pp. 133-150, 1996, incorporated herein by reference in its entirety. Gambit 2.2 was used to construct the mesh and as the reactor is symmetric as shown in FIG. 12, only half part of the reactor was modeled with a mesh of more than 5,00,000 finite volumes was used with very small boundary control volumes in the regions of high gradients. The CFD code Fluent 12.1 was selected for the solution of the steady-state conservation equations.

TABLE 3.2

Modified two-Step Methane-oxygen Combustion Mechanisms with Kinetic Rate Data.

| Reaction number | Reactions | A | β | $E_a$ (J/kmole) | Reaction orders |
|---|---|---|---|---|---|
| Reaction 1 | $CH_4 + 1.5O_2 \rightarrow CO + 2H_2O$ | $1.59 * 10^{13}$ | 0 | $1.998 * 10^8$ | $[CH_4]^{0.7}[O_2]^{0.8}$ |
| Reaction 2 | $CO + 0.5O_2 \rightarrow CO_2$ | $3.98 * 10^8$ | 0 | $4.18 * 10^7$ | $[CO][O_2]^{0.25}[H_2O]^{0.5}$ |
| Reaction 3 | $CO_2 \rightarrow CO + 0.5O_2$ | $6.16 * 10^{13}$ | −0.97 | $3.277 * 10^8$ | $[CO_2][H_2O]^{0.5}[O_2]^{-0.25}$ |

Figure 14:
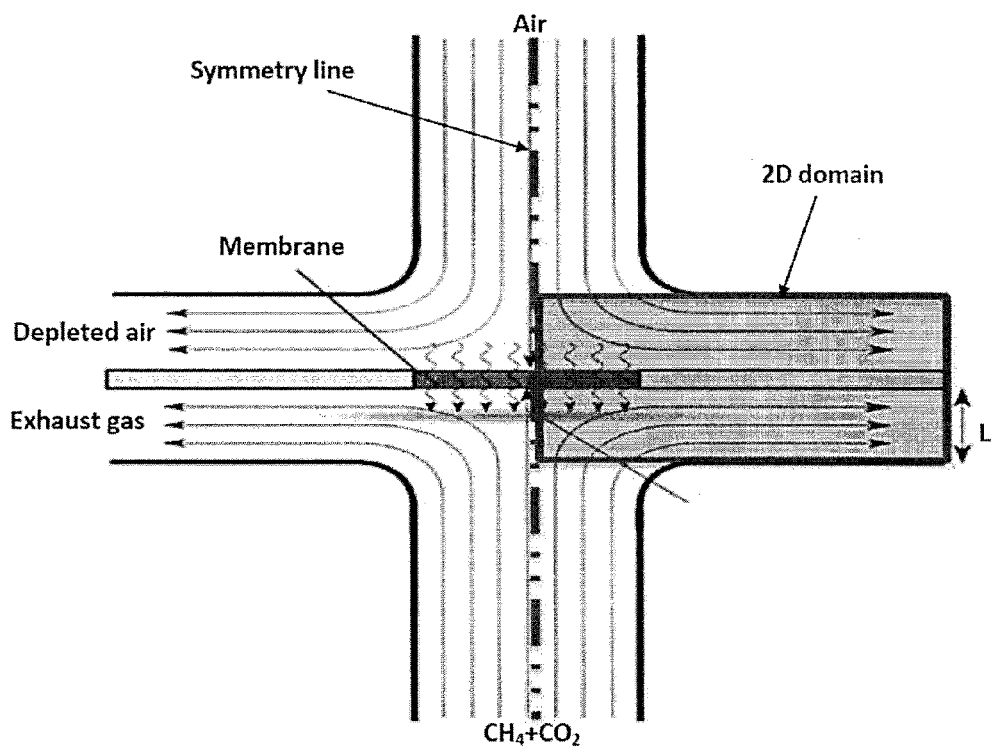
FIG. 14 is a schematic diagram of the 2D representation of the membrane reactor used in the CFD model.

Membrane Reactor Model Setup:

FIG. 14 is a schematic diagram of the 2D representation of the membrane reactor used in the CFD model. The membrane reactor model shown in FIG. 14 is used as the ITM reactor. As shown in the figure, an LSCF-1991 ionic ceramic membrane separates an oxygen containing upstream (typically air) and a downstream containing the sweep gases. The geometry of reactor was selected to facilitate comparison with numerical work and to reduce spatial variations to two dimensions. Due to the symmetry in the reactor design, only half of the domain is considered as the symmetry plane is passing through the middle of the membrane surface area.

The sweep gas tested in the present work is a mixture of $CH_4+CO_2$ for the analysis of the membrane reactor application. More details about membrane specifications are listed in table 4.1. The surface area of the membrane is 8 cm×8 cm and it has an operating temperature range of 700° C. to 950° C. The normal distance to the membrane surface, L, between fuel inlet and the membrane surface is varied from 15 mm to 90 mm in order to investigate the effect of reactor geometry on the permeation and combustion process. The temperature of both streams in the feed and permeate sides of the membrane is varied between 700° C. and 1000° C. to see its effect also.

Both sides of the reactor are maintained at atmospheric pressure. The simulations were carried out over a wide range of volume flow rates of both feed and permeate flows (100, to 2000 standard cubic centimeter per minute, sccm). The pre-exponential coefficients of the Dkk (Dv, Kf and Kr coefficients model) oxygen flux permeation equation model have been fitted using the available experimental data in literature. Where, DV is the diffusion coefficient of oxygen vacancies, kf and kr are, respectively, the forward and reverse reaction rate constants as discussed below. A complete oxygen permeation model is developed as it is discussed later in the coming section. The flow rates in SI units (kg/s) have been calculated from feed and permeate side volume flow rates (in sccm) using the species concentrations at inlet and the species properties calculated at the standard conditions of 0° C. The analyses of the reaction kinetics are done here using a two-step model in order to consider the detailed oxy-combustion process without large computational effort.

TABLE 4.1

Membrane specifications

| Parameter | Value |
| --- | --- |
| Membrane thickness | 0.9 mm |
| Membrane material | LSCF-1991 |
| density | 6000 kg/m$^3$ [184, 185] |
| Thermal conductivity | 4 W/m/K [184, 185] |

The reduced coordinate system to 2D due to symmetry in the reactor design, the two-step hydrocarbon oxidation mechanism by Westbrook and Dryer which was modified by Andersen et. al. was used for the calculations of the reaction kinetics. The model was modified to handle the increased $CO_2$ concentration under oxy-fuel conditions. The Westbrook and Dryer model consists of two reactions, where the last step, oxidation of CO to $CO_2$, is reversible. The mechanism is listed in the form of three irreversible steps as described above in the part of numerical modeling setup for the gas turbine model combustor (see reactions from 1 to 3 above). For this model, the modified reaction rate data by Andersen et. al. are listed as described in table 3.1.

Little work was reported with a focus on examining the effects of reaction side conditions and flow configuration on oxygen permeation through the mixed-conducting ceramic membranes and none has been performed for 3-D membrane reactors. Focus is made on oxygen separation through ion transport membranes and then the combustion is made in the permeate channels with fuel in a mixture of $O2/CO_2/H_2O$. The new reactor design introduced here is substituting conventional gas turbine combustor by a monolith structure ITM reactor. Measurement for the feed and sweep flow rates have been done in order to meet the power required for the reactor and keeping the reactor size as compact as possible. Effects of flow configurations, channel width and percentage of $CH_4$ in the permeate side flow are also introduced under constant inlet gas temperature and fixed operating pressure of 10 bars. Since reported maximum permeation rates have increased relatively recently, the expression was scaled up by one order of magnitude (inside the model) such that it gives the maximum flux values found in the literature at maximum temperature and partial pressure difference and to reflect recent permeation improvements. However, different oxygen permeation model is used, the same scaling factor like that in has been applied to the model in order to reflect the recent improvements in the oxygen permeation. See Mancini N. D., Mitsos A., Ion transport membrane reactors for oxy-combustion Part I: intermediate fidelity Modeling, Energy 2011, 36, 4701-4720, incorporated herein by reference in its entirety. The reactor geometry has been measured based on the channel width. Accordingly, the number of permeate and feed channels has been calculated keeping the reactor size as close as possible to the size of a real industrial gas turbine. The monolith structure rector design introduced here is able to give power ranging from 5 to 8 MWe based on cycle first law efficiency.

Figure 15:
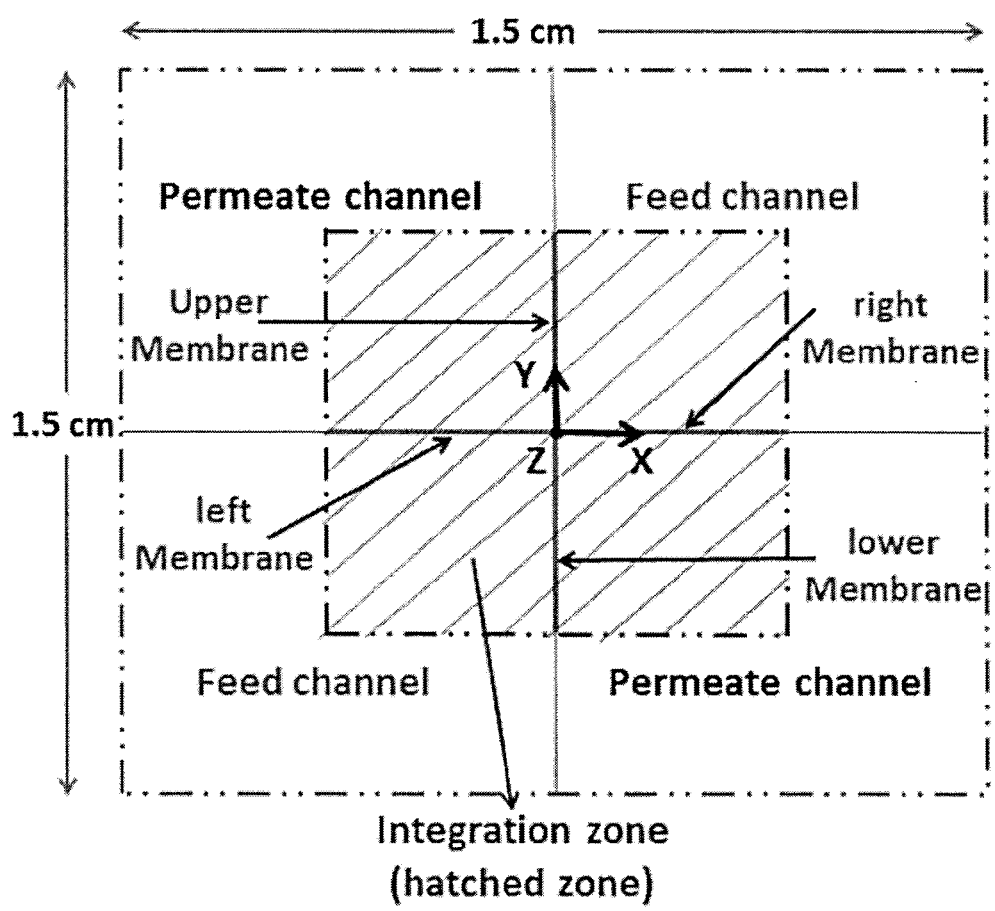
FIG. 15 is a schematic diagram of a traverse cross section in four adjacent channels in the 3-D membrane reactor.

A monolith structure design ITM reactor was used here with total number of feed and permeate channels of 50,000, 25,000 for each stream. Each channel has a square cross section of width of 15 mm based on the channel width as discussed in the coming section. The length of the reactor was considered fixed and equal to 0.9 m in order to keep the length of the reactor to be similar to that of real industrial gas turbines. Due to symmetry in the monolith structure design of the reactor, only 3D four quarters of four adjacent channels sharing one common edge are considered in all simulations as shown in FIG. 15. FIG. 15 is a schematic diagram of a traverse cross section in four adjacent channels in the 3-D membrane reactor showing the membranes and the considered integration zone. The section in FIG. 15 is for a traverse cross section in four adjacent channels inside the reactor and normal to the axial $\hat{J}z'$ direction. As shown in the figure, LSCF-1991 ionic ceramic membranes separate oxygen containing streams (typically air) from streams containing the fuel, methane, and the sweep gas, $CO_2$ plus $H_2O$. More details about membrane specifications are there in table 4.1 Nemitallah et al. See Nemitallah M. A., Habib M. A., Ben Mansour R., Investigations of oxy-fuel combustion and oxygen permeation in an ITM reactor using a two-step oxycombustion reaction kinetics model, Journal of Membrane Science 2013, 432, 1-12, incorporated herein by reference in its entirety. The present reactor design results in reactor height of 3.35 m and overall volume and membrane surface area of 10.1 m3 and 2700 m2, respectively. In order to understand how an ITM reactor depends on the flow configuration, calculations are performed for co-current versus counter current at the same operating conditions. Restricted equilibrium is assumed for simplicity because it provides upper-bound estimates on the wall temperature and reactive ITM performance in general.

The channel width is varied in order to investigate the effect of reactor geometry on oxygen permeation flux and combustion process. The temperature of streams in all feed and permeate channels of the reactor is fixed to 900° C. and the pressure for all streams is maintained at ten times the atmospheric pressure, 10 bars. The volume flow rates of feed and permeate flows have been measured in order to get maximum oxygen permeation flux and improving the combustion process in the permeate channels. The pre-exponential coefficients of the Dkk (Dv, Kf and Kr coefficients model) oxygen flux permeation equation model have been fitted using the available experimental data in literature. Where, DV is the diffusion coefficient of oxygen vacancies, kf and kr are, respectively, the forward and reverse reaction rate constants as discussed below.

The simplest oxidation mechanism assumes that products of the chemical reaction consist only of $CO_2$ and $H_2O$:

$$CH_4 + 2O_2 \rightarrow CO_2 + 2H_2O \qquad (4.1)$$

The physical situation that this assumption reasonably approximates is a diffusion flame suspended in the flow field at relatively high temperature. Here, the oxygen diffuses across the boundary layer to meet methane in a small, well-defined reaction zone. The high temperature of the flame accelerates the local homogeneous kinetics, and mostly produces $CO_2$ and $H_2O$ only, if the flame temperature is not too high. However it is only needed to show that the reaction rates are so much fast that chemical equilibrium is always locally attained.

Finally, the homogeneous gas phase reactions in the relatively cool bulk are taken to be so slow that once the products of the reaction have formed and leave the reaction zone back to the free stream, they do not have a sufficient residence time to interact and form species such as $H_2$ or CO.

Development of Oxygen Permeation Equation:

The same oxygen permeation equation is considered in both 2D and 3D membrane reactors simulations. In the ceramic membrane reactor, oxygen permeates through the ionic or mixed-conducting ceramic membrane via a complex mechanism. It usually includes adsorption of oxygen and charge transfer reaction on the membrane surface exposed to air, oxygen vacancy and electron diffusion in the membrane bulk, and charge transfer and chemical reaction on the membrane surface exposed to a reducing gas. The detailed mathematical formulation for oxygen permeation through mixed-conducting ceramic membranes is fairly complex. Only mobile ionic defects can move from one lattice position to another, and the oxygen vacancy and electron hole are the two charged defects in ITM. When an oxygen vacancy moves to the site occupied by an oxygen ion, the oxygen ion is relocated to the site released by the oxygen vacancy. The transport of charged defects at steady state under an electrochemical potential gradient is described by the Nernst-Planck equation:

$$J_V = -\frac{\sigma_V}{4F^2}(\nabla \mu_V + 2F\nabla\Phi) \tag{4.2}$$

Where $\sigma_V$ is the oxygen vacancy conductivity; $\nabla\mu_V$ and $\nabla\Phi$ are the gradients of the chemical potential and the electric field, respectively. Because of the fast transport of electron-holes inside the open-circuit membrane, a steady-state electric field gradient is not established and it can be considered:

$$\nabla\Phi=0 \tag{4.3}$$

Assuming ideal behavior, the chemical potential gradient can be correlated to the concentration of oxygen vacancies by:

$$\nabla\mu_V = RT\nabla \ln C_V \tag{4.4}$$

Since the thicknesses of the membrane disks are small compared with their diameters, radial diffusion can be neglected. Using Eqs. (4.3) and (4.4) as well as the Einstein relation ($\sigma_V = (4 F^2/RT)C_V D_V$), Eq. (4.2) can be transformed for one-dimensional oxygen permeation to give:

$$J_V = -D_V dC_V/dx \tag{4.5}$$

This takes the form of Fick's first law. According to classical diffusion theories, the diffusion coefficient of oxygen vacancies, DV, is a function of temperature and the oxygen defect lattice structure. Once the steady-state structure is established under certain temperatures, DV can be considered constant and not to be a function of the position from the membrane wall. Based on this analysis and considering $$J_{O2} = \frac{1}{2}J_V,$$

the oxygen permeation flux (J) via bulk diffusion can be obtained by integrating Eq. (4.5):

$$J_{O2} = \frac{D_V}{2L}(C_V'' - V_V') \tag{4.6}$$

Where, L is the membrane thickness, $C'_V$ and $C''_V$ are the concentrations of oxygen vacancies at the high and low oxygen pressure sides of the membrane, respectively. This Expression shows that the oxygen permeation rate by bulk diffusion is governed by the ionic conductivity, temperature and the chemical potential gradient of oxygen vacancies across the membrane. The concentration of oxygen vacancies at both surfaces of the membrane ($C'_V$ and $C''_V$) in Eq. (4.6) is also governed by surface exchange kinetics for the following two surface reactions:

$$\frac{1}{2}O_2 + V^{..}{}_O \overset{K_f/K_r}{\longleftrightarrow} O_o^x + 2h^{.} \tag{A}$$

$$O_o^x + 2h^{.} \overset{K_r/K_f}{\longleftrightarrow} \frac{1}{2}O_2 + V^{..}{}_O \tag{B}$$

Where. $O^x{}_O$ represents lattice oxygen in the perovskite crystal structure, $k_f$ and $k_r$ are, respectively, the forward and reverse reaction rate constants for reaction a (or the reverse and forward rate constants for reaction b). It should be noted that because of the high electronic conductivity, the electron holes are essentially constant at both surfaces of the membrane, and thus the reverse reaction rate of Reaction a and the forward reaction rate of Reaction b are pseudo zero-order at steady state under isothermal conditions. While these two reactions may involve many sub-steps, such as oxygen adsorption, dissociation, recombination, and charge transfer, van Hassel et al. have theoretically and experimentally demonstrated that these two reactions can be considered as elementary reactions and that the law of mass action is therefore applicable. See Van Hassel B. A., Kawada T., Sakai N., Yokokawa H., Dokiya M., Bouwmeester, oxygen permeation modeling of perovskite, H. J. M. Solid State Ionics. 1993, 66, 295, 305, incorporated herein by reference in its entirety. Therefore:

$$J_{O2}=K_f P'_{O2}{}^{0.5}C'_V - K_r \tag{4.7}$$

$$J_{O2}=K_r - K_f P''_{O2}{}^{0.5}C''_V \tag{4.8}$$

As proposed by Xu and Thomson, at steady state, an expression that combines surface exchange on the feed and permeate sides and bulk diffusion in terms of the oxygen partial pressures can be derived. At steady state, Eqs. From (4.6) to (4.8) are equal. Combining these expressions, the form is obtained:

$$J_{O2} = \frac{D_V K_r(P'^{0.5}_{O2} - P''^{0.5}_{O2})}{2LK_f(P'_{O2}P''_{O2})^{0.5} + D_V(P'^{0.5}_{O2} + P''^{0.5}_{O2})} \tag{4.9}$$

Where, DV, Kr and Kf are functions of temperature and the specific properties of the membrane. DV is the diffusion coefficient of oxygen vacancies and kf and kr are, respectively, the forward and reverse reaction rate constants for reaction A (or the reverse and forward rate constants for reaction B). The concentration of oxygen vacancies at both surfaces of the membrane is governed by surface exchange kinetics.

Figure 16:
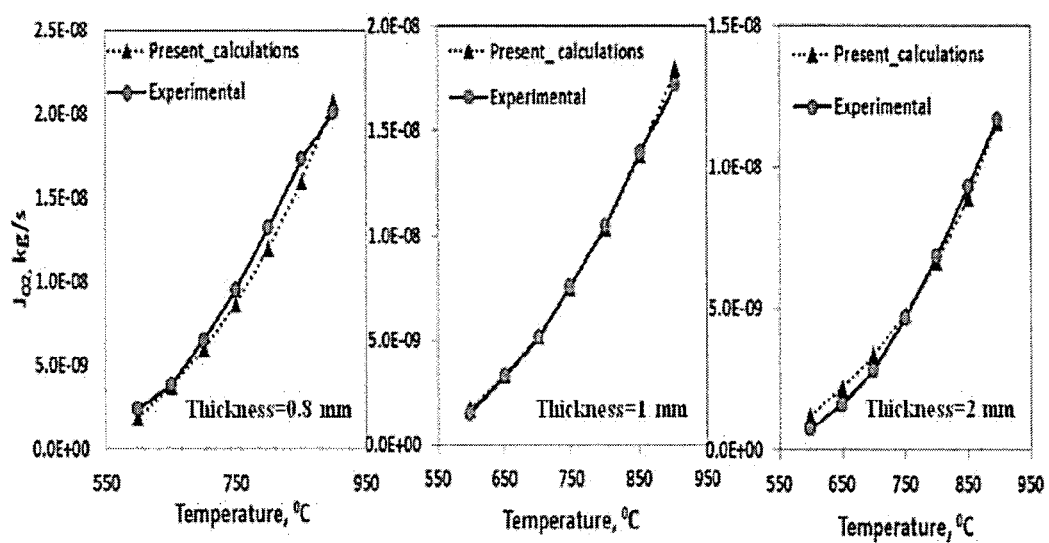
FIG. 16 is a graph of Oxygen permeation through a membrane.

The value of the pre-exponential coefficient of DV is in m 2/s, of kf is in m/atm 0.5 .s and that of kr is in mol/m².s. The activation energy for LSCF-1991 membrane has been determined by fitting the experimental oxygen flux data in the work done by kusaba et. al. as function of temperatures as shown in FIG. 16. FIG. 16 is a graph of the fitting of the experimental data of Kusaba et. al. for Oxygen permeation through LSCF1991 membrane having thicknesses of 0.8, 1 and 2 mm with the present permeation model. As shown in the figure, both the experimental data and the present Dkk model (pre-exponential coefficients of DV, Kr and Kf model) are in a very good agreement for all of the three considered thicknesses of the membrane. The fitted values of the pre-exponential coefficients of $D_V$, $K_r$ and $K_f$ are listed in table 4.2 and also the values of the activation energies are listed there in the table.

TABLE 4.2

Obtained pre-exponential coefficients and activation energies by Nemitallah et al. [183] of $D_v$, $k_f$ and $k_r$ for LSCF-1991 membrane comes from the fitting of experimental data of Kusaba et.al.

| Expression | Pre-Exponential coefficients | | Activation Energy |
|---|---|---|---|
| | Unit | Value | (kJ/mol) |
| $D_v = D°_v \exp(-E_D/RT)$ | m²/s | $1.58 \times 10^{-5}$ | 73.6 |
| $K_f = k°_f \exp(-E_f/RT)$ | m/atm$^{0.5}$ · s | $1.11 \times 10^{10}$ | 226.9 |
| $K_r = k°_r \exp(-E_r/RT)$ | mol/m² · s | $3.85 \times 10^{11}$ | 241.3 |

CFD Model:

The same CFD model is considered in both 2D and 3D membrane reactors simulations. Following the same approach of the previous work, the species transport across the membrane is carried out using a source/sink term. The source/sink term (Si) accounts for the mass flow of species across the membrane. At the volume cells adjacent to the membrane surface, the species are allowed to disappear from one side of the membrane through the sink term and to come out on the other side through the source term. With this method, the velocity and the pressure fields of the gas mixture are obtained from the numerical solution of the mass and momentum conservation equations, while the species concentration distribution and the relevant permeate and retentate fluxes are obtained from a scalar convection-diffusion equation including a source term to tackle the mass flow of the species across the membrane.

The equations which govern the conservation of mass, momentum and energy as well as the equations for species transport are found there in the work done by Lei and Ghoniem. Due to the transfer of oxygen molecules across the membrane surface from feed side to permeate side, a source-sink term should be added to those equations to account for oxygen transfer across the membrane. The conservation equations are modified as follows:

$$\nabla \cdot (\rho U) = S_i \quad (4.10)$$

$$\nabla \cdot (\rho UU) = -\nabla P + \mu \nabla^2 U \quad (4.11)$$

$$(\rho C_P) U \cdot \nabla T = \nabla \cdot (\lambda \nabla T) \quad (4.12)$$

$$\nabla \cdot (\rho U Y_i) - \nabla \cdot (\rho D_{i,m} \nabla Y_i) = S_i \quad (4.13)$$

See Habib M. A., Nemitallah M. A., Ben-Mansour R., Recent Development in Oxy-Combustion Technology and Its Applications to Gas Turbine Combustors and ITM Reactors, dx.doi.org/10.1021/ef301266j|Energy Fuels 2013, 27, 2-19, incorporated herein by reference in its entirety.

Where, u is the velocity vector, ρ is the fluid density, p is the pressure, μ is the dynamic viscosity, λ is the thermal conductivity, $D_{i,m}$ is the diffusion coefficient, Yi is the scalar species mass fraction and S is a source/sink term. In all cases, the source/sink term, S, permits taking into account the mass flow of the species across the membrane. Clearly, the method requires the preliminary knowledge of the permeability characteristics of the membrane, which determine the formulation of the source term. In this work, LSCF 1991 membrane have been considered, which is permeable to oxygen only. Therefore, the source term only takes into account the transfer of oxygen molecules across the membrane. Depending on each specific membrane, any mechanism can be included in the model. From the above mentioned oxygen permeation equation (Eq. 4.9), the following form for the source term can be implemented in the model:

$$S_i = \begin{cases} +\dfrac{J_{O_2} \cdot A_{cell} MW_{O_2}}{V_{cell}} & \text{at low partial pressure } O_2 \\ -\dfrac{J_{O_2} \cdot A_{cell} MW_{O_2}}{V_{cell}} & \text{at high partial pressure } O_2 \end{cases} \quad (4.14)$$

Where, AC and VC is the computational cell area (m²) and volume (m³), respectively. MWO2 is the molecular weight of O2 in kg/mole and JO2 is the oxygen permeation flux in mole/m²-s. The source/sink Si term (kg/m³/s) is modeled in such a way that it is zero unless i=O$_2$ and the computational cell is adjacent to the membrane surface. Coupling of heat transfer through the membrane surface between feed and permeate sides is made through a heat balance equation which considers also the radiant heat absorbed by the membrane:

$$Q°_{sweep} - Q°_{feed} - 2\sigma\epsilon(T^4_{mem} - T^4_\infty) = 0 \quad (4.15)$$

Where, Qo sweep is the heat transfer from the reacting sweep gases to the membrane and Qo feed is the heat released from the membrane surface to the feed side. The emissivity of the membrane surface is assumed to be equal to 0.8 and $T_{mem}$ and T~ are the membrane and surrounding wall temperature, respectively. The diffusion coefficient is determined by specifying, the binary mass diffusion coefficient of the component i in the component j. The corresponding diffusion coefficient is:

$$D_{i,m} = \frac{1 - X_i}{\sum_{j,i=i} \left(\dfrac{X_i}{D_{i,j}}\right)} \quad (4.16)$$

Gambit 2.2 was used to construct the 2D and 3D meshes. For the 2D reactor simulations, only half part of the reactor was modeled due to reactor symmetry with a mesh of more than 5,00,000 finite volumes was used with very small boundary control volumes near to both sides of the membrane in order to correctly predict the permeation process. For the 3D membrane reactor simulations, a mesh has been constructed with more than 1,000,000 finite volumes was used with very small boundary control volumes near to both sides of the membranes. The general-purpose commercial CFD code Fluent 12.1 was selected for the solution of the steady-state conservation equations adopting the laminar formulation for all simulations. Grid independence has been performed to get unchangeable accurate calculations. The equations were numerically solved in a Cartesian coordinate system; Transport of O2 across the membrane was achieved using series of user-defined functions (UDF) that are written in VC++ and compiled and hooked to the FLUENT software. The issue of hydraulic jump across the membrane was resolved by patching the cells from the upper and lower zones with two different values of initial partial pressures of species. The convective terms were discretized by a second order upwind scheme, while the SIMPLE algorithm was used in all cases to couple the continuity and Navier-Stokes equations, due to its stability and accurateness. The solution convergence was carefully checked by monitoring the residuals of all variables as well as the species mass flow rate. Residuals were dropped to the order of $10^{-5}$ or less, which is at least 2 orders of magnitude tighter than Fluent's default criteria.

Radiation Heat Transfer Modeling:

Same radiation model has been applied for all 2D and 3D simulations. In order to correctly predict the temperature distribution in the membrane reactor, a radiative transfer equation (RTE) for an absorbing, emitting and scattering medium has to be solved. The RTE equation is written as:

$$\frac{dI(r,s)}{ds} = \kappa I_b - (\kappa + \sigma_s)I(r,s) \quad (4.17)$$

The total radiation intensity I, depends on the position vector, r, and the path length s. $\kappa$ is the absorption coefficient and $\sigma_s$ is the scattering coefficient. The Planck mean absorption coefficient is given as:

$$\kappa_P(T, P) = \frac{\int_0^\infty \kappa_\lambda(\lambda, T, P) e_{b\lambda}(\lambda, T) d\lambda}{\sigma T^4} \quad (4.18)$$

Where, $eb\lambda$ is the blackbody spectral emissive power. $\kappa$ is calculated using variables by Liu et al. See Liu F., Becker H. A., Bindar Y., A Comparative Study of Radiative Heat Transfer Modeling in as-Fired Furnaces Using the Simple Grey and the Weighted-Sum-of-Grey-Gases Models. International J. of Heat and Mass Transfer 1998, Vol. 41, pp. 3357-3371, incorporated herein by reference in its entirety.

An accurate calculation of the gas radiation property must consider the spectral absorption of $CO_2$ and $H_2O$, and also the overlap between these radiating gas components. Since direct prediction of the absorption coefficient is computationally complex, models for absorption properties, such as the gray gas, will have to be employed in the radiation heat transfer model. The most commonly used gray gas model in CFD is the weighted sum of gray gases (WSGG) model proposed by Smith et al. has been applied in the present CFD calculations. See Smith T. F., Shen Z. F., Friedman J. N., Evaluation of coefficients for the weighted sum of gray gases model, The ASME Journal of Heat Transfer 1982, Vol. 104:602-8, incorporated herein by reference in its entirety. In this model, the gas is assumed to consist of a transparent gas and several gray gases without any wavelength dependence, and the model parameters are based on the radiation properties of air-fired flue gases.

Model Combustor:

Experimental and numerical investigations of an atmospheric diffusion oxy-combustion flame in a gas turbine model combustor are disclosed. Oxy-combustion and emission characterization, flame stabilization and oxycombustion model validation analyses are disclosed. The combustor is fuelled with $CH_4$ and a mixture of $CO_2$ and $O_2$ as oxidizer. Wide ranges of different operating parameters are considered including equivalence ratio, percentage of $O_2/CO_2$ in the oxidizer mixture, and fuel volume flow rate to check the stability of the oxy-combustion diffusion flame experimentally and numerically and also to check the minimum permissible percent of $O_2$ in the oxidizer mixture required in order to get a stable flame. Visualizations of the flame at the above mentioned operating conditions have been carried out experimentally and comparisons with the numerical results have been done. The flames have been characterized in details by measuring the exhaust gas temperatures and comparing them with those from the numerical model. Flame zone also has been characterized in details by plotting the axial and radial temperatures, species concentrations and flow velocities. A modified two-step oxycombustion reaction kinetics model for methane-oxygen combustion has been used in order to predict a clearer oxy-combustion characteristics and then more accurate numerical results in order to correctly validate the numerical model using the experimental results.

Flame Stabilization Behavior:

A series of experiments in a swirl-stabilized gas turbine model combustor described above has been carried out at atmospheric pressure for a range of parameters including fuel volume flow rate, percentage of $O_2$ in the oxidizer mixture and equivalence ratios. The stability of the oxyfuel/$CH_4$ flames was studied for Oxygen concentrations in the oxidizer mixture starting from 100% and reducing this percent till the flame blow out state. The equivalence ratio has been changed from 0.5 to 1 and fuel volume flow rate from 5 L/min to 10 L/min. However, attempts of operating the burner with less than 21% $O_2$ were unsuccessful in all of the considered operating range resulting in unstable operation and blow out. Table 5.1 presents the values of the percentages of $O_2$ in the oxidizer mixture (remainder is $CO_2$) at which the flame has reached a blow out condition. It seems from those results that the most stable flame for the present design is at equivalence ratio of 0.65, as the flame blows out at minimum possible percentage of $O_2$ for stable flame, 22% at 6 L/min fuel volume flow rate and 21% at 9 L/min fuel volume flow rate. As the equivalence ratio was increased more than 0.65, the flame instability conditions are encountered and the flame blow out occurred at higher percentage of $O_2$ in the oxidizer mixture. This is due to the reduced amount of oxygen available for combustion in the flame zone. As the equivalence ratio is increased as in the present model of gas turbine combustor, a great portion of the inlet oxidizer is escaping near to the combustor wall around the flame in order to cool down the exhaust gases comes out from the combustion process. When the equivalence ratio was decreased lower than 0.65 also another cause for instability was encountered because of the increased amount of $CO_2$ available in the combustion chamber which reduces the burning velocity and results in poor combustion performance and a modified distribution of temperature and species in the combustion chamber. The lower burning velocity for oxy-combustion of gaseous fuel theoretically can be affected by the following features: (1) lower thermal diffusivity of $CO_2$, (2) higher molar heat capacity of $CO_2$, (3) chemical effects of $CO_2$ and (4) modified radiative heat transfer. Since the molar heat capacity affects the flame temperature, its effect generally dominates.

TABLE 5.1

The percentage of $O_2$ in the oxidizer mixture at which the flame blows out at different equivalence ratios and fuel volume flow rates.

| Equivalence ratio, $\phi$ | $V°_f$ = 6 L/min | $V°_f$ = 9 L/min |
|---|---|---|
| 0.5 | 24 | 22 |
| 0.55 | 23 | 22 |
| 0.65 | 22 | 21 |
| 0.75 | 25 | 25 |
| 1.0 | 25 | 25 |

Figure 17:
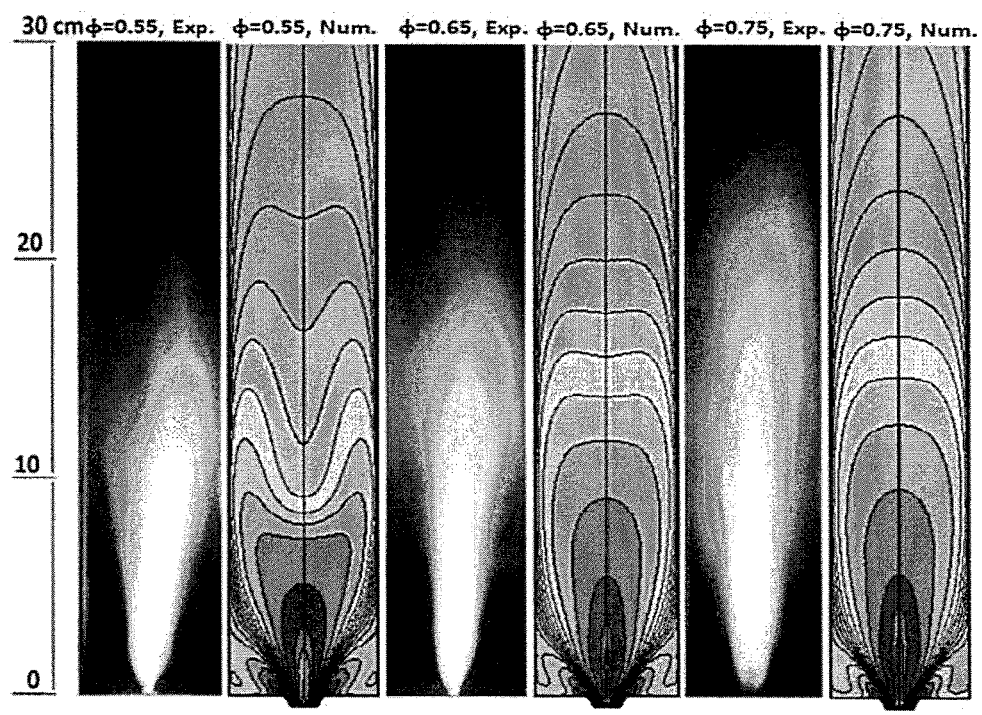
FIG. 17 is an illustration of the comparison between experimental and numerical flame shape at different equivalence ratios.

To visualize the flame shape, a high speed camera has been used to record the flame photos under steady state operating conditions. The displayed images cover a field of view of the whole reactor height (300 mm). FIG. 17 shows a Comparison between experimental (photo using a high speed camera) and numerical (taken from temperature contour plots) flame shapes at different equivalence ratios, Vf=6 L/min and $O2/CO_2$:50/50%. As it is clear from the FIG. 17, the calculated flame shape using the contour plots of temperature distribution is very close to the experimental recorded shapes taken from the steady state flame photos. This is a very good agreement however; the experimental photos are not showing the regions of small temperature gradients. At the lower equivalence ratios, the combustion is stable due to excess oxygen available in the combustion region and the flame temperature as a result increase as characterized from the flame shape and color as shown in FIG. 17.

As the equivalence ratio increases, the red part of the flame increases indicating less oxygen availability in the flame zone. That's why the flame starts to extend for more distance inside the reactor in order to complete the combustion process. As a result, the temperature of the flame was reduced. At higher equivalence ratios, the combustor enters an unstable mode; completely unstable combustion was encountered in case of equivalence ratio equal to 1.0 as shown in FIG. 17. The video images show clear signs of an axially symmetric vortex ring structure forming at the sudden expansion and moving through the outer recirculation zone near to reactor wall.

Figure 18:
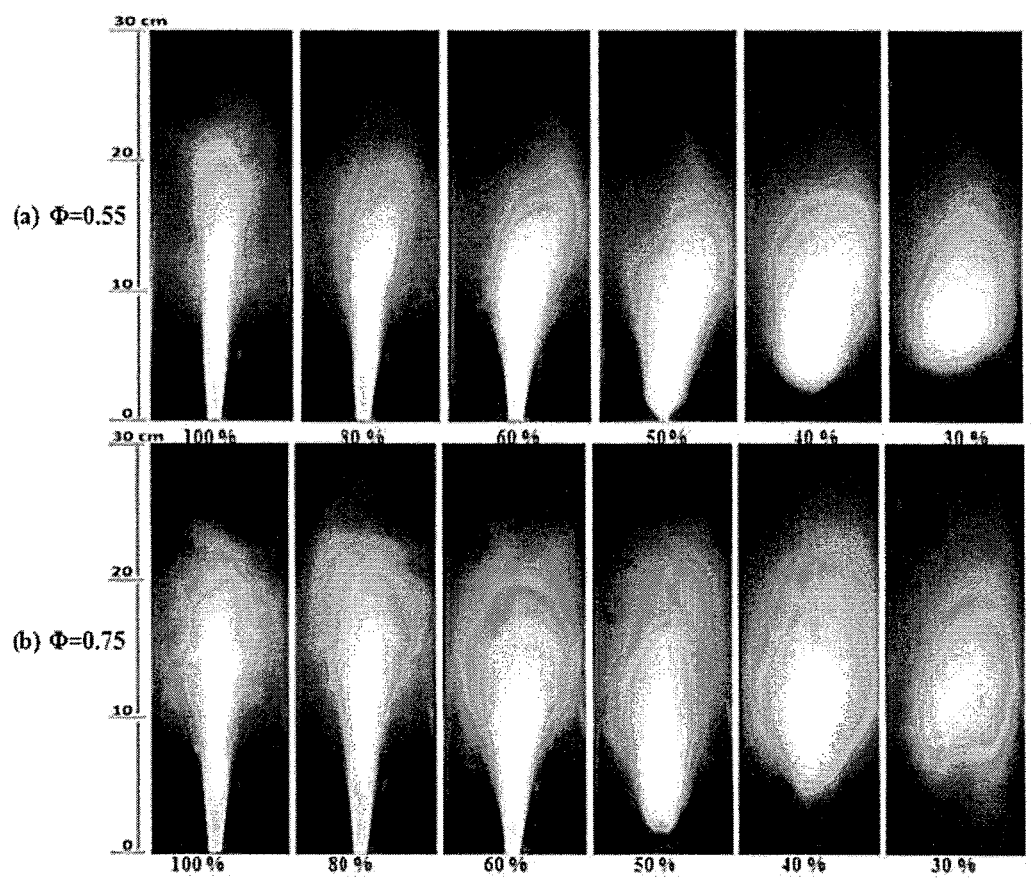
FIG. 18 is an illustration of the visualization of the flame shape to investigate the effect of concentration ratio of O2 in the oxidizer mixture at fixed fuel volume flow rate.

FIG. 18 is an illustration of the flame shape using images captured at steady state operation to investigate the effect of concentration ratio of $O_2$ in the oxidizer mixture at fixed fuel volume flow rate of 6 L/min: (a) at $\phi$=0.55 and (b) at $\phi$=0.75. FIG. 18 shows the percentages of $O_2$ in the oxidizer mixture at constant fuel volume flow rate of 6 L/min considering two operating equivalence ratios. The images indicate that as the $O_2$ content in the oxidizer is increased the flame can be operated stably. This can be attributed to two effects: the flame speed and/or the Reynolds number. As shown in FIG. 18 for both equivalence ratios, the flame is stable for higher concentrations of $O_2$ and as the percentage of $CO_2$ increases in the mixture as the flow rate increases (constant equivalence ratio) and the start to be lifted at 40%/60% of $O_2/CO_2$. As the percentage of $O_2$ in the oxidizer mixture is reduced more, the flame lift distance increases and occupies smaller area inside the reactor until the blow out point is encountered between 25 to 22% of $O_2$ in the oxidizer mixture. In oxyfuel combustion the $O_2$ fraction of the oxidizer can be seen as an additional variable influencing the combustion behavior.

In fact, the $O_2$ concentration has a large effect on increasing the flame speed. The oxidizer composition also influences the flow field as the Reynolds number increases as the percentage of $CO_2$ increases in the oxidizer mixture due to its higher molecular weight. The higher flame speed and lower Reynolds number hence assist flame stabilization and lean operation at higher $O_2$ levels. Also, the flames at higher oxidizer flow rates (lower equivalence ratio and higher Reynolds number) have similar stability limits.

Figure 19:
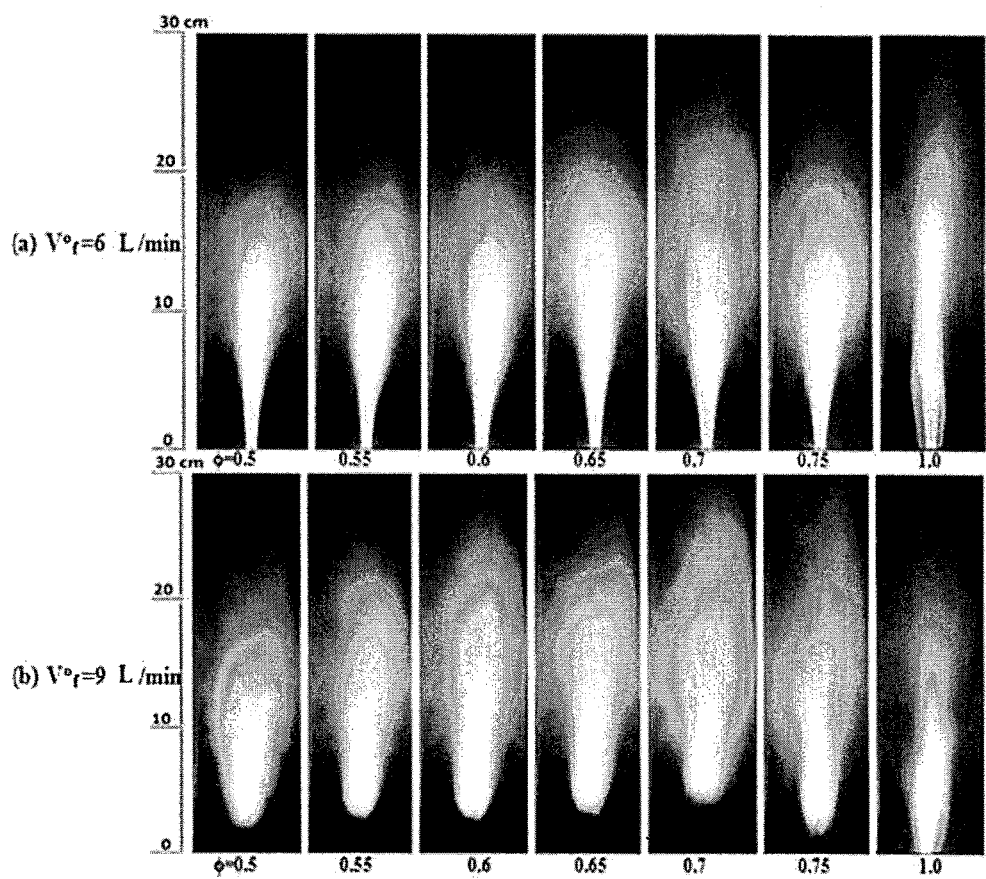
FIG. 19 is an illustration of the visualization of the flame shape investigate the effect of equivalence ratio on flame shape and stability at fixed ratio of $O2/CO_2$.
Figure 20:
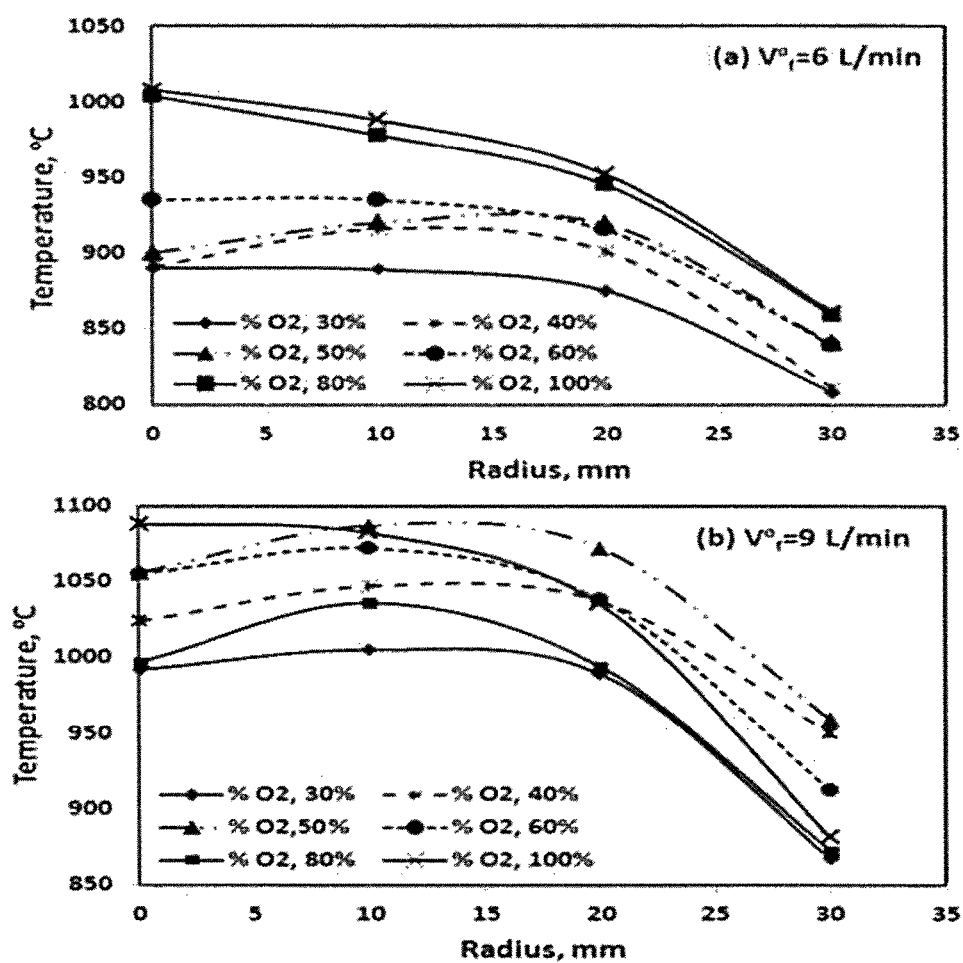
FIG. 20 is a graph of the exhaust gases temperature radial profiles plots as function of percentage of O2 in the oxidizer mixture.

The stabilization behavior does not change significantly with changing the fuel volume flow rate as can be seen in FIG. 19 by comparing the images for the same equivalence ratio for the two considered fuel volume flow rates, 6 L/min and 9 L/min. all the images recorded in the figure are at 60%/40% of $O_2/CO_2$ in the oxidizer mixture to correctly analyze the effect of equivalence ratio on the flame stabilization. FIG. 19 is an illustration of the visualization of the flame shape using images captured at steady state operation to investigate the effect of equivalence ratio on flameshape and stability at fixed ratio of $O2/CO_2$, 60%/40% in the oxidizer mixture: (a) at Vo f=6 L/min and (b) at Vof=9 L/min. In each case for a given fuel volume flow rate, a similar series of transitions in the combustor dynamics and flow noise as characterized by the flame shape as shown in the FIG. 20. FIG. 20 is a graph of the exhaust gases temperature (at a height of 300 mm from the reactor base) radial profiles plots as function of percentage of O2 in the oxidizer mixture at equivalence ratio of 0.55: (a) at 6 l/min fuel flow rate and (b) at 9l/min fuel flow rate. However, in case of 9 L/min fuel flow, the flame was lifted for all equivalence ratios causing more noise of the flame.

At the lower equivalence ratios, the combustion is stable due to excess oxygen available in the combustion region and the flame temperature as a result increase as characterized from the flame shape and color as shown in the figure. As the equivalence ratio increases as the red part of the flame increases indicating less oxygen availability in the flame zone and that's why the flame starts to extend for more distance inside the reactor in order to complete the combustion process and as a result, the temperature of the flame was reduced.

At higher equivalence ratios, the combustor enters an unstable mode; completely unstable combustion was encountered in case of equivalence ratio equal to 1.0 as shown in the figure. The video images show clear signs of an axially symmetric vortex ring structure forming at the sudden expansion and moving through the outer recirculation zone near to reactor wall.

Exhaust Gas Temperature:

For $CH_4$/oxy-combustion, the flames were subject to thermo-acoustic instabilities over a substantial range of operating conditions. As shown in FIG. 20, at equivalence ratio of 0.55, part (a), the exhaust gas temperature increases at the same radial position with increasing $O_2$ content in the oxidizer mixture. This is attributed to the higher flame temperature which causes an increase in the reactivity leading to higher laminar flame speeds and shorter ignition delay times. The temperature is maximum at the centerline and decrease toward the reactor wall. The change in chemical reaction rates along with the reduced Reynolds numbers may be main causes for the change of the flame structure when changing the percentage of oxygen in the oxidizer mixture. In case of lower fuel flow rates, as shown in FIG. 20, part (a), the flame length decreases as the percentage of $CO_2$ in the oxidizer mixture increases. Even when the flame is lifted, the flame height is also reduced and as a result, the radial exhaust temperature is reduced. However, in case of higher flow rates as shown in FIG. 20, part (b), the exhaust temperature is reduced with reducing the Oxygen percent in the oxidizer mixture tell 60% and after that the flame starts to be lifted due to increased mass flow rate of the oxidizer mixture causing an increase in the exhaust gases temperature at the exit section of the reactor. Further reduction in the percentage of $O_2$ in the mixture (increasing $CO_2$) leads to a significant influence on the combustion intensity and stability. As a result, the exhaust gases temperature starts to be reduced again.

Figure 21:
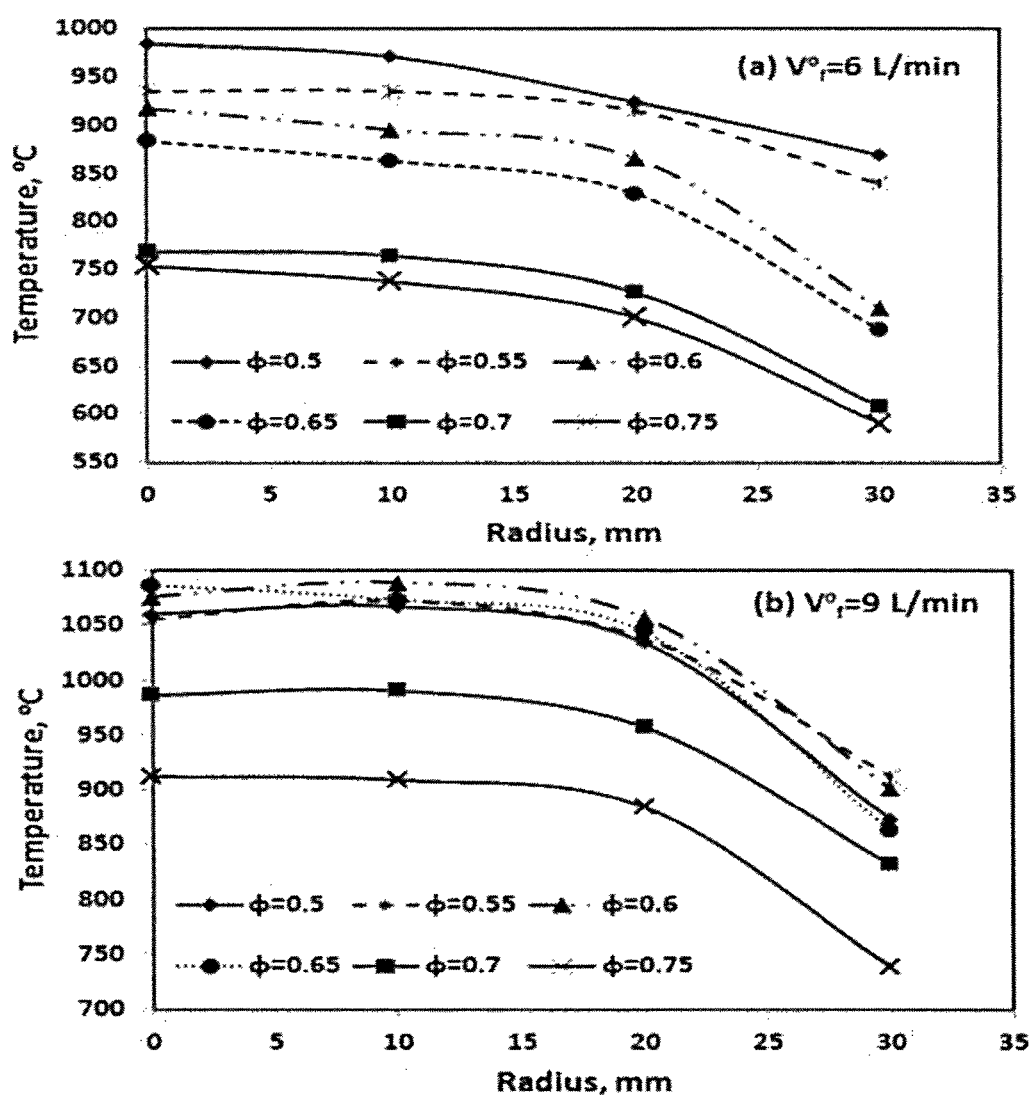
FIG. 21 is a graph of the exhaust gases temperature radial profiles plots as function of equivalence ratio in the oxidizer mixture rate.

At higher values of equivalence ratios, the flame length is extended as compared to lower values of equivalence ratio. This is due to the reduced oxygen in the flame zone and as a result, the exhaust temperature is increased at lower values of fuel volume flow rates. At higher fuel volume flow rates, the trend is not affected significantly by changing the equivalence ratio. The temperature decreases first with reducing $O_2$ in the oxidizer mixture then, it increases due to the flame lift. As the amount of $CO_2$ increases in the mixture, the flame temperature starts to be reduced again. To investigate more clearly the effect of equivalence ratio on the combustion temperature and then on the exhaust gases temperature, FIG. 21 is showing this effect at two different fuel volume flow rates of 6 and 9 L/min. FIG. 21 is a graph of the exhaust gases temperature (at a height of 300 mm from the reactor base) radial profiles plots as function of equivalence ratio at 60% O2 in the oxidizer mixture (40% $CO_2$): (a) at 6 l/min fuel flow rate and (b) at 9 l/min fuel flow rate.

At lower fuel flow, part (a), the amount of corresponding oxidizer is low and as the equivalence ratio increases, the availability of Oxygen is reduced causing lower values of the exhaust gas temperature. However, at higher values of fuel flow rates, part (b), the amount of corresponding oxidizer at the same equivalence ratio is increased. As a result the exhaust gas temperature is increased first due to the optimum availability of oxygen inside the flame zone at equivalence ratio of 0.65. Further increase in the equivalence ratio leads to reduced oxygen availability and the exhaust temperature is reduced as shown in FIG. 21. In this design of gas turbine, great portion of incoming fresh gases go beside the flame in order to cool down the exhaust gases and the temperature is reduced by increasing the equivalence ratio toward stoichiometry.

Figure 22:
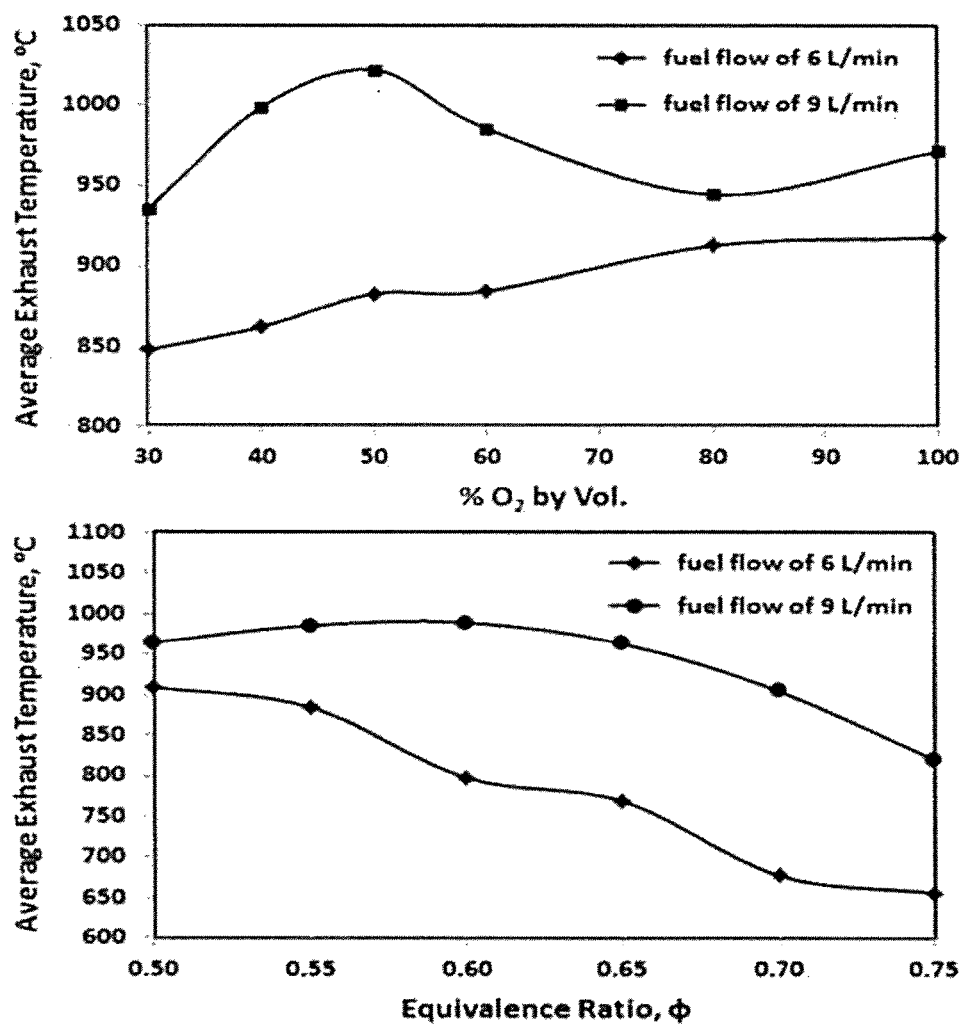
FIG. 22 is a graph of the average exhaust gases temperature plot at different fuel volume flow rates as a function of percentage of O2 in the oxidizer mixture and as a function of equivalence ratio for O2 in the oxidizer mixture.

The average temperature at the exhaust section has been calculated based on energy calculations from flow characteristic data at the exhaust section of the reactor. Those flow data are flow velocity calculated using the 7th power law (for turbulent flow), flow density and flow specific heat at constant pressure calculated at each point and then averaged for the exhaust gases mixture. Based on this energy averaging, the average exhaust gases temperature at a height of 300 mm has been calculated and plotted as shown in FIG. 22. FIG. 22 is a graph of the average exhaust gases temperature (at a height of 300 mm from the reactor base) plot at different fuel volume flow rates. (a) as a function of percentage of O2 in the oxidizer mixture at equivalence ratio of 0.55 and (b) as a function of equivalence ratio for 60% O2 in the oxidizer mixture (40% $CO_2$). FIG. 22 shows the average exhaust gas temperature as a function of percentage of oxygen in the oxidizer mixture in the upper plot and also as a function of equivalence ratio in the lower plot. At fuel volume flow rate of 6 L/min, the exhaust gas temperature increases with increasing the percentage of oxygen in the oxidizer mixture and decreases with increasing the equivalence ratio as shown in the figure. For the case of 9 L/min fuel flow rate, the temperature is reduced by reducing Oxygen in the mixture until the flame lift occur at about 60 percent $O_2$ in the oxidizer mixture and then the exhaust temperature will start to be increased. Further increase in the amount of $CO_2$ leads to the appearance of bad effects of $CO_2$ on the flame characteristics and as a result, the exhaust temperature is reduced again. Also, the temperature is reduced with increasing the equivalence ratio for the case of 9 L/min fuel flow rate. The analysis of the average exhaust gas temperature is similar to what is mentioned above however, the average temperature given is giving an indication about the average energy contained in the exhaust gases.

Figure 23:
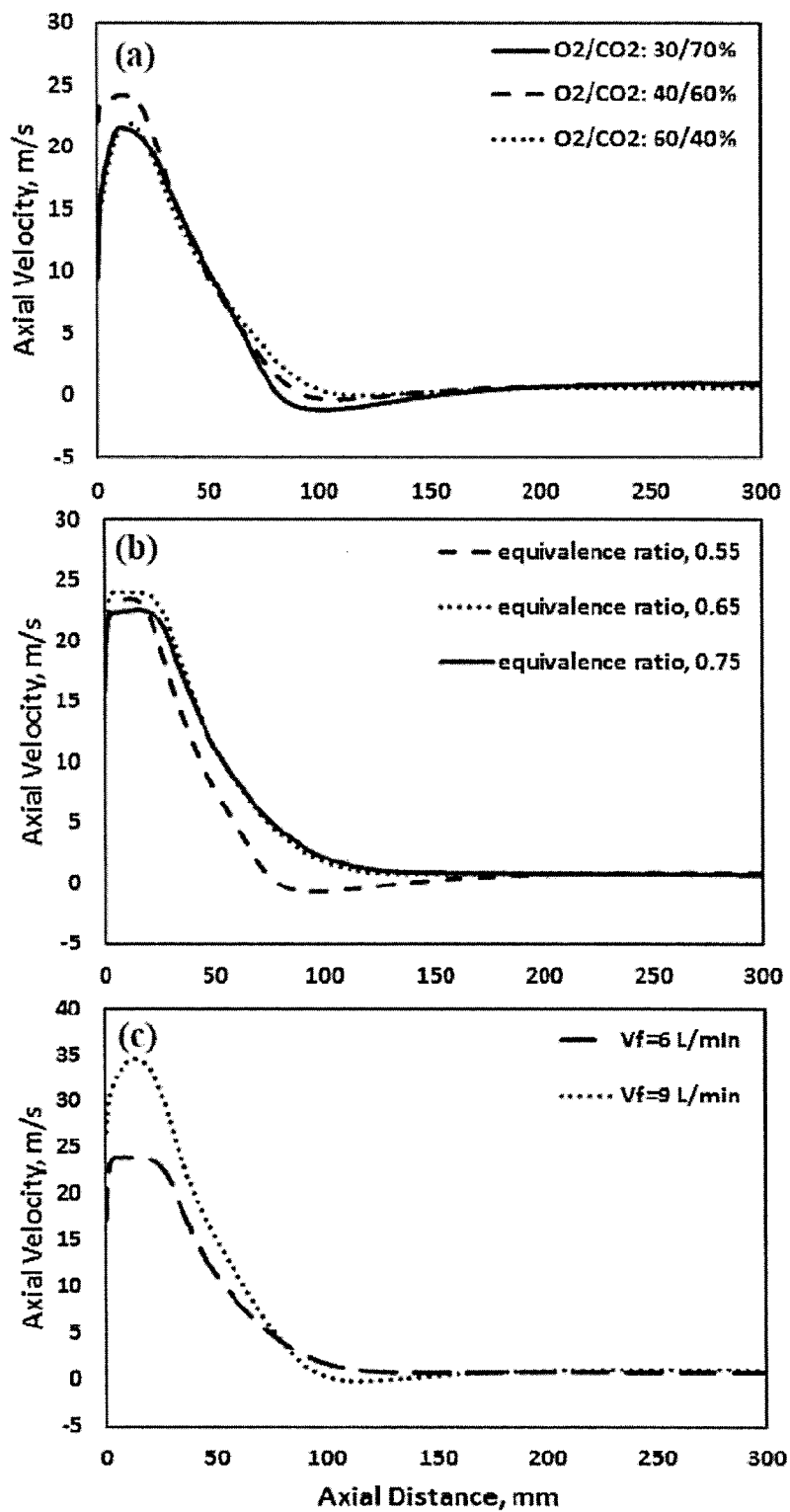
FIG. 23 is a graph of the axial velocity distribution at different operating parameters.

Velocity Field:

The computational procedure was used to predict the characteristics of the flow field which are presented in the following subsections. Comparisons between experimental and numerical results are also presented. FIG. 23 is a graph of the axial velocity distribution at different operating parameters: (a) $\Phi$=0.65 and Vf=6 L/min, (b) Vf=6 L/min and O2/$CO_2$:50/50% and (c) $\Phi$=0.65 and O2/$CO_2$:50/50%. FIG. 23 shows the axial velocity distribution at different operating conditions including percentages of $O_2$/$CO_2$ in the oxidizer at $\Phi$=0.65 and Vf=6 L/min, equivalence ratios at Vf=6 L/min and $O_2$/$CO_2$:50/50% and fuel volume flow rates at $\Phi$=0.65 and $O_2$/$CO_2$:50/50%. From FIG. 23, it can be seen that there is an internal recirculation zone along the centerline downstream of the burner outlet. This zone is clearly indicated by the negative values of the axial velocity at heights ranging between h=75 mm and h=120 mm which indicates a reverse flow along and in the vicinity of the burner axis.

The axial velocity peak ranges from 20 to 35 m/s, depending on the operating conditions, at around h=30 mm in the axial direction. The swirling oxidizer stream along with the bluff body in the fuel flow pipe creates a region of a severe pressure gradient along the axis and this is responsible for establishing the internal recirculation zone. In the shear layer between the inflow and both the inner and outer recirculation zones, large velocity fluctuations and the low mean velocity generally cause a very high turbulence intensity. Therefore, intense mixing of the cold fresh gas with hot burned gases can be observed in these regions. For percentages of $O_2$/$CO_2$ in the oxidizer mixture between 30/70 and 60/40, no much great differences between the axial velocity distributions as shown in FIG. 23, part (a).

Figure 24:
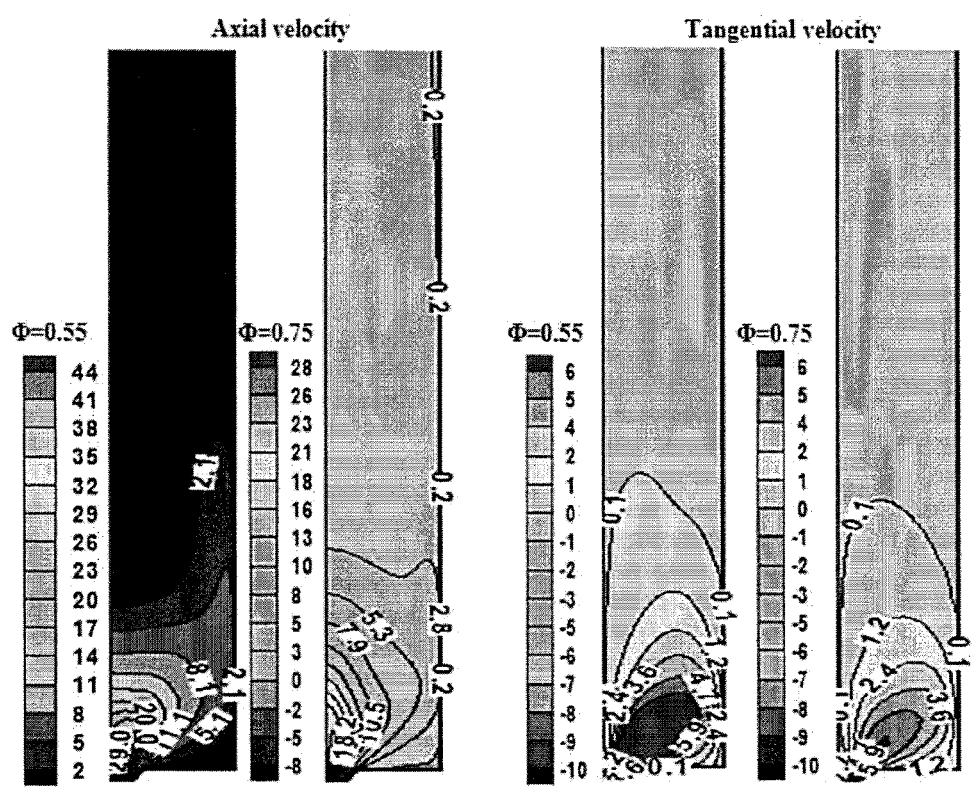
FIG. 24 is an illustration of contour plots of axial and tangential velocities at the x-symmetry plane of the reactor for two different equivalence ratios.

At lower values of equivalence ratios, the recirculation is enhanced in the inner recirculation zone due to the increased amount of oxidizer introduced to the reactor with a swirl angle of 60° as shown in FIG. 23, part (b). This enhancement in flow recirculation can be seen easily from FIG. 24 from the distribution of both axial and tangential components of the flow velocity. FIG. 24 is an illustration of the contour plots of axial and tangential velocities at the x-symmetry plane of the reactor at Vf=6 L/min and O2/$CO_2$:50/50% for two different equivalence ratios, 0.55 and 0.75. Also, as the amount of fuel flow increases at fixed operating equivalence ratio, the axial velocity increases and also the recirculation is enhanced as shown in FIG. 23, part (c). An external recirculation zone near to the reactor wall is also noticed from the contour plots of the tangential velocity as shown in FIG. 24 and this outer flow recirculation is enhanced by lowering the operating equivalence ration.

Figure 25A:
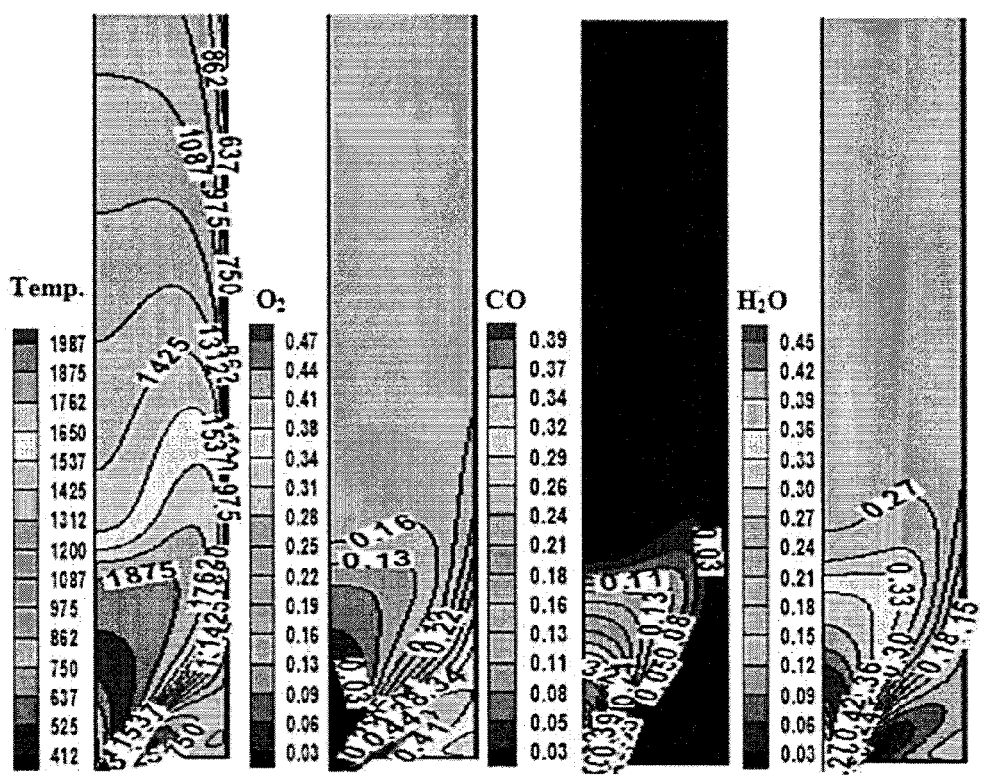
FIG. 25A-FIG. 25B are contour plots of temperature and mole fraction at the x-symmetry plane of the reactor.
Figure 25B:
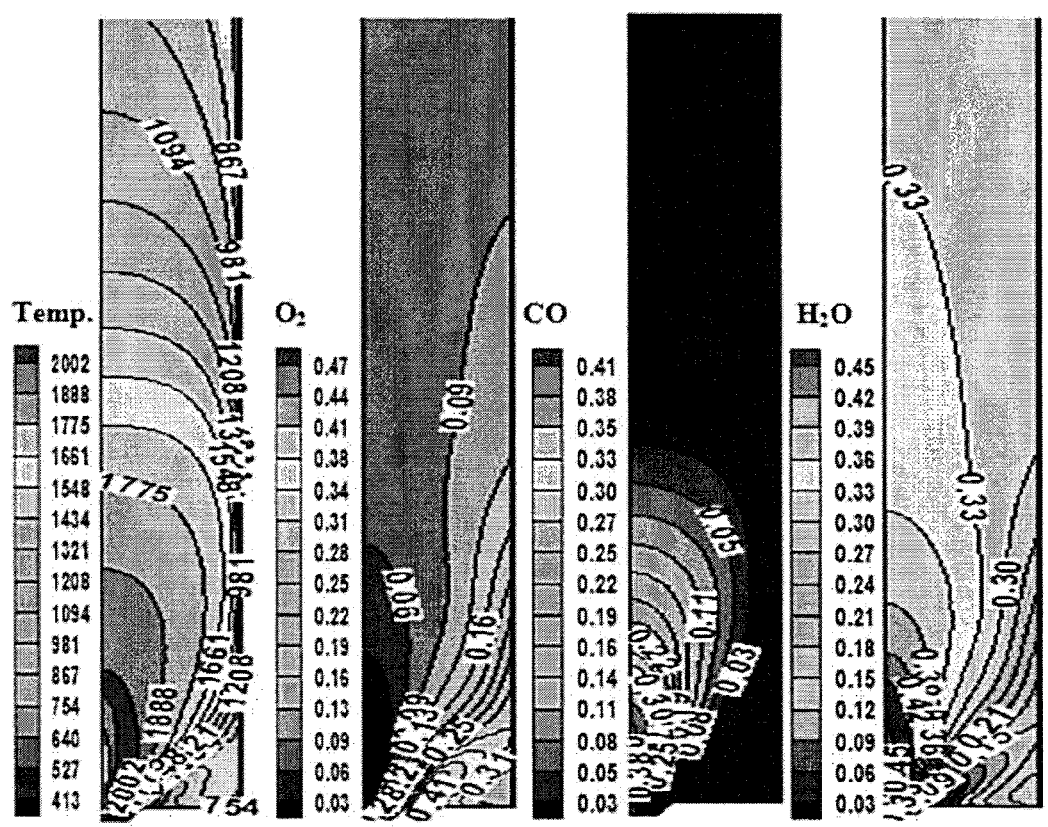

Temperature and Species Mole Fractions Distributions:

The distributions of the static temperatures are displayed in FIG. 25A-FIG. 25B at the x-symmetry plane of the reactor at Vf=6 L/min and $O_2$/$CO_2$:50/50% for two different equivalence ratios. FIG. 25A is a contour plots of temperature and mole fraction of O2, CO and $H_2O$ at the x-symmetry plane of the reactor at $\Phi$=0.55, Vf=6 L/min and O2/$CO_2$:50/50%. FIG. 25B is a contour plots of temperature and mole fraction of O2, CO and $H_2O$ at the x-symmetry plane of the reactor at $\Phi$=0.75, Vf=6 L/min and O2/$CO_2$:50/50%. It is seen that the final temperatures of the flames close to exit section of the combustor are increasing with the global equivalence ratios. This is due to the reduced oxygen availability for combustion at higher values of equivalence ratios and as a result, the flame length is increased. The temperature is maximum in the flame zone close to the reactor center line and it is reduced in the radial direction due to fresh gases inlet. The higher temperatures in the region close to the reactor center line are explained by the more frequent occurrence of reactions. To identify the differences more clearly, FIG. 26 displays the radial temperature profiles at different heights, h=25 mm, h=50 mm and h=100 mm, at $\Phi$=0.65, Vf=6 L/min and $O_2/CO_2$:50/50%. The high-temperature region is close to the center line at all heights however; the maximum temperature is reached around h=50 mm.

The increased temperature level at h=50 mm enhances, of course, the reactivity of the gas mixtures and, thus, the heat release and burnout as discussed in the coming section. The temperature is reduced in the region at r§0-5 mm due to the recirculation in the inner recirculation zone and the reduced temperature at r §10-20 mm reflects the inlet streams of fresh oxidizer gas. The temperature level in the outer recirculation zone close to reactor wall is much lower than in the inner recirculation zone, which is due to the leaner mixtures and heat loss through the wall by convection and radiation mechanisms. As the height is increased more than 50 mm, the temperature is also reduced due to the mixing of hot burned gases with the excess unburned oxidizer.

Figure 27:
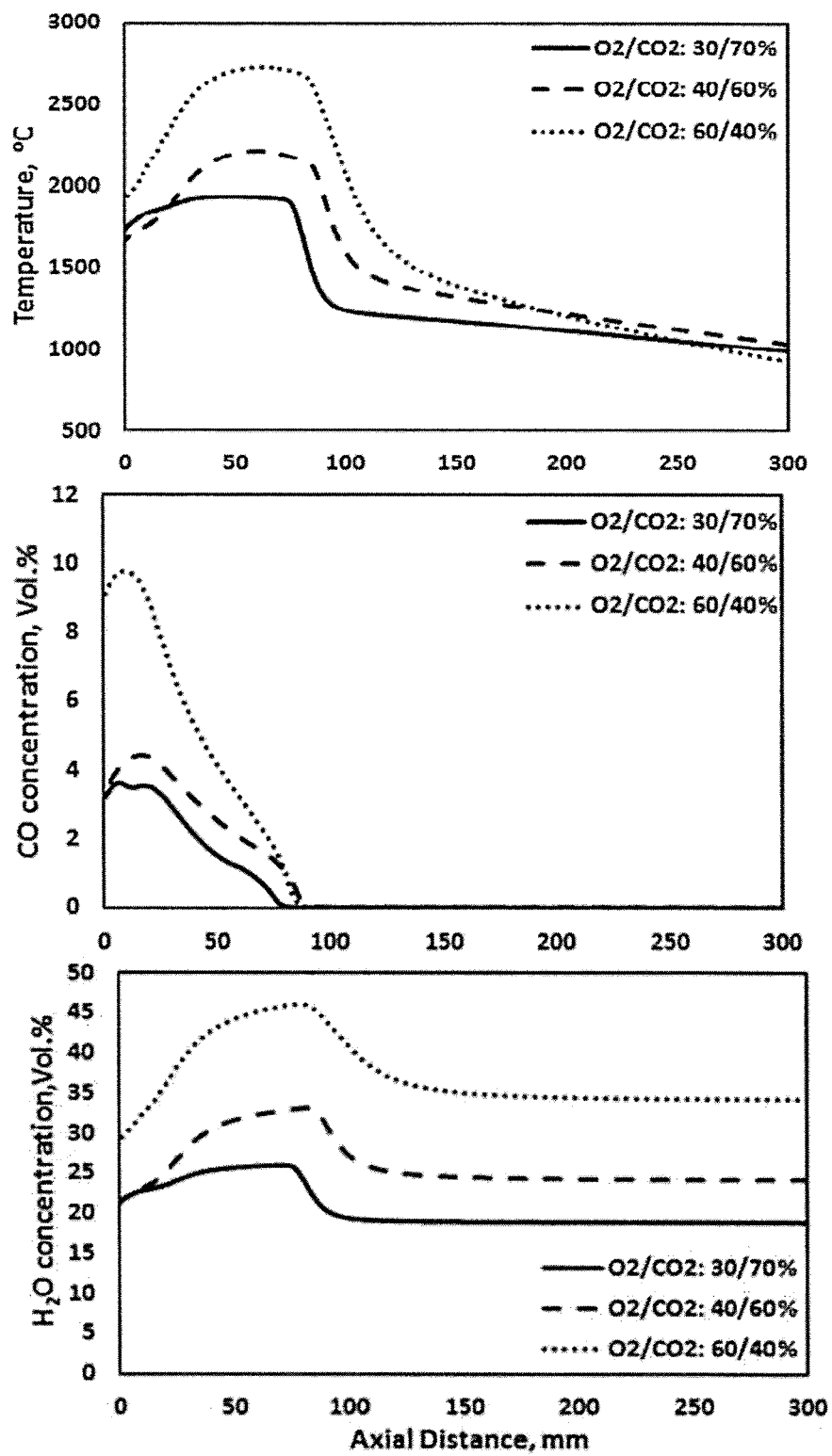
FIG. 27 is a graph of the temperature, CO mole fraction and $H_2O$ mole fraction distribution in the axial direction at different operating percentages of $O2/CO_2$ in the oxidizer.

To identify the differences more clearly, FIG. 27 displays the axial temperature profiles at different operating percentages of $O_2/CO_2$ in the oxidizer for $\Phi$=0.65 and Vf=6 L/min. FIG. 27 is a graph of the temperature, CO mole fraction and $H_2O$H2O mole fraction distributions in the axial direction at different operating percentages of O2/$CO_2$ in the oxidizer for $\Phi$=0.65 and Vf=6 L/min. With increasing height, temperature values increase strongly, reach a maximum at around h=50 mm, and decrease slowly afterward. It has been well established experimentally and numerically that with increasing the percentage of $O_2$ in the oxidizer mixture, a significantly higher peak as well as overall combustion temperature levels has been encountered (see FIG. 27) The lower combustion temperature in the cases of lower oxygen concentration in the oxidizer mixture is mainly a result of high specific heat capacity of $CO_2$. This causes an increase in radiation losses caused by the $CO_2$ which increases the gas emissivity. The significance of the latter effect obviously depends on the radiative properties of the flame considered, i.e. to what extent other components such as moisture soot and particles contribute to the radiative heat transfer.

The contour plots of the distributions of the mole fractions of O2, CO and $H_2O$ are presented in FIG. 25A and FIG. 25B at the x-symmetry plane of the reactor at Vf=6 L/min and O2/$CO_2$:50/50% for two different equivalence ratios As shown in FIGS. 25A-FIG. 25B, the distributions of mole fractions of CO exhibit the highest values close to the fuel nozzle. The consumption of CO with increasing distance from the nozzle is in general accordance with the decrease in temperature as shown from the axial distributions in FIG. 27. CO disappears after a certain height of the reactor, around h=100 mm. This is due to the consumption of CO in the reaction with O2 to produce $CO_2$ and due to the extended reactor length which enables good gases mixing, no CO is found in the exhaust gas region.

Figure 26:
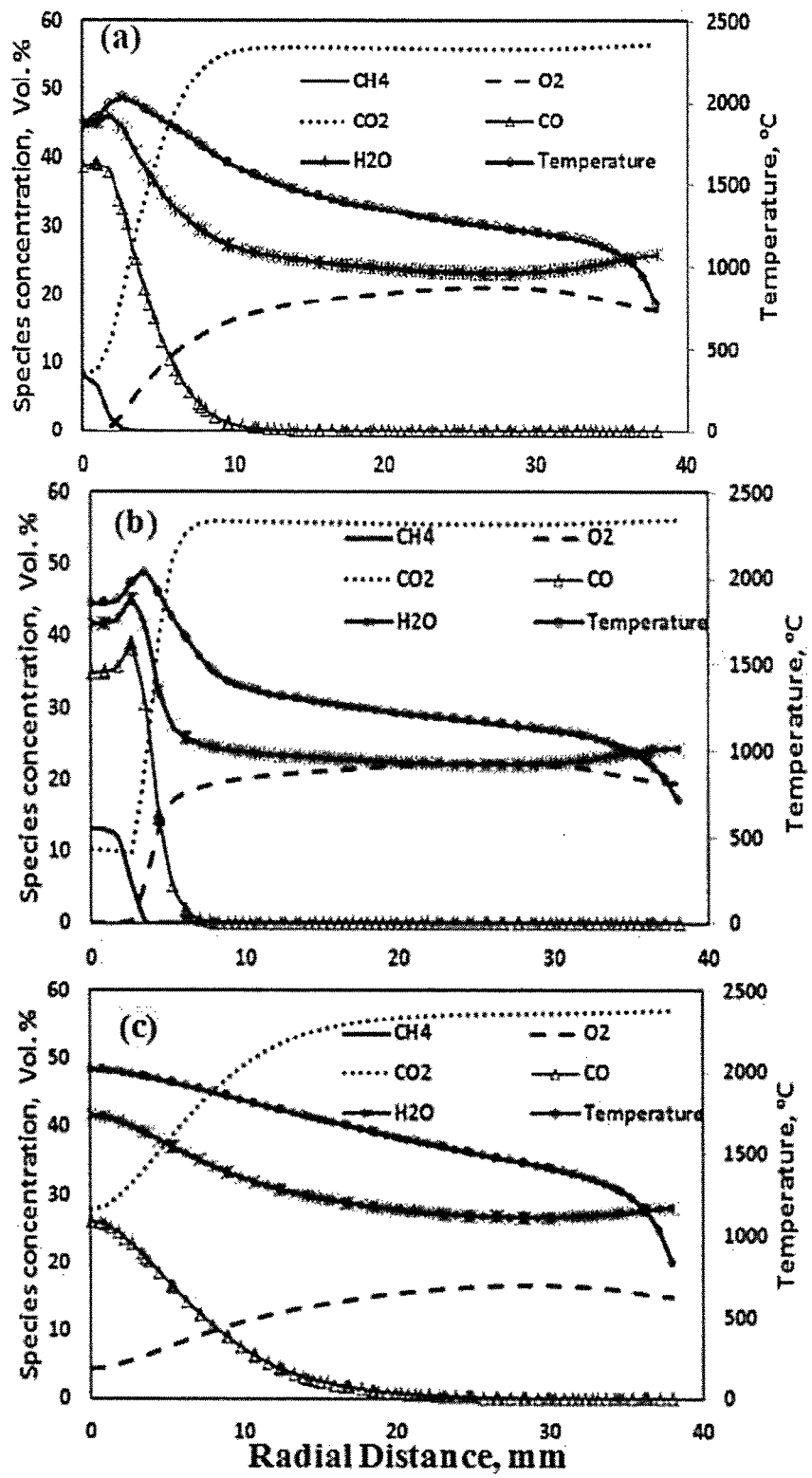
FIG. 26 is a graph of the radial species concentration distribution and temperature at different reactor heights.

From FIG. 25A, FIG. 25B, and FIG. 26, as the equivalence ratio increases as the amount of CO increases and this is due to the less availability of oxygen to complete the combustion. Also, as the percentages of Oxygen increases in the mixture, the rate of production of CO increases in the inner recirculation zone as $CH_4$ first combust and produce CO and then CO is consumed in the combustion with CO. For the $O_2$ concentrations, the larger concentrations are at inlet and in the outer recirculation zone and it decreases as the combustion proceeds. Less oxygen is available as the equivalence ration is increased away from the burner exit. The shapes of the distributions of mole fractions of $H_2O$ resemble strongly those of temperature for each flame in the same figure, FIG. 25A-FIG. 25B. This result is also confirmed from the axial distributions of both temperature and $H_2O$ mole fractions in FIG. 27. One can see that the larger concentrations of $H_2O$ are near to the combustion zone as the $H_2O$ is a product of combustion and its concentrations are increased with increasing the amount of oxygen in the oxidizer mixture.

To configure more the species concentrations, radial gas concentration profiles for $CH_4$, $O_2$, CO, $CO_2$2 and $H_2O$ are shown in FIG. 24 at different reactor heights for $\Phi$=0.65, Vf=6 L/min and O2/$CO_2$:50/50%. The considered heights in this figure represent the most intense combustion zone with the highest temperatures for all cases. $CH_4$ is consumed in the direction from center line to the reactor wall because of reactions with the incoming fresh gas and it completely disappears after h=50 mm due to the excess oxygen which is available to complete the combustion of $CH_4$. Similar behavior to that of $CH_4$ is found for the distribution of CO inside the reactor as CO is an intermediate product and it disappear due in case of excess oxygen availability in the combustion zone. $H_2O$ is maximum in the flame zone and it is reduced in the radial direction because of the reduced reaction intensity and increased concentrations of $CO_2$ because of coming fresh gas inlet. $O_2$ and $CO_2$ concentrations are maximum close to the reactor wall due to fresh gas inlet ($O_2$+$CO_2$) and decreases in the direction of the flame zone.

Figure 28:
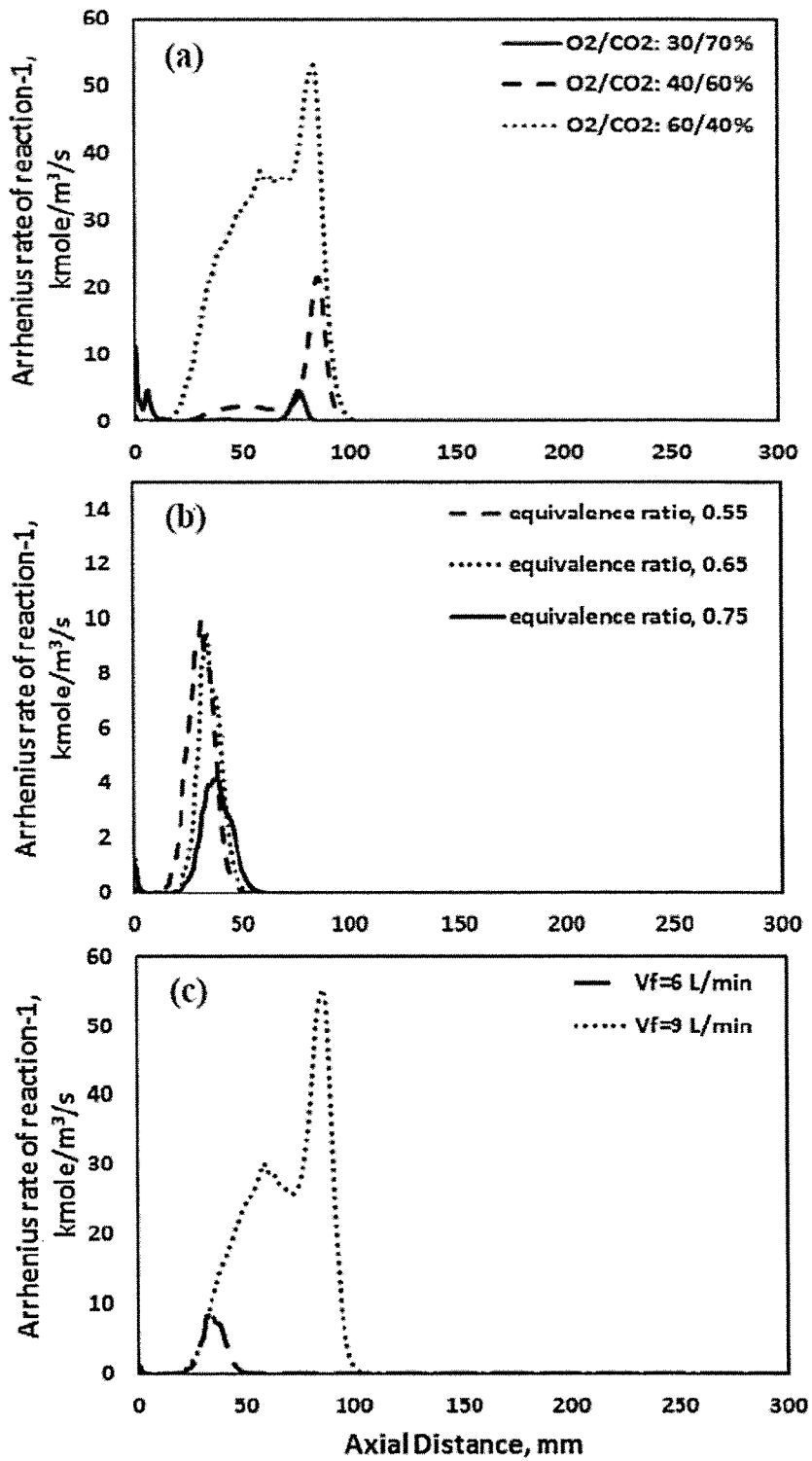
FIG. 28 is a graph of the axial distribution of reaction-1 Arrhenius rate at different operating parameters.

Heat Transfer:

FIG. 28 shows the axial distribution of reaction-1 Arrhenius rate at different operating conditions including percentages of $O_2/CO_2$ in the oxidizer at $\Phi$=0.65 and Vf=6 L/min, equivalence ratios at Vf=6 L/min and $O_2/CO_2$:50/50% and fuel volume flow rates at $\Phi$=0.65 and O2/$CO_2$:50/50%. As it is clear from the figure, part (a), when the percentage of $O_2$ in the oxidizer mixture is increased, the rate of reaction is also increases. This is due to the existence of enough amount of oxygen to complete the conversion of $CH_4$ and as a result the reaction-1 rate will be increased and also reaction-2 rate is increased. This figure explains more the temperature profiles which have maximum values in the points of maximum rate of reaction.

It is shown that the rate of reaction reaches to nearly 5, 20 and 50 kg-mol/$m^3$-s for percentages of $O_2$ of 30, 40 and 60, respectively and drops along the length of the reactor. The rate of reaction becomes zero after a certain height of the reactor and this is due to the fact that the fuel is totally consumed. Also, the rate of reaction-1 decreases as the equivalence ratio is increased due to the reduced available amount of oxygen to enhance the reaction. In addition to, the rate of reaction-1 is also increasing sharply when the amount of fuel volume flow rate is increased at the same operating equivalence ratio.

Figure 29:
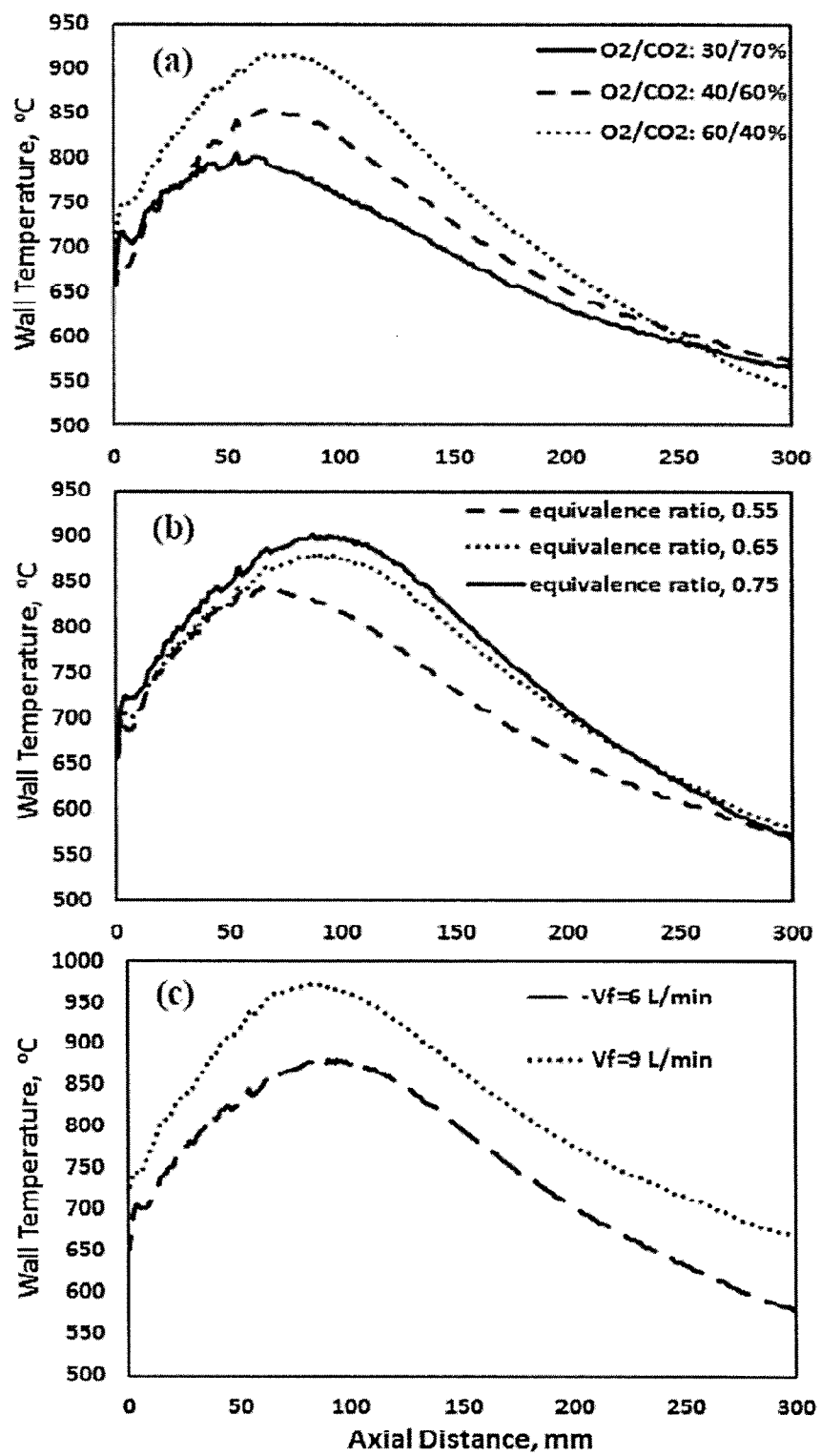
FIG. 29 is a graph of the reactor wall temperature distribution in the axial direction at different operating parameters.
Figure 30:
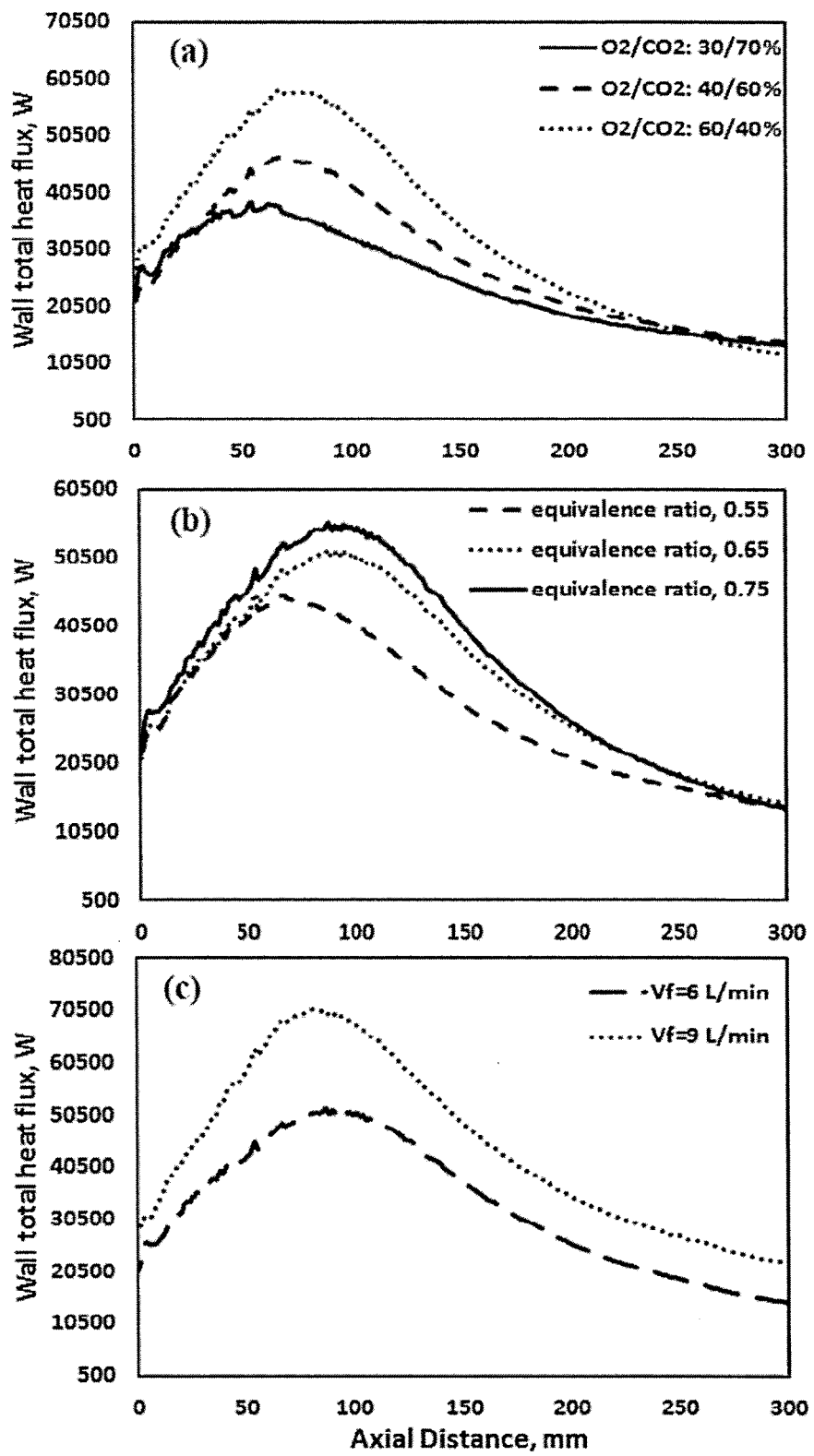
FIG. 30 is a graph of the reactor wall total heat flux distribution in the axial direction at different operating parameters.

Reactor wall temperature profiles in the axial direction at different operating parameters are shown in FIG. 29 due to improved combustion by increasing the amount of oxygen in the fresh gas mixture, the gas temperature inside the reactor increases and reaches its maximum values around h=100 mm. FIG. 29 is a graph of the reactor wall temperature distribution in the axial direction at different operating parameters: (a) Φ=0.65 and Vf=6 L/min, (b) mVf=6 L/min and O2/CO$_2$:50/50% and (c) Φ=0.65 and O2/CO$_2$:50/50%. The wall temperature is also increased as shown in FIG. 29 and the total amount of heat flux across the reactor wall is also increased as shown in FIG. 30. FIG. 30 is a graph of the reactor wall total heat flux distribution in the axial direction at different operating parameters: (a) Φ=0.65 and Vf=6 L/min, (b) Vf=6 L/min and O2/CO$_2$:50/50% and (c) Φ=0.65 and O2/CO$_2$:50/50%. It was also found that the equivalence ratio has a significant effect on both wall temperature and accordingly the rate of heat loss across the reactor wall.

As shown in FIG. 29 and FIG. 30, both wall temperature and wall heat flux are decreased with decreasing the equivalence ratio. This can be attributed to the cooling effect of the increased amount of the oxidizer that enters the reactor with decreasing the equivalence ratio. This amount helps in cooling the gases close to the reactor wall and then decreases the amount of total heat flux across the wall. It can be observed in FIG. 29 and FIG. 30, that there are differences in both wall temperature and wall heat flux as the amount of fuel volume flow rate is changed from 6 to 9 L/min at the same operating equivalence ratio. Increasing the fuel flow at the same equivalence ratio results in increase in the amount of oxidizer and improved flow swirl. As a result, the overall mixing and combustion process are improved causing a significant increase in the combustion temperature. Because of this improved performance, the wall temperature increases and accordingly the amount of heat flux across the reactor wall increases.

Figure 31:
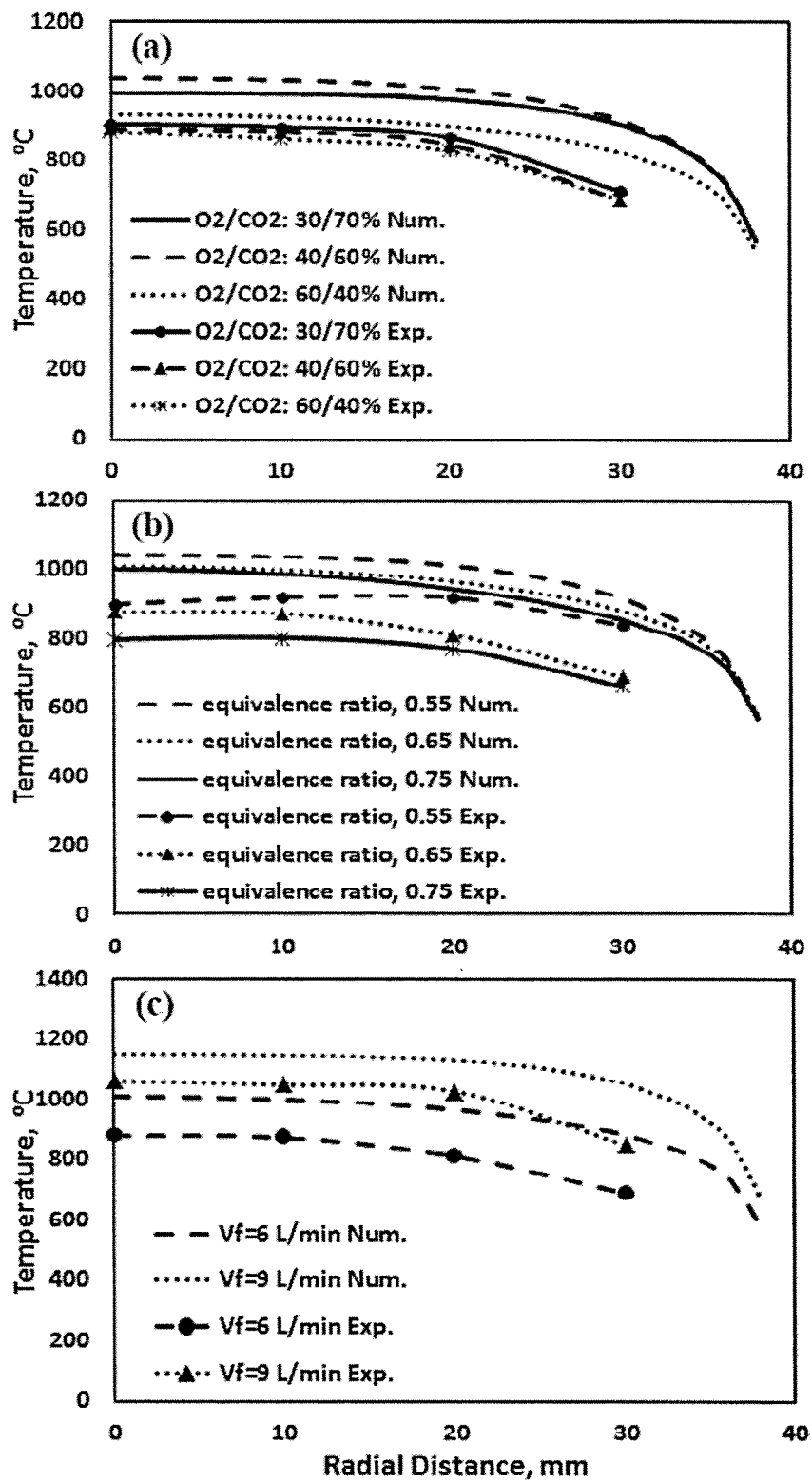
FIG. 31 is a graph of the comparison between radial experimental and numerical exhaust gas temperature at different operating parameters.

Comparison Between Measured and Calculated Exhaust Temperature and Emissions:

FIG. 31 is a graph of the comparison between radial experimental and numerical exhaust gas temperature at h=300 mm at different operating parameters: (a) Φ=0.65 and Vf=6 L/min, (b) Vf=6 L/min and O2/CO$_2$:50/50% and (c) Φ=0.65 and O2/CO$_2$:50/50%. FIG. 31 shows a comparison between experimental and numerical exhaust radial gas temperature at h=300 mm at different operating conditions as shown in FIG. 31. For CH$_4$/oxy-combustion, the flames were subject to thermo-acoustic instabilities over a substantial range of operating conditions. As shown in FIG. 31, the exhaust gas temperature increases at the same radial position with increasing O$_2$ content in the oxidizer mixture from 30 to 40%. This is attributed to the higher flame temperature which causes an increase in the reactivity leading to higher laminar flame speeds and shorter ignition delay times.

When the percentage of O$_2$ in the mixture is increased to 60%, the exhaust temperature was reduced again. From the experimental work conducted for all ranges of the flames, the flame lift starts to occur when the O$_2$/CO$_2$ ratio in the mixture reaches 50/50%. Further reduction in the percentage of O$_2$ in the mixture (increasing CO$_2$) leads to an increase in the flame lift and significant influences on the combustion intensity and stability. This flame lift off may due to the smaller diameter of the fuel nozzles however the height of the flame lift off is reduced because of the divergent shape of the oxidizer gases inlet section and the creation of the outer recirculation zone. Due to the increased flow velocity by increasing the mass flow rates, the residence time for combustion is increased as a result of delayed mixing between gases and fuel and the flame is moved away from the gases inlet sections. Also, fuel type which is gaseous fuel, Methane, may have also additional effects on the flame lift off. When the O$_2$/CO$_2$ ratio is 60/40%, flame lift is not there as compared to the cases of 30/70% and 40/60% and that's why the exhaust temperature in case of 60/40% is less than the other considered cases in FIG. 31. The temperature is maximum at the centerline and decrease toward the reactor wall. The change in chemical reaction rates along with the reduced Reynolds numbers may be main causes for the change of the flame structure when changing the percentage of oxygen in the oxidizer mixture.

To investigate the effect of equivalence ratio on the exhaust gas temperature, FIG. 31 is showing this effect at Vf=6 L/min and O$_2$/CO$_2$:50/50%. At the same fuel volume flow rate, the amount of corresponding oxidizer is lowered when the equivalence ratio is increased and the availability of Oxygen is also reduced. This may justify the lowered exhaust gas temperature when the equivalence ratio is increased as shown in the figure from both experimental and numerical temperature data. The flow swirl is a very important parameter and it forces the flow beside the wall to go toward the flame zone. By lowering the oxidizer flow (increasing equivalence ratio) the swirl will be affected and a large portion of the oxidizer will escape beside the reactor wall without participating in the combustion process. That's why the temperature is reduced by increasing the equivalence ratio toward stoichiometry.

In FIG. 31, the effect of fuel volume flow rate on the combustion temperature is investigated at fixed equivalence ratio and O$_2$/CO$_2$ ratio. As seen, increasing the fuel flow at fixed equivalence ratio improves the overall combustion process and so, the exhaust gas temperature is also improved. As shown in the figure, both experimental and numerical results are in a slightly good agreement. This deviation between experimental and numerical data may be attributed to slight movement of the temperature probe inside the rector in addition to the error comes from the reading of the thermocouple probe itself. There may be also some errors in the calculations of the CO$_2$ concentrations that directly affect the temperature distribution inside the reactor. Only two step reaction kinetics model has been considered which is a small number of steps in order to consider most of the intermediate species. However, because of the calculation time considering the 3D simulations, the present two step model has been used with reasonable errors in the calculations as compared to higher number of steps models.

Figure 32:
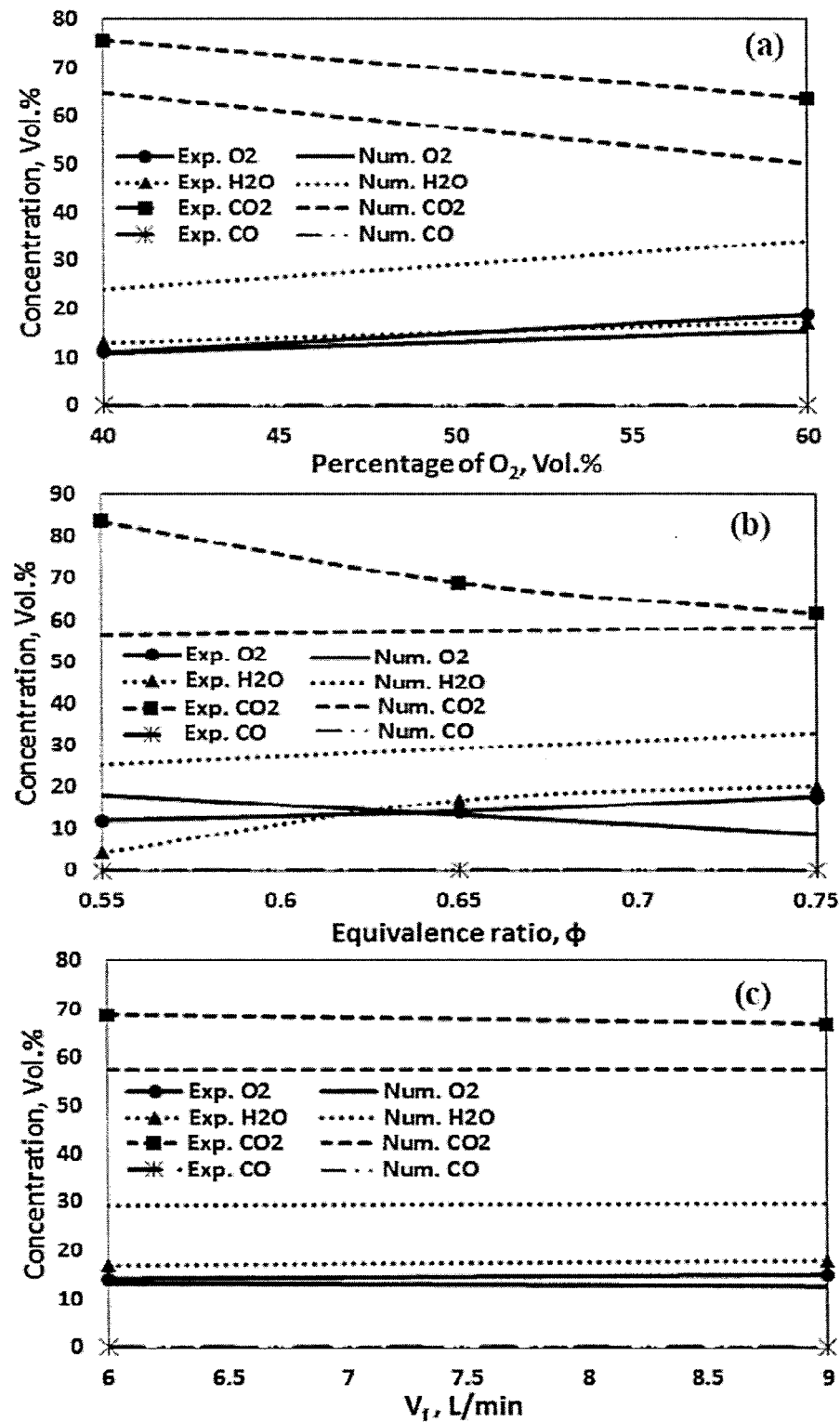
FIG. 32 is a graph of the comparison between experimental and numerical average exhaust gas emissions as a function of different operating parameters.

A Comparison between experimental and numerical average exhaust gas emissions at h=300 mm as a function of percentage of O$_2$ in the oxidizer mixture, equivalence ratio and fuel volume flow rate is shown in FIG. 32. FIG. 32 is a graph of the comparison between experimental and numerical average exhaust gas emissions at h=300 mm as a function of different operating parameters: (a) Φ=0.65 and Vf=6 L/min, (b) Vf=6 L/min and O2/CO$_2$:50/50% and (c) Φ=0.65 and O2/CO$_2$:50/50%. Due to the long length of the combustor, the combustion is almost complete and no CO is appearing there experimentally and numerically as shown in the figure. As shown in FIG. 32, the concentration of CO$_2$ in the exhaust gas is reduced when the amount of O$_2$ is increased in the oxidizer mixture which consists of O2 and CO$_2$. However, by increasing the amount of oxygen, the combustion process is improved and CO$_2$ created by combustion is increased. But, the effect of CO$_2$ reduction in the oxidizer mixture is greater than the effect of increase of CO$_2$ due to improved combustion. The concentration of H$_2$O is increased in the exhaust by increasing O$_2$ in the oxidizer mixture due to the improved combustion process as H$_2$O is a combustion product. Also, O$_2$ concentrations are increased as shown in the figure. By increasing the equivalence ratio at fixed ratio of O2/CO$_2$% and fuel volume flow, the concentrations of CO$_2$ and O$_2$ are decreased and H$_2$O concentrations are slightly increased. By increasing the fuel volume flow rate at a fixed operating equivalence ratio and $O_2/CO_2\%$, the concentrations of all species are not affected much as shown in FIG. 32.

Both experimental and numerical investigations were conducted for an atmospheric diffusion oxy-combustion flame in a gas turbine model combustor. Oxy-combustion and emission characterization, flame stabilization and oxy-combustion model validation have been investigated in details. The combustor is fuelled with $CH_4$ and a mixture of $CO_2$ and $O_2$ as oxidizer. A modified two-step oxy-combustion reaction kinetics model for methane-oxygen combustion has been used in order to predict the oxy-combustion characteristics of the considered flame and validations have been done using the experimental results. Wide ranges of different operating parameters have been considered including equivalence ratio, percentage of $O_2/CO_2$ in the oxidizer mixture and fuel volume flow rate. The stability of the oxycombustion diffusion flame has been checked experimentally and numerically.

The stability of the oxy-combustion flame is affected when the operating percentage of Oxygen in the oxidizer mixture is reduced below 25%. No operation was possible for the burner with less than 21% Oxygen in the oxidizer mixture. Visualizations of the flame at the above mentioned operating conditions have been carried out experimentally and comparisons with the numerical results have been done. The flames have been characterized in details by measuring the exhaust gas temperatures and emissions and comparing them with those from the numerical model. The combustion stability was found to be improved with increasing the percentage of $O_2$ at inlet however there is a limitation in temperature. Also, by lowering the equivalence ratio, improvement in flow swirl and the overall combustion process has been reached. Both experimental and numerical results are in good agreement and the modified two step reaction kinetics model is capable of predicting very similar trends of temperature and also the overall flame shape is very close to the recorded experimental shapes.

Results of the 2D Simulations of the ITM Reactor:

The modified two step finite rate oxy-combustion reaction kinetics model done by Andersen et. al. is used to predict a oxy-combustion characteristics inside a stagnation flow ITM reactor. A detailed analysis is disclosed to understand more the performance of ion transport membranes under the oxy-combustion conditions in the permeate side of the membrane. Effects of many parameters including inlet gases temperature, reactor geometry, feed and sweep flow rate, oxygen partial pressure in the feed side and the effect of the percentage of $CH_4$ in the sweep gases mixture on the permeation and combustion processes are disclosed.

Due to the symmetry in the computational model, only half part of the domain is considered and all the line plots in Y-direction are at the symmetry line. The symmetry line length located inside the feed zone is 3 cm and it is fixed in all simulations; however, the symmetry line part located inside the permeate zone starts from membrane surface (Y=3 cm) and it was varied in a set of simulations to see the effect of geometry on permeation process otherwise it was fixed and equal to 3 cm.

Figure 33:
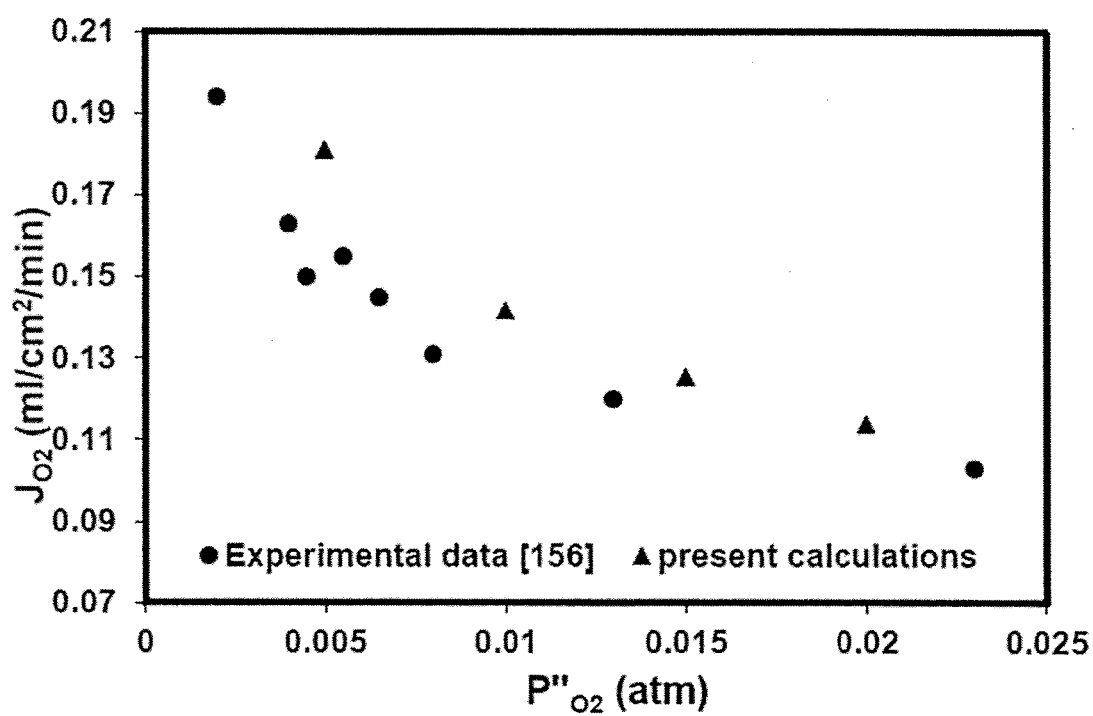
FIG. 33 is a graph of the effect of the permeate side oxygen partial pressure on the oxygen permeation flux for both experimental data and the present calculations.

FIG. 33 is a graph of the effect of the permeate side oxygen partial pressure on the oxygen permeation flux for both experimental data and the present calculations at 2'O P=1 atm and N2 flux=4-120 ml/cm2/min FIG. 33 compares the present model results with the experimental data of the previous literature work of Xu and Thomson to investigate the effect of oxygen partial pressure in the permeation side on the overall oxygen permeation flux. To do this validation, a new mesh was developed to simulate the membrane reactor and the present numerical model was applied to this computational domain. Change of oxygen partial pressure in the permeation side has been done through the change of the nitrogen flux coming in the sweep/purge gas in the permeate side from 4 to 120 ml/cm².min. As shown from FIG. 33, both experimental and numerical data are in a good agreement. Also, as it is clear from the graph, the partial pressure of Oxygen in the permeate side decreases as the oxygen permeation flux increases. This is due to the increased pressure gradient across the membrane at constant oxygen partial pressure in the feed side.

Figure 34:
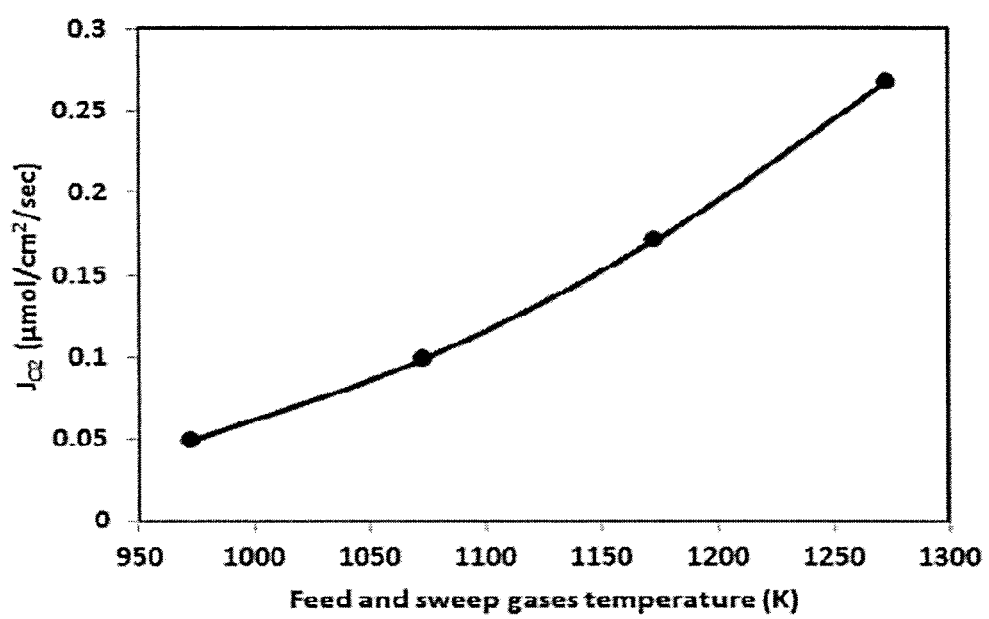
FIG. 34 is a graph of the oxygen permeation flux as function of feed and sweep gases inlet temperature at feed and sweep gases at a specific volume flow rate.

Argon is used as an inert sweep gas to flow inside the permeate zone to extract oxygen through the membrane in the absence of fuel (no reactions). In this part, investigations of the dependence of oxygen permeation flux on the gases inlet temperature and accordingly the membrane temperature without considering reactions inside the permeate zone have been done. FIG. 34 is a graph of the Oxygen permeation flux as function of feed (air) and sweep (argon) gases inlet temperature at feed and sweep gases volume flow rate of 500 sccm and P'O2=0.21 atm. As shown in FIG. 34, the permeation oxygen flux is very sensitive to the membrane temperature and increases sharply as the temperature increases. This is due to the reduced surface exchange resistance to oxygen permeation as the temperature increase. Also, as the membrane temperature increases as the movement of the gases on the surface of the membrane inside the permeate zone increases causing a reduction in the oxygen partial pressure in the permeate side and hence increasing the driving force for oxygen permeation across the membrane. However, the activation energy for the two surface reaction rates and the oxygen vacancies diffusion will be affected by temperature increase and may the dependence of oxygen flux on membrane temperature be reduced at a certain temperature.

Figure 35:
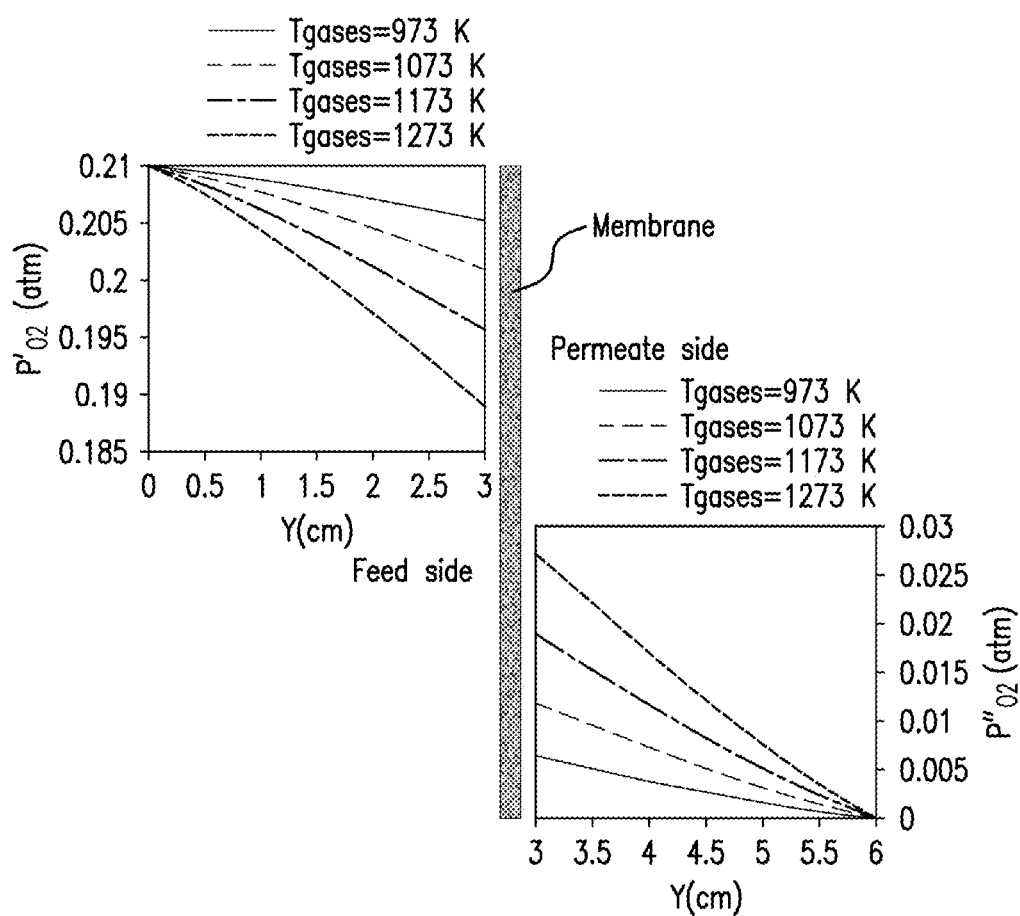
FIG. 35 is an illustration of the oxygen partial pressure in feed and permeate sides of the membrane as function of feed and sweep gases inlet temperature.

FIG. 35 is an illustration of oxygen partial pressure in feed and permeate sides of the membrane as function of feed (air) and sweep (argon) gases inlet temperature at feed and sweep gases volume flow rate of 500 sccm and P'O2=0.21 atm. The effect of membrane temperature on the oxygen partial pressure in feed and permeate sides of the membrane is shown in FIG. 35. As shown in FIG. 35, as the partial pressure of oxygen inside the feed zone decreases near to the membrane surface as the temperature increases reflecting higher oxygen flux due to higher driving force across the membrane and reduced permeation resistance. As a result of increased oxygen permeation flux, the oxygen partial pressure inside the permeate zone was increased.

Figure 36:
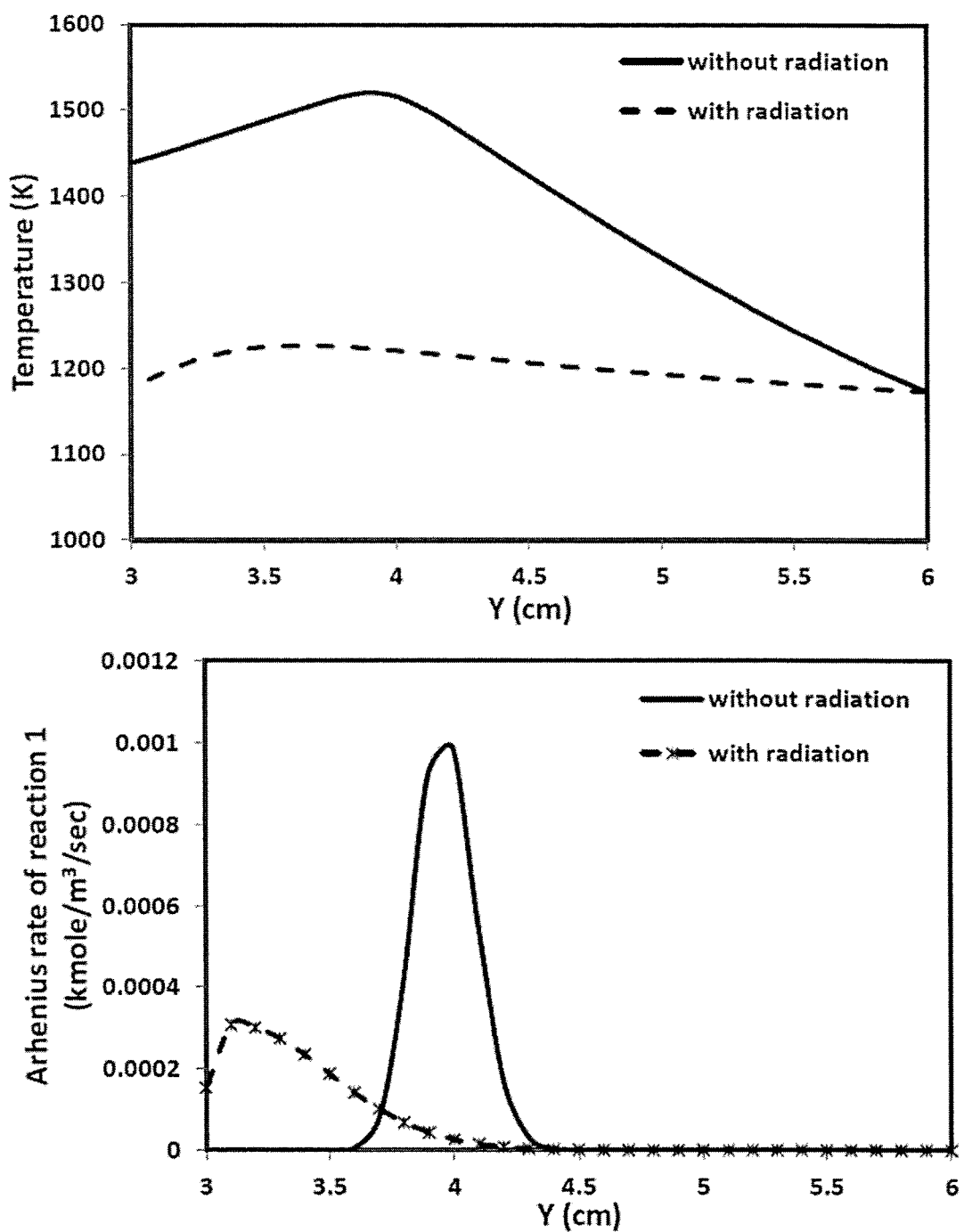
FIG. 36 is a graph of the effects of reaction heat transfer on temperature and reaction 1 rate.
Figure 37:
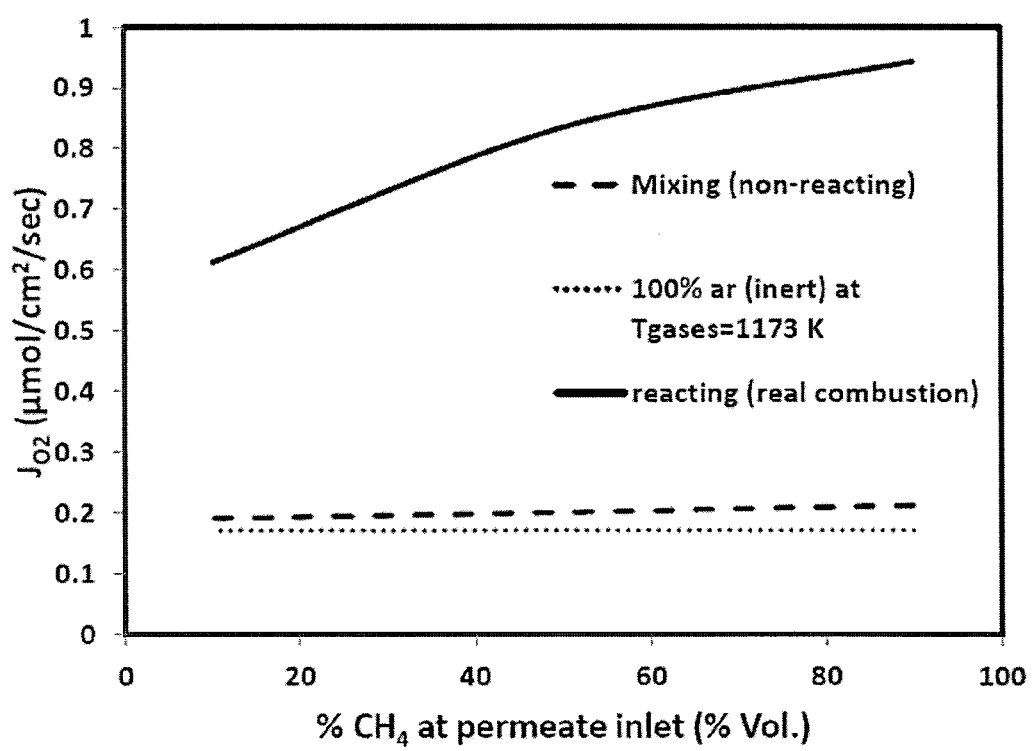
FIG. 37 is a graph of the effect of reactivity on oxygen permeation flux for different percentages of $CH_4/CO_2$ as sweep gases.

The effects of radiation heat transfer on oxy-fuel combustion characteristics in the permeate side of the 2D ITM reactor are disclosed. Effects of reaction heat transfer on combustion temperature and reaction 1 rate at 2.5/97.5% Vol. $CH_4/CO_2$ as sweep gases, feed and sweep gases volume flow rate and inlet temperature of 500 sccm and 1173 K respectively and P'O2=0.21 atm are shown in FIG. 36. FIG. 36 is a graph of the effects of reaction heat transfer on temperature and reaction 1 rate at 2.5/97.5% Vol. $CH_4/CO_2$ as sweep gases, feed and sweep gases volume flow rate and inlet temperature of 500 sccm and 1173 K respectively and P'O2=0.21 atm. The discrete ordinates radiation model is used to predict the radiation heat transfer. As shown in FIG. 36, it is observed that excluding radiation model results in the over-prediction of combustion temperatures in the membrane reactor. It is also observed in FIG. 36 that the overall reaction rate and its peak value increase when accounting for radiative heat transfer, despite the decrease in temperature caused by radiation. Therefore, it is important to incorporate a radiation heat transfer model in combustion inside ITM reactors in order to predict their characteristics accurately. In all of the membrane reactor results, discrete ordinates radiation model has been applied in order to provide more accurate results. The sweep gases used are $CO_2$ and $CH_4$ in order to investigate the reactive ITMs. $CO_2$ is used instead of argon due to reduced oxygen flux using argon as compared to $CO_2$ as shown in FIG. 37. FIG. 37 is a graph of the effect of reactivity on oxygen permeation flux for different percentages of $CH_4/CO_2$ as sweep gases at feed and sweep gases volume flow rate and inlet temperature of 500 sccm and 1173 K respectively and P'O2=0.21 atm. In all of oxy-combustion applications, the main target is to capture $CO_2$ easily without any extra separation processes that will be needed in case of using argon as an energy carrier medium in case of reactive applications. Also, in all of the carbon free operations, the carbon dioxide is already available in the exhaust so, it could be recirculated and used as sweep gas and energy carrier without any additional costs. As one can see from FIG. 37, the percentage of $CH_4$ increases in the sweep gases mixture as the amount of oxygen flux permeation increases for both cases of mixing operation (no reacting) and the reacting medium operations; however the increase is sharp in case of reactions are activated. The permeate side conditions and the chemical reactions have significant effects on the oxygen permeation flux.

Figure 38:
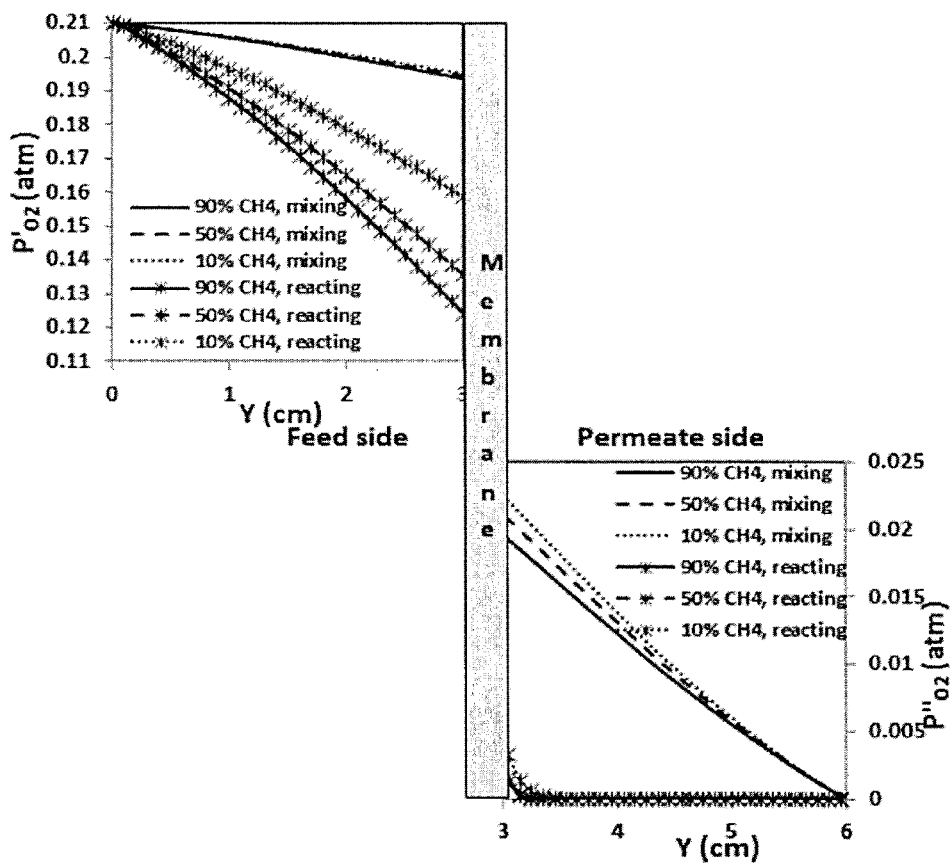
FIG. 38 is an illustration of the effect of reactivity on oxygen partial pressure in both sides of the membrane for different percentages of $CH_4/CO_2$ as sweep gases.

FIG. 37 also shows the influence of reactivity on oxygen permeation flux for different concentrations of $CH_4/CO_2$. As shown in FIG. 37, the oxygen permeation flux is increased with activating the reactions in the permeate side of the membrane. This is due to the increase in membrane temperature because of combustion and also the reduced oxygen partial pressure due to the consumption of oxygen in the combustion process. FIG. 38 is an illustration of the effect of reactivity on oxygen partial pressure in both sides of the membrane for different percentages of $CH_4/CO_2$ as sweep gases at feed and sweep gases volume flow rate and inlet temperature of 500 sccm and 1173 K respectively and P'O2=0.21 atm FIG. 38 shows large reduction in the oxygen partial pressure inside the permeate zone for the reacting cases as compared to the cases without activating reactions in the calculations. Also, the oxygen flux increases sharply with activating reactions in the permeate side, the oxygen partial pressure inside the feed zone is reduced also sharply as compared to non-reacting cases. Also for reacting cases, the heat generated by combustion is transferred to the feed zone through the membrane surface causing an increase in the membrane temperature and also increased air temperature near to the membrane surface in the feed zone causing more oxygen flux.

Figure 39A:
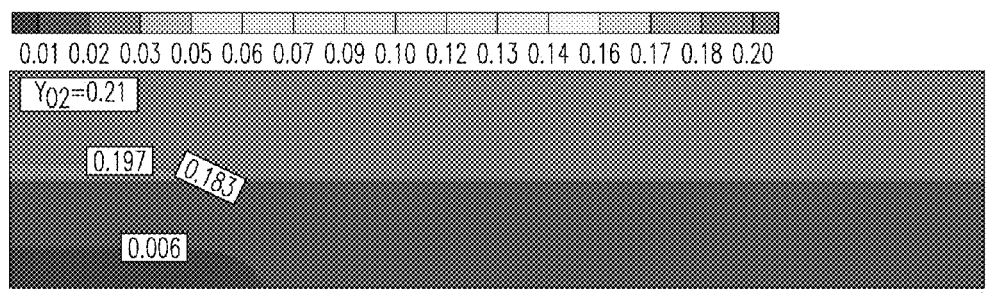
FIG. 39 is an illustration of the contour plots showing the effect of reactivity on oxygen partial pressure in both sides of the membrane as sweep gases, feed and sweep gases.
Figure 39B:
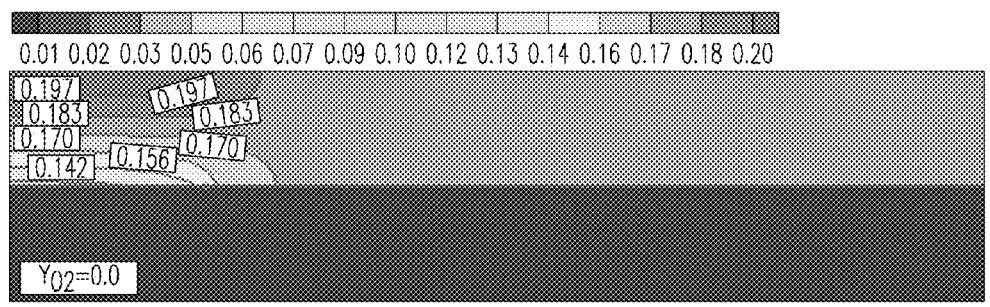

FIG. 39 is an illustration of the contour plots showing the effect of reactivity on oxygen partial pressure in both sides of the membrane at 90/5% Vol. $CH_4/CO_2$ as sweep gases, feed and sweep gases volume flow rate and inlet temperature of 500 sccm and 1173 K respectively and P'O2=0.21 atm. FIG. 39 allows for a more complete view for the oxygen partial pressure distribution inside the whole reactor and compare both cases of reacting and non-reacting mediums. FIG. 39 shows the contour plots of oxygen partial pressure inside the whole reactor for 5/95% Vol. as sweep gases mixture, feed and sweep gases volume flow rate and inlet temperature of 500 sccm and 1173 K respectively and P'O2=0.21 atm. As shown in FIG. 39 for the mixing only case (non-reacting), oxygen molecules exist in the whole permeate zone however, also shown in FIG. 39, the oxygen is completely consumed inside the permeate zone due to its consumption in the combustion process. There is a larger gradient in oxygen concentration near to the membrane surface in the feed zone due to increased oxygen permeation in case of reacting medium compared to mixing only case.

Figure 40A:
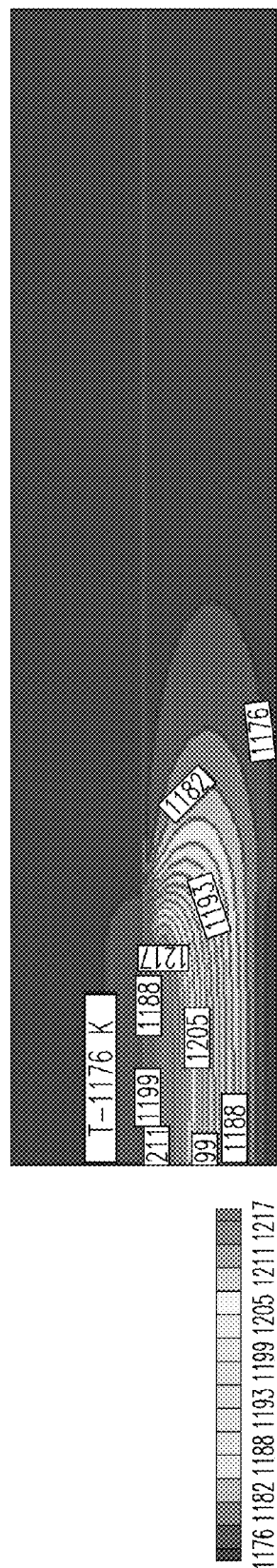
FIG. 40 is an illustration of the contour plots of temperature, mole fractions of $CH_4$, mole fractions of $H_2O$ and mole fractions of CO in both sides of the membrane.
Figure 40B:
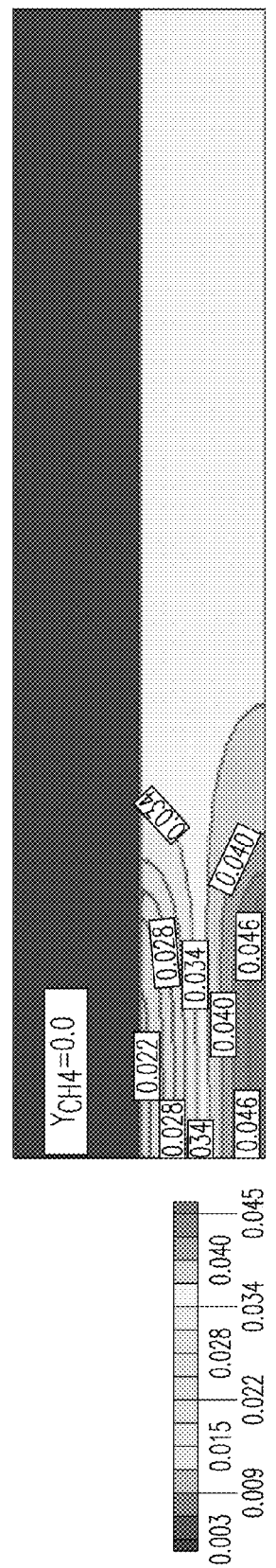

The influences of many parameters (including effect of sweep $CH_4/CO_2$ ratio, effect of inlet temperature, effect of geometry, effect of feed and sweep volume flow rates and effect of oxygen partial pressure inside the feed zone) on the oxygen permeation process and oxy-combustion characteristics are investigated relative to the base case (5/95% Vol. $CH_4/CO_2$ as sweep gases, feed and sweep gases volume flow rate and inlet temperature of 500 sccm and 1173 K respectively and P'O2=0.21 atm). Now the oxy-combustion characteristics are disclosed based on the base case. FIG. 40 is an illustration of the contour plots of: (a) temperature, (b) mole fractions of $CH_4CH4$, (c) mole fractions of $H_2O$ and (d) mole fractions of CO in both sides of the membrane at 5/95% Vol. $CH_4CH4/CO_2$, feed and sweep gases volume flow rate and inlet temperature of 500 sccm and 1173 K respectively and P'O2=0.21 atm. FIG. 40 shows the contour plots of: (a) temperature, (b) mole fractions of $H_2O$, (c) mole fractions of $CH_4$ and (d) mole fractions of CO in both sides of the membrane for the base case.

As shown in FIG. 40 from the contour plots of temperature, the reaction zone is close to the membrane surface and the maximum temperature is about 1217° C. inside the permeate zone. The values of mole fractions of $CH_4$, $H_2O$ and CO ($YCH_4$, $YH_2O$ and YCO) are equal to zero inside the feed side as shown in FIG. 40. As the maximum temperature increases as the membrane temperature increases by heating from combustion zone; however, part of this heat will be lost to the air domain through the membrane surface causing a reduction in its temperature and also this heat lost to the air domain causes an increase in feed zone temperature near to the membrane surface and as a result, an increase in oxygen permeation flux will be encountered. Also it could be seen from the figure that the temperature distribution beside the membrane surface is uniform, this will extend the membrane working period and prevent membrane fracture due to thermal stresses on the membrane surface (idea of isothermal membrane reactor).

The reactions occur in the region close to the membrane surface where enough oxygen for combustion exists. However, away from the membrane surface, no enough oxygen for combustion will be available and so the reactions will be reduced. In FIG. 40, the contour plots of mole fractions of $CH_4$ are shown. The concentration of $CH_4$ is reduced in the direction of membrane surface from the inlet of the sweep gases due to the consumption of $CH_4$ in the combustion process; however, no complete conversion of $CH_4$ is there because of not enough amount of oxygen permeation through the membrane and then not complete combustion and also because a great portion of the coming $CH_4$ from the inlet opening don't go to the flame zone. However, part of $CH_4$ due to the present design of the sweep gases inlet of the reactor escapes from the reaction region but, this design is very good for keeping the temperature constant (isothermal membrane reactor) through the membrane surface and prevents membrane fracture due to thermal stresses.

FIG. 40 presents the contour plots of $H_2O$ mole fractions. As a matter of fact, $H_2O$ is a combustion product and its mole fractions should resemble strongly the contour plots of temperature distribution in the upper part of the figure. The area of maximum values of $H_2O$ mole fractions is the same area of maximum temperature which is the reaction zone as $H_2O$ is a product of the combustion process. The concentration of $H_2O$ is high near to the membrane surface causing a reduction in partial pressure of $O_2$ in the close region to the membrane surface; this will result in increasing the oxygen permeation flux through the membrane. The last part of FIG. 40 shows the contour plots of CO as intermediate combustion product however great part of the created CO will not continue in the reaction due to lack of enough $O_2$ and hence incomplete combustion. Also the CO concentration is maximum inside the reaction zone.

Figure 41:
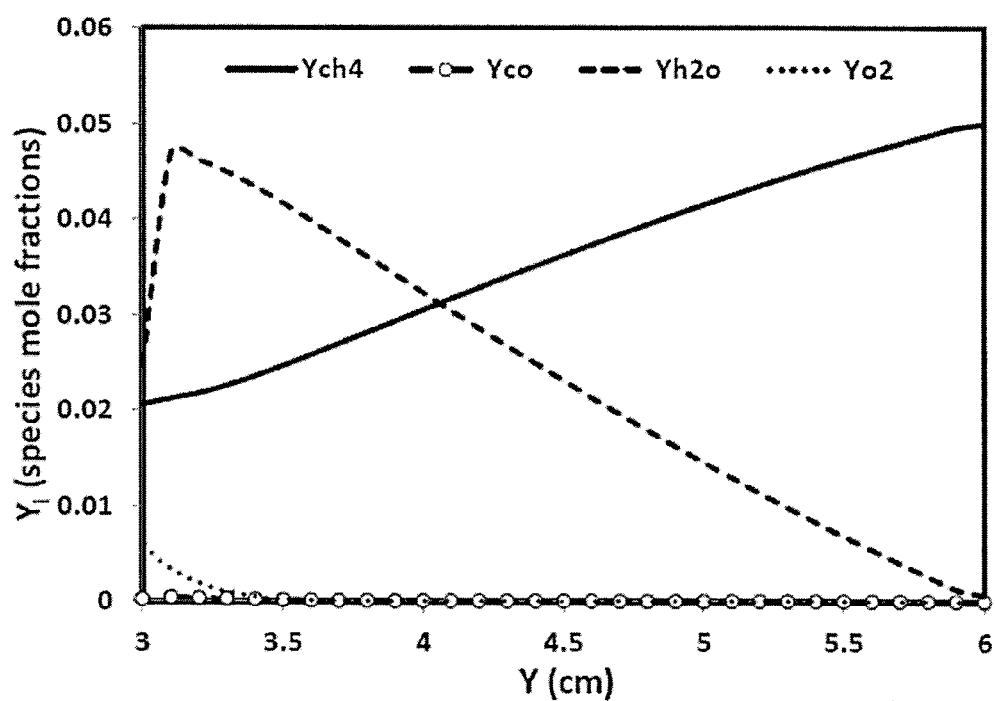
FIG. 41 is a graph of the species mole fractions distributions inside the reaction zone.

The average values of the species mole fractions at the permeate zone outlet are 0.036125, 0.00163, 0.940327, 0.021872 and 0.000043 for $CH_4$, $O_2$, $CO_2$, $H_2O$ and CO respectively which are summing to the value of one indicating the accuracy of the calculations. FIG. 41 is a graph of the species mole fractions distributions inside the reaction zone at 5/95% Vol. $CH_4/CO_2$, feed and sweep gases volume flow rate and inlet temperature of 500 sccm and 1173 K respectively and P'O2=0.21 atm. To compare the values of species mole fractions in the same figure, FIG. 41 shows the species mole fractions through the symmetry line inside the permeate zone. As shown, $CH_4$ and $O_2$ are disappearing in the reaction zone beside the membrane surface while $H_2O$, CO and $CO_2$ are increasing as they are combustion products. Because of very high values of $CO_2$ mole fractions as compared to the other species, it was removed from FIG. 41 to be able to see the other species clearly. Higher $CO_2$ concentrations are diffused from the reaction zone to the membrane surface and this may lead to reduced partial pressure of $O_2$ and as a result, the oxygen permeation flux may increase. The values of CO mole fractions are very low as compared to the other species as it is an intermediate product and most of it converts to $CO_2$.

Figure 42:
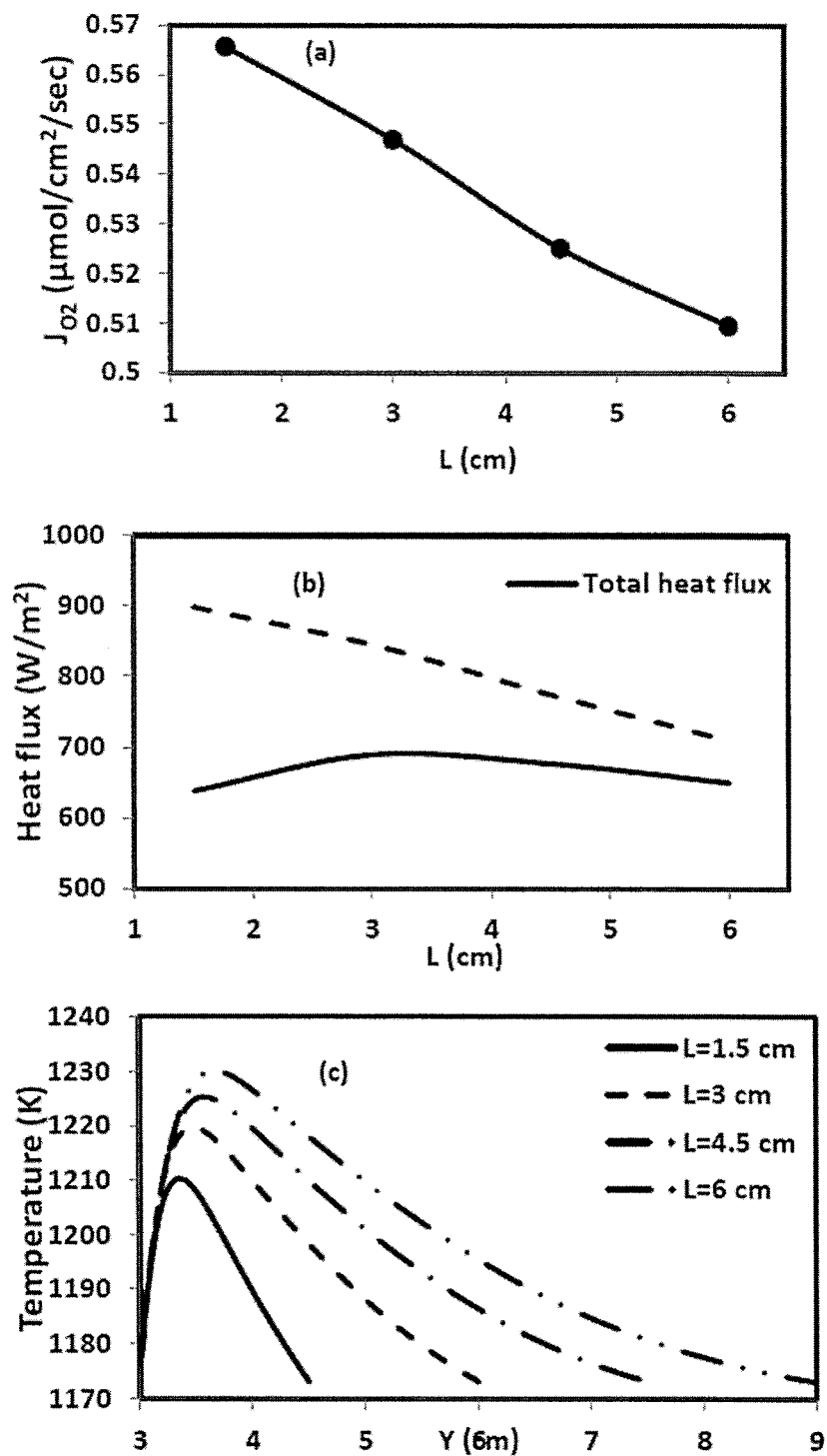
FIG. 42 is a graph of the influences of normal distance to the membrane, L, on oxygenpermeation flux, total heat flux through the membrane surface to the feed zone and absorbed radiation heat flux and temperature distribution inside the reaction zone.
Figure 43:
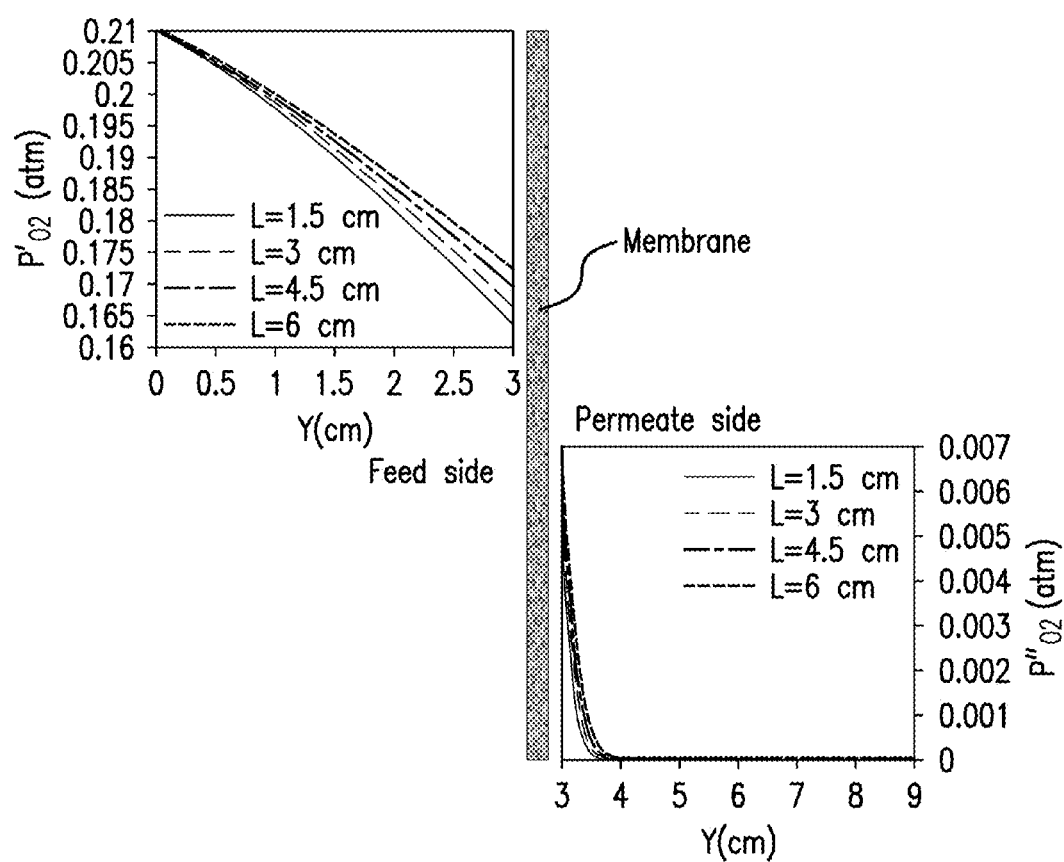
FIG. 43 is a graph of the influences of normal distance to the membrane, L, on oxygen partial pressure distribution in both sides of the membrane.

A sensitivity analysis is done here to investigate the effect of permeate channel height on the oxygen permeation rate and oxy-combustion characteristics considering the real ITM reactor application. All the parameters are fixed like the base case and only the permeate channel height is changed. FIG. 42 and FIG. 43 are used to investigate this sensitivity analysis regarding reactor geometry with considering a real combustion model. FIG. 42 is a graph of the influences of normal distance to the membrane, L, on: (a) oxygen permeation flux, (b) total heat flux through the membrane surface to the feed zone and absorbed radiation heat flux and (c) temperature distribution inside the reaction zone at feed and sweep gases volume flow rate of 500 sccm, 5/95% Vol. $CH_4CH4/CO_2$ and P'O2=0.21 atm. FIG. 43 is a graph of the influences of normal distance to the membrane, L, on oxygen partial pressure distribution in both sides of the membrane at feed and sweep gases volume flow rate of 500 sccm, 5/95% Vol. $CH_4CH4/CO_2$ and P'O2=0.21 atm. As shown in FIG. 42 the oxygen permeation rate has a reverse behavior to the permeate channel geometry and it is reduced by increasing the channel height. This is due to the reduced effect of the flow momentum by increasing the channel height as the velocity of the flow will be reduced by increasing the area.

As a result of increased oxygen flux by reducing the channel height, the oxygen partial pressure inside the feed zone is reduced indicating higher oxygen flux and highlighting the effect of flow momentum inside the permeate zone on oxygen permeation rate as shown in FIG. 43. However, the maximum temperature inside the reaction zone will be increased with the channel height indicating better mixing between the sweep reactants and the permeated oxygen due to reduced flow velocity. Also, the maximum temperature region starts to move little bit away from the membrane surface as the channel height is increased as shown in FIG. 42 and as a result, the amount of heat absorbed by the membrane will be reduced.

Due to the lowered oxygen permeation flux as the channel height increase, the combustion zone shifts away from the membrane surface and hence more oxygen will be available near to the membrane surface and this may justify the higher oxygen partial pressure inside the permeate zone near to the membrane surface in case of increasing the permeate channel height as shown in FIG. 43.

Figure 44:
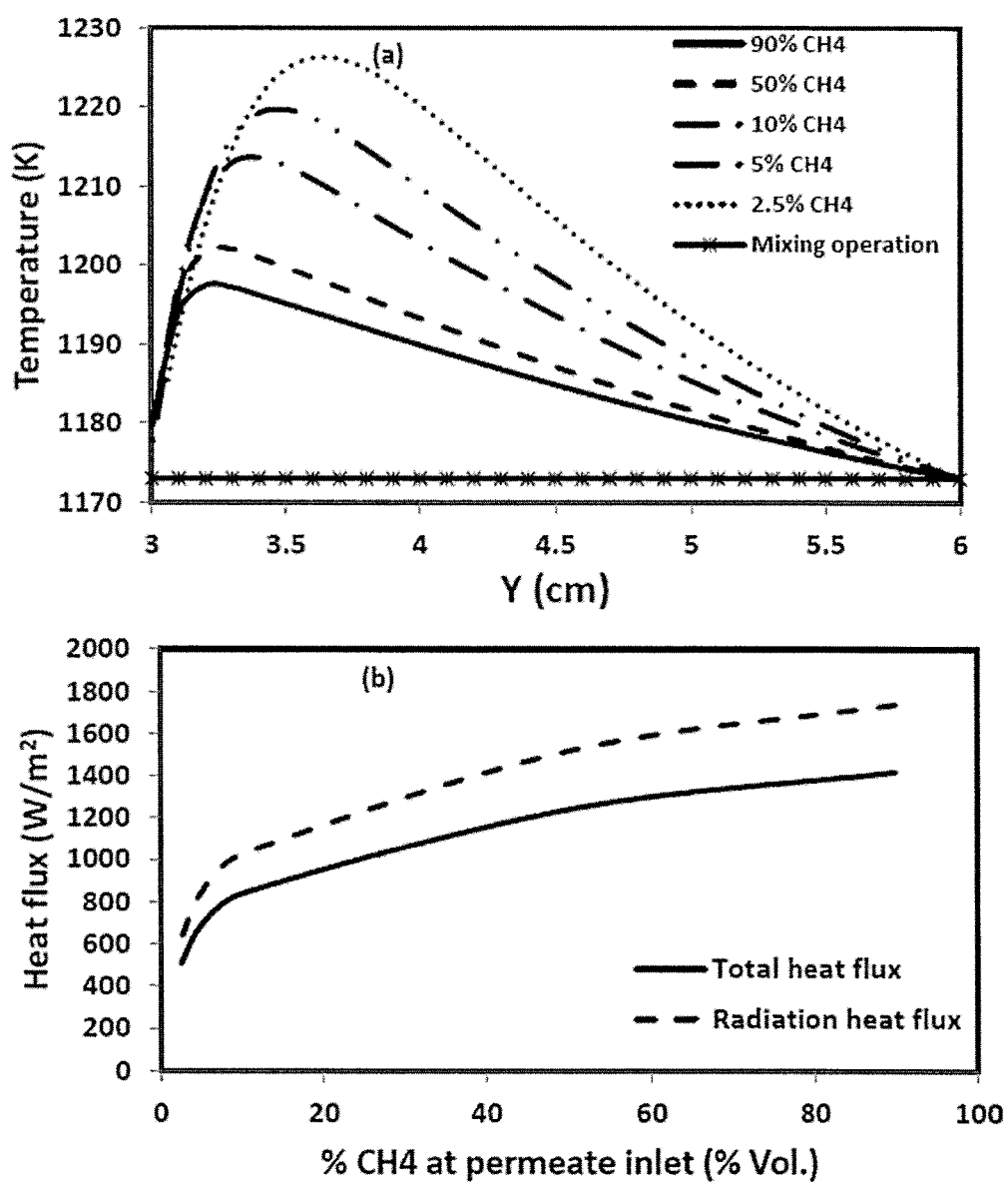
FIG. 44 is an illustration of the influences of % $CH_4$ in the sweep gas mixture on temperature distribution inside the reaction zone, total heat flux through the membrane surface to the feed zone and absorbed radiation heat flux.

As the percentage of $CH_4$ increases in the sweep gas as the oxygen permeation flux increases. However, in all cases, the amount of oxygen permeation is not enough for complete combustion of $CH_4$. FIG. 44 is an illustration of the influences of % $CH_4$ in the sweep gas mixture ($CH_4CH4+CO_2$) on: (a) temperature distribution inside the reaction zone. (b) total heat flux through the membrane surface to the feed zone and absorbed radiation heat flux at feed and sweep gases volume flow rate and inlet temperature of 500 sccm and 1173 K respectively and P'O2=0.21 atm. As shown in FIG. 44, the maximum temperature inside the reaction zone is increased as the percentage of $CH_4$ is reduced in the sweep gas mixture. This is due to improved ratio of the available permeated oxygen moles to the coming $CH_4$ moles in sweep gas. When this ratio is more close to the stoichiometric ratio, the combustion temperature will be increased however; the oxygen permeation flux is reduced as the percentage $CH_4$ in the sweep mixture is reduced. Also it is clear from the temperature plots that the combustion starts early away from the membrane surface and the maximum temperature region is moved away from the membrane surface when the percentage of $CH_4$ is decreased in the sweep gas mixture. There is no increase in the temperature in case of mixing operation (non-reacting) as shown in the figure. FIG. 44 shows the amount of radiant heat flux absorbed by the membrane surface and the total heat flux through the membrane surface. Part of the absorbed heat is moves through the membrane surface to the air side and the other part is kept by the membrane and this part of heat causes the increase in the membrane temperature. It is obvious also from FIG. 44 that as the $CH_4$% increases in the sweep gas mixture as the amount of heat transfer through the membrane increases however the maximum temperature was decreased. The maximum temperature region moves away from the membrane surface when the $CH_4$% is reduced in the sweep mixture.

Figure 45:
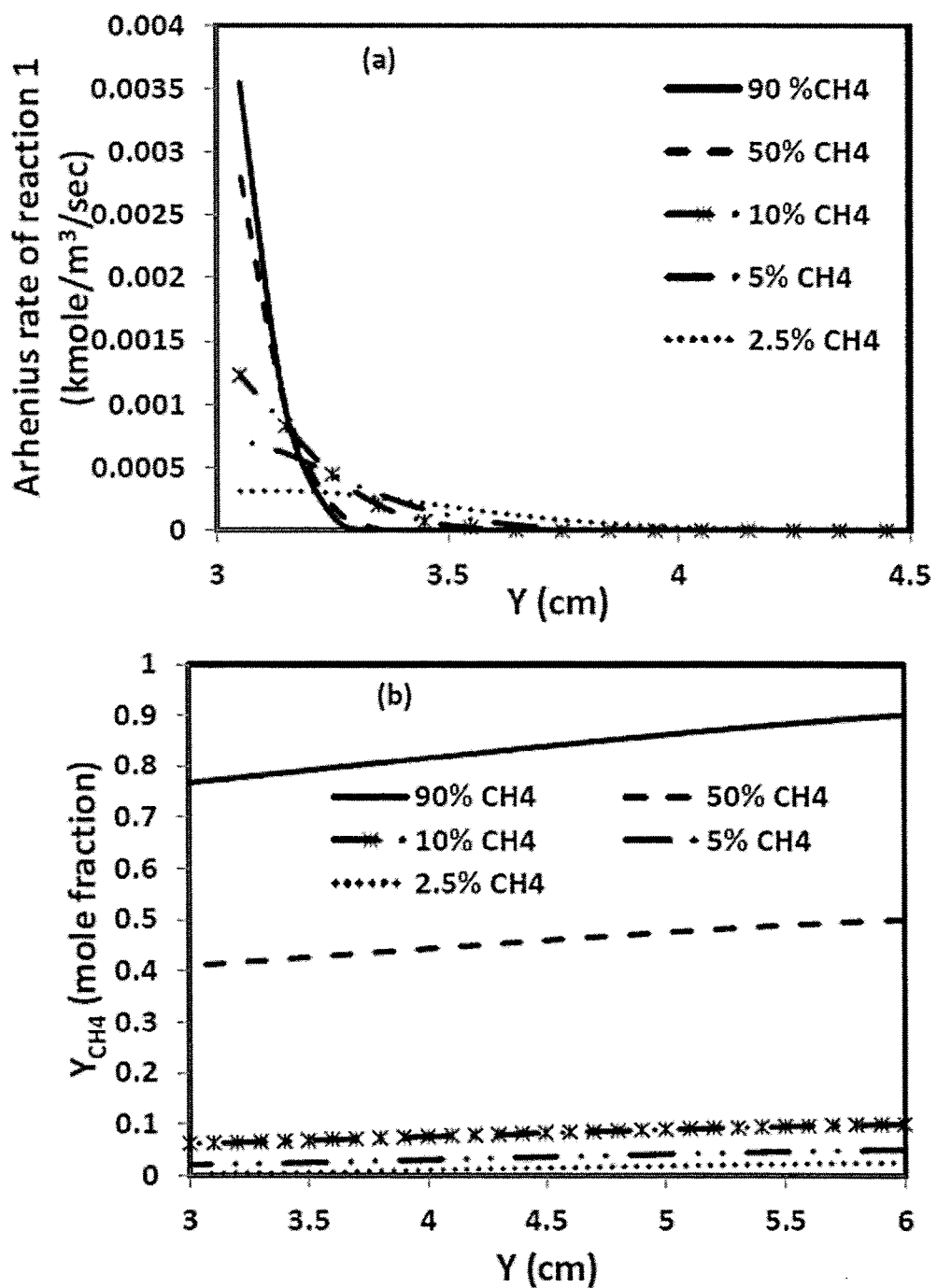
FIG. 45 is a graph of the influences of % $CH_4$ in the sweep gas mixture rate of reaction1, mole fractions distribution of $CH_4$.
Figure 46:
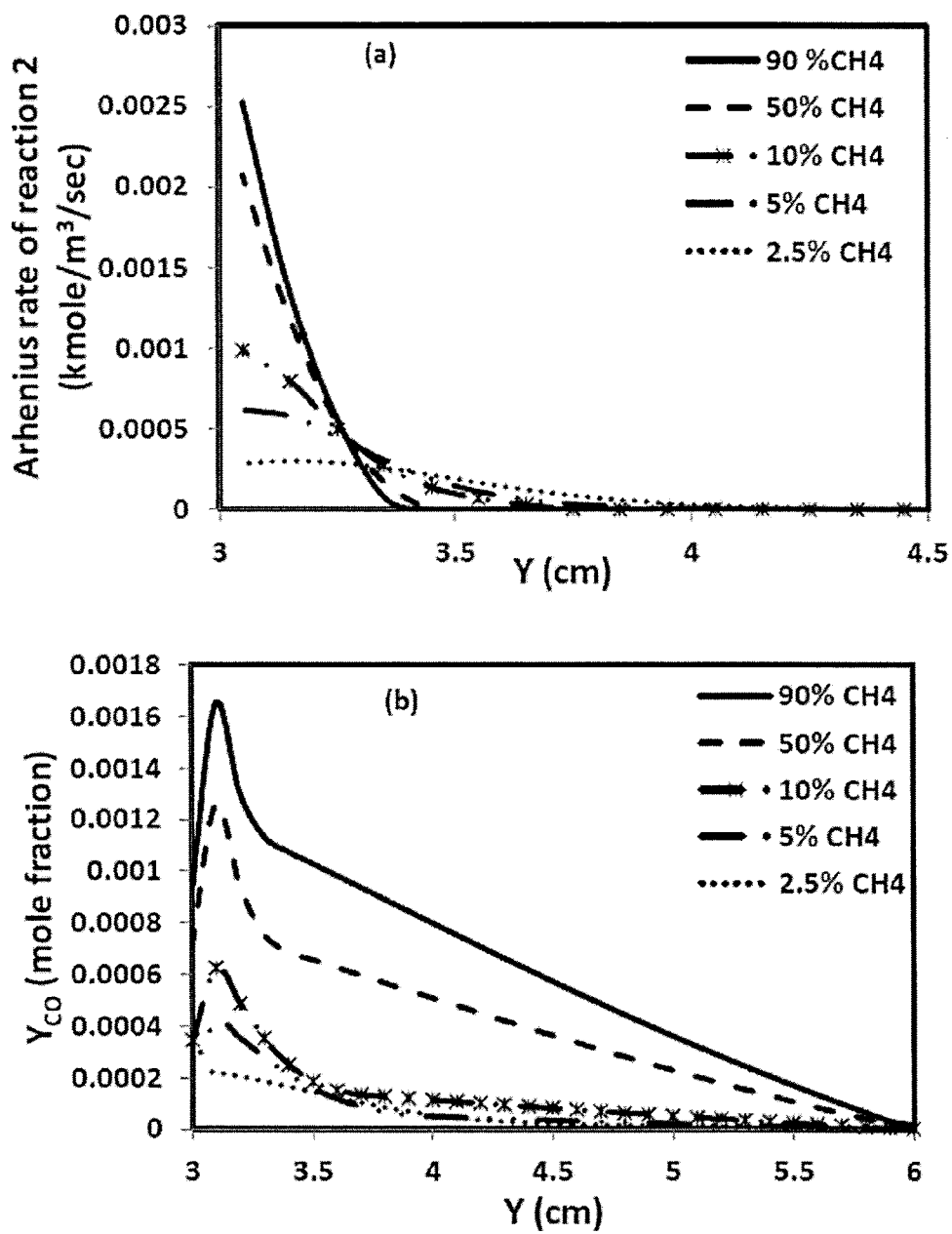
FIG. 46 is a graph of the influences of % $CH_4$ in the sweep gas mixture on rate of reaction2, mole fractions distribution of CO.

Also, due to the high reactor temperature as compared to the reactor geometry, the strain rate will be increased due to reduced density and so increased velocity. This high strain rate leads to squeezing of the flame into a small region and this will lead to higher maximum heat release rate in the reaction zone. The flame zone also is near to the membrane surface as shown above and this will lead to heating up of the membrane and reduced maximum temperature inside the reactor due to higher heat loss to the air side through the membrane surface. FIG. 45 is a graph of the influences of % $CH_4$ in the sweep gas mixture ($CH_4CH4+CO_2CO2$) on: (a) rate of reaction1. (b) mole fractions distribution of $CH_4$ at feed and sweep gases volume flow rate and inlet temperature of 500 sccm and 1173 K respectively and P'O2=0.21 atm. FIG. 46 is a graph of the influences of % $CH_4CH4$ in the sweep gas mixture ($CH_4+CO_2$) on: (a) rate of reaction2. (b) mole fractions distribution of CO at feed and sweep gases volume flow rate and inlet temperature of 500 sccm and 1173 K respectively and P'O2=0.21 atm. FIG. 45 and FIG. 46 are showing the profiles regarding the reactions rates profiles and the mole fraction distribution for each reacting species. FIG. 45 shows the rates of reaction 1 for different percentages of $CH_4CCO_2$ as sweep gases. The oxygen permeation rate and hence the oxygen concentration on the permeate side are rather low, resulting in a fuel-rich environment in the reaction zone. Instead of being fully converted to carbon dioxide (complete combustion), methane is partially oxidized to form carbon monoxide and water vapor, as introduced in table. 3.2 for the first reaction. Then, the carbon monoxide comes out from the first reaction react with oxygen and produce carbon dioxide which is reaction 2. The amount of oxygen permeation flux was increased when the $CH_4\%$ was increased in the mixture and as a result the reaction 1 rate will be increased and as a result also reaction rate 2 will be increased according to the availability of oxygen as shown in FIG. 46. As shown in FIG. 46 when the $CH_4\%$ is increased, the amount of CO is increased and because of increased oxygen permeation flux, the reaction rate of reaction number 2 was increased. FIG. 45 and FIG. 46 both demonstrate the reaction rates for both reactions are almost zero in most of the reactor except in the region near to the membrane indicating lack of oxygen in those regions.

Figure 47:
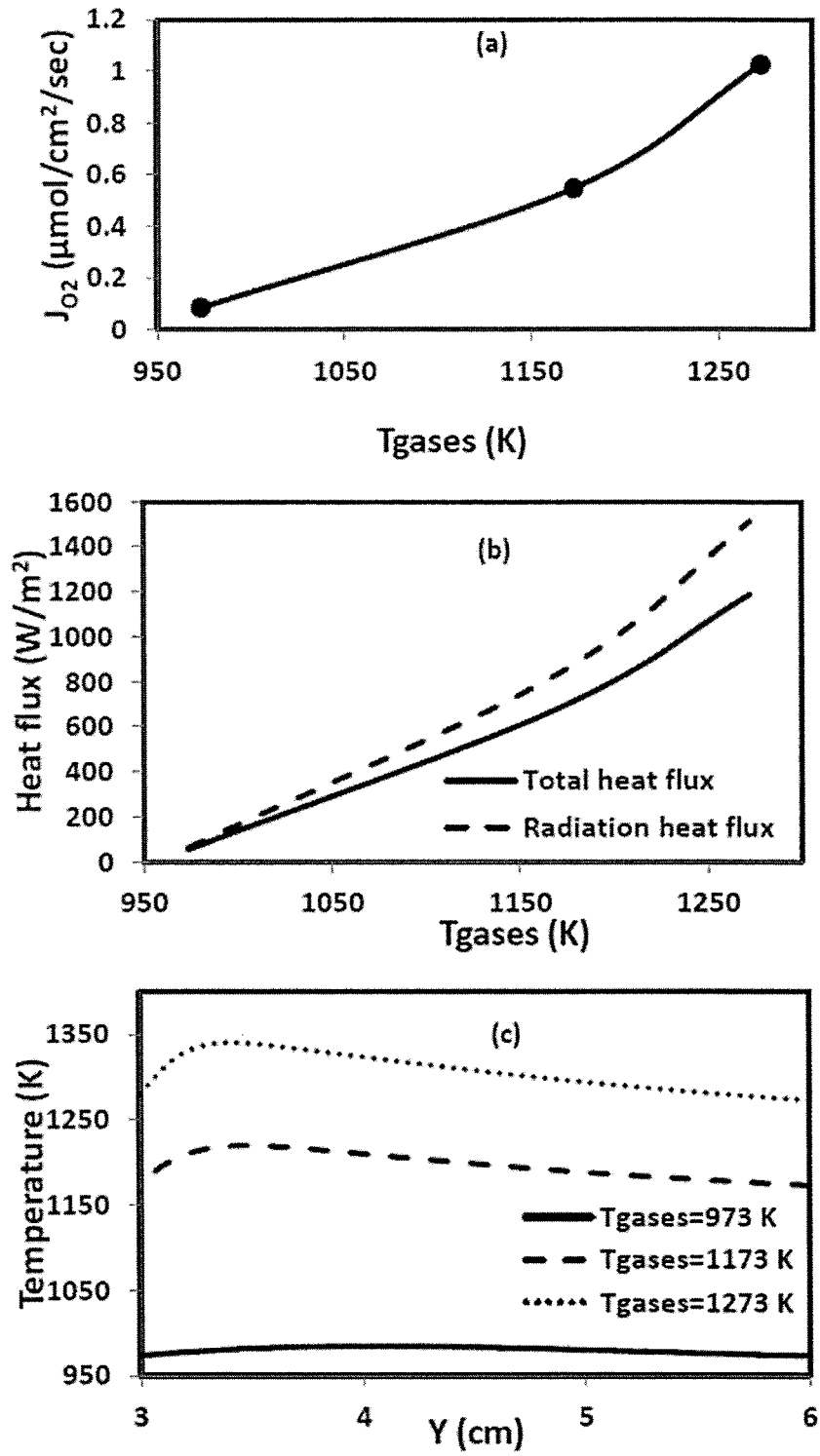
FIG. 47 is a graph of the influences of feed and sweep gases inlet temperature on: oxygen permeation flux, total heat flux through the membrane surface to the feed zone and absorbed radiation heat flux and temperature distribution inside the reaction zone.

The inlet temperature of gases in both sides of the membrane is a very important parameter regarding the oxygen permeation flux. From oxygen permeation equation, the oxygen flux is directly dependent on membrane temperature and as the temperature increases as the oxygen flux increases because of the reduction in the surface exchange resistance of the membrane. FIG. 47 confirms this way of dependence of oxygen permeation on the inlet gases temperature in case of reactions are activated in the permeate side of the membrane. FIG. 47 is a graph of the influences of feed and sweep gases inlet temperature on: (a) oxygen permeation flux, (b) total heat flux through the membrane surface to the feed zone and absorbed radiation heat flux and (c) temperature distribution inside the reaction zone at feed and sweep gases volume flow rate of 500 sccm, 5/95% Vol. $CH_4/CO_2$ and P'O2=0.21 atm. If those values of oxygen permeation flux (see FIG. 47) are compared to the inert operation (argon is used as sweep gas) for the same feed and sweep volume flow rates, one can found that the values of the oxygen permeation flux are increased to roughly three times more because of reactions activation in the permeate side and the effective permeation process when $CO_2$ and $CH_4$ are used as sweep gases as compared to argon.

As the inlet gases temperature increases as the oxygen permeation flux increases and so more complete combustion will be encountered and the maximum temperature inside the reactor will be increased as shown in FIG. 47 causing more radiant heat to be absorbed by the membrane surface and more heat flux to the feed side domain as shown in FIG. 47 The partial pressure of oxygen in feed zone, $_{P'O2}$, was found to be reduced when the inlet gas temperature was increased indicating more oxygen permeation flux. In the permeate side, for the case of inlet temperature of 973 K, the oxygen permeation flux is very small as compared to the other cases and as a result, the reactions will proceed very slowly and the increase in temperature is negligible.

So, oxygen molecules were found to be available everywhere inside the permeate zone because of very weak combustion in this case. For the other high inlet gas temperature cases, only oxygen is available near to the membrane surface and then it is completely consumed in the combustion process as the combustion is much more effective in those cases.

Figure 48:
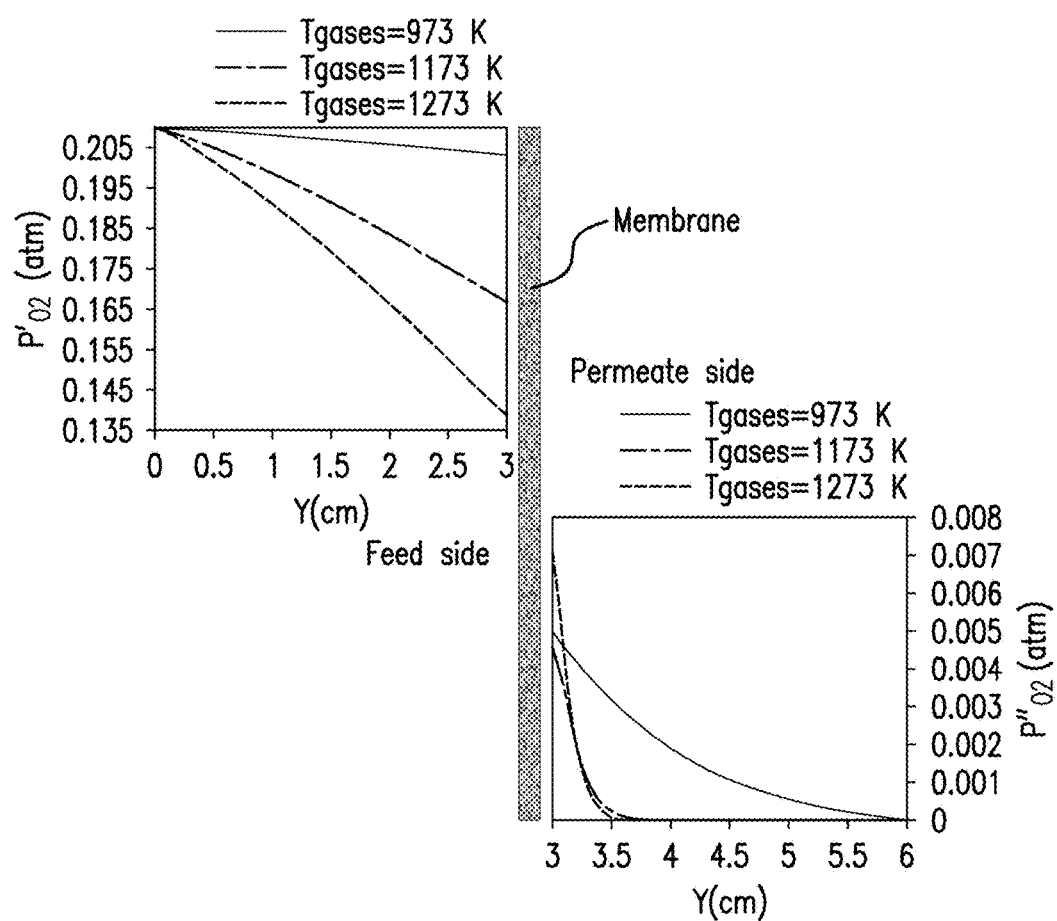
FIG. 48 is an illustration of the influences of feed and sweep gases inlet temperature on oxygen partial pressure distribution in both sides of the membrane at a specific feed and sweep gases volume flow rate.

FIG. 48 is an illustration of Influences of feed and sweep gases inlet temperature on oxygen partial pressure distribution in both sides of the membrane at feed and sweep gases volume flow rate of 500 sccm, 5/95% Vol. $CH_4/CO_2$ and P'O2=0.21 atm. FIG. 48 shows the partial pressure distribution of oxygen in both sides of the membrane. As shown, the partial pressure of oxygen in feed zone, $P'_{O2}$, is reduced as the inlet gases temperature increase indicating more oxygen permeation flux as explained above. In the permeate side, for the case of inlet temperature of 973 K, the oxygen permeation flux is very small as compared to the other cases and as a result, the reactions will proceed very slowly and the increase in temperature is negligible. Oxygen molecules are available everywhere inside the permeate zone because of very weak combustion as shown in FIG. 48. As compared to the other cases, only oxygen is available near to the membrane surface and then it is completely consumed in the combustion process as the combustion is much more effective in those cases.

Figure 49:
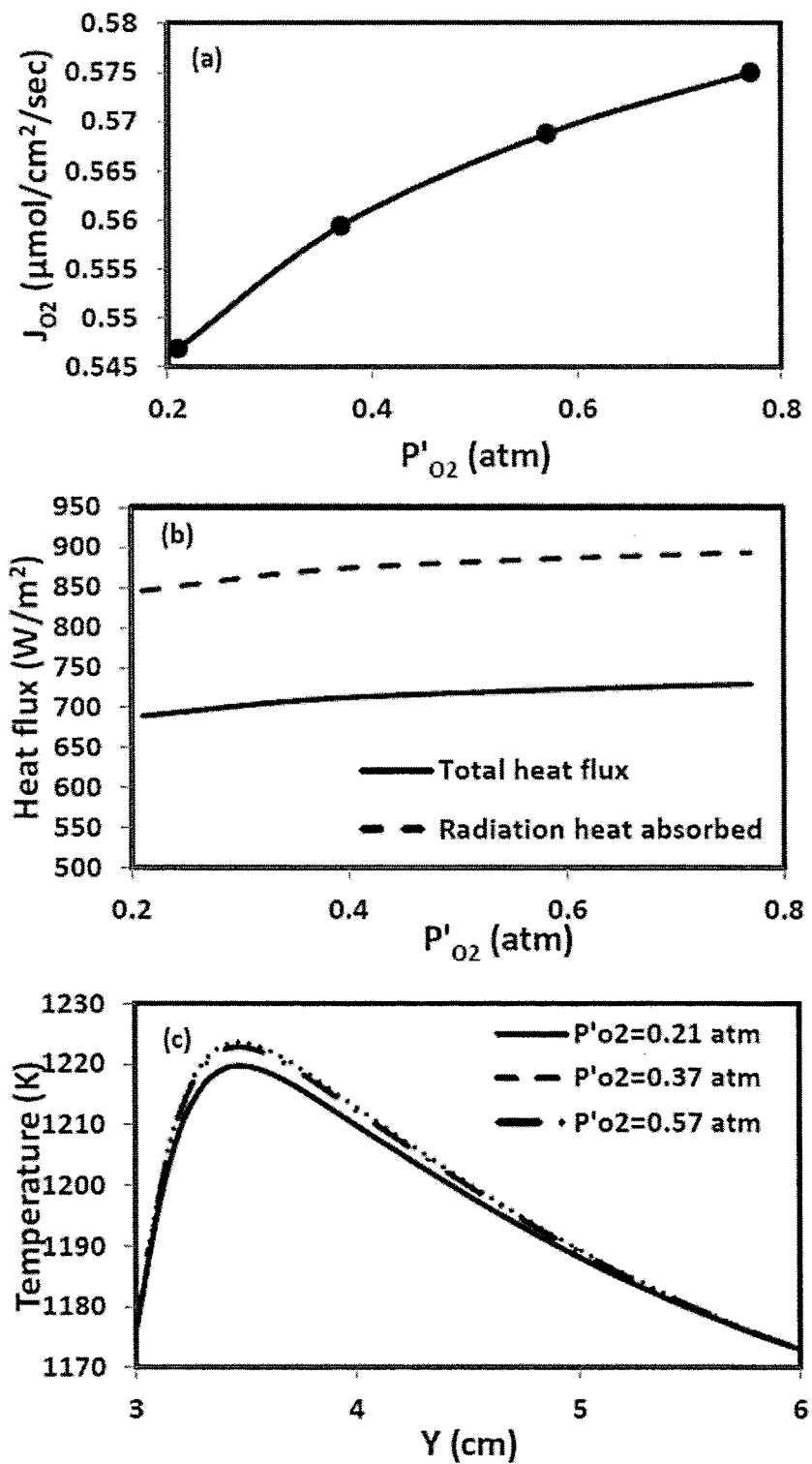
FIG. 49 is a graph of the influences of partial pressure of O2, P'O2, on oxygen permeation flux, total heat flux through the membrane surface to the feed zone and adsorbed radiation heat flux and temperature distribution inside the reaction zone.

Now a sensitivity analysis regarding the feed side oxygen partial pressure is disclosed. FIG. 49 is a graph of the influences of partial pressure of O2, P'O2, on: (a) oxygen permeation flux, (b) total heat flux through the membrane surface to the feed zone and absorbed radiation heat flux and (c) temperature distribution inside the reaction zone at feed and sweep gases volume flow rate of 500 sccm, 5/95% Vol. $CH_4/CO_2$ and P'O2=0.21 atm. FIG. 49 explains the effect of feed side oxygen partial pressure on both the oxygen permeation flux and oxy-combustion process for the same sweep and feed flow rates. As shown in the graph of FIG. 49, the amount of oxygen permeation flux increases as the oxygen partial pressure in the feed side increases. The reason is that the oxygen permeation flux is dominated by the difference in oxygen partial pressure across the membrane and the membrane temperature, as it is clearly shown in the permeation flux equation. Then, the changes in the P'o2 will affect the oxygen permeation directly, as shown in FIG. 49 However, the increase in the oxygen flux is very small and this fact is indicating the main dependence of oxygen permeation flux on the temperature rather than the oxygen partial pressure and the temperature difference is small as shown in FIG. 49 then, the differences in oxygen permeation rate is small.

The greater the P'o2, the larger the driving force for oxygen permeation. Also, as a result of increased oxygen flux, the combustion process is improved slightly and the maximum temperature inside the reaction zone is increased a little bit as shown in FIG. 49. The amount of heat transfer absorbed and across the membrane is also increased slightly by increasing the oxygen partial pressure in the feed side (see FIG. 47). The values of the oxygen partial pressure in the permeate side are increased very slightly near to the membrane surface due to the slightly improved oxygen flux. FIG. 48 shows also the partial pressure distribution of oxygen as a function of feed side oxygen partial pressure at feed inlet. The values in the permeate side are increased very slightly near to the membrane surface due to the slightly improved oxygen flux.

Figure 50:
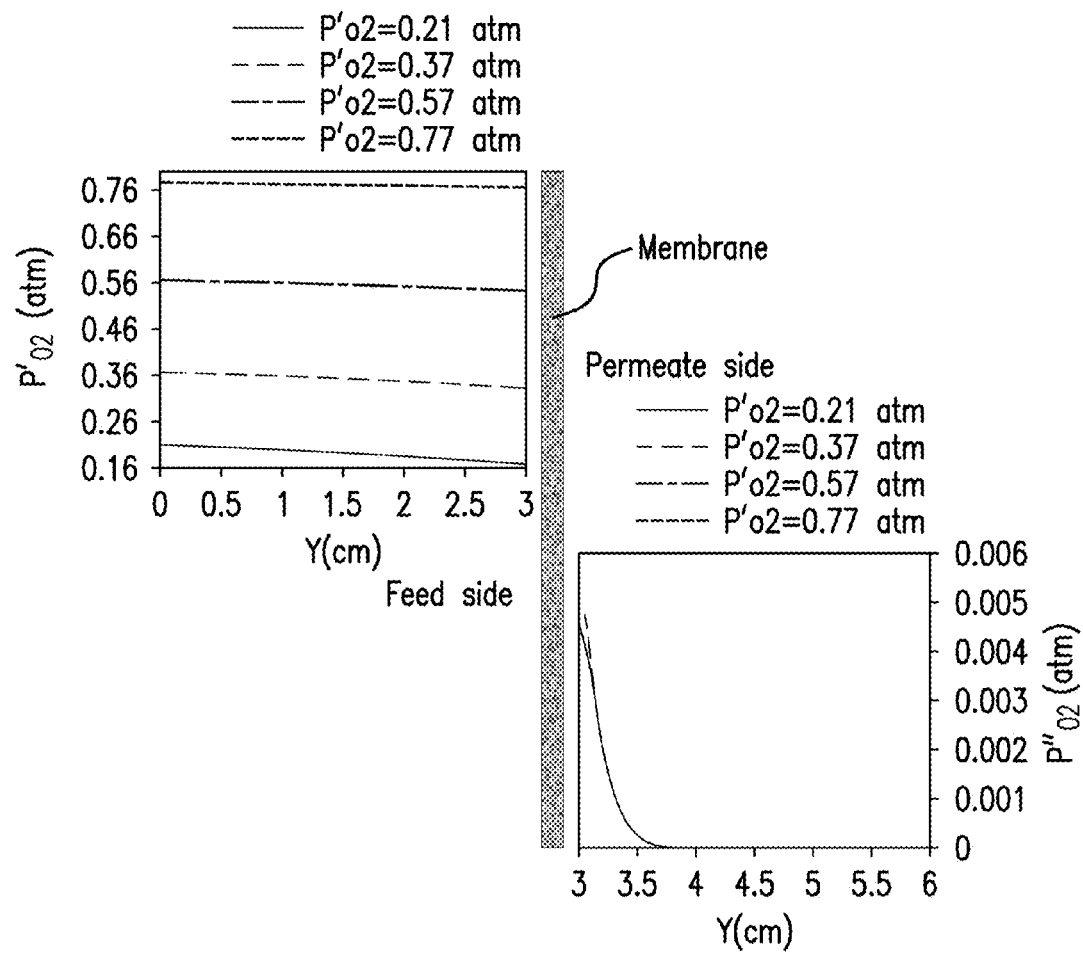
FIG. 50 is an illustration of the influences of partial pressure of O2, P'O2, on oxygen partialpressure distribution in both sides of the membrane.

FIG. 50 is an illustration of the influences of partial pressure of O2, P'O2, on oxygen partial pressure distribution in both sides of the membrane at feed and sweep gases volume flow rate of 500 sccm, 5/95% Vol. $CH_4/CO_2$ and P'O2=0.21 atm.

Figure 51:
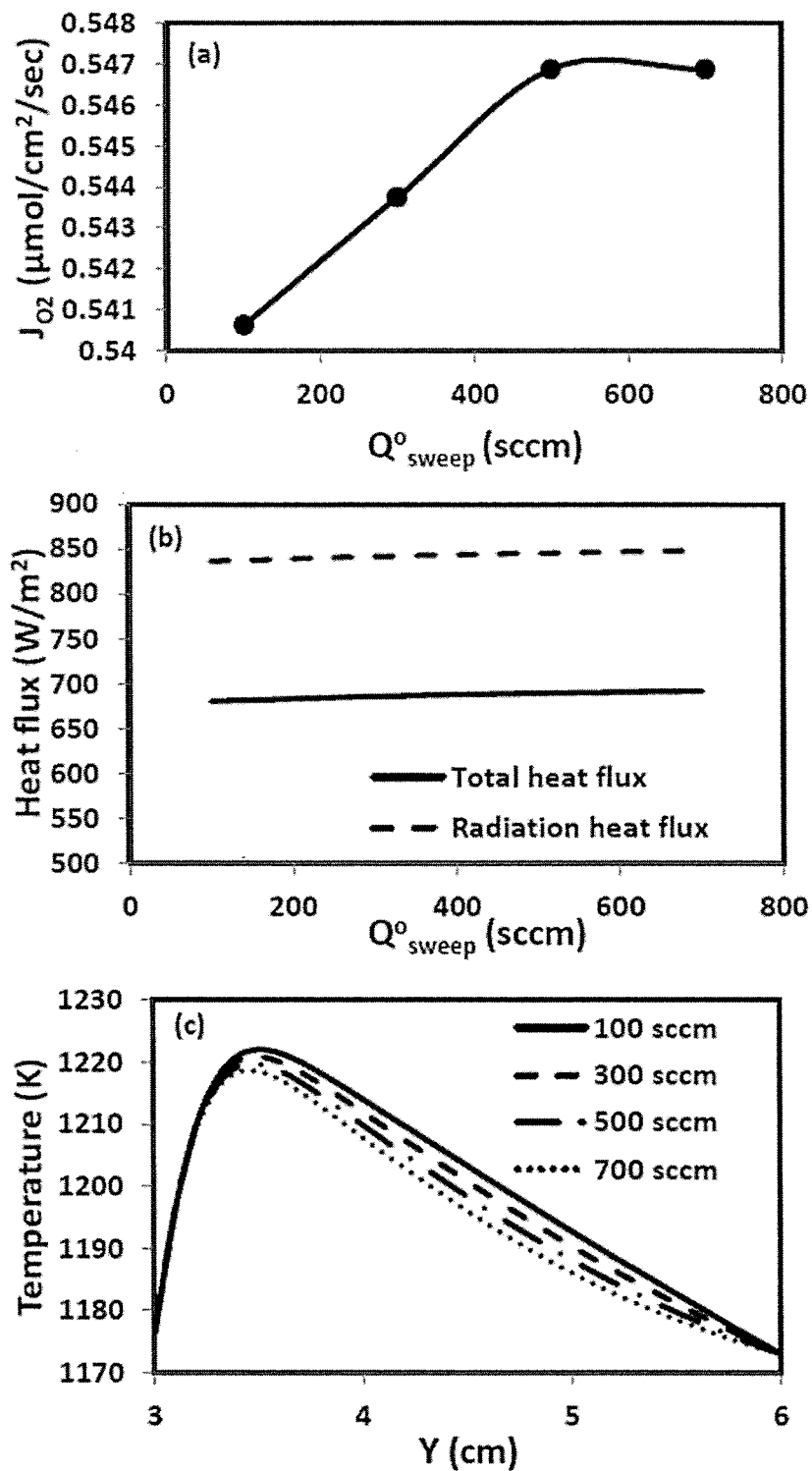
FIG. 51 is a graph of the influences of sweep gases volume flow rate on oxygen permeation flux, total heat flux through the membrane surface to the feed zone and absorbed radiation heat flux and temperature distribution inside the reaction zone.

FIG. 51 is a graph of the influences of sweep gases volume flow rate on: (a) oxygen permeation flux, (b) total heat flux through the membrane surface to the feed zone and absorbed radiation heat flux and (c) temperature distribution inside the reaction zone at feed and sweep gases volume flow rate of 500 sccm, 5/95% Vol. $CH_4/CO_2$ and P'O2=0.21 atm. The sweep gases mass flux has an enhancing effect on the oxygen permeation flux. However, the change in oxygen permeation flux is slight as shown in FIG. 51 due to the main dependence of oxygen permeation on the membrane temperature rather than the oxygen partial pressure in both sides of the membrane as in all cases in FIG. 51, the combustion process is activated and as a result the membrane temperature was increased. The increase in the sweep gases mass flux results in increase in the oxygen permeation flux due to the reduction in the oxygen partial pressure in the permeate side. Furthermore, the permeate side oxygen partial pressure does not change much with the sweep volume flow rate and as a result the amount of oxygen permeation will not be affected that much and after certain volume flow rate, no increase in the oxygen permeation flux will be encountered as shown in FIG. 51, Due to the slight increase in the oxygen flux as a function of sweep gases volume flow rate, the combustion temperature was increased by a small number of degrees as shown in FIG. 51, and there is also a slight improvement in the amount of heat flux through the membrane as shown in the same FIG. 51. A modified two step finite rate reaction kinetics model for methane oxy-combustion has been introduced in order to predict the oxy-fuel combustion characteristics inside an ITM reactor. A detailed 2D analysis has been presented herein to understand more the performance of an ITM reactor under the oxycombustion conditions in the permeate side of the membrane. Also, coefficients of the oxygen permeation equation have been introduced for a LSCF1991 ion transport membrane based on the fitting of the experimental data in the literature. The analysis of the effect of reactivity on the permeation process is discussed.

The effects of many parameters including inlet gases temperature (feed and sweep), reactor geometry, feed and sweep volume flow rates, oxygen partial pressure in the feed side and the effect of the percentage of $CH_4$ in the sweep gases mixture on the permeation process and oxy-combustion characteristics have been analyzed. There are important parameters affecting the operation of ITM reactors (reactions are activated) like the inlet gases temperature (feed and sweep), percentage of $CH_4$ in the sweep gases mixture and the reactor geometry. Also, there are less important parameters like, feed and sweep volume flow rates, oxygen partial pressure in the feed side. From the above analysis, it can be concluded that the chemical reactions have a great effect on enhancing the oxygen permeation flux.

Results of the 3D Simulations for the Substitution of ITM Reactor into Gas Turbine Combustor:

Little work was reported with a focus on examining the effects of reaction side conditions and flow configuration on oxygen permeation through the mixed-conducting ceramic membranes and none has been performed for 3-D membrane reactors. Focus is made on oxygen separation through ion transport membranes and then the combustion is made in the permeate channels with fuel in a mixture of $O_2/CO_2/H_2O$. The new reactor design is substituting conventional gas turbine combustor by a monolith structure ITM reactor. Measurements for the feed and sweep flow rates have been done in order to meet the power required for the reactor and keeping the reactor size as compact as possible. Effects of flow configurations, channel width and percentage of $CH_4$ in the permeate side flow are also introduced under constant inlet gas temperature and fixed operating pressure of 10 bars. The reactor geometry was structured based on the channel width. Accordingly, the number of permeate and feed channels has been calculated keeping the reactor size as close as possible to the size of a real industrial gas turbine. The monolith structure rector design introduced here is able to give power ranging from 5 to 8 MWe based on cycle first law efficiency.

An ITM reactor design has a permeate stream with an upper-bound on diluent flow-rate because the inlet methane concentration should not fall below roughly 5% for mass transfer and combustion stability reasons. For this reason, the percentage of $CH_4$ in the permeate channels was kept at 5% Vol. and the flow rates in both sides of the membrane were changed in order to get maximum oxygen permeation flux and complete conversion of $CH_4$ in the permeate channels.

Any reduction in the channel width below 15 mm results in large increases in the viscous pressure drop. As the channel width decreases, the flow velocity must increase to maintain the same mass flow-rate. The combustion also due to this high flow velocity was lost. The channel length was considered fixed in all simulations to 0.9 m to be similar to the operating length of a real gas turbine combustor and the operating pressure for both streams was fixed to 10 bars. The total number of channels was calculated in order to get as compact design as possible for the ITM reactor and give a reasonable operating power output. A monolith structure design ITM reactor is used with total number of feed and permeate channels of 50,000, 25,000 for each stream. The membranes separate oxygen containing streams (typically air) from streams containing the fuel, methane, and the sweep gas, $CO_2$ plus $H_2O$. The present reactor design results in reactor height of 3.35 m and overall volume and membrane surface area of 10 m3 and 2700 m2, respectively. The reactor is able to deliver power ranging from 5 to 8 MWe based on cycle first law efficiency. In order to understand how an ITM reactor depends on the flow configuration, calculations are performed for co-current versus counter current at the same operating conditions. The ITM reactor specifications for the substituting a gas turbine combustor are listed in table 7.1.

TABLE 7.1

Membrane reactor specifications for substituting a gas combustor

| parameter | Reactive co and counter-current |
|---|---|
| Permeate $T_{in}$ [K] | 1173 |
| Feed $T_{in}$ [K] | 1173 |
| Feed m•$_{air}$, [kg/s/cell] | 1.4336 * $10^{-3}$ |
| Permeate m•$_{CH4}$, [kg/s/cell] 5% Vol. | 1.54944 * $10^{-5}$ |
| Permeate m•$_{CO2,in}$ [kg/s/cell] | 4.289 * $10^{-4}$ |
| Permeate m•$_{H2O,in}$ [kg/s/cell] | 1.754 * $10^{-4}$ |
| Feed $P_{tot}$ [bar] | 10 |
| Permeate $P_{tot}$ [bar] | 10 |
| Number of cells per stream | 25,000 |
| Power [MW] · bases on $1^{st}$ law efficiency. | 5:8 |

Figure 52:
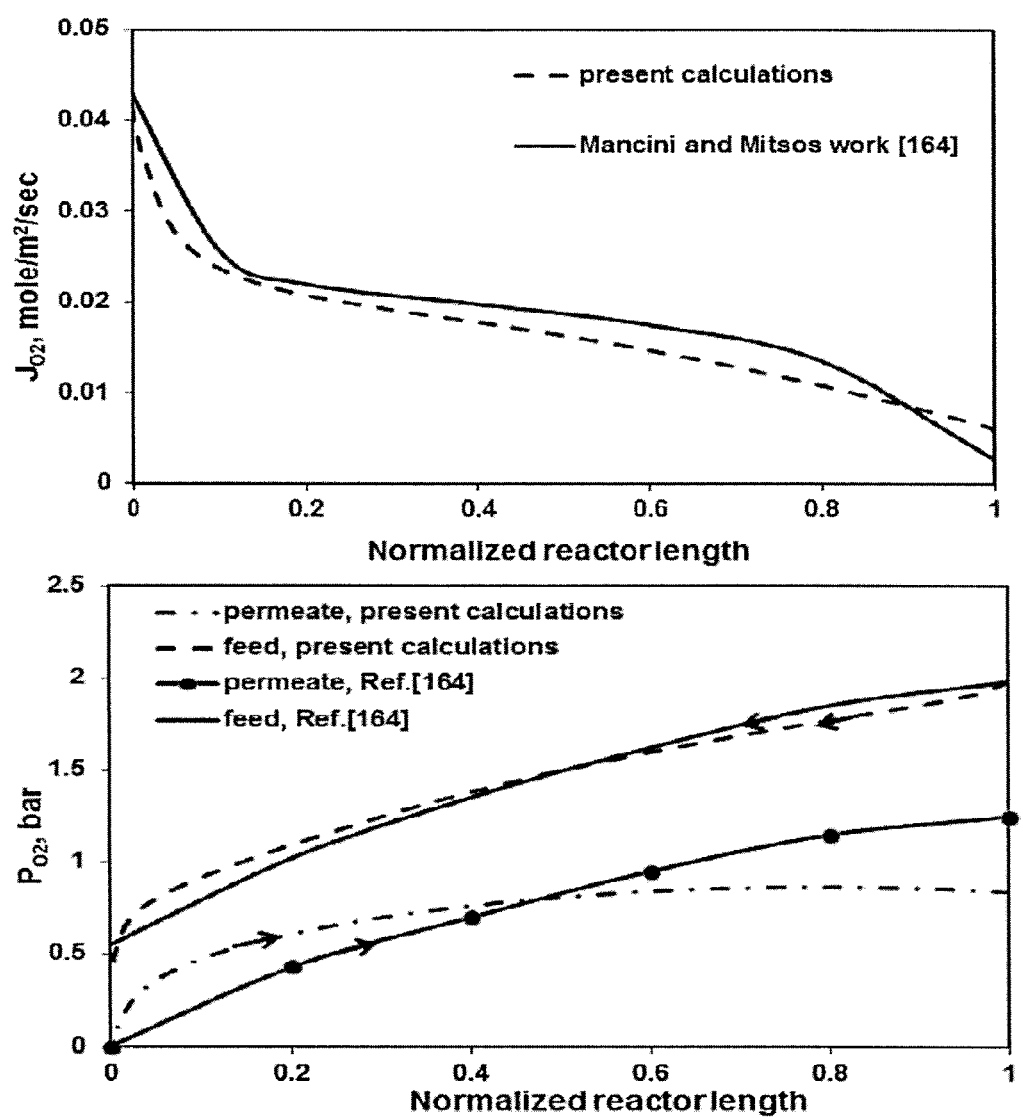
FIG. 52 is a graph of the counter-current separation-only: axial dependence of oxygen permeation flux and oxygen partial pressure at fixed pressure.

FIG. 52 is a graph of the counter-current separation-only: axial dependence of oxygen permeation flux and oxygen partial pressure at fixed pressure of 10 bars in both sides of the membrane for the present calculations and the work done by Mancini and Mitsos. FIG. 52 compares the present model calculation results with the work done by Mancini and Mitsos. For this validation case, the counter current flow configuration cases considered in their work was conducted using the present model and the data for oxygen permeation flux and oxygen partial pressure in both sides of the membrane were compared as shown in FIG. 52. Due to the reactor symmetry, only four adjacent quarters of four adjacent cells are considered in this simulation. The calculations were performed at fixed pressure of 10 bars in both sides of each membrane and feed and permeate inlet temperatures of 973 K and 1173 K, respectively. The total flow rates of feed gases for all reactor cells (100,000 cells, 50,000 cells per stream) are $O_2$ (3.3 kmol/s), N2 (12.41 kmol/s) and $H_2O$ (1 kmol/s). Also, the total permeate gases flow rates for all reactor cells are $CO_2$ (8.34 kmol/s) and $H_2O$ (8.34 kmol/s).

One can see that the oxygen permeation flux profiles for the present calculations and the reference work calculations are in agreement and the flux drop from inlet to exit direction. This flux drop is due to the increased oxygen partial pressure in the permeate side of the membrane as shown in the same figure, lower plot. Also, the oxygen mole fraction of the feed stream drops sharply in the case of counter current configuration indicating a high recovery ratio, and an effective ITM configuration as shown in FIG. 52.

In case of counter-current flow, the membrane temperature is increased exceeding the permissible operating range of the membrane. The counter-current has the lowest average partial pressure driving force, but an analogy to heat exchangers explains this apparent contradiction as the counter current heat exchangers has higher efficiency than the co-current exchangers. The overall mass transfer coefficient depends on both the average wall temperature and average partial pressure driving force. Thus, since the average wall temperature is higher, the average partial pressure driving force must be higher if the same operating conditions are applied.

Figure 53:
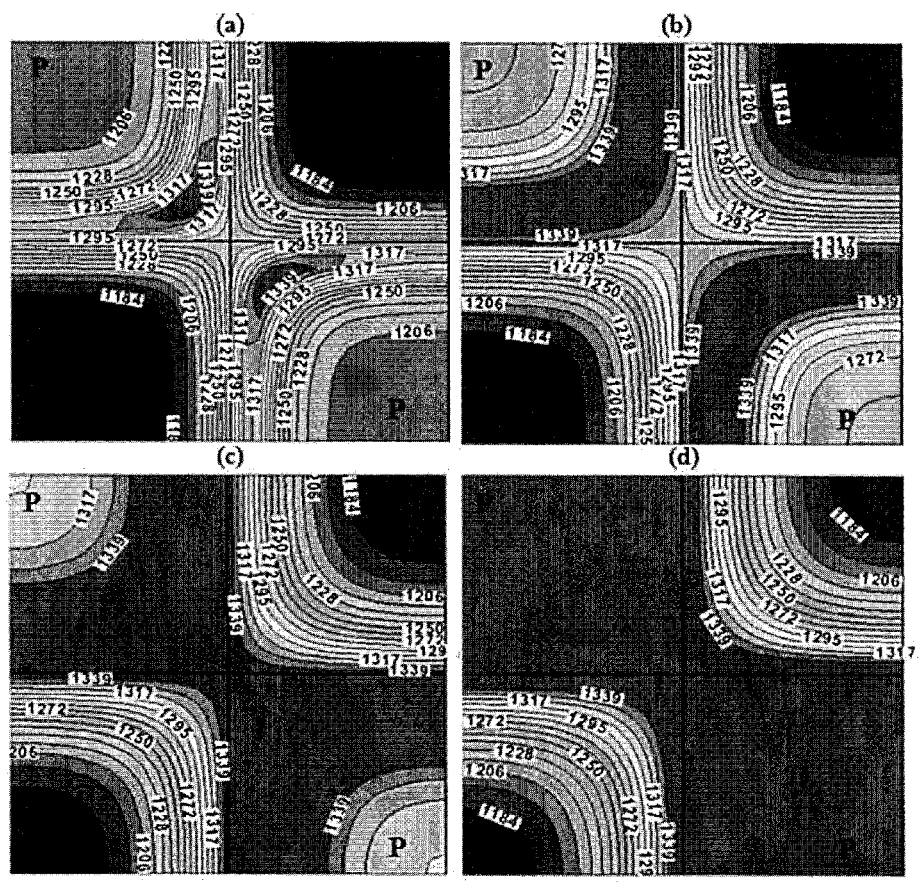
FIG. 53 is an illustration of the co-current temperature contour plots at different axial locations through the reactor.
Figure 55:
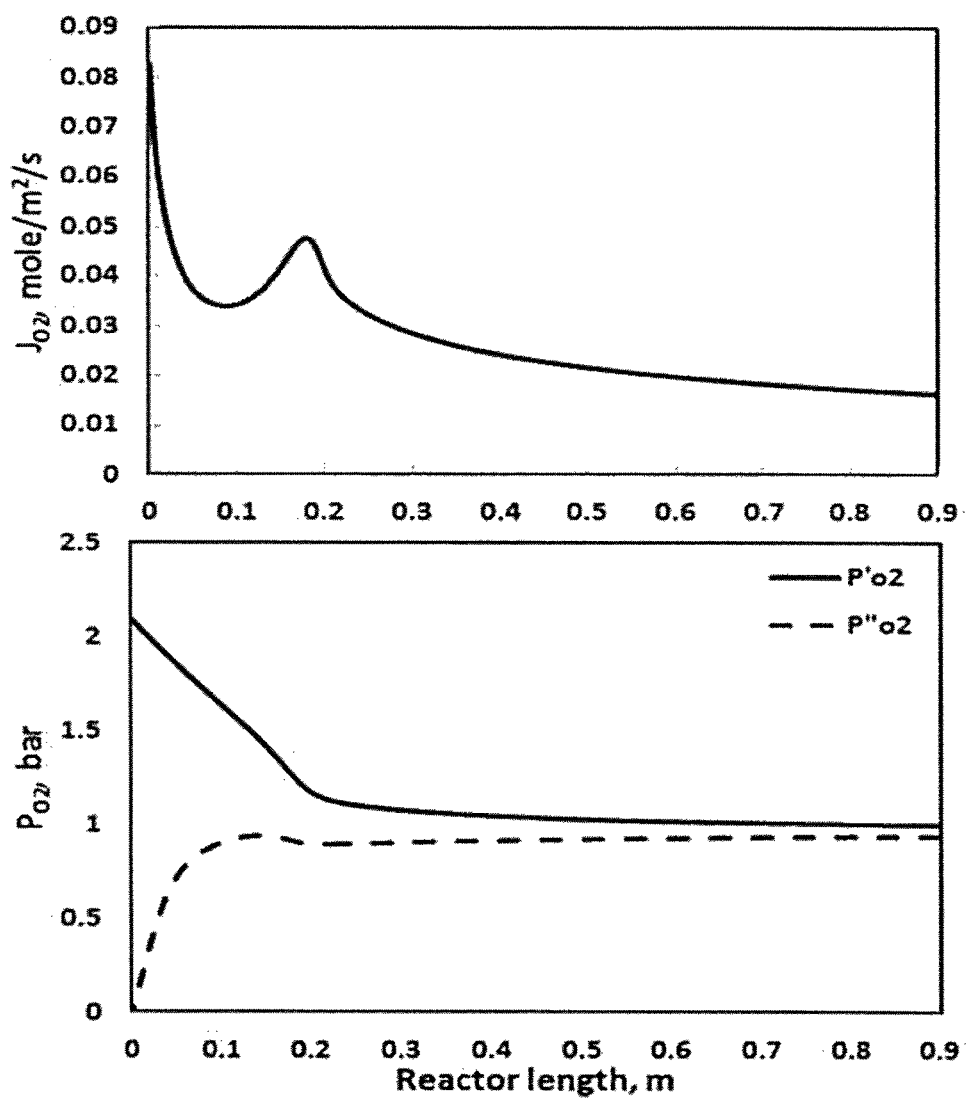
FIG. 55 is a graph of the co-current axial oxygen permeation flux distribution and axial local oxygen partial pressure distribution in both sides of the membrane.

The combustion starts close to the membrane surface at axial location close to 0.15 m and due to the sudden increase in temperature at this region, a jump in oxygen permeation flux occurs at this region as shown in FIG. 55. FIG. 55 is a graph of the co-current: a) axial oxygen permeation flux distribution and b) axial local oxygen partial pressure distribution in both sides of the membrane. The permeate gas temperature rises slowly at first due to slow oxygen transport starting from 1173 K at inlet and then increases gradually to reach 1400 K at exit plane. To see the flame zone shape and its size development on the axial direction, FIG. 53 shows the temperature contour plots at different axial locations on planes normal to the flow direction. FIG. 53 is an illustration of the co-current temperature contour plots at different axial locations through the reactor. a) Z=0.2 m, b) Z=0.4 m, c) Z=0.6 m and d) Z=0.8 m. The flame starts in a small region in the corners between membranes in the permeate channels. The size of the flame starts to increase in the axial direction tell it fills the whole permeate channels at axial location of 0.8 m, close to the rector exit plane, as shown in the figure.

Figure 54:
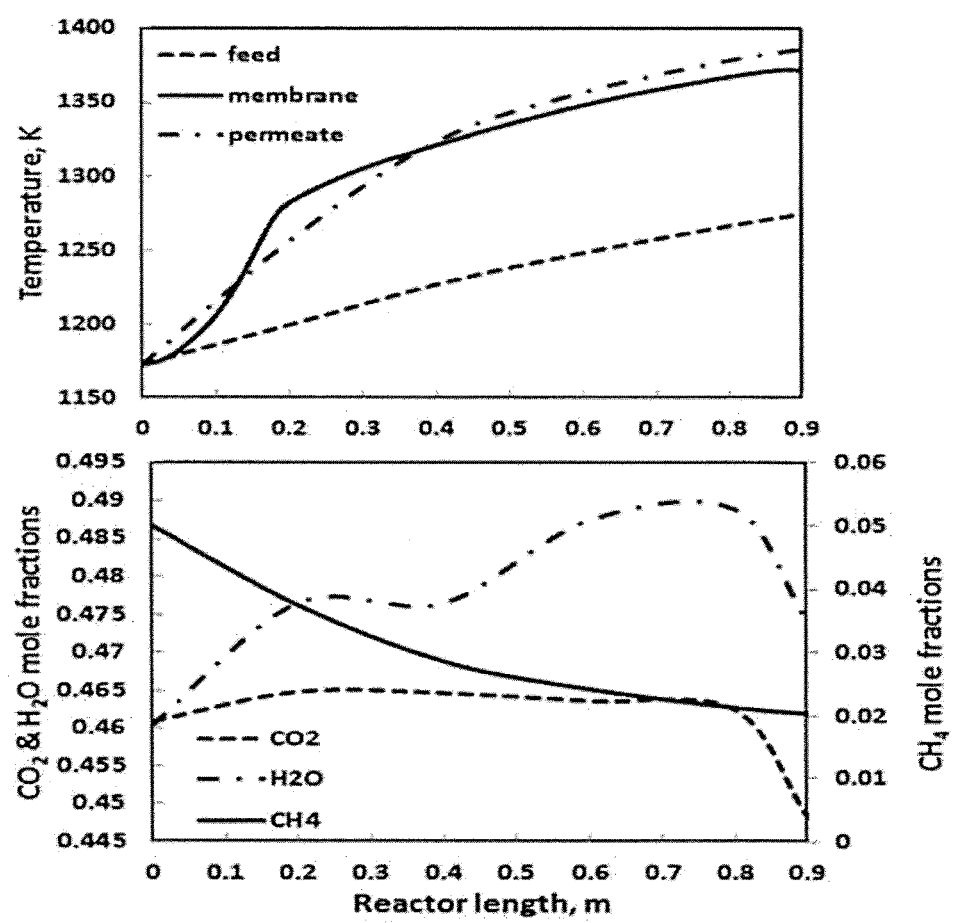
FIG. 54 is a graph of the co-currentaxial average temperature distribution of feed gas, membrane and permeate gas and axial average species mole fractions in the permeate side of the membrane.

FIG. 54 is a graph of the co-current: a) axial average temperature distribution of feed gas, membrane and permeate gas and b) axial average species mole fractions in the permeate side of the membrane. FIG. 54 shows the axial average temperature distribution of feed gas, membrane and permeate gas and the axial average species mole fractions in the permeate side of the membrane. As shown in FIG. 54, the membrane temperature rises slowly at the first part of the reactor due to slow oxygen transport and the resulting gradual combustion of the fuel. The permeate stream remains relatively close to the membrane temperature in this region because the convective heat transfer coefficient is high enough to accommodate the local heat release without a noticeable temperature difference. Due to the higher air flow rates and thus heat capacity in the feed channels, the average temperature of the feed flow remains low and little bit away from the membrane temperature. This increase in air flow rates has double merits enhancing the reactor operation, one is to cool down the membrane surface temperature because the combustion zone is very close to the membrane and the second is to increase the oxygen permeation flux.

The membrane temperature begins to increase faster than those of permeate and feed streams as the Arrhenius term in the flux constitutive relation increases rapidly, and the chemical reactions accelerate and the fuel is rapidly consumed. The implications of these results are that the local heat transfer coefficient is quite important because it dictates how much additional diluent is required, or equivalently, how much smaller the reactor channels must be to accommodate the localized excessive temperature. That is, unless local cooling can be provided precisely at the location where the membrane temperature overshoots, the heat transfer coefficient must be increased. That is, if only the transverse heat convection is sufficient to maintain the wall temperature within limits, then the reactor is likely to meet this criterion easily when the effects of transverse radiative heat transfer are present and the application of ITM reactors into gas turbines is possible.

The average axial species mole fractions distributions are shown in FIG. 54. FIG. 54 demonstrates that the fuel starts to be consumed gradually from inlet to exit and the combustion is uniformly distributed through the rector length. The reactions kinetics are sufficiently fast and that's why no fuel is present in significant amounts at reactor exit. The amount of $CH_4$ at exit section is around 2% of the total gases including the excess permeated oxygen and the whole combustion products of $H_2O$ and $CO_2$ in addition to the inlet gases. The concentrations of $H_2O$ and $CO_2$ are increased through the reactor length due to combustion as both of them are combustion products. However, their mole fractions are reduced at reactor exit section due to the reduction in the reaction rates and also due to the permeation of oxygen that is not consumed close to the rector exit plane.

The longitudinal distributions of the average oxygen permeation flux and average local oxygen partial pressure in both sides of the membrane are shown in FIG. 55. The results indicate that the flux drops significantly as the partial pressure of oxygen on the permeate side increases. This is due to higher sensitivity to the permeate partial pressures at large ratios of feed to permeate partial pressures. A jump in oxygen permeation flux occurs at axial distance of 0.15 m at which the combustion starts and the membrane temperature starts to increase sharply at this point. This behavior is a direct consequence of a dominant oxygen flux dependence on temperature than on partial pressure differences, and has serious implications for the feasibility of a reactive ITM. The increase in membrane temperature reduces the surface resistance of the membrane to oxygen permeation. See Hong J., Kirchen P., Ghoniem A. F., Numerical simulation of ion transport membrane reactors: Oxygen permeation and transport and fuel conversion, Journal of Membrane Science 2012, 85, 407-408, incorporated herein by reference in its entirety.

Figure 56:
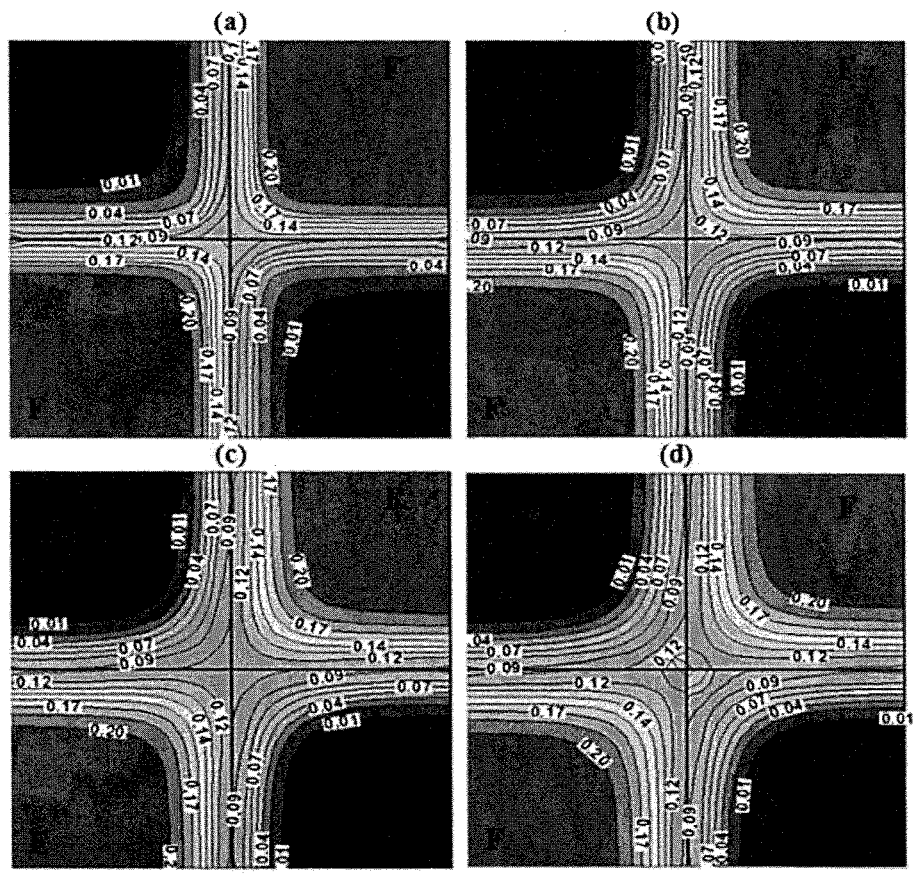
FIG. 56 is an illustration of the co-current oxygen mole fraction distribution at different axial locations through the reactor.

Further, the sudden acceleration of the oxygen flux as the temperature increases in a region of high partial pressure difference is the primary cause of the temperature overshoot, and could also have implications for materials stability. The increase in the oxygen partial pressure through the axial direction is due to the increased mass fractions of $O_2$ in the axial direction which can be seen easily in FIG. 56 at different axial locations on planes normal to the flow direction. FIG. 56 is an illustration of the co-current oxygen mole fraction distribution at different axial locations through the reactor. a) Z=0.2 m, b) Z=0.4 m, c) Z=0.6 m and d) Z=0.8 m.

Figure 57:
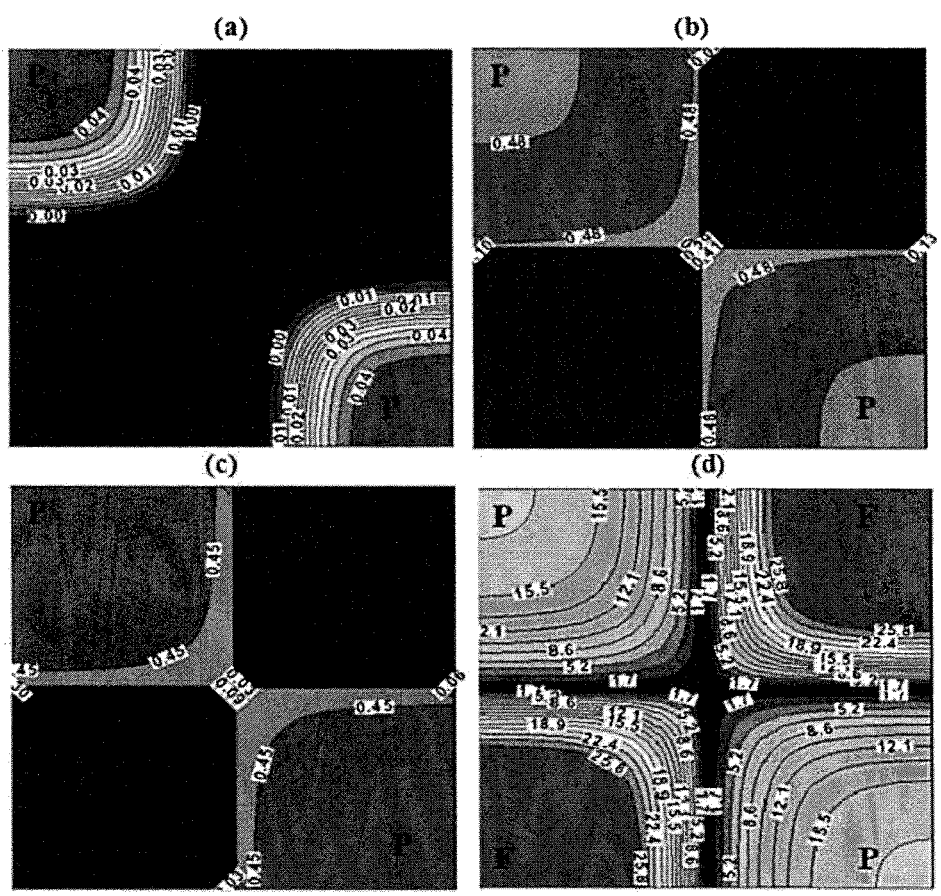
FIG. 57 is an illustration of the co-current contour plots of $CH_4$, $H_2O$, $CO_2$ concentrations and axial velocity, respectively, at fixed axial location.

As shown in FIG. 56, the amount of $O_2$ increase in the axial direction in the permeate side and occupy larger area and it is reduced in the feed side. FIG. 57 is an illustration of the co-current contour plots of $CH_4$, $H_2O$, $CO_2$ concentrations and axial velocity, respectively, at fixed axial location of Z=0.6 m. a) $CH_4$, b) $H_2O$, c) $CO_2$ and d) Z-Velocity. To capture a complete 3D view about the other parameters, FIG. 57 shows the contour plots of $CH_4$, $H_2O$, $CO_2$ mole fractions distributions and axial velocity distribution, respectively, on a plane normal to the flow direction at axial location of z=0.6 m. in the permeate channels, the species concentrations are reduced close to the membrane surface due to oxygen permeation and the velocity is increased in the direction from the membrane surface to the channel centerline as shown in the figure.

Figure 58:
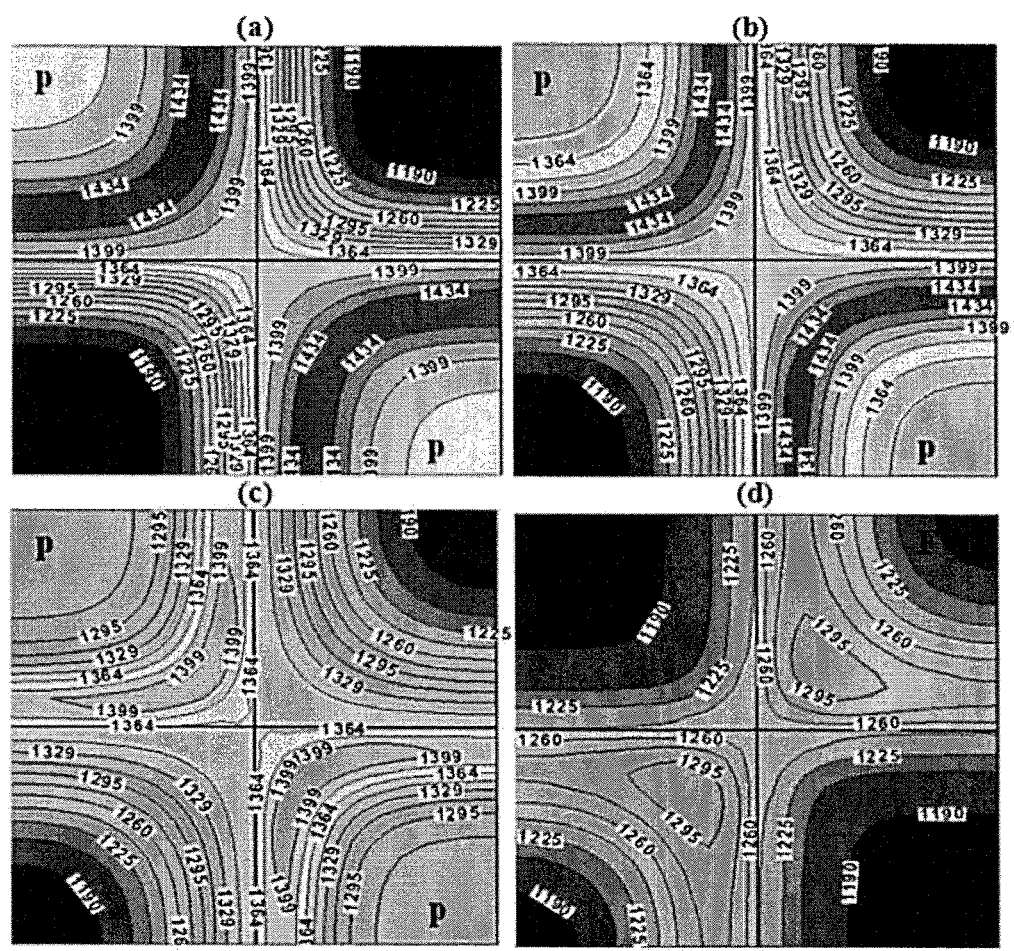
FIG. 58 is an illustration of the counter-current temperature contour plots at different axial locations through the reactor.

Counter-current flow configuration has many advantages over co-current flow due to the effective heat transfer characteristics and uniform distribution of the oxygen permeation flux through the whole length of the reactor. In this case of counter flow configuration membrane reactor, fuel plus other diluent gases in the permeate side enter the reactor at z=0.9 m and feed stream, air, enters at z=0. FIG. 58 is an illustration of the counter-current temperature contour plots at different axial locations through the reactor. a) Z=0.2 m, b) Z=0.4 m, c) Z=0.6 m and d) Z=0.8 m. FIG. 58 shows the contour plots of temperature at different axial locations on planes normal to the flow direction. The temperature develops from 1173 at z=0.9 m to about 1440 K at z=0 m. the temperature rise in case of counter-current flow is improved much due to higher oxygen permeation flux and improvement in combustion. The combustion in this case starts early close to fuel inlet and the temperature reach its maximum rapidly as compared to co-current flow membrane reactor. However, the flame shape and position remains in the same position close to the membrane surface and the shame flame shape is also obtained.

Figure 59:
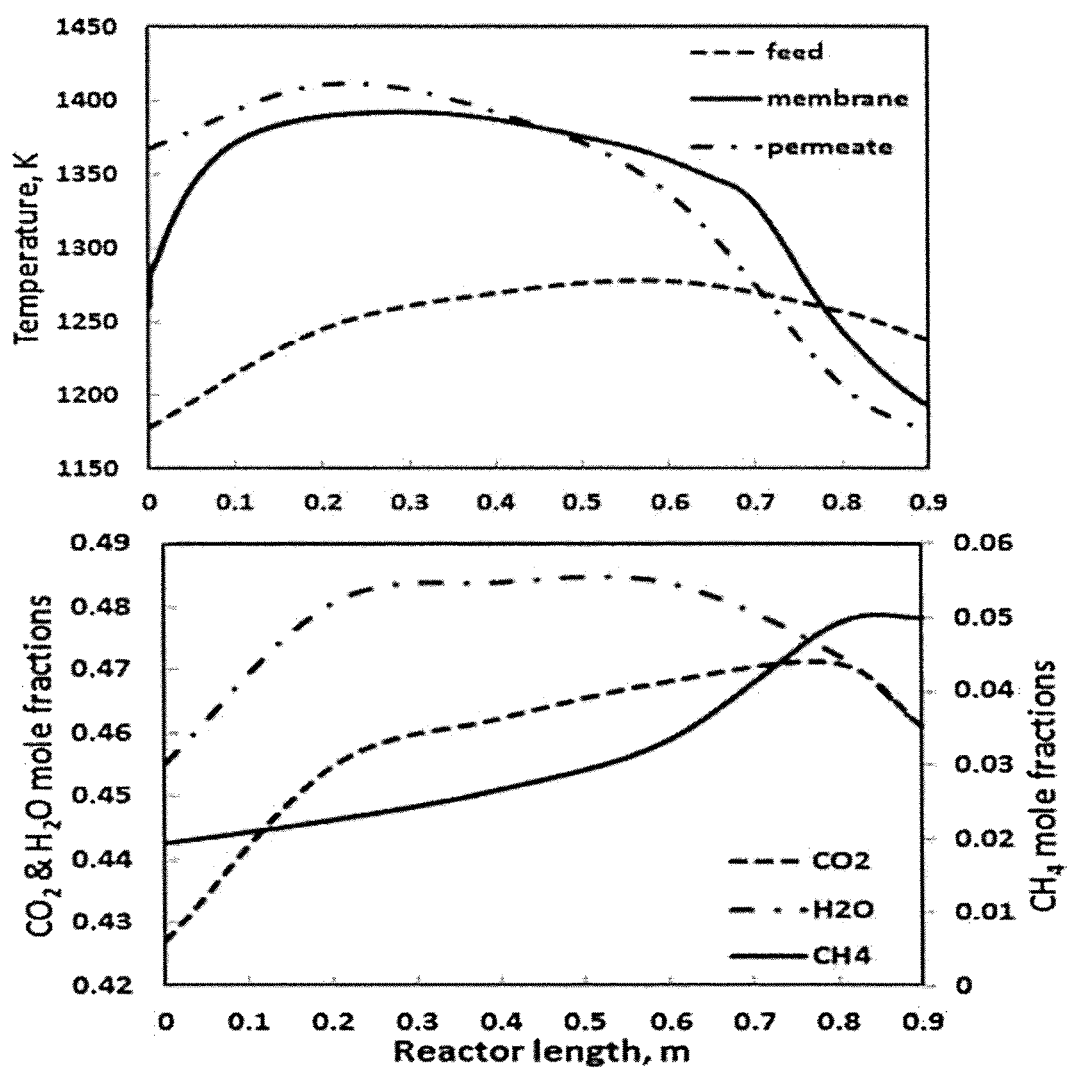
FIG. 59 is a graph of the counter-current axial average temperature distribution of feed gas, membrane and permeate gas and axial average species mole fractions in the permeate side of the membrane.

FIG. 59 is a graph of the counter-current: a) axial average temperature distribution of feed gas, membrane and permeate gas and b) axial average species mole fractions in the permeate side of the membrane. FIG. 59, upper plot, shows the axial average temperature distribution of feed gas, membrane and permeate gas. As shown in FIG. 59, the temperature of permeate gas develops quickly as compared to the case of co-current and reach its maximum value faster. The membrane temperature is uniform through the reactor length except at inlet and exit regions. Due to high air flow rates in the permeate sides and thus its specific heat, the feed stream temperature is lower than the temperature of membranes and permeate streams. The temperature profiles are quite important, and careful selection of the inlet conditions could lead to large improvements in ITM performance.

The oxygen flux is a strong function of the local membrane temperature, and so the average membrane temperature is given for each simulation. Interestingly, the counter-current separation-only ITM has the highest average temperature due to the well-balanced heat exchange between the streams. In the lower plot, FIG. 59, the average axial mole fractions distributions of $CH_4$, $CO_2$ and $H_2O$ are presented. As shown, $CH_4$CH4 mole fractions starts to decline sharply after small distance from fuel inlet indicating higher oxygen permeation flux and improved combustion as compared to the smooth reduction of $CH_4$ through the reactor length in case of co-current reactor design. $CO_2$ and $H_2O$ concentrations are increased due to combustion and after that their concentrations starts to decline due to the permeation of oxygen.

Figure 60:
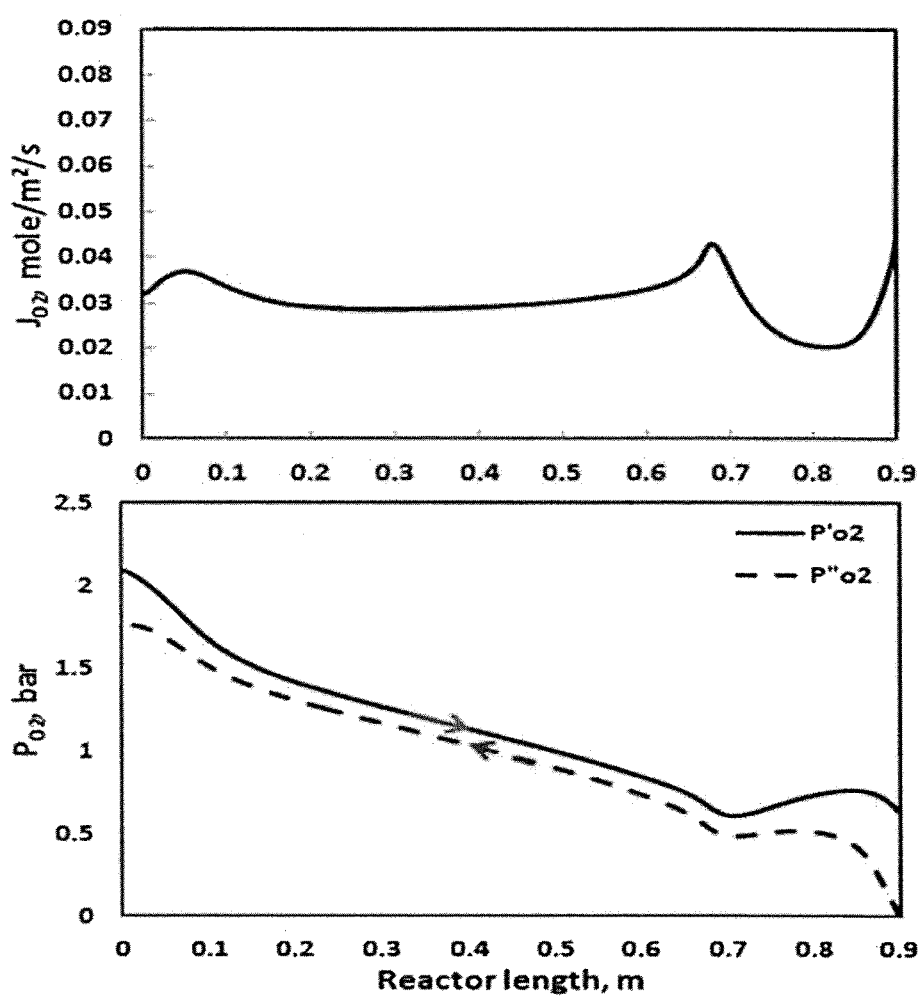
FIG. 60 is a graph of the counter-current axial oxygen permeation flux distribution and axial local oxygen partial pressure distribution in both sides of the membrane.

Due to effective heat transfer and oxygen permeation mechanisms in case of counter current flow, the combustion is improved and the membrane temperature is higher as compared to co-current. FIG. 60 is a graph of the counter-current: a) axial oxygen permeation flux distribution and b) axial local oxygen partial pressure distribution in both sides of the membrane. As shown in FIG. 60 in the upper plot, the average flux through the reactor is higher than in case of co-current flow configuration. The oxygen permeation flux is uniform through the reactor length with a jump close to fuel inlet. This jump in oxygen flux is indicating the start of combustion and an increased membrane temperature. Examination of the partial pressure profile reveals that the partial pressure difference is essentially constant along the reactor length, indicating good material stability potential by minimizing chemical expansion stress as shown in FIG. 60, lower plot. The oxygen mole fraction of the feed stream drops by 72.5%, indicating a high recovery ratio, and an effective ITM configuration. Further, the more sensitive region where the permeate partial pressure is low coincides with the region where the feed partial pressure is low, which appears to be a better match-up than the co-current case, where the high feed matches up with the low permeate.

Figure 61:
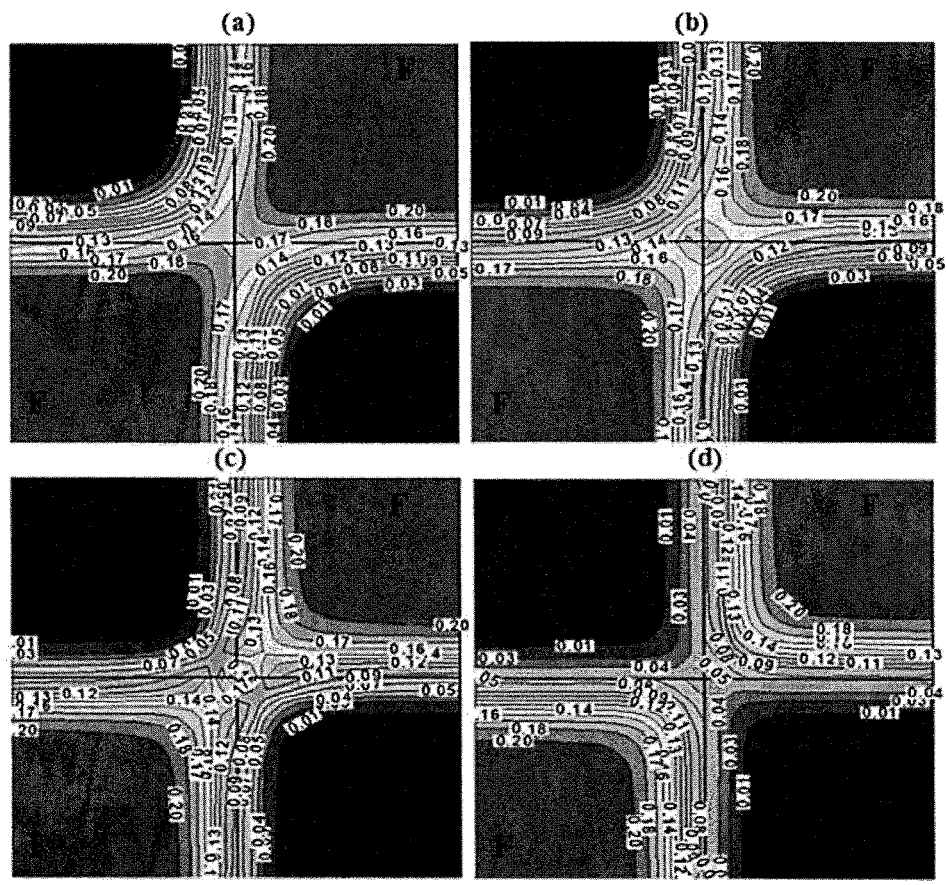
FIG. 61 is an illustration of the counter-current oxygen mole fraction distribution at different axial locations through the reactor.

FIG. 61 is an illustration of the counter-current oxygen mole fraction distribution at different axial locations through the reactor. a) Z=0.2 m, b) Z=0.4 m, c) Z=0.6 m and d) Z=0.8 m. FIG. 61 shows the oxygen mole fractions distribution at different axial location s of the reactor on planes normal to the flow direction. As shown, the amount of $O_2$ increase in the axial direction in the permeate side and occupy larger area than the case of co-current flow which indicates higher recovery ratio.

A very important parameter regarding the ITM design is the individual monolith channel width and accordingly the reactor volume. Variations in the reactor volume have similar influences like changing the volume flow-rates. Larger reactor size results in increasing the oxygen permeation flux. However, increasing the ITM reactor size is too costly, and so there may be an optimal channel width in order to obtain a certain power output according to the limitations provided for special applications of ITM reactors. A design of an ITM reactor is presented in order to substitute a gas turbine combustor. In this case, reactor length is limited to 0.9 m to occupy the same length as a real gas turbine combustor. The total number of channels is limited by the channel with and the available space for a real application. Modifications to the channel width directly impacts the surface area to volume ratio as well as the reactor aspect ratio, and significantly changes pressure drop for a fixed number of channels and inlet flow-rates. The channel width affects many aspects of the ITM performance, specifically the heat transfer coefficient, the surface area to volume ratio, and the local flow conditions among others. A larger channel width reactor near the inlet would result in a relatively low heat transfer coefficient, and so even if the reaction rate is small, the wall temperature could still be significantly high.

As the channel width is reduced, the amount of oxygen permeation flux is increased. Based on this fact, the simulations were done in order to calculate the minimum operating channel width as it is explored later in detail. It was found from the simulations that any reduction in the channel width below 15 mm results in large increases in the viscous pressure drop. As the channel width decreases, the flow velocity must increase to maintain the same mass flow-rate. The combustion also due to this high flow velocity was lost.

Figure 62:
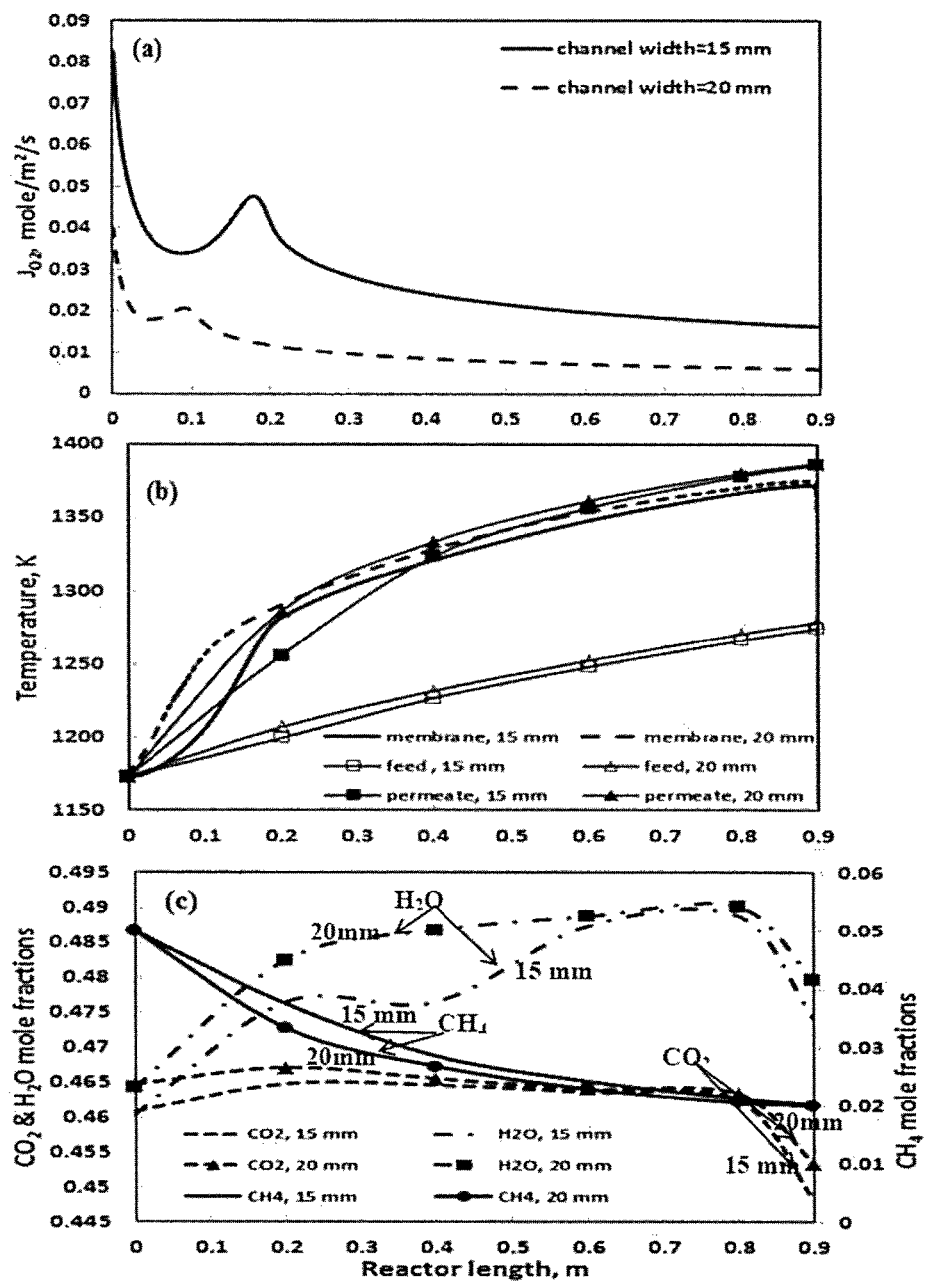
FIG. 62 is a graph of the co-current effect of channel width on axial oxygen permeation flux distribution, axial average temperature distribution of feed gas, membrane and permeate gas and axial average species mole fractions in the permeate side of the membrane.

FIG. 62 is a graph of the co-current: effect of channel width on a) axial oxygen permeation flux distribution; b) axial average temperature distribution of feed gas, membrane and permeate gas; c) axial average species mole fractions in the permeate side of the membrane. This analysis can be confirmed from the results in FIG. 62 that compares the results of the minimum permissible operating channel width, 15 mm, with 20 mm channel width. Large improvement in oxygen permeation flux is obtained by reducing the channel width from 15 mm to 20 mm as shown in FIG. 62. The temperatures are very similar in both cases and also the species concentrations. This is enough to justify the use of the minimum permissible channel width of 15 mm in the present reactor design in order to substitute a gas turbine model. By using 25,000 channels for each stream, this will result in a reactor with total volume of 10 m$^3$.

From the above results, the average membrane temperature has a significant impact on the performance of an ITM reactor. The membrane surface temperature is dependent on the intensity of combustion in the permeate sides of the membranes that accordingly depends on the percentage of fuel in the permeate sides gas flows. The amount of $CH_4$ in the permeate flow have two limitations, one is that, the permeate stream has an upper-bound on diluent flow-rate because the inlet methane concentration should not fall below roughly 5% for mass transfer and combustion stability reasons. Second, according to the measurement of flow rates in feed and permeate side, there is a limit for the value of oxygen permeation flux across the membrane.

Figure 63:
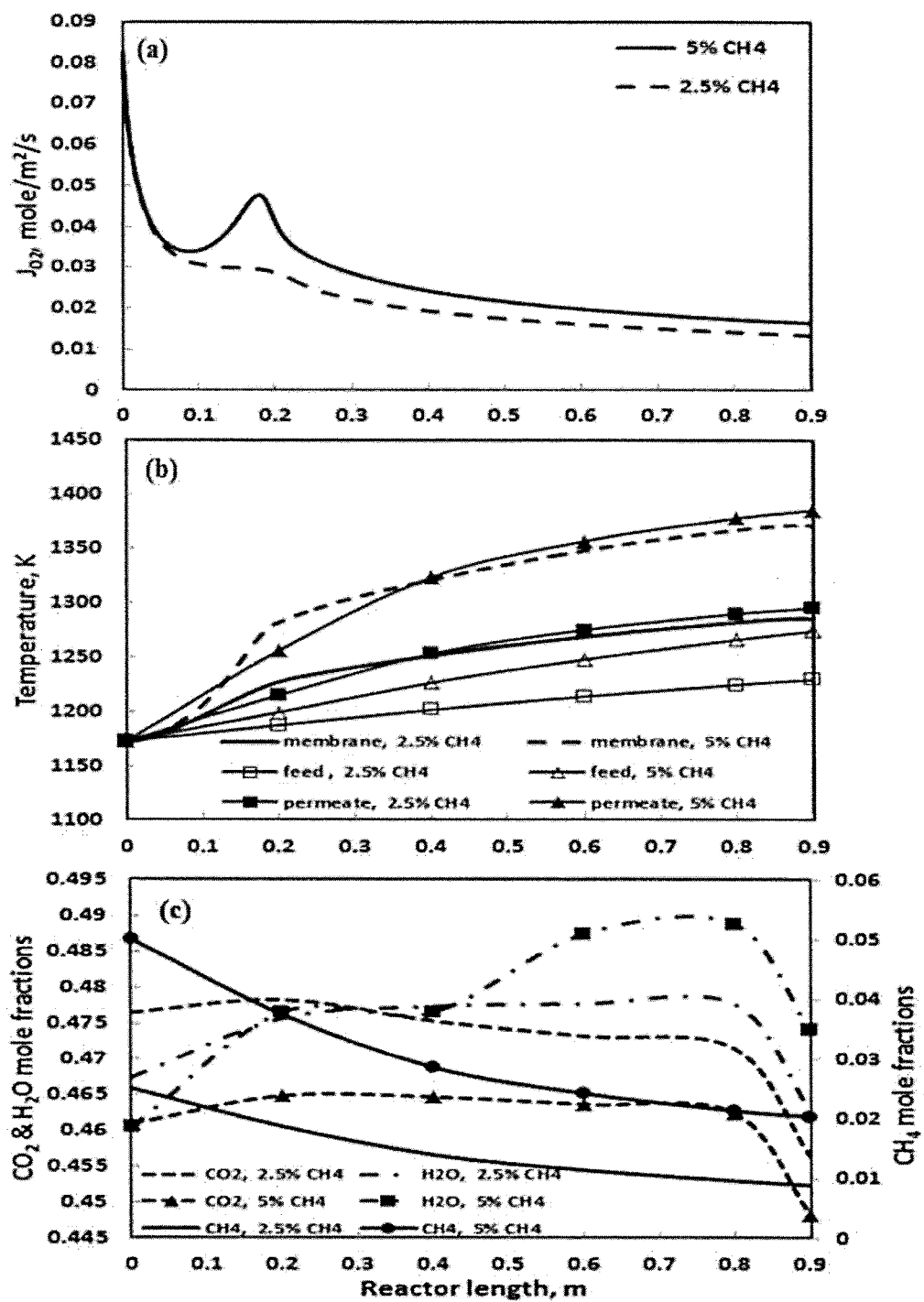
FIG. 63 is a graph of the co-current effect of $CH_4$% axial oxygen permeation flux Distribution, axial average temperature distribution of feed gas, membrane and permeate gas; and axial average species mole fractions in the permeate side of the membrane.

At certain flow conditions like the present case, increasing the flow rates in feed and permeate sides will not result in any increase in the oxygen flux. Based on this, increasing the amount of $CH_4$ in the permeate side over 5% is also non-applicable because of limited oxygen permeation flux. FIG. 63 is a graph of the co-current: effect of $CH_4$% on a) axial oxygen permeation flux distribution; b) axial average temperature distribution of feed gas, membrane and permeate gas; c) axial average species mole fractions in the permeate side of the membrane. FIG. 63 shows the influences of reducing $CH_4$% in the permeate side from 5% to 2.5% Vol. with keeping $H_2O$ % constant on oxygen permeation flux, axial average temperature distribution of feed gas, membrane and permeate gas and axial average species mole fractions in the permeate side of the membrane. As shown in FIG. 63 better oxygen permeation flux distribution is obtained in case of 5% $CH_4$ as compared to the case of 2.5%. Also, the jump in oxygen permeation flux is higher in case of 5% indicating higher combustion temperature and overall improvement in the combustion process.

This may due to the improvement in the ratio between the available oxygen for combustion and methane. However, the temperature distributions for feed gas, membrane and permeate gas are very close in both cases as shown in FIG. 63. This may be attributed to the cooling effects of the excess permeated oxygen in the permeate side which cool down the gases. In FIG. 63, the effects of $CH_4$% on the combustion process is clear and can be seen easily from the average species concentrations through the rector. For both cases, 5% and 2.5%, the amount of $H_2O$ at inlet is the same. However, in case of 5% $CH_4$, the concentrations of $H_2O$ are much higher as compared to the case of 2.5% $CH_4$. This indicates an improvement in combustion process as $H_2O$ is a combustion product. Further more, $CO_2$ concentrations are also improved.

An ITM monolith structure reactor design is introduced for substituting a conventional gas turbine combustor using LSCF1991 membranes. Measurements for the feed and sweep flow rates were performed in order to meet the power required and all simulations were conducted in 3D. Effects of flow configurations, channel width and percentage of $CH_4$CH4 in the permeate side flow have been introduced under constant inlet gas temperature of 1173 K and a fixed operating pressure of 10 bars. The reactor geometry was measured based on the channel width.

It is concluded that counter-current flow configuration design resulted in improvements in oxygen permeation flux and overall heat transfer characteristics. However, it has a limitation as a result of increased membrane temperature. Any reduction in the channel width below 15 mm resulted in large increase in the viscous pressure drop and losing the combustion due to increased flow velocity. As well, increasing the amount of $CH_4$ in the permeate side over 5% was found to be non-applicable because of limited oxygen permeation flux. The present ITM reactor has the capability of producing power output in the range of 5 to 8 MWe based on cycle first law efficiency.

In another embodiment oxygen was extracted from the atmosphere using air separation units and then used in the combustion process. The second approach is based on combining air separation and combustion processes utilizing the ion transport reactor technology. Both experimental and numerical investigations were conducted for an atmospheric diffusion oxy-combustion flame in a gas turbine model combustor. Oxy-combustion and emission characterization, flame stabilization and oxy-combustion model validation have been investigated in details. The combustor is fuelled with $CH_4$ and a mixture of $CO_2$ and $O_2$ as oxidizer. A modified two-step oxy-combustion reaction kinetics model for methane-oxygen combustion has been used in order to predict the oxy-combustion characteristics of the considered flame and validations have been done using the experimental results. Wide ranges of different operating parameters have been considered including equivalence ratio, percentage of $O_2/CO_2$ in the oxidizer mixture and fuel volume flow rate. The stability of the oxy-combustion diffusion flame has been checked experimentally and numerically.

A modified two step finite rate reaction kinetics model for methane oxycombustion has been introduced in order to predict the oxy-fuel combustion characteristics inside an ITM reactor. A detailed 2D analysis has been presented in the present work to understand more the performance of an ITM reactor under the oxycombustion conditions in the permeate side of the membrane. Also, Coefficients of the oxygen permeation equation have been introduced for a LSCF1991 ion transport membrane based on the fitting of the experimental data in the literature. The analysis of the effect of reactivity on the permeation process has been discussed. The effects of many parameters including inlet gases temperature (feed and sweep), reactor geometry, feed and sweep volume flow rates, oxygen partial pressure in the feed side and the effect of the percentage of $CH_4$ in the sweep gases mixture on the permeation process and oxy-combustion characteristics have been analyzed.

A new 3D reactor design is introduced for the substitution of ITM reactors into a gas turbine combustor. An ITM monolith structure reactor design has been introduced for substituting a conventional gas turbine combustor using LSCF 1991 membranes. Measurements for the feed and sweep flow rates were performed in order to meet the power required and all simulations were conducted in 3D. Effects of flow configurations, channel width and percentage of $CH_4$ in the permeate side flow have been introduced under constant inlet gas temperature of 1173 K and a fixed operating pressure of 10 bars. The reactor geometry was structured based on channel width.

The stability of the oxy-combustion flame in the gas turbine combustion application is affected when the operating percentage of Oxygen in the oxidizer mixture is reduced below 25%. Also, no operation was possible for the burner with less than 21% Oxygen in the oxidizer mixture. The combustion stability in the gas turbine combustor was found to be improved with increasing the percentage of $O_2$ at the inlet; however, there is a limitation in temperature. Also, by lowering the equivalence ratio, improvement in flow swirl and the overall combustion process in the gas turbine combustor were improved. Both experimental and numerical results are in good agreement and the modified two step reaction kinetics model is capable of predicting very similar trends of temperature and also the overall flame shape is very close to the recorded experimental flame shape recorded for the gas turbine combustor.

From the 2D sensitivity analysis done above for the simple symmetric design ITM reactor, one can say that there are important parameters affecting the operation of ITM reactors (reactions are activated) like the inlet gases temperature (feed and sweep), percentage of $CH_4$ in the sweep gases mixture and the reactor geometry. Also, there are less important parameters such as, feed and sweep volume flow rates, and oxygen partial pressure in the feed side. The 2D analysis showed that the chemical reactions have a great effect on enhancing the oxygen permeation flux.

Based on the 3D analysis of the monolith structure design ITM reactor for the target of substituting ITM reactor into gas turbine combustor, it is concluded that counter-current flow configuration design resulted in improvements in oxygen permeation flux and overall heat transfer characteristics. However, it has a limitation as a result of increased membrane temperature. From the 3D case, it was shown that any reduction in the channel width below 15 mm resulted in large increase in the viscous pressure drop and losing the combustion due to increased flow velocity. Further, increasing the amount of $CH_4$ in the permeate side over 5% was found to be non-applicable because of limited oxygen permeation flux.

The present ITM reactor has the capability of producing power output in the range of 5 to 8 MWe based on cycle first law efficiency.

New coefficients oxygen permeation equation model is introduced by fitting the experimental data for a LSCF-1991 ion transport membrane. A new 3D reactor design is introduced for the substitution of ITM reactors into a gas turbine combustor.

An analysis oxy-combustion in a gas turbine model combustor has been conducted both experimentally and numerically without comparison with air operation as a reference case. This comparison should be the next step in both experimental and numerical work. Regarding the validation of the numerical model using the experimental data, only two steps oxy-combustion reaction kinetics model has been considered. It is needed to increase the number of steps in order to consider the most important reactions inside the reactor for more accurate results. Tools are required to measure the inside reactor temperature and species concentrations in order to characterize the flame in details.

Also, the idea of application of oxy-combustion technology into gas turbines is possible; however, the combustion temperature will be increased tremendously which need more control to safe the turbine blades.

Experimental investigations on an atmospheric diffusion oxycombustion flame in a gas turbine model combustor is conducted. The combustor is fuelled with $CH_4$ and a mixture of $CO_2$ and $O_2$ as oxidizer. Large operating range of parameters including equivalence ratio (from 0.5 to 1.0), percentages of $O2/CO_2$ in the oxidizer mixture (from 100% tell flame blow out), fuel volume flow rates (from 5 to 9 L/min) are considered in this work.

A wide range of operating equivalence ratios has been considered. At each equivalence ratio, the fuel volume flow rate is changed from 5 to 9 L/min and at each fuel volume flow rate, the percentage of oxygen in the oxidizer mixture is changed from 100% tell the flame blow out. The following tables are describing operating conditions in detail, each table is showing the operating conditions at a certain operating equivalence ratio. 35 experimental sets of experiments have been considered.

TABLE A.1

Experimental operating conditions at fixed equivalence ratio of 0.5.

| Experiment set number | $V°_{CH4}$ (L/min) | Power (kW) | $O_2$% | $V°_{O2}$ (L/min) | $V°_{CO2}$ (L/min) |
|---|---|---|---|---|---|
| set #1 | 5 | 2.782916667 | 100 | 20 | 0 |
|  |  |  | 80 | 20 | 5 |
|  |  |  | 60 | 20 | 13.33 |
|  |  |  | 50 | 20 | 20 |
|  |  |  | 45 | 20 | 24.44 |
|  |  |  | 40 | 20 | 30 |
|  |  |  | 35 | 20 | 37.14 |
|  |  |  | 30 | 20 | 46.67 |
|  |  |  | 25 | 20 | 60 |
| set #2 | 6 | 3.3395 | 100 | 24 | 0 |
|  |  |  | 80 | 24 | 6 |
|  |  |  | 60 | 24 | 16 |
|  |  |  | 50 | 24 | 24 |
|  |  |  | 45 | 24 | 29.33 |
|  |  |  | 40 | 24 | 36 |
|  |  |  | 35 | 24 | 44.57 |
|  |  |  | 30 | 24 | 56 |
|  |  |  | 25 | 24 | 72 |
| set #3 | 7 | 3.896083333 | 100 | 28 | 0 |
|  |  |  | 80 | 28 | 7 |
|  |  |  | 60 | 28 | 18.67 |
|  |  |  | 50 | 28 | 28 |
|  |  |  | 45 | 28 | 34.22 |
|  |  |  | 40 | 28 | 42 |
|  |  |  | 35 | 28 | 52 |
|  |  |  | 30 | 28 | 65.33 |
|  |  |  | 25 | 28 | 84 |
| set #4 | 8 | 4.452666667 | 100 | 32 | 0 |
|  |  |  | 80 | 32 | 8 |
|  |  |  | 60 | 32 | 21.33 |
|  |  |  | 50 | 32 | 32 |
|  |  |  | 45 | 32 | 39.11 |
|  |  |  | 40 | 32 | 48 |
|  |  |  | 35 | 32 | 59.42 |
|  |  |  | 30 | 32 | 74.67 |
|  |  |  | 25 | 32 | 96 |
| set #5 | 9 | 5.00925 | 100 | 36 | 0 |
|  |  |  | 80 | 36 | 9 |
|  |  |  | 60 | 36 | 24 |
|  |  |  | 50 | 36 | 36 |
|  |  |  | 45 | 36 | 44 |
|  |  |  | 40 | 36 | 54 |
|  |  |  | 35 | 36 | 66.85 |
|  |  |  | 30 | 36 | 84 |
|  |  |  | 25 | 36 | 105 |

TABLE A.2

Experimental operating conditions at fixed equivalence ratio of 0.55.

| Experiment set number | $V°)_{CH4}$ (L/min) | Power (kW) | $O_2$% | $V°)_{O2}$ (L/min) | $V°)_{CO2}$ (L/min) |
|---|---|---|---|---|---|
| Set #6 | 5 | 2.782916667 | 100 | 18.18 | 0 |
|  |  |  | 80 | 18.18 | 4.55 |
|  |  |  | 60 | 18.18 | 12.12 |
|  |  |  | 50 | 18.18 | 18.18 |
|  |  |  | 45 | 18.18 | 22.22 |
|  |  |  | 40 | 18.18 | 27.27 |
|  |  |  | 35 | 18.18 | 33.76 |
|  |  |  | 30 | 18.18 | 42.42 |
|  |  |  | 25 | 18.18 | 54.54 |
| set #7 | 6 | 3.3395 | 100 | 21.81 | 0 |
|  |  |  | 80 | 21.81 | 5.45 |
|  |  |  | 60 | 21.81 | 14.54 |
|  |  |  | 50 | 21.81 | 21.81 |
|  |  |  | 45 | 21.81 | 26.66 |
|  |  |  | 40 | 21.81 | 32.72 |
|  |  |  | 35 | 21.81 | 40.52 |
|  |  |  | 30 | 21.81 | 50.9 |
|  |  |  | 25 | 21.81 | 65.45 |
| set #8 | 7 | 3.896083333 | 100 | 25.45 | 0 |
|  |  |  | 80 | 25.45 | 6.36 |
|  |  |  | 60 | 25.45 | 16.97 |
|  |  |  | 50 | 25.45 | 25.45 |
|  |  |  | 45 | 25.45 | 31.11 |
|  |  |  | 40 | 25.45 | 38.18 |
|  |  |  | 35 | 25.45 | 47.27 |
|  |  |  | 30 | 25.45 | 59.4 |
|  |  |  | 25 | 25.45 | 76.36 |
| set #9 | 8 | 4.452666667 | 100 | 29.1 | 0 |
|  |  |  | 80 | 29.1 | 7.27 |
|  |  |  | 60 | 29.1 | 19.4 |
|  |  |  | 50 | 29.1 | 29.1 |
|  |  |  | 45 | 29.1 | 35.55 |
|  |  |  | 40 | 29.1 | 43.64 |
|  |  |  | 35 | 29.1 | 54.03 |
|  |  |  | 30 | 29.1 | 67.88 |
|  |  |  | 25 | 29.1 | 87.27 |
| set #10 | 9 | 5.00925 | 100 | 32.73 | 0 |
|  |  |  | 80 | 32.73 | 8.18 |
|  |  |  | 60 | 32.73 | 21.82 |
|  |  |  | 50 | 32.73 | 32.73 |
|  |  |  | 45 | 32.73 | 40 |
|  |  |  | 40 | 32.73 | 49.1 |
|  |  |  | 35 | 32.73 | 60.78 |
|  |  |  | 30 | 32.73 | 76.36 |
|  |  |  | 25 | 32.73 | 98.18 |

TABLE A.3

Experimental operating conditions at fixed equivalence ratio of 0.6.

| Experiment set number | $V°)_{CH4}$ (L/min) | Power (kW) | $O_2$% | $V°)_{O2}$ (L/min) | $V°)_{CO2}$ (L/min) |
|---|---|---|---|---|---|
| set #11 | 5 | 2.782916667 | 100 | 16.66 | 0 |
|  |  |  | 80 | 16.66 | 4.17 |
|  |  |  | 60 | 16.66 | 11.11 |
|  |  |  | 50 | 16.66 | 16.67 |
|  |  |  | 45 | 16.66 | 20.37 |
|  |  |  | 40 | 16.66 | 25 |
|  |  |  | 35 | 16.66 | 30.95 |
|  |  |  | 30 | 16.66 | 38.89 |
|  |  |  | 25 | 16.66 | 50 |
| set #12 | 6 | 3.3395 | 100 | 20 | 0 |
|  |  |  | 80 | 20 | 5 |
|  |  |  | 60 | 20 | 13.33 |
|  |  |  | 50 | 20 | 20 |
|  |  |  | 45 | 20 | 24.44 |
|  |  |  | 40 | 20 | 30 |
|  |  |  | 35 | 20 | 37.14 |
|  |  |  | 30 | 20 | 46.67 |
|  |  |  | 25 | 20 | 60 |
| set #13 | 7 | 3.896083333 | 100 | 23.33 | 0 |
|  |  |  | 80 | 23.33 | 5.83 |
|  |  |  | 60 | 23.33 | 15.56 |
|  |  |  | 50 | 23.33 | 23.33 |
|  |  |  | 45 | 23.33 | 28.52 |
|  |  |  | 40 | 23.33 | 35 |
|  |  |  | 35 | 23.33 | 43.33 |
|  |  |  | 30 | 23.33 | 54.44 |
|  |  |  | 25 | 23.33 | 70 |
| set #14 | 8 | 4.452666667 | 100 | 26.67 | 0 |
|  |  |  | 80 | 26.67 | 6.67 |
|  |  |  | 60 | 26.67 | 17.77 |
|  |  |  | 50 | 26.67 | 26.67 |
|  |  |  | 45 | 26.67 | 32.6 |
|  |  |  | 40 | 26.67 | 40 |
|  |  |  | 35 | 26.67 | 49.52 |
|  |  |  | 30 | 26.67 | 62.22 |
|  |  |  | 25 | 26.67 | 80 |
| set #15 | 9 | 5.00925 | 100 | 30 | 0 |
|  |  |  | 80 | 30 | 7.5 |
|  |  |  | 60 | 30 | 20 |
|  |  |  | 50 | 30 | 30 |
|  |  |  | 45 | 30 | 36.67 |
|  |  |  | 40 | 30 | 45 |
|  |  |  | 35 | 30 | 55.71 |
|  |  |  | 30 | 30 | 70 |
|  |  |  | 25 | 30 | 90 |

TABLE A.4

Experimental operating conditions at fixed equivalence ratio of 0.65.

| Experiment set number | $V°)_{CH4}$ (L/min) | Power (kW) | $O_2$% | $V°)_{O2}$ (L/min) | $V°)_{CO2}$ (L/min) |
|---|---|---|---|---|---|
| set #16 | 5 | 2.782916667 | 100 | 15.38 | 0 |
|  |  |  | 80 | 15.38 | 3.85 |
|  |  |  | 60 | 15.38 | 10.25 |
|  |  |  | 50 | 15.38 | 15.38 |
|  |  |  | 45 | 15.38 | 18.8 |
|  |  |  | 40 | 15.38 | 23.07 |
|  |  |  | 35 | 15.38 | 28.57 |
|  |  |  | 30 | 15.38 | 35.9 |
|  |  |  | 25 | 15.38 | 46.15 |
| set #17 | 6 | 3.3395 | 100 | 18.46 | 0 |
|  |  |  | 80 | 18.46 | 4.62 |
|  |  |  | 60 | 18.46 | 12.3 |
|  |  |  | 50 | 18.46 | 18.46 |
|  |  |  | 45 | 18.46 | 22.56 |
|  |  |  | 40 | 18.46 | 27.69 |
|  |  |  | 35 | 18.46 | 34.28 |
|  |  |  | 30 | 18.46 | 43.07 |
|  |  |  | 25 | 18.46 | 55.38 |
| set #18 | 7 | 3.896083333 | 100 | 21.54 | 0 |
|  |  |  | 80 | 21.54 | 5.38 |
|  |  |  | 60 | 21.54 | 14.36 |
|  |  |  | 50 | 21.54 | 21.54 |
|  |  |  | 45 | 21.54 | 26.32 |
|  |  |  | 40 | 21.54 | 32.3 |
|  |  |  | 35 | 21.54 | 40 |
|  |  |  | 30 | 21.54 | 50.26 |
|  |  |  | 25 | 21.54 | 64.62 |
| set #19 | 8 | 4.452666667 | 100 | 24.62 | 0 |
|  |  |  | 80 | 24.62 | 6.15 |
|  |  |  | 60 | 24.62 | 16.4 |
|  |  |  | 50 | 24.62 | 24.62 |
|  |  |  | 45 | 24.62 | 30.1 |
|  |  |  | 40 | 24.62 | 36.92 |
|  |  |  | 35 | 24.62 | 45.7 |
|  |  |  | 30 | 24.62 | 57.43 |
|  |  |  | 25 | 24.62 | 73.84 |

TABLE A.4-continued

Experimental operating conditions at fixed equivalence ratio of 0.65.

| Experiment set number | $V°_{CH4}$ (L/min) | Power (kW) | $O_2$ % | $V°_{O2}$ (L/min) | $V°_{CO2}$ (L/min) |
|---|---|---|---|---|---|
| set #20 | 9 | 5.00925 | 100 | 27.7 | 0 |
|  |  |  | 80 | 27.7 | 6.92 |
|  |  |  | 60 | 27.7 | 18.46 |
|  |  |  | 50 | 27.7 | 27.7 |
|  |  |  | 45 | 27.7 | 33.85 |
|  |  |  | 40 | 27.7 | 41.54 |
|  |  |  | 35 | 27.7 | 51.43 |
|  |  |  | 30 | 27.7 | 64.62 |
|  |  |  | 25 | 27.7 | 83.07 |

TABLE A.5

Experimental operating conditions at fixed equivalence ratio of 0.7.

| Experiment set number | $V°_{CH4}$ (L/min) | Power (kW) | $O_2$ % | $V°_{O2}$ (L/min) | $V°_{CO2}$ (L/min) |
|---|---|---|---|---|---|
| set #21 | 5 | 2.782916667 | 100 | 14.28 | 0 |
|  |  |  | 80 | 14.28 | 3.57 |
|  |  |  | 60 | 14.28 | 9.52 |
|  |  |  | 50 | 14.28 | 14.28 |
|  |  |  | 45 | 14.28 | 17.46 |
|  |  |  | 40 | 14.28 | 21.42 |
|  |  |  | 35 | 14.28 | 26.53 |
|  |  |  | 30 | 14.28 | 33.33 |
| set #22 | 6 | 3.3395 | 25 | 14.28 | 42.85 |
|  |  |  | 100 | 17.14 | 0 |
|  |  |  | 80 | 17.14 | 4.29 |
|  |  |  | 60 | 17.14 | 11.43 |
|  |  |  | 50 | 17.14 | 17.14 |
|  |  |  | 45 | 17.14 | 20.95 |
|  |  |  | 40 | 17.14 | 25.71 |
|  |  |  | 35 | 17.14 | 31.84 |
|  |  |  | 30 | 17.14 | 40 |
|  |  |  | 25 | 17.14 | 51.43 |
| set #23 | 7 | 3.896083333 | 100 | 20 | 0 |
|  |  |  | 80 | 20 | 5 |
|  |  |  | 60 | 20 | 13.33 |
|  |  |  | 50 | 20 | 20 |
|  |  |  | 45 | 20 | 24.44 |
|  |  |  | 40 | 20 | 30 |
|  |  |  | 35 | 20 | 37.14 |
|  |  |  | 30 | 20 | 46.67 |
|  |  |  | 25 | 20 | 60 |
| set #24 | 8 | 4.452666667 | 100 | 22.85 | 0 |
|  |  |  | 80 | 22.85 | 5.71 |
|  |  |  | 60 | 22.85 | 15.24 |
|  |  |  | 50 | 22.85 | 22.86 |
|  |  |  | 45 | 22.85 | 27.94 |
|  |  |  | 40 | 22.85 | 34.29 |
|  |  |  | 35 | 22.85 | 42.45 |
|  |  |  | 30 | 22.85 | 53.33 |
|  |  |  | 25 | 22.85 | 68.57 |
| set #25 | 9 | 5.00925 | 100 | 25.7 | 0 |
|  |  |  | 80 | 25.7 | 6.43 |
|  |  |  | 60 | 25.7 | 17.14 |
|  |  |  | 50 | 25.7 | 25.71 |
|  |  |  | 45 | 25.7 | 31.43 |
|  |  |  | 40 | 25.7 | 38.57 |
|  |  |  | 35 | 25.7 | 47.76 |
|  |  |  | 30 | 25.7 | 60 |
|  |  |  | 25 | 25.7 | 77.14 |

TABLE A.6

Experimental operating conditions at fixed equivalence ratio of 0.75.

| Experiment set number | $V°_{CH4}$ (L/min) | Power (kW) | $O_2$ % | $V°_{O2}$ (L/min) | $V°_{CO2}$ (L/min) |
|---|---|---|---|---|---|
| set #26 | 5 | 2.782916667 | 100 | 13.33 | 0 |
|  |  |  | 80 | 13.33 | 3.33 |
|  |  |  | 60 | 13.33 | 8.89 |
|  |  |  | 50 | 13.33 | 13.33 |
|  |  |  | 45 | 13.33 | 16.3 |
|  |  |  | 40 | 13.33 | 20 |
|  |  |  | 35 | 13.33 | 24.76 |
|  |  |  | 30 | 13.33 | 31.11 |
|  |  |  | 25 | 13.33 | 40 |
| set #27 | 6 | 3.3395 | 100 | 16 | 0 |
|  |  |  | 80 | 16 | 4 |
|  |  |  | 60 | 16 | 10.67 |
|  |  |  | 50 | 16 | 16 |
|  |  |  | 45 | 16 | 19.56 |
|  |  |  | 40 | 16 | 24 |
|  |  |  | 35 | 16 | 29.71 |
|  |  |  | 30 | 16 | 37.33 |
|  |  |  | 25 | 16 | 48 |
| set #28 | 7 | 3.896083333 | 100 | 18.67 | 0 |
|  |  |  | 80 | 18.67 | 4.67 |
|  |  |  | 60 | 18.67 | 12.44 |
|  |  |  | 50 | 18.67 | 18.67 |
|  |  |  | 45 | 18.67 | 22.81 |
|  |  |  | 40 | 18.67 | 28 |
|  |  |  | 35 | 18.67 | 34.67 |
|  |  |  | 30 | 18.67 | 43.56 |
|  |  |  | 25 | 18.67 | 56 |
| set #29 | 8 | 4.452666667 | 100 | 21.33 | 0 |
|  |  |  | 80 | 21.33 | 5.33 |
|  |  |  | 60 | 21.33 | 14.22 |
|  |  |  | 50 | 21.33 | 21.33 |
|  |  |  | 45 | 21.33 | 26.07 |
|  |  |  | 40 | 21.33 | 32 |
|  |  |  | 35 | 21.33 | 39.62 |
|  |  |  | 30 | 21.33 | 49.78 |
|  |  |  | 25 | 21.33 | 64 |
| set #30 | 9 | 5.00925 | 100 | 24 | 0 |
|  |  |  | 80 | 24 | 6 |
|  |  |  | 60 | 24 | 16 |
|  |  |  | 50 | 24 | 24 |
|  |  |  | 45 | 24 | 29.33 |
|  |  |  | 40 | 24 | 36 |
|  |  |  | 35 | 24 | 44.57 |
|  |  |  | 30 | 24 | 56 |
|  |  |  | 25 | 24 | 72 |

TABLE A.7

Experimental operating conditions at fixed equivalence ratio of 1.0.

| Experiment set number | $V°_{CH4}$ (L/min) | Power (kW) | $O_2$ % | $V°_{O2}$ (L/min) | $V°_{CO2}$ (L/min) |
|---|---|---|---|---|---|
| set #31 | 5 | 2.782916667 | 100 | 10 | 0 |
|  |  |  | 80 | 10 | 10 |
|  |  |  | 60 | 10 | 6.67 |
|  |  |  | 50 | 10 | 10 |
|  |  |  | 45 | 10 | 12.22 |
|  |  |  | 40 | 10 | 15 |
|  |  |  | 35 | 10 | 18.57 |
|  |  |  | 30 | 10 | 23.33 |
|  |  |  | 25 | 10 | 30 |
| set #32 | 6 | 3.3395 | 100 | 12 | 0 |
|  |  |  | 80 | 12 | 3 |
|  |  |  | 60 | 12 | 8 |
|  |  |  | 50 | 12 | 12 |
|  |  |  | 45 | 12 | 14.67 |
|  |  |  | 40 | 12 | 18 |
|  |  |  | 35 | 12 | 22.29 |
|  |  |  | 30 | 12 | 28 |
|  |  |  | 25 | 12 | 36 |

TABLE A.7-continued

Experimental operating conditions at fixed equivalence ratio of 1.0.

| Experiment set number | $V°_{CH4}$ (L/min) | Power (kW) | $O_2$ % | $V°_{O2}$ (L/min) | $V°_{CO2}$ (L/min) |
|---|---|---|---|---|---|
| set #33 | 7 | 3.896083333 | 100 | 14 | 0 |
|  |  |  | 80 | 14 | 3.5 |
|  |  |  | 60 | 14 | 9.33 |
|  |  |  | 50 | 14 | 14 |
|  |  |  | 45 | 14 | 17.11 |
|  |  |  | 40 | 14 | 21 |
|  |  |  | 35 | 14 | 26 |
|  |  |  | 30 | 14 | 32.67 |
|  |  |  | 25 | 14 | 42 |
| set #34 | 8 | 4.452666667 | 100 | 16 | 0 |
|  |  |  | 80 | 16 | 4 |
|  |  |  | 60 | 16 | 10.67 |
|  |  |  | 50 | 16 | 16 |
|  |  |  | 45 | 16 | 19.56 |
|  |  |  | 40 | 16 | 24 |
|  |  |  | 35 | 16 | 29.71 |
|  |  |  | 30 | 16 | 37.33 |
|  |  |  | 25 | 16 | 48 |
| set #35 | 9 | 5.00925 | 100 | 18 | 0 |
|  |  |  | 80 | 18 | 4.5 |
|  |  |  | 60 | 18 | 12 |
|  |  |  | 50 | 18 | 18 |
|  |  |  | 45 | 18 | 22 |
|  |  |  | 40 | 18 | 27 |
|  |  |  | 35 | 18 | 33.43 |
|  |  |  | 30 | 18 | 42 |
|  |  |  | 25 | 18 | 54 |

The exhaust gas temperature is measured at the exit plan of the reactor (height of 300 mm) with R-type thermocouple from Omega which has a maximum range of 1500° C. and inserted inside a 12 inches long ceramic probe to protect it from high flame temperature. The thermocouple probe is connected to a data logger and a computer which takes the average temperature at each location during one minute. The following tables are showing the temperature measurements data at the exit section of the reactor.

Repeatability of the results was checked by repeating all tests for two times under the same conditions and taking the average value. To consider gas energy at each location, the local temperature measurements at the exit section in the radial direction are repeated and average values are calculated at each location based on energy calculations.

Medhat Ahmed Abdallah Nemitallah, "Applications of Oxy-Fuel Combustion Technology into Gas Turbine Combustors and Ion Transport Membrane Reactors," Doctor of Philosophy in Mechanical Engineering, King Fahd University of Petroleum and Minerals, Dhahran, Saudi Arabia, March 2013-incorporated herein by reference in its entirety.

TABLE B.1

Radial temperature data in ° C. at the exit section of the reactor for different concentrations of oxygen in the oxidizer mixture at $\Phi = 0.55$ and $V_f = 6$ L/min.

| | Radius, mm | | | |
|---|---|---|---|---|
| $O_2$ % | 0.0 | 10 | 20 | 30 |
| 100 | 1008 | 988 | 952 | 861 |
| 80 | 1004 | 978 | 945 | 859 |
| 60 | 935 | 935 | 915 | 839 |
| 50 | 900 | 920 | 919 | 840 |
| 40 | 891 | 916 | 901 | 811 |
| 30 | 890 | 889 | 875 | 808 |
| 25 | 891 | 888 | 858 | 797 |

TABLE B.2

Radial temperature data in ° C. at the exit section of the reactor for different concentrations of oxygen in the oxidizer mixture at $\Phi = 0.55$ and $Y_f = 9$ L/min.

| | Radius, mm | | | |
|---|---|---|---|---|
| $O_2$ % | 0.0 | 10 | 20 | 30 |
| 100 | 1088 | 1082 | 1035 | 881 |
| 80 | 997 | 1036 | 994 | 872 |
| 60 | 1055 | 1072 | 1038 | 912 |
| 50 | 1056 | 1087 | 1072 | 959 |
| 40 | 1024 | 1047 | 1037 | 950 |
| 30 | 992 | 1005 | 989 | 867 |

TABLE B.3

Radial temperature data in ° C. at the exit section of the reactor for different concentrations of oxygen in the oxidizer mixture at $\Phi = 0.65$ and $V_f = 6$ L/min.

| | Radius, mm | | | |
|---|---|---|---|---|
| $O_2$ % | 0.0 | 10 | 20 | 30 |
| 100 | 1078 | 1040 | 958 | 746 |
| 80 | 952 | 927 | 885 | 728 |
| 60 | 883 | 863 | 829 | 687 |
| 50 | 878 | 873 | 811 | 689 |
| 40 | 890 | 884 | 847 | 688 |
| 30 | 905 | 898 | 867 | 712 |
| 25 | 919 | 906 | 878 | 714 |

TABLE B.4

Radial temperature data in ° C. at the exit section of the reactor for different concentrations of oxygen in the oxidizer mixture at $\Phi = 0.65$ and $V_f = 9$ L/min.

| | Radius, mm | | | |
|---|---|---|---|---|
| $O_2$ % | 0.0 | 10 | 20 | 30 |
| 100 | 1048 | 1032 | 998 | 838 |
| 80 | 985 | 983 | 958 | 801 |
| 60 | 1086 | 1073 | 1044 | 862 |
| 50 | 1059 | 1048 | 1027 | 849 |
| 40 | 1036 | 1022 | 1003 | 827 |
| 30 | 1023 | 1011 | 976 | 813 |
| 25 | 1017 | 1008 | 967 | 808 |

TABLE B.5

Radial temperature data in ° C. at the exit section of the reactor for different concentrations of oxygen in the oxidizer mixture at $\Phi = 0.75$ and $V_f = 6$ L/min.

| | Radius, mm | | | |
|---|---|---|---|---|
| $O_2$ % | 0.0 | 10 | 20 | 30 |
| 100 | 764 | 760 | 738 | 642 |
| 80 | 764 | 750 | 723 | 620 |
| 60 | 753 | 737 | 700 | 590 |
| 50 | 798 | 803 | 771 | 662 |
| 40 | 814 | 823 | 804 | 686 |

TABLE B.6

Radial temperature data in ° C. at the exit section of the reactor for different concentrations of oxygen in the oxidizer mixture at $\Phi = 0.75$ and $V_f = 9$ L/min.

| O₂ % | Radius, mm | | | |
|---|---|---|---|---|
| | 0.0 | 10 | 20 | 30 |
| 100 | 901 | 885 | 872 | 783 |
| 80 | 889 | 887 | 867 | 738 |
| 60 | 912 | 909 | 884 | 738 |
| 50 | 949 | 943 | 922 | 778 |
| 40 | 923 | 915 | 885 | 746 |
| 30 | 902 | 897 | 879 | 723 |

TABLE B.7

Energy based average temperature data at the exit section of the reactor at different operating equivalence ratios for 60% O₂ in the oxidizer and $V_f = 6$ L/min.

| $\Phi$ | $T_{avg}$, K | $T_{avg}$, ° C. |
|---|---|---|
| 0.50 | 1181.877 | 908.727 |
| 0.55 | 1157.403 | 884.2533 |
| 0.60 | 1070.61 | 797.4601 |
| 0.65 | 1042.009 | 768.8589 |
| 0.70 | 950.7207 | 677.5707 |
| 0.75 | 929.211 | 656.061 |

TABLE B.8

Energy based average temperature data at the exit section of the reactor at different operating equivalence ratios for 60% O₂ in the oxidizer and $V_f = 9$ L/min.

| $\Phi$ | $T_{avg}$, K | $T_{avg}$, ° C. |
|---|---|---|
| 0.50 | 1237.118 | 963.968 |
| 0.55 | 1258.617 | 985.4667 |
| 0.60 | 1262.382 | 989.2317 |
| 0.65 | 1236.085 | 962.9348 |
| 0.70 | 1177.601 | 904.451 |
| 0.75 | 1093.121 | 819.9709 |

TABLE B.9

Energy based average temperature data at the exit section of the reactor for different oxygen concentrations in the oxidizer at $\Phi = 0.55$ and $V_f = 6$ L/min.

| O₂ % | $T_{avg}$, K | $T_{avg}$, ° C. |
|---|---|---|
| 100 | 1190.787 | 917.6371 |
| 80 | 1185.741 | 912.5915 |
| 60 | 1157.403 | 884.2533 |
| 50 | 1155.741 | 882.5914 |
| 40 | 1135.164 | 862.0141 |
| 30 | 1120.471 | 847.3206 |
| 25 | 1109.494 | 836.344 |

TABLE B.10

Energy based average temperature data at the exit section of the reactor for different oxygen concentrations in the oxidizer at $\Phi = 0.55$ and $V_f = 9$ L/min.

| $\Phi$ | $T_{avg}$, K | $T_{avg}$, ° C. |
|---|---|---|
| 100 | 1244.486 | 971.3355 |
| 80 | 1217.547 | 944.3965 |

TABLE B.10-continued

Energy based average temperature data at the exit section of the reactor for different oxygen concentrations in the oxidizer at $\Phi = 0.55$ and $V_f = 9$ L/min.

| $\Phi$ | $T_{avg}$, K | $T_{avg}$, ° C. |
|---|---|---|
| 60 | 1258.617 | 985.4667 |
| 50 | 1295.068 | 1021.918 |
| 40 | 1271.738 | 998.5884 |
| 30 | 1208.197 | 935.047 |

Figure 64:
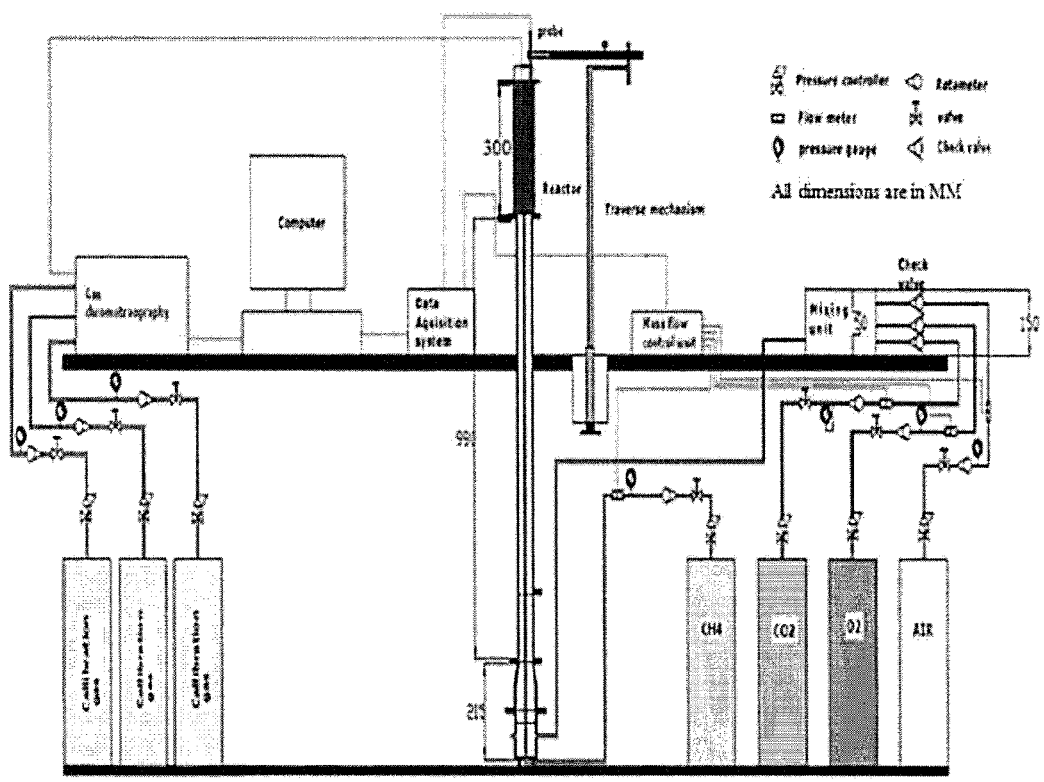
FIG. 64 is a schematic diagram of the test-rig facility.

FIG. 64 is a schematic diagram of the test-rig facility.

Figure 65:
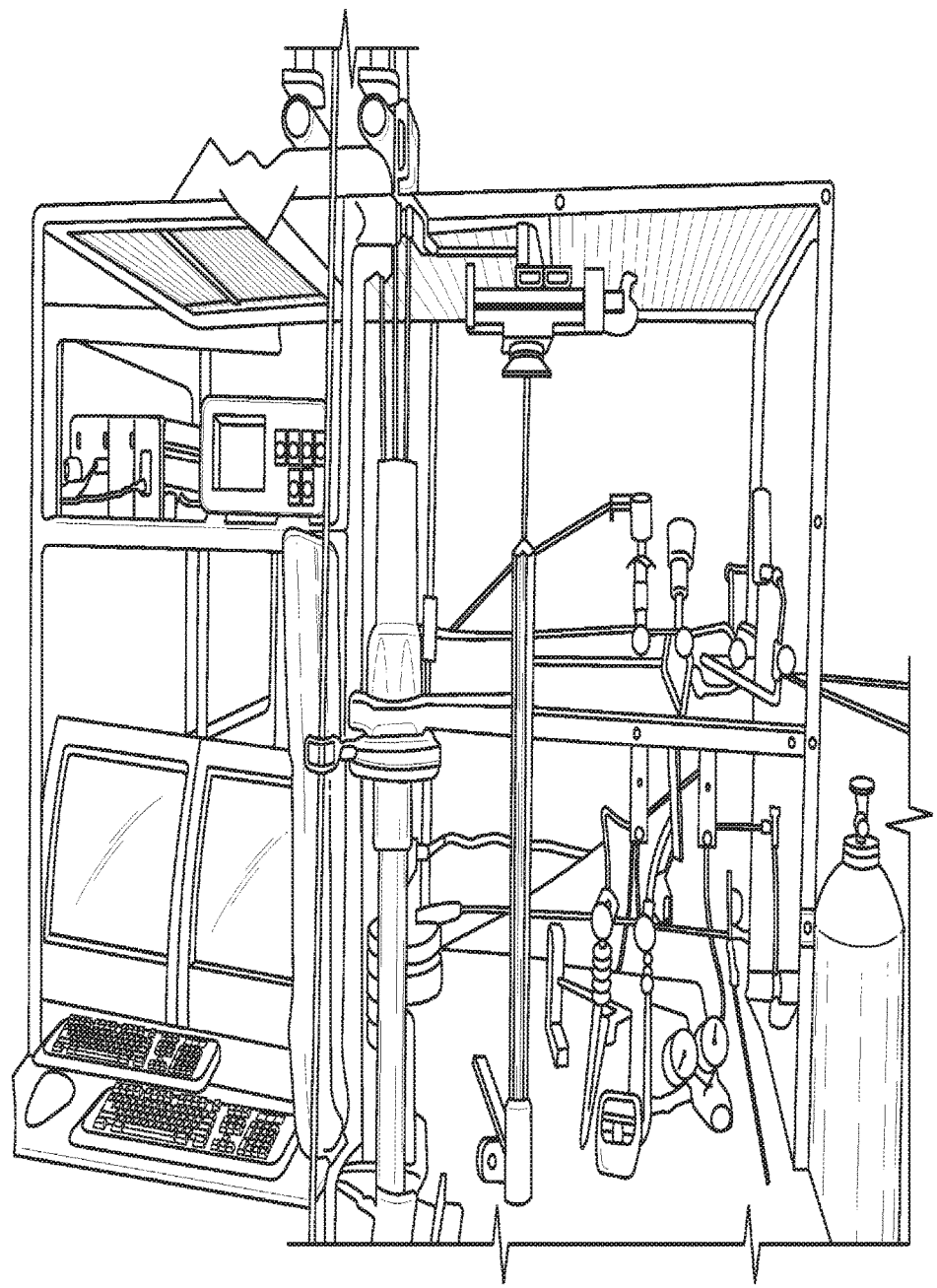
FIG. 65 depicts the test-rig facility.

FIG. 65 depitcs=the test-rig facility.

Figure 66:
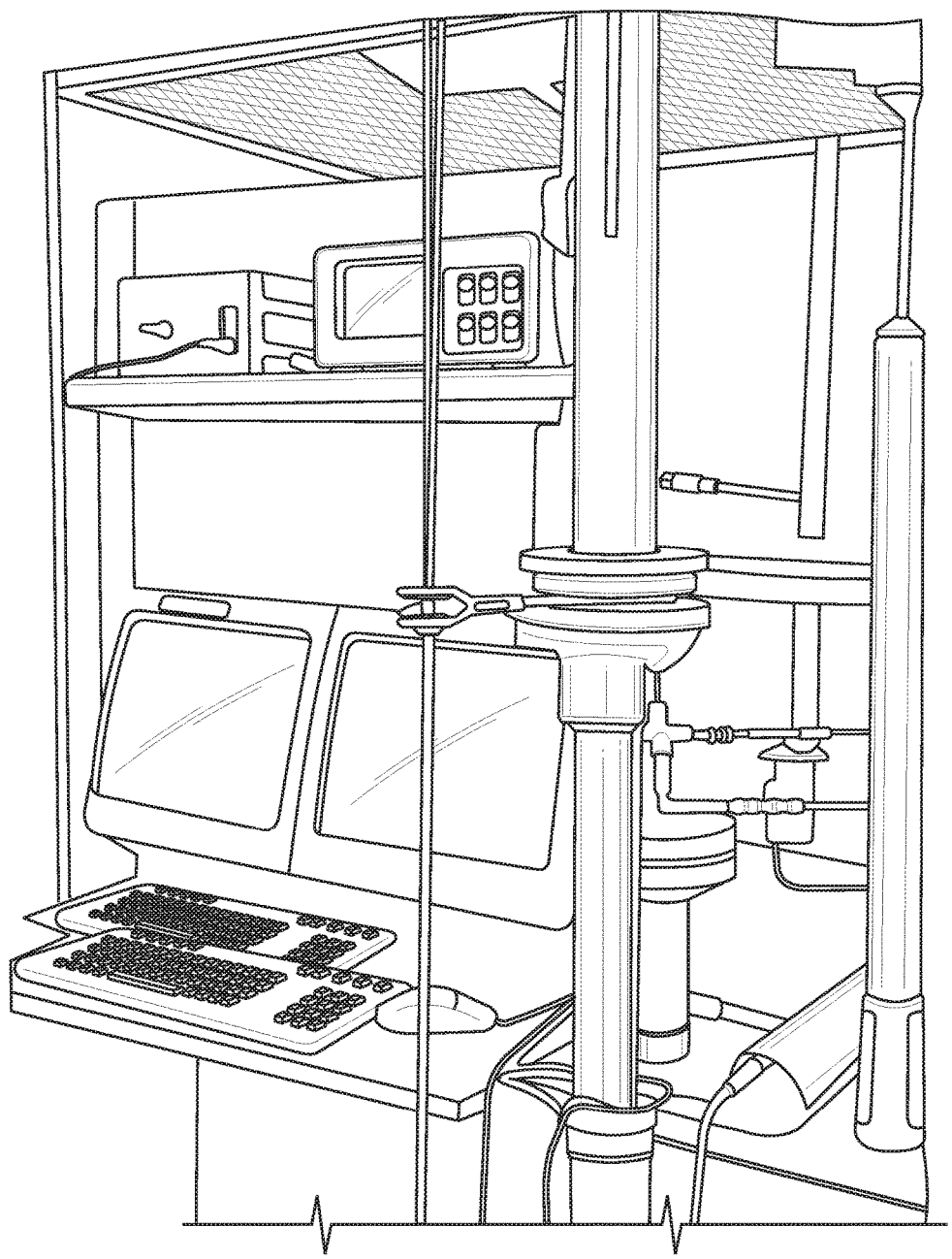
FIG. 66 depicts the data acquisition system and post processing computers.

FIG. 66 depicts the data acquisition system and post processing computers.

Figure 67:
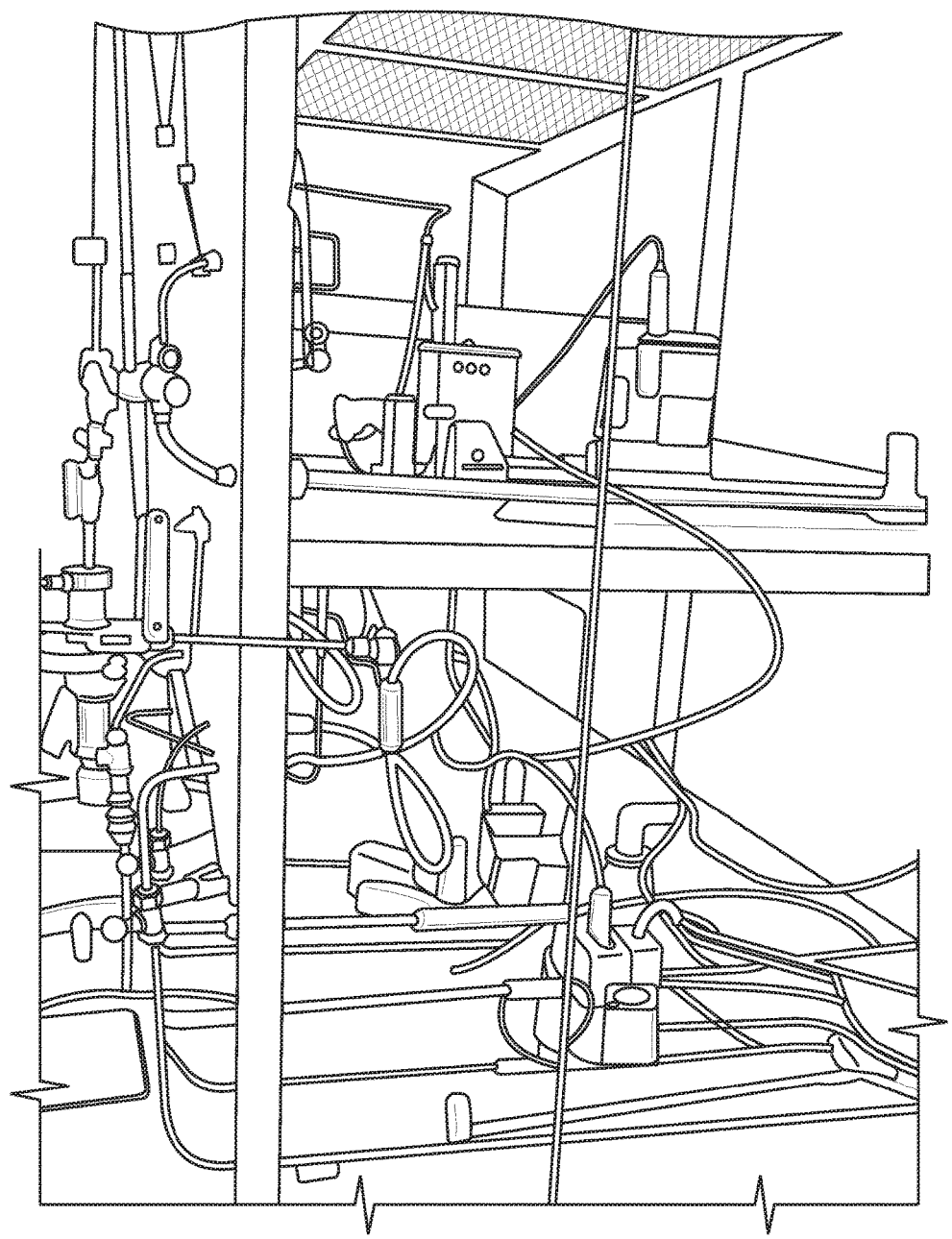
FIG. 67 depicts the mass flow controllers of $CH_4$, O2, $CO_2$2 and air.

FIG. 67 depicts the mass flow controllers of CH₄, O2, CO₂ and air.

Figure 68:
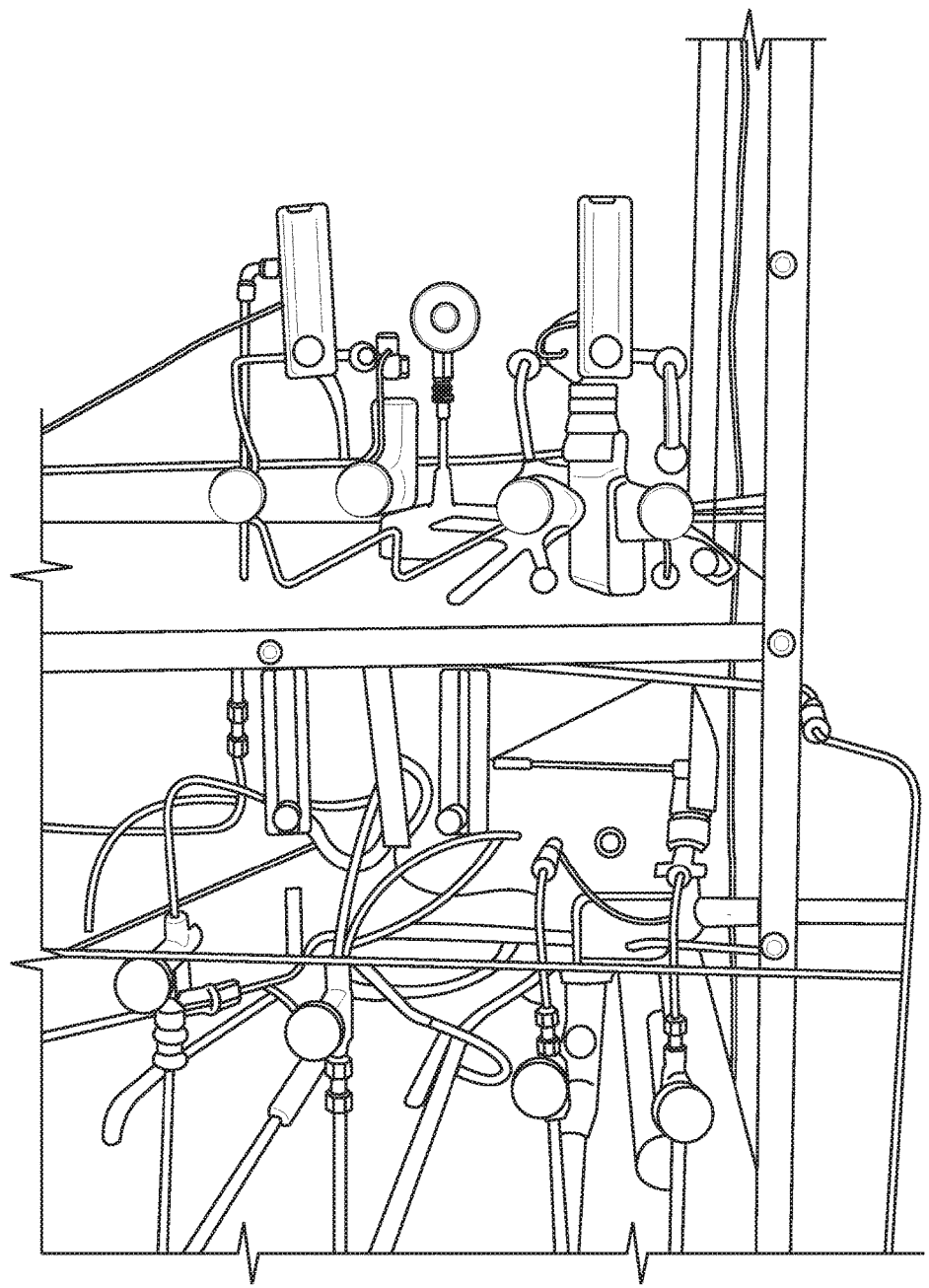
FIG. 68 depicts the mass flow meters, Rotameters, used for visualization of the flow and also for double checking of the volume flow rates.
Figure 69:
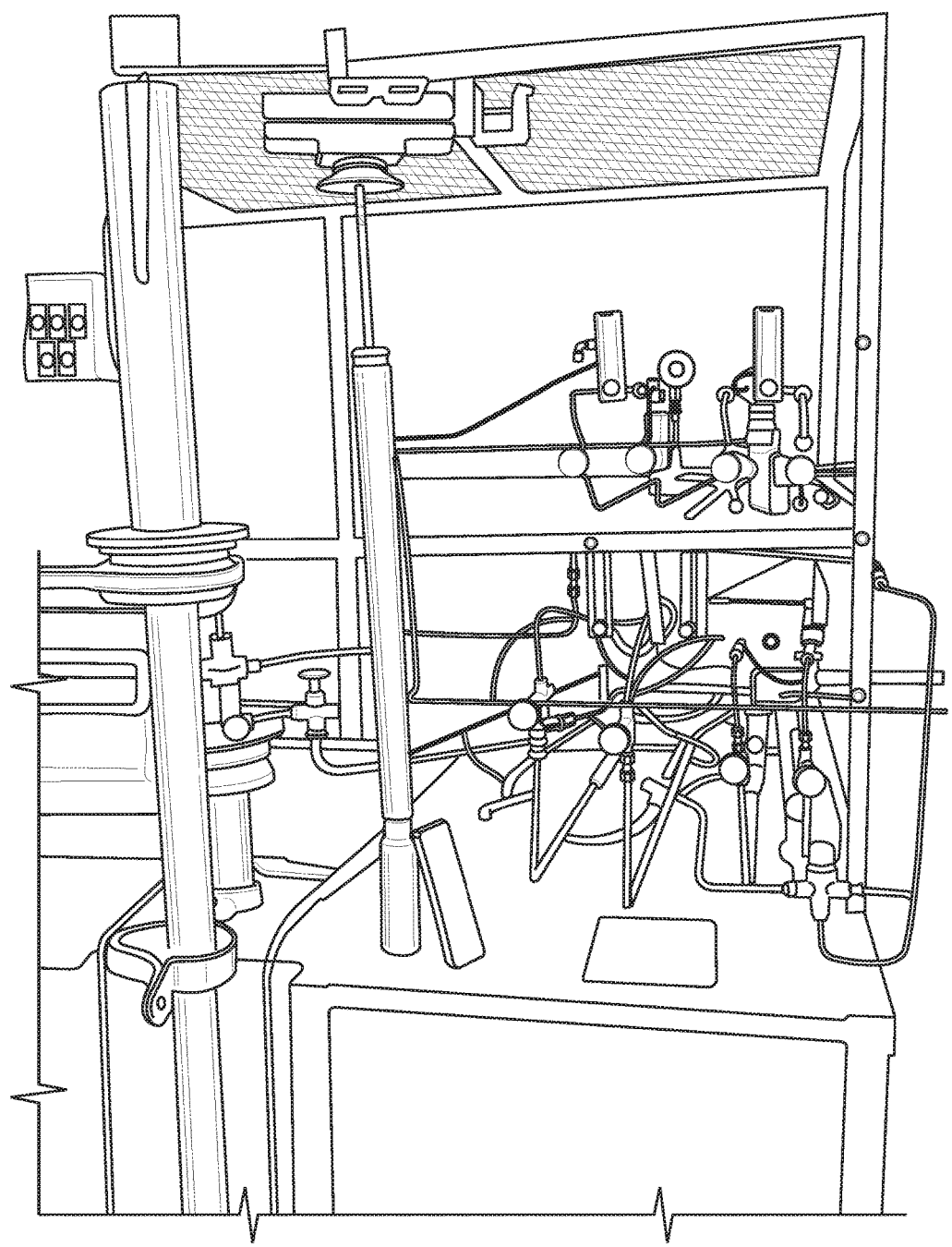
FIG. 69 depicts the traverse mechanism used for fixing probes at the required position inside the reactor.
Figure 70:
FIG. 70 depicts the $CH_4$, O2, $CO_2$ and air cylinders.

FIG. 68 depicts the mass flow meters, Rotameters, used for visualization of the flow and also for double checking of the volume flow rates FIG. 69 depicts the traverse mechanism used for fixing probes at the required position inside the reactor FIG. 70 depicts the CH₄, O2, CO₂ and air cylinders.

Figure 71:
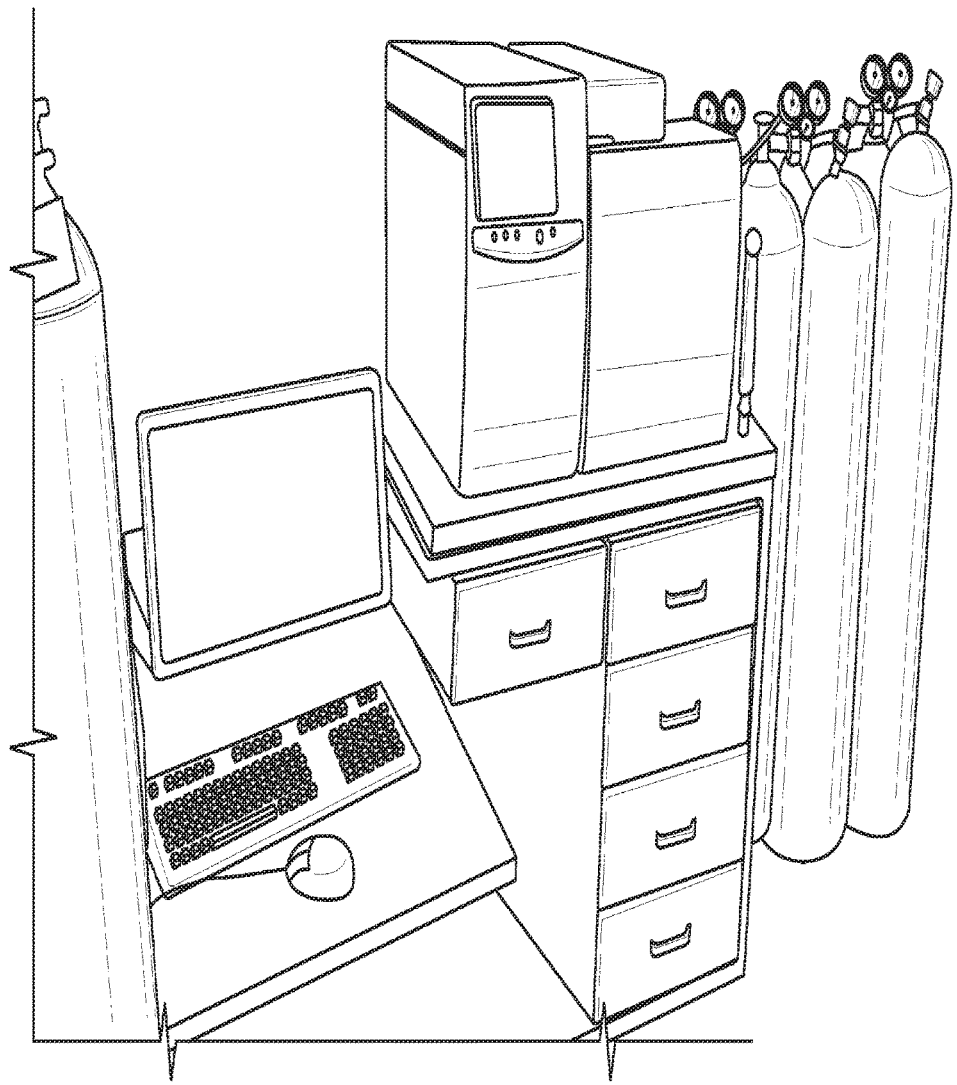
FIG. 71 depicts the gas chromatograph used in emission analysis and its calibration cylinders.

FIG. 71 depicts the gas chromatograph used in emission analysis and its calibration cylinders.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A monolith structure ion transport membrane reactor comprising:
a plurality of first and second ionic ceramic membranes that separate oxygen from a feed gas, wherein the first and second ionic ceramic membranes are oriented lengthwise and the first ionic ceramic membranes form first walls and the second ionic ceramic membranes form second walls defining a plurality of alternately stacked feed channels and permeate channels;
wherein the plurality of feed channels and the plurality of permeate channels are present in the monolith structure ion transport membrane reactor formed by the first and second ionic ceramic membranes;
wherein each permeate channel has a fuel inlet at an upstream end of the reactor and each feed channel has an oxygen-containing gas inlet at an upstream end of the reactor;
wherein an oxygen-containing gas passes through the feed channels and at least one of the first and the second ionic ceramic membranes separates oxygen from the feed channels into the fuel channels through at least one ionic ceramic membrane to react with a fuel gas present in the permeate channels to create a flame;
wherein the monolith structure ion transport membrane reactor has at least 50,000 permeate channels in which the oxygen gas and the fuel gas combust; and
wherein the permeate channels have a width of 1-15 mm.

2. The monolith structure ion transport membrane reactor of claim 1 in which the total surface area of the ionic ceramic membranes is 2500 $m^2$-3000 $m^2$ and the ionic ceramic membranes have a thickness of 0.5-1.0 mm.

3. The monolith structure ion transport membrane reactor of claim 1 in which the monolith structure ion transport membrane reactor has a power output ranging from 5-8 MWe based on cycle first law efficiency.

4. The monolith structure ion transport membrane reactor of claim 1 in which a methane concentration remains above 5% at both the permeate inlet and in the permeate channels of the monolith structure ion transport membrane reactor.

5. The monolith structure ion transport membrane reactor of claim 1 wherein both the separation of the oxygen gas from the feed gas and the of the oxygen gas with the fuel gas occurs inside the monolith structure ion transport membrane reactor.

* * * * *